(12) United States Patent
Volin

(10) Patent No.: US 12,201,066 B2
(45) Date of Patent: Jan. 21, 2025

(54) SIX-DEVICE-IN-ONE MATERIAL-SAVING CONSUMER-AND-MANUFACTURER-COST-SAVING SHIPPING-VOLUME-SAVING MULTI-BARRIER-LOCKING MULTI-ROOT-GRIPPING-AND-WATER-FLOWING ANTI-DIGGING GARDEN-AND-TREE-PROTECTING VERTICAL-TRUCK-BED-EXTENDER-AND-TONNEAU-COVER STACKABLE LANDSCAPE BARRIER

(71) Applicant: Dee Volin, Gresham, OR (US)

(72) Inventor: Dee Volin, Gresham, OR (US)

( * ) Notice: Subject to any disclaimer, the term of this patent is extended or adjusted under 35 U.S.C. 154(b) by 1195 days.

(21) Appl. No.: 16/994,557

(22) Filed: Aug. 15, 2020

(65) Prior Publication Data

US 2021/0084838 A1 Mar. 25, 2021

Related U.S. Application Data

(60) Provisional application No. 62/905,389, filed on Sep. 25, 2019.

(51) Int. Cl.
*A01G 9/28* (2018.01)
*A01G 13/02* (2006.01)
(Continued)

(52) U.S. Cl.
CPC ............... *A01G 13/10* (2013.01); *A01G 9/28* (2018.02); *A01G 13/0231* (2013.01);
(Continued)

(58) Field of Classification Search
CPC ....................................................... A01G 9/28
See application file for complete search history.

(56) References Cited

U.S. PATENT DOCUMENTS 2,094,519 A 2/1937 Ballard
2,769,277 A 1/1953 Keelor
(Continued)

FOREIGN PATENT DOCUMENTS

FR 2630290 A1 * 10/1989
FR 2753341 A1 * 3/1998 ......... A01G 13/0243
(Continued)

*Primary Examiner* — Magdalena Topolski

(57) ABSTRACT

A six-device-in-one landscape barrier, comprises: a barrier, a end-wing molded to the barrier for saving materials during manufacturing, being half of the length of comparable prior art and saving money for consumers by requiring less overlap at the ends of the landscape barriers and preventing animals from digging beneath the landscape barrier, when inserted into the soil vertically and bending to create a variety of corner angles, corner-angling holes cut out from the barrier for lockingly supporting a garden-plant cage and promoting bending of the end-wing to form a variety of corner angles, tongue-locking openings cut out from the end-wing, barrier-locking tongues molded to the end-wing for saving materials during manufacturing, being half of the length of comparable prior art and saving money for consumers by requiring less overlap at the two barrier ends of the landscape barriers and securely supporting solar-stake-mounted lights or a trellis for vines or climbing plants or an
(Continued)

umbrella pole or a sprinkler head or drip line and securely connecting multiple landscape barriers together by inserting through the tongue-locking opening and wrapping over the top or under the bottom of the barrier and securely locking multiple landscape barriers together by inserting through the tongue-locking openings, wrapping in the opposite direction through the corner-angling holes, and again through the tongue-locking opening and anchoring the landscape barrier into soil and protecting garden plants from animals and saving materials during manufacturing, being half of the length of comparable prior art and saving money for consumers by requiring less overlap at the ends of the landscape barriers, a fold-over ridge folded from the top of the material-saving barrier for connecting the ridge of one landscape barrier to the ridge of an another landscape barrier to create a shield to protect garden plants from animals and to create a shield to protect saplings from animals and to create a shield to protect trees from animals and to create a barrier to protect garden vegetation from animals and to create a tonneau cover of a truck bed and providing a guide for the end-wing to slide into, at least one serpentine stake punched out of the barrier for frictionally anchoring the stake into soil by providing a serpentine stake shape and securing the landscape barrier into soil on an inclined or level surface and piercing into soil angledly or vertically, root-gripping tunnels punched out of the barrier for saving materials during manufacturing by stamping out the stake from the barrier and saving time and energy costs when the stake is stored within the root-gripping tunnel during packaging and storage and shipping the landscape barrier to reduce the space needed in each shipping container and to reduce the space needed for the landscape barrier and to reduce unit cost of the landscape barrier and securing the landscape barrier into soil by providing tunnel openings through which grass and plant roots may grow and soil may fill and locking into soil by providing tunnel lower edges below the root-gripping tunnels, stake-locking nipples formed into the barrier for locking the stake to the barrier to provide a secure place to store the stake when not in use and to prevent loss of the stake, a stopper formed into the stake, a stake-locking hole punched out of the stake for locking the stake tip to the barrier for storage and shipping and securing the stake in the soil by providing an opening through which grass and plant roots may grow and creating friction against the soil to secure the stake, at least one single-angled sheath and double-angled sheath and triple-angled sheath, molded to the barrier for connecting multiple landscape barriers by providing an opening for a strap to be threaded therethrough to create a shield to protect gardens or saplings or trees from animals and a barrier to protect garden plants from animals and a tonneau cover of a truck bed and securing the landscape barrier to the utility holes of a pickup truck by providing an opening for the stake to be threaded therethrough to create a vertical truck-bed extender and securing multiple landscape barriers to each other vertically by providing an opening for a stake to be threaded therethrough to create a tree ring or planter ring of varying heights and guiding a stake while being inserted vertically or angledly, ridges respectively pressed into the stake for wedging into the single- and double- and triple-angled sheaths to securely lock the stake for storage and shipping and wedging into the double-angled sheath to securely lock the stake and wedging into the triple-angled sheath to securely lock the stake and frictionally securing the stake into soil, having friction provided by serpentine ridge-shapes, to prevent lifting when ground expands and contracts due to changes in temperature and securingly locking the stake to the barrier by snap-locking to the triple-angled sheath.

14 Claims, 100 Drawing Sheets

(51) Int. Cl.
  *A01G 13/10* (2006.01)
  *A01M 29/30* (2011.01)
  *B62D 33/04* (2006.01)
  *A01G 13/00* (2006.01)

(52) U.S. Cl.
  CPC ..... *A01G 13/0237* (2013.01); *A01G 13/0243* (2013.01); *A01M 29/30* (2013.01); *B62D 33/046* (2013.01); *A01G 2013/006* (2013.01)

(56) References Cited

U.S. PATENT DOCUMENTS

| | | | | |
|---|---|---|---|---|
| 2,809,809 | A | * 10/1957 | Johnston | A01G 9/28 D8/1 |
| 3,484,989 | A | 12/1969 | Lazinsky | |
| 3,495,352 | A | 2/1970 | Sbare | |
| 4,372,079 | A | 2/1983 | Trageser | |
| 4,628,632 | A | * 12/1986 | Zwier | A01G 9/28 47/33 |
| 4,995,191 | A | * 2/1991 | Davis | A01G 29/00 47/32.7 |
| 5,020,272 | A | * 6/1991 | Herrema | A01G 9/28 47/33 |
| 5,301,461 | A | 4/1994 | Zwier | |
| 5,375,369 | A | 12/1994 | VerHoeve | |
| 5,379,546 | A | * 1/1995 | Popp | A01G 9/28 47/33 |
| 5,640,801 | A | * 6/1997 | Rynberk | A01G 9/28 47/33 |
| D390,671 | S | 2/1998 | Prassas | |
| 5,941,018 | A | 8/1999 | Herrem | |
| 6,012,254 | A | 1/2000 | Gaston | |
| 6,026,610 | A | 2/2000 | Northrop | |
| D444,579 | S | 7/2001 | Emalfarb | |
| 6,324,783 | B1 | * 12/2001 | McIntyre | A01G 9/28 47/33 |
| 6,345,465 | B1 | 2/2002 | Allen | |
| 6,629,383 | B2 | 10/2003 | Allen | |
| 6,779,297 | B2 | 8/2004 | Conde | |
| D548,368 | S | 8/2007 | Hale | |
| 7,836,907 | B2 | 8/2010 | Strobl, Jr. | |
| 8,499,491 | B2 | 8/2013 | Bolin | |
| 9,173,350 | B1 | 11/2015 | Beutler | |
| D752,248 | S | 3/2016 | Kopp | |
| 10,378,232 | B2 | * 8/2019 | Volin | E04H 12/2261 |
| 10,729,077 | B2 | * 8/2020 | Bahler | A01G 9/28 |
| 11,957,095 | B2 | * 4/2024 | Fischer | A01G 9/28 |
| 2002/0129546 | A1 | * 9/2002 | Baumann | A01G 9/28 47/33 |
| 2005/0055876 | A1 | 3/2005 | Solis | |
| 2005/0210740 | A1 | * 9/2005 | Zwier | A01G 9/28 47/33 |
| 2008/0163566 | A1 | 7/2008 | Bella | |
| 2010/0050505 | A1 | * 3/2010 | Zwier | A01G 9/28 47/33 |

FOREIGN PATENT DOCUMENTS

| | | | |
|---|---|---|---|
| GB | 2288964 A | * 11/1995 | A01G 1/08 |
| GB | 2340719 A | * 3/2000 | A01G 1/08 |
| KR | 102277077 B1 | * 7/2021 | |

* cited by examiner

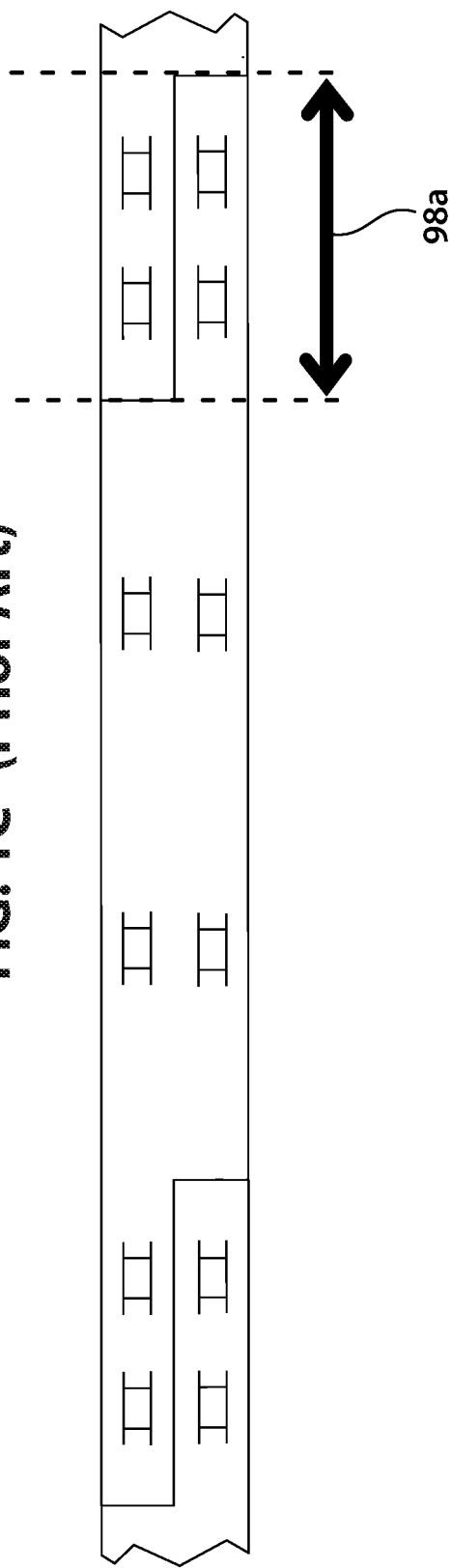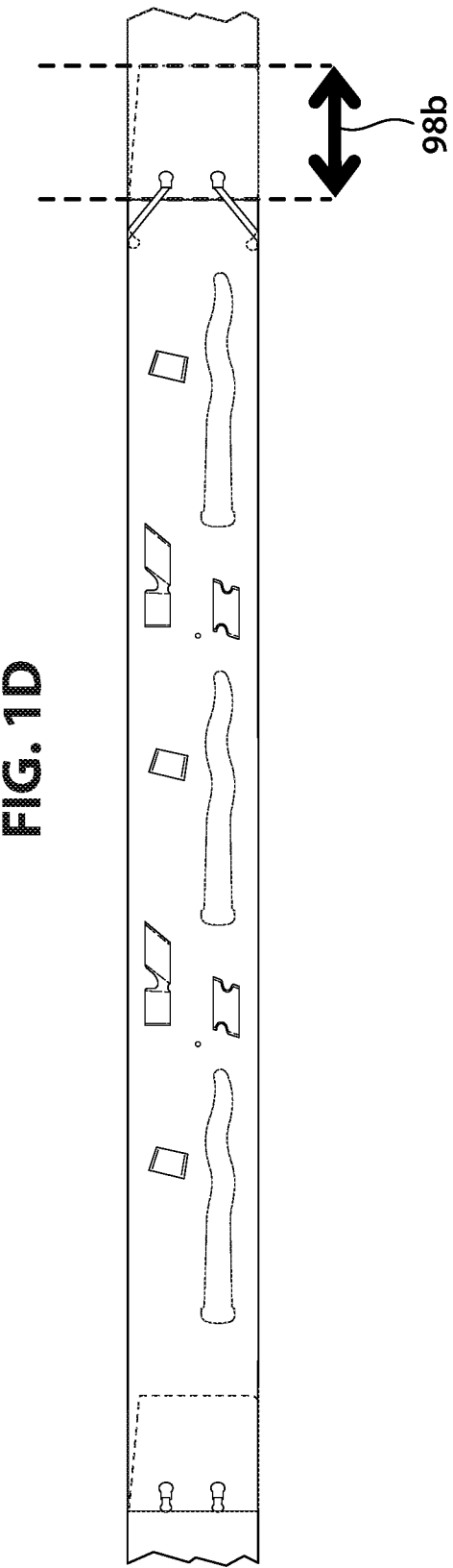
FIG. 1C (Prior Art)
FIG. 1D

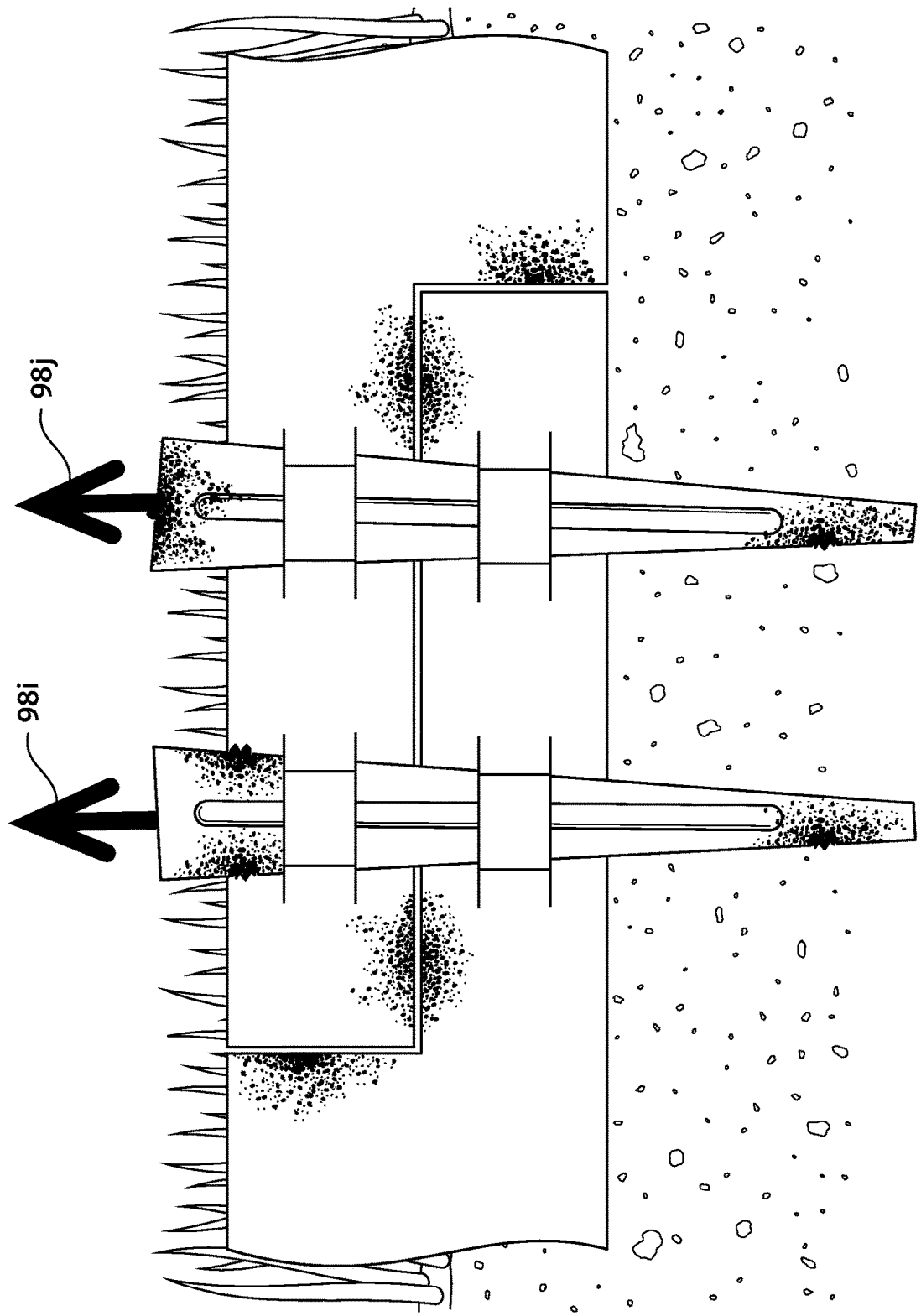

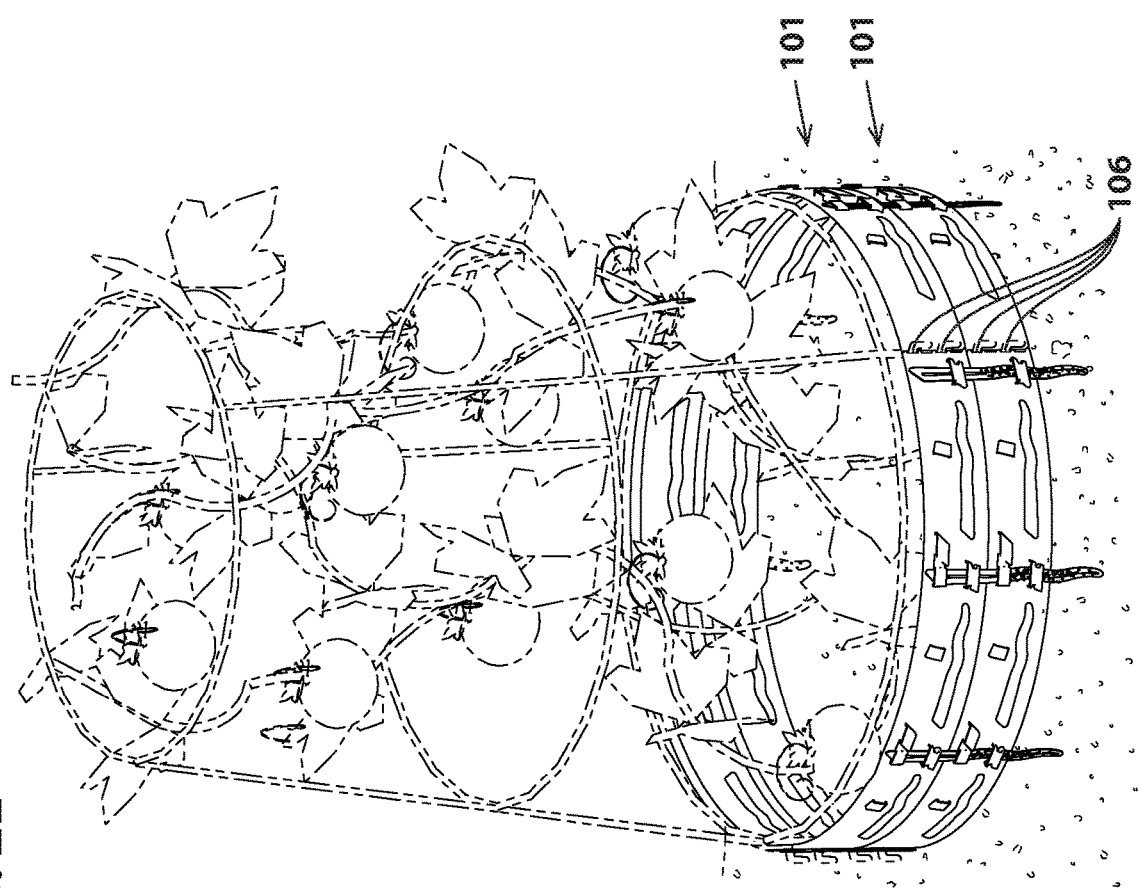
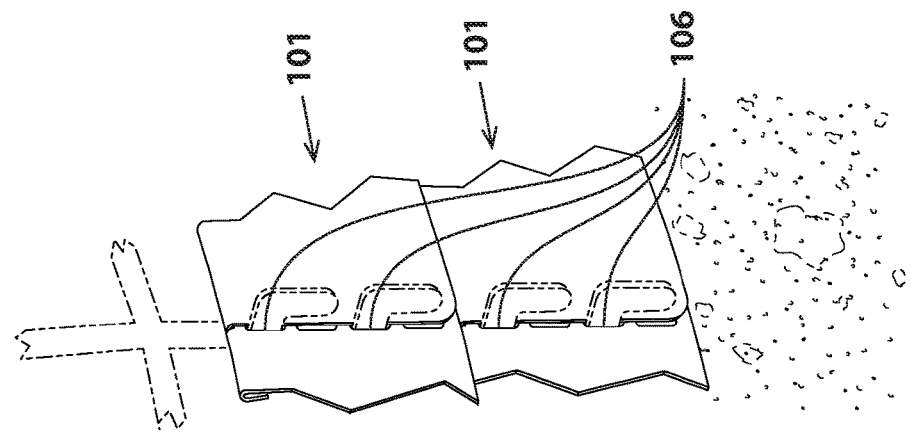
FIG. 2E
FIG. 2F

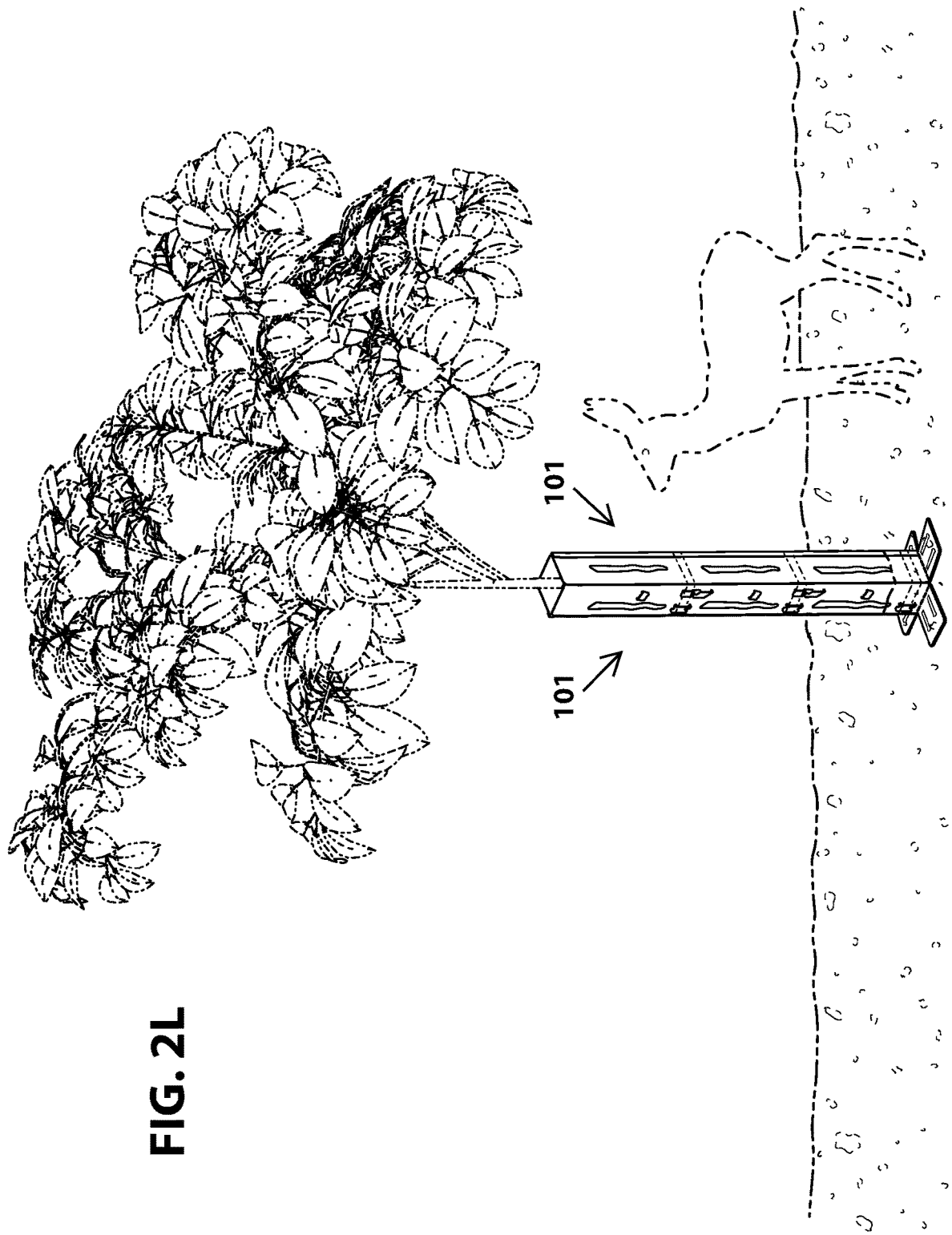

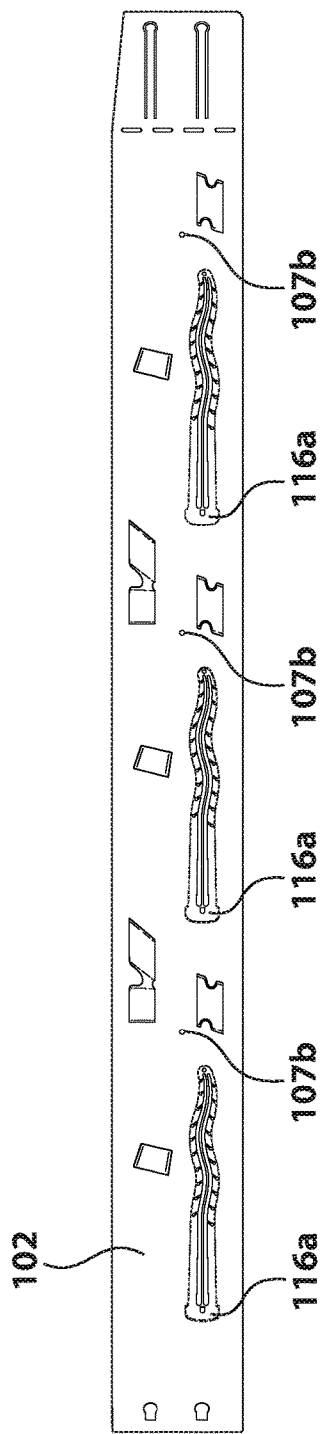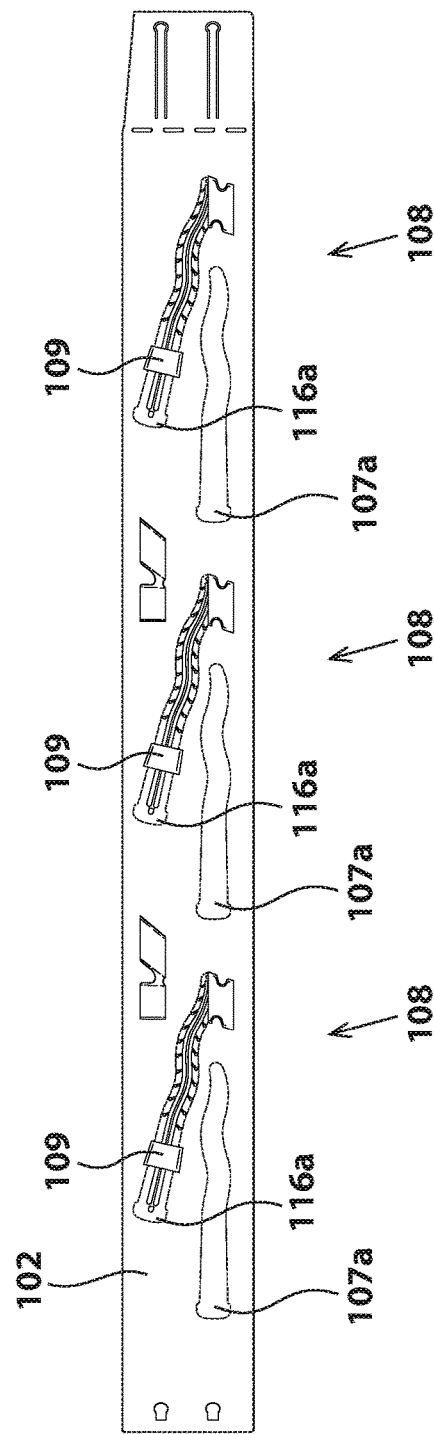

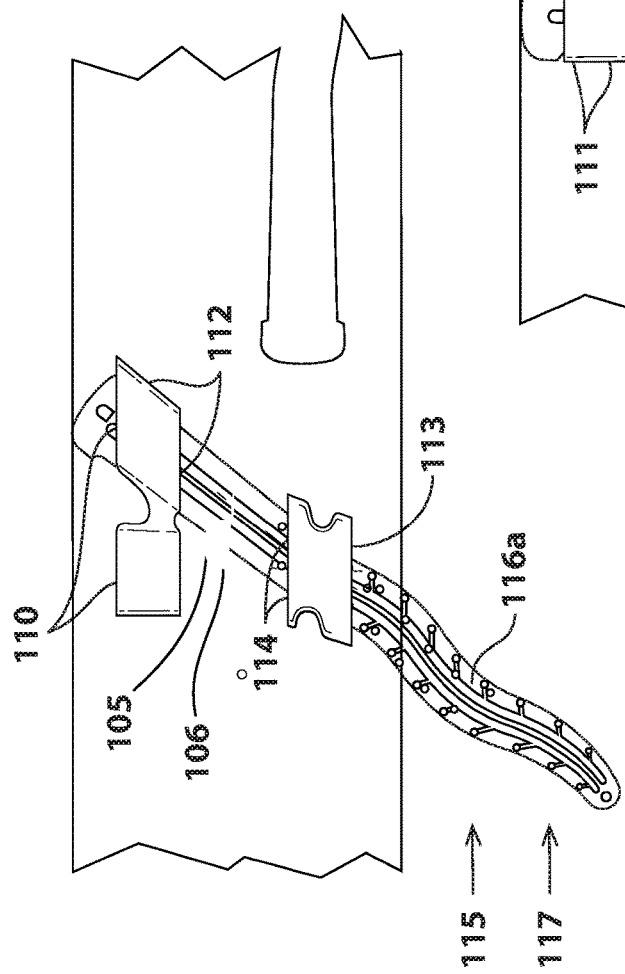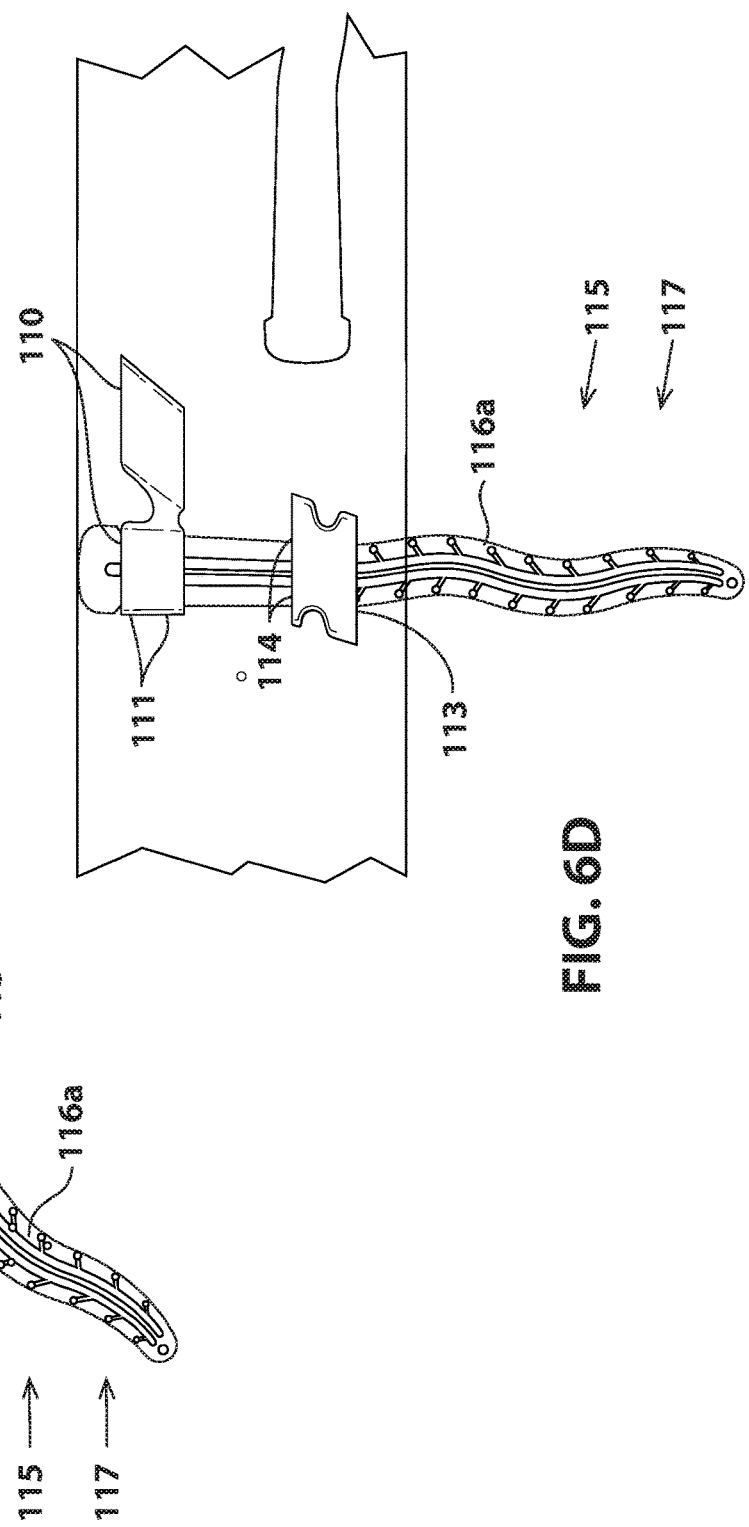

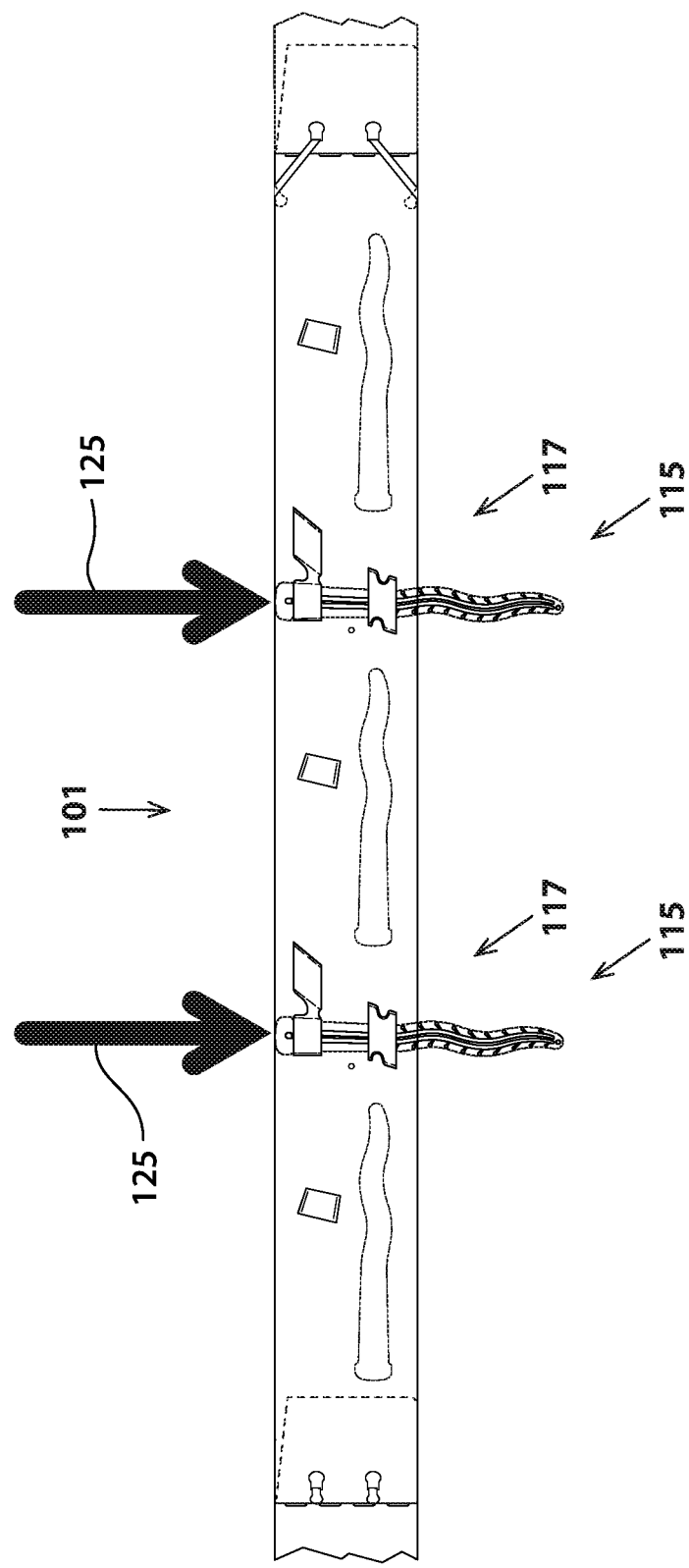

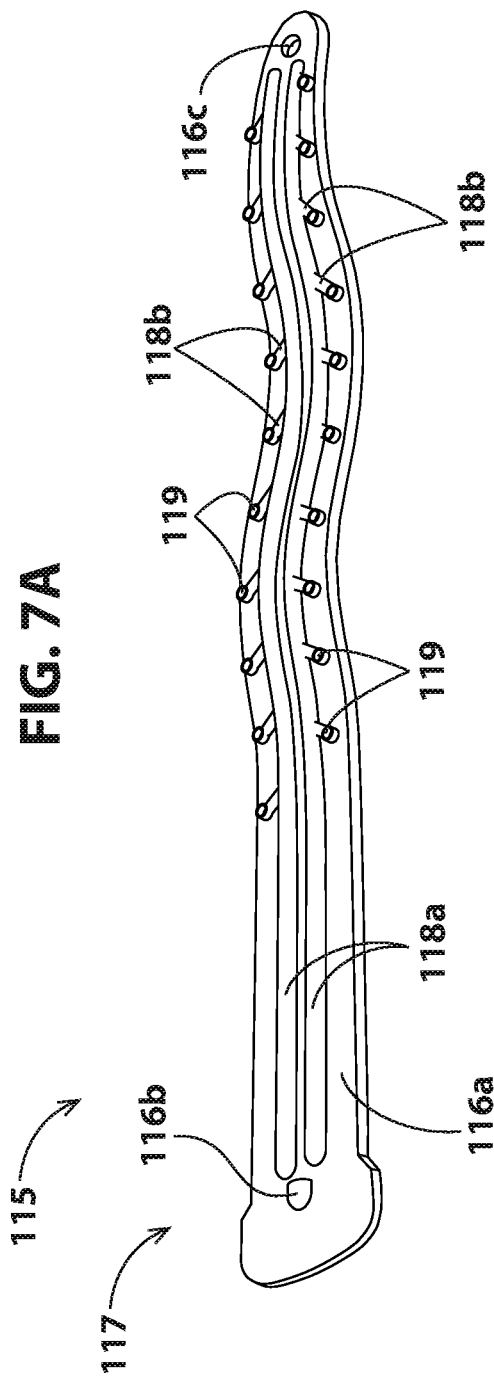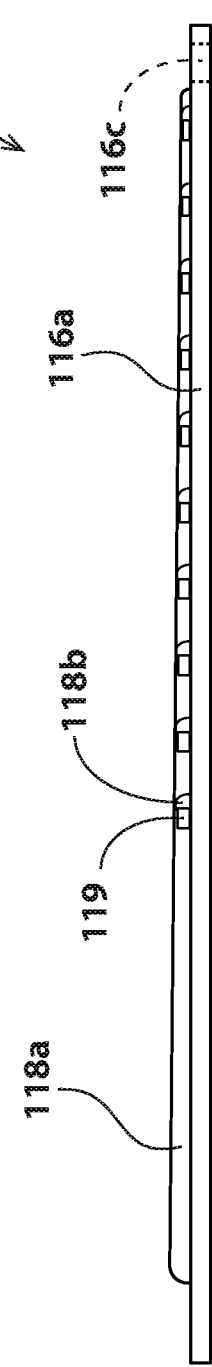

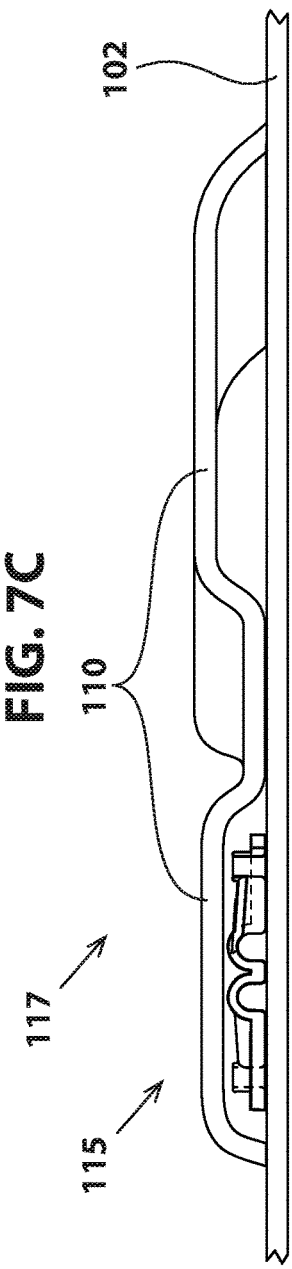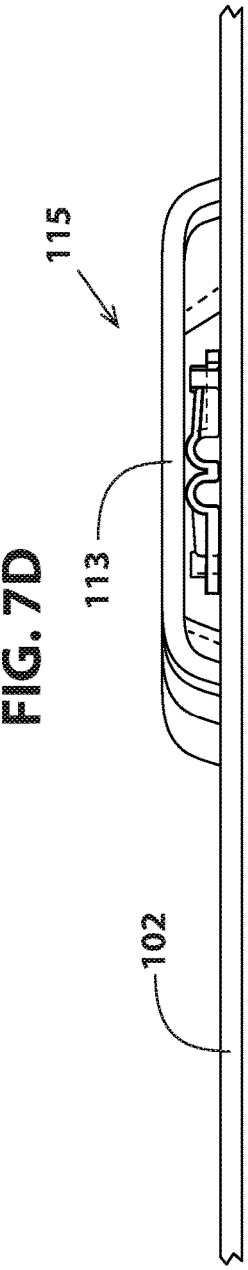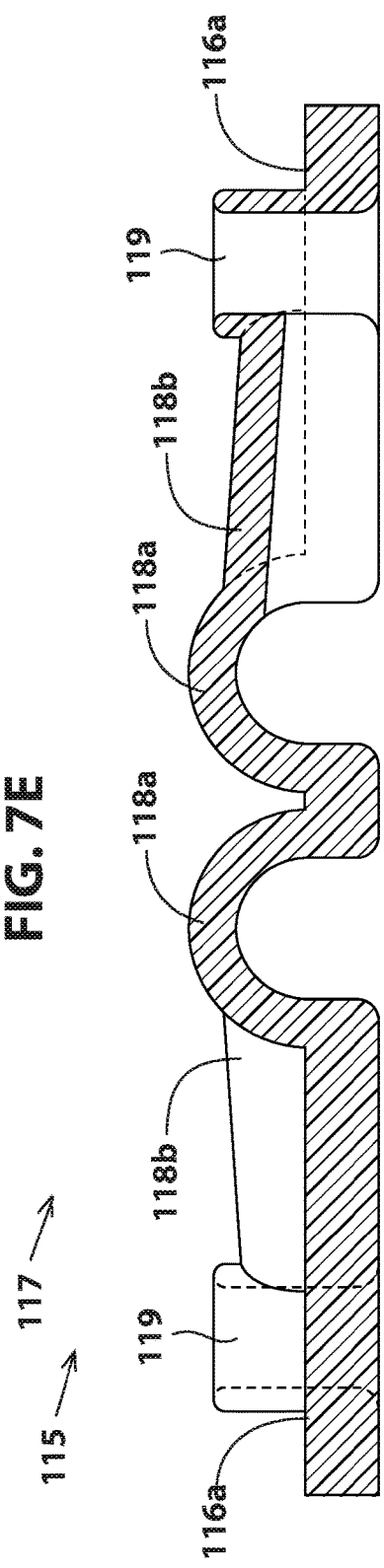

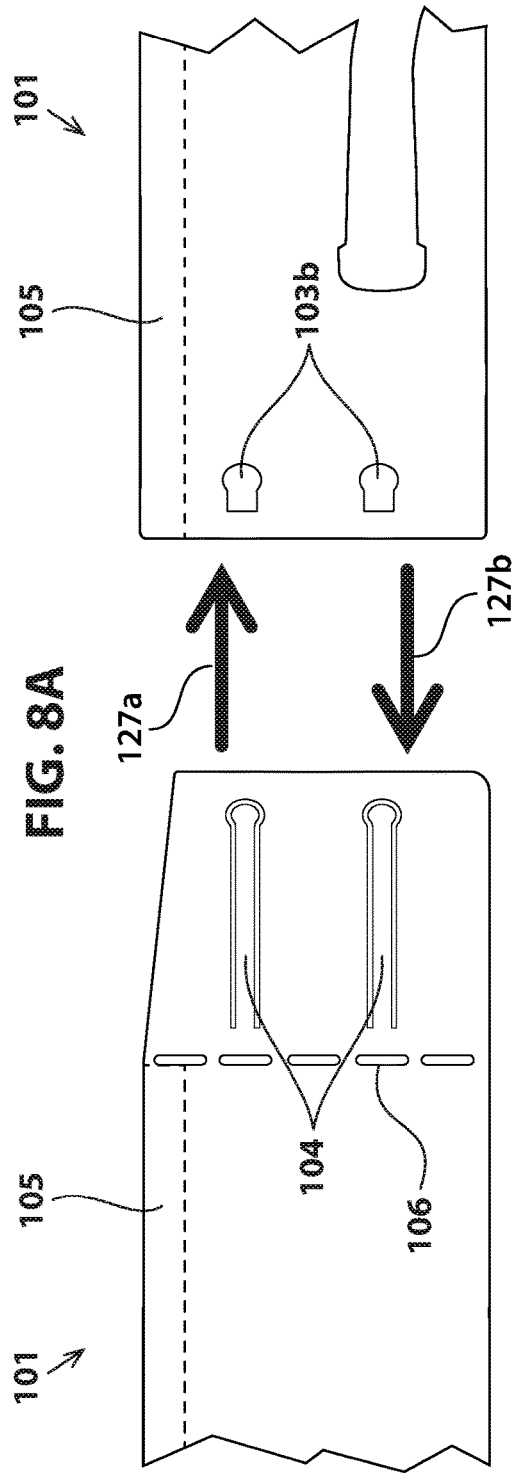
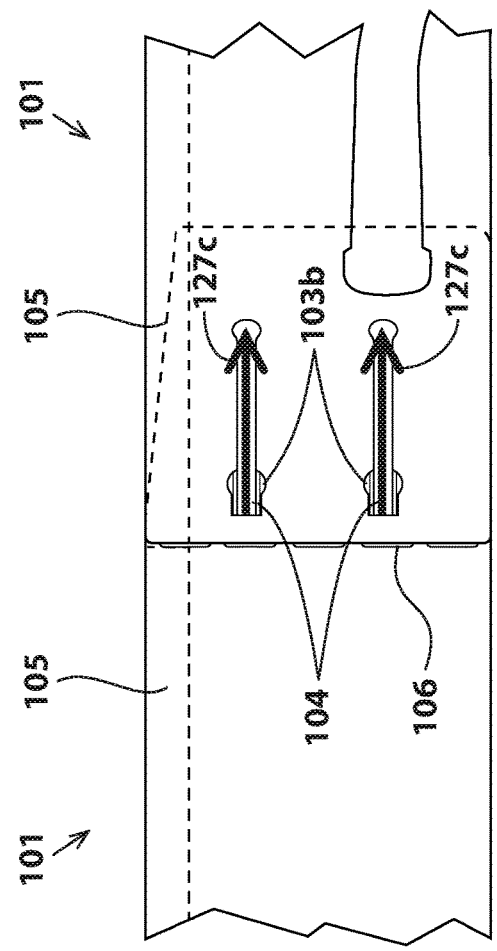

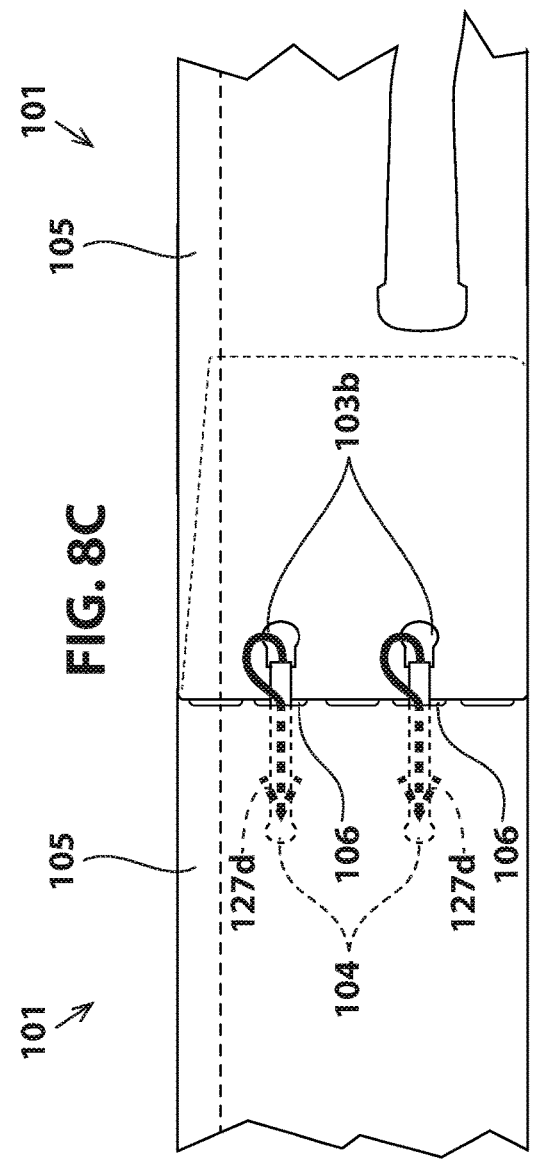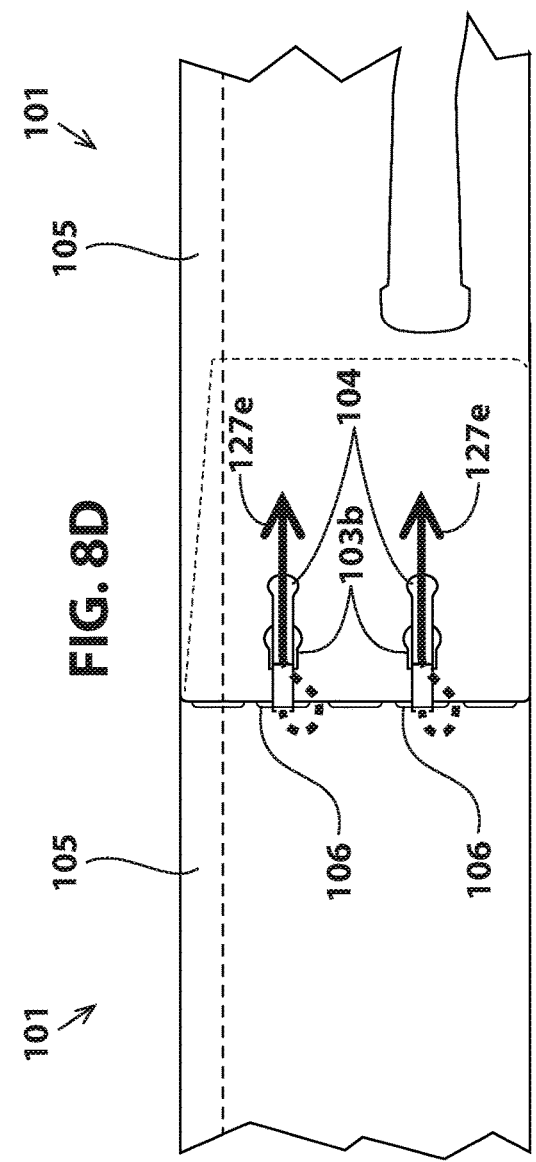

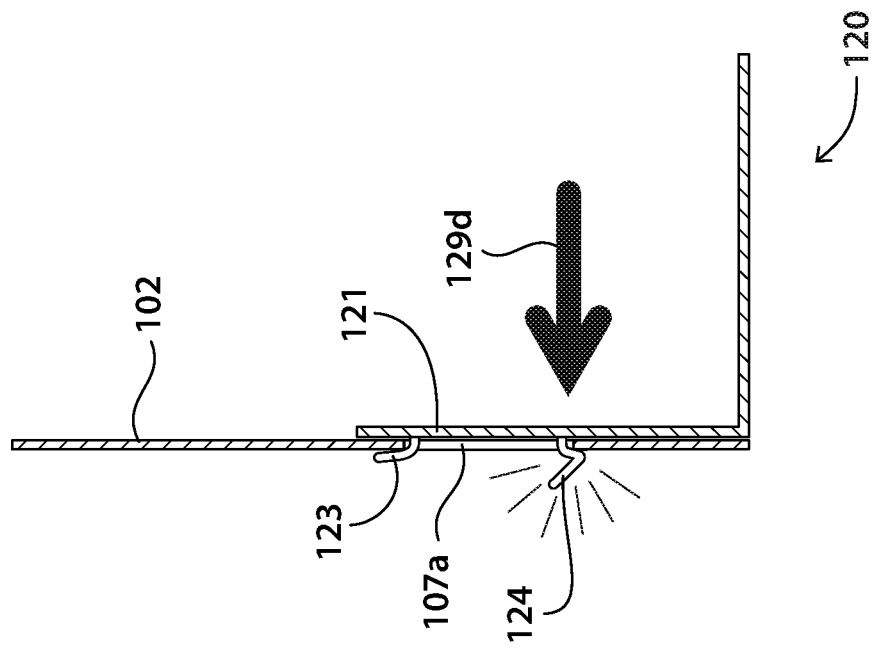
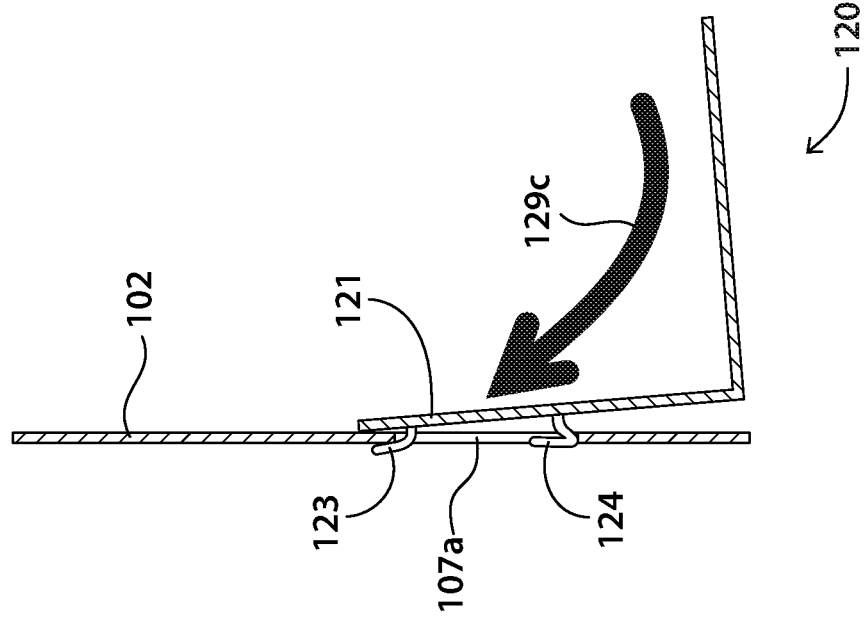

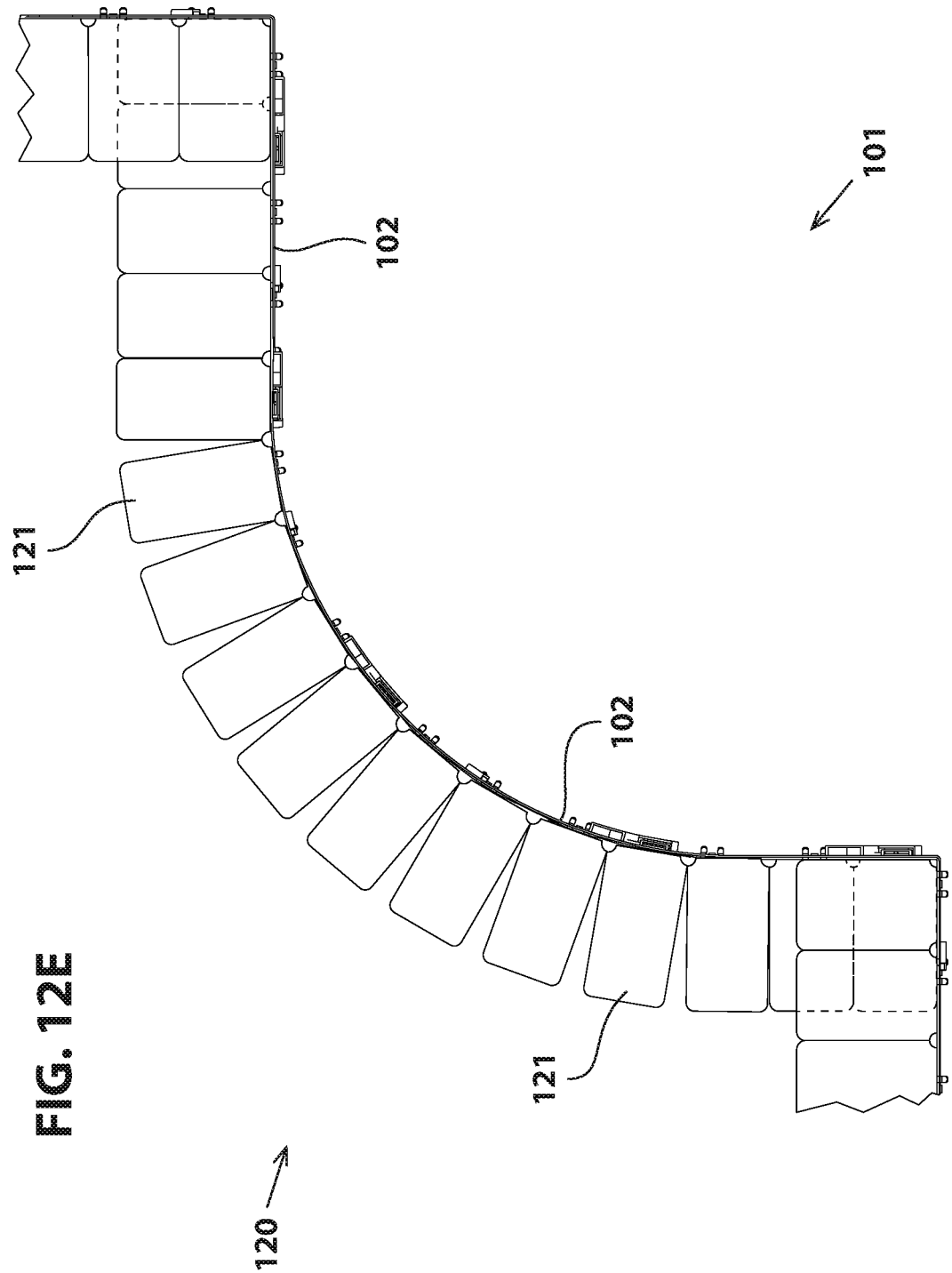

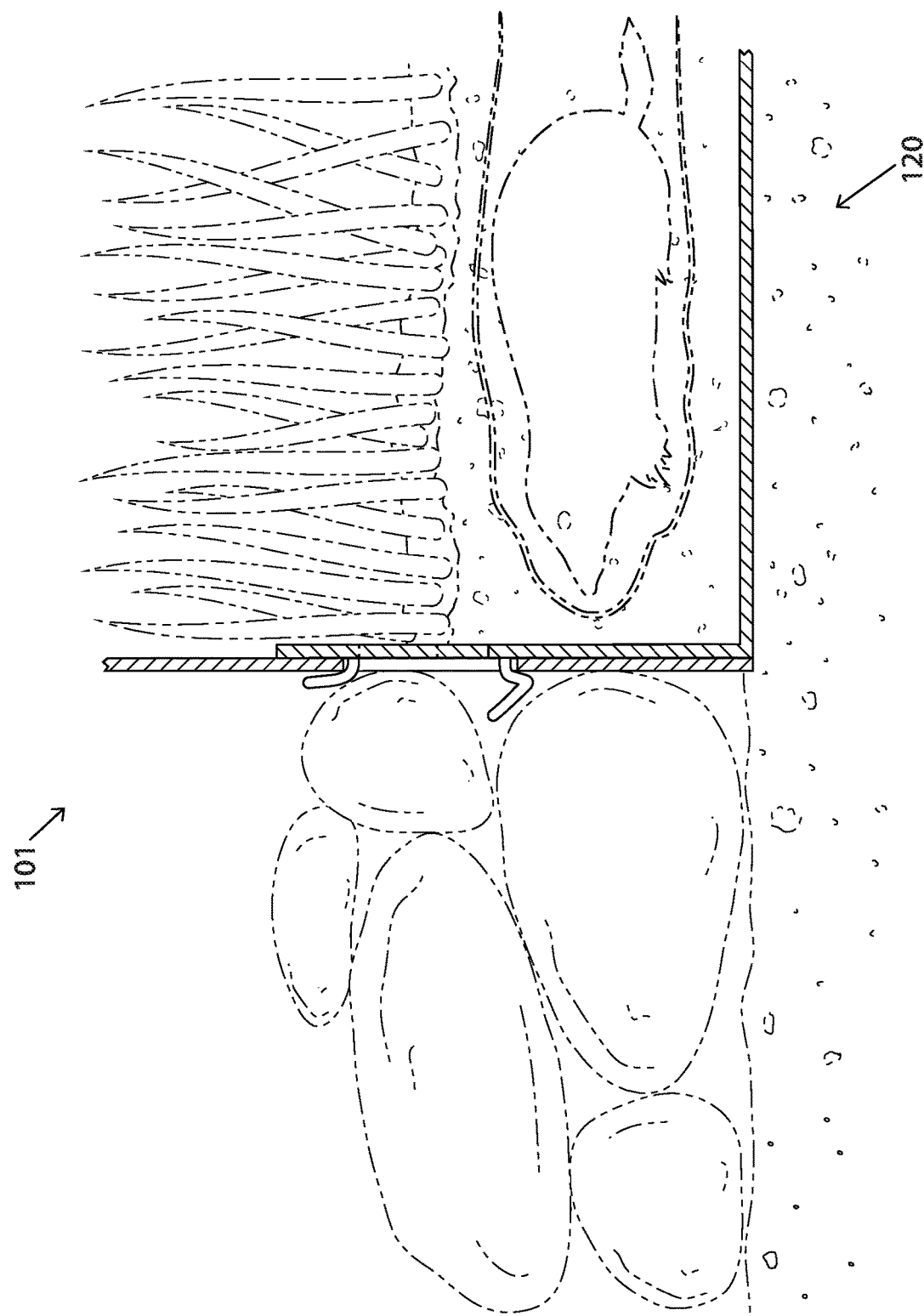

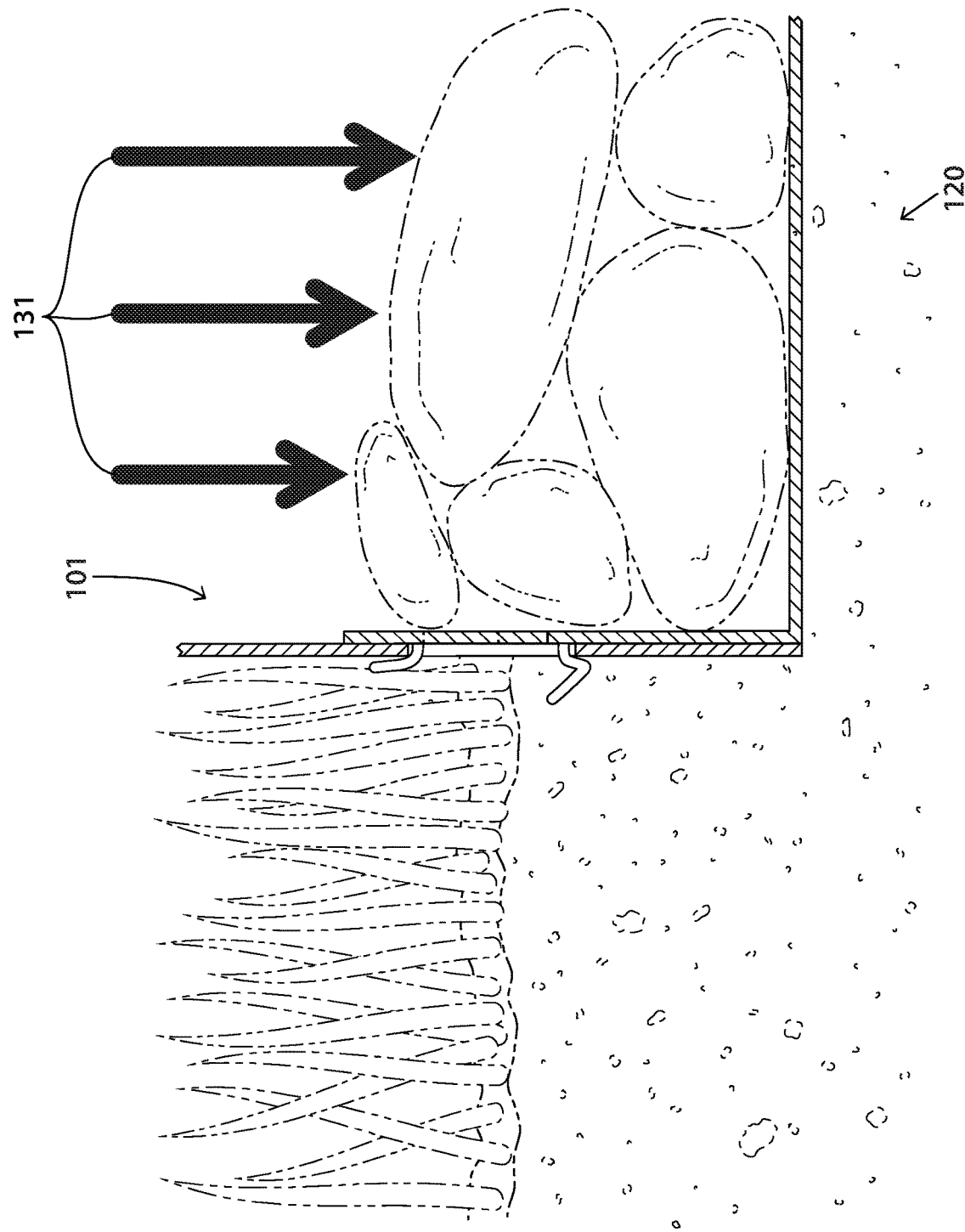

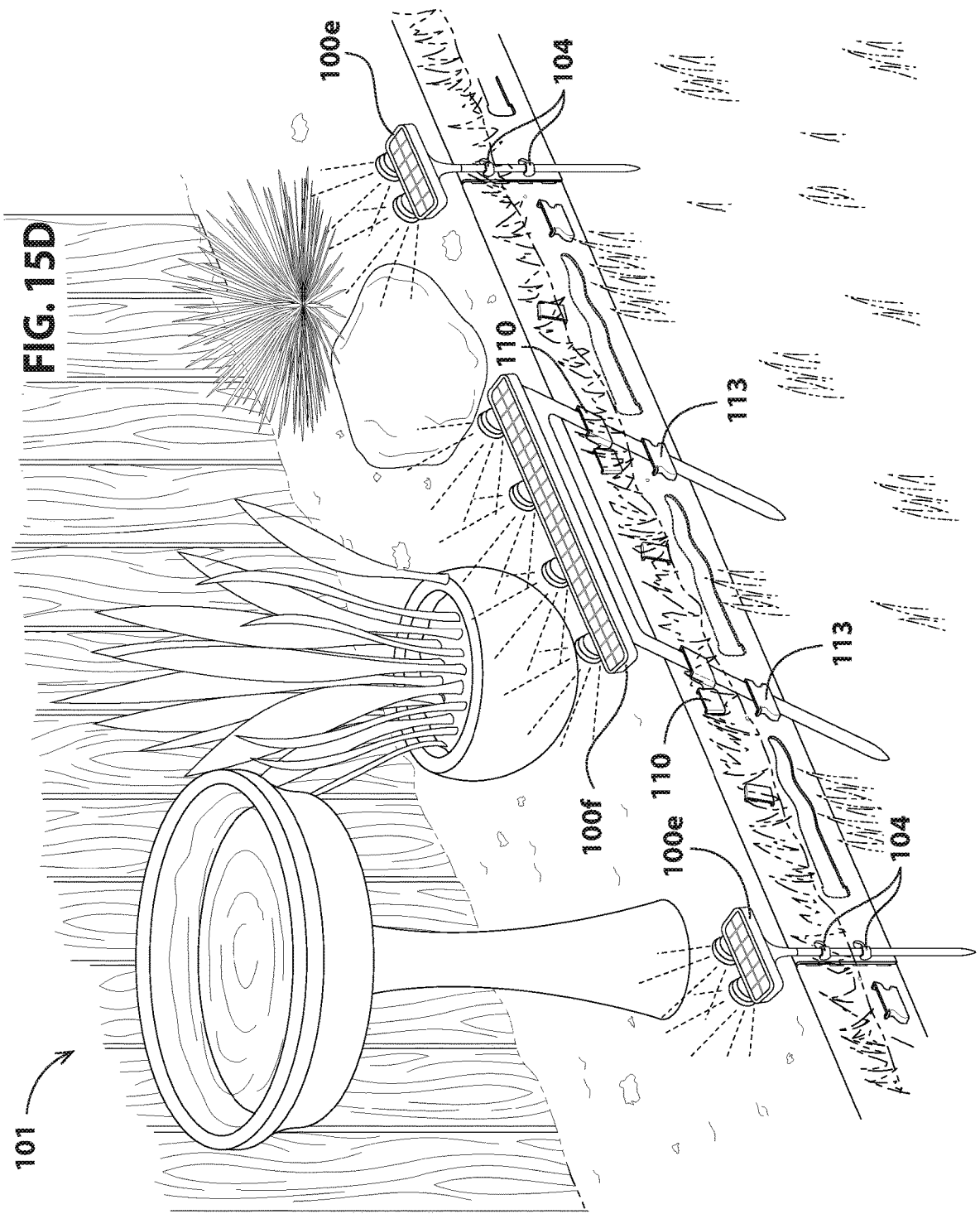

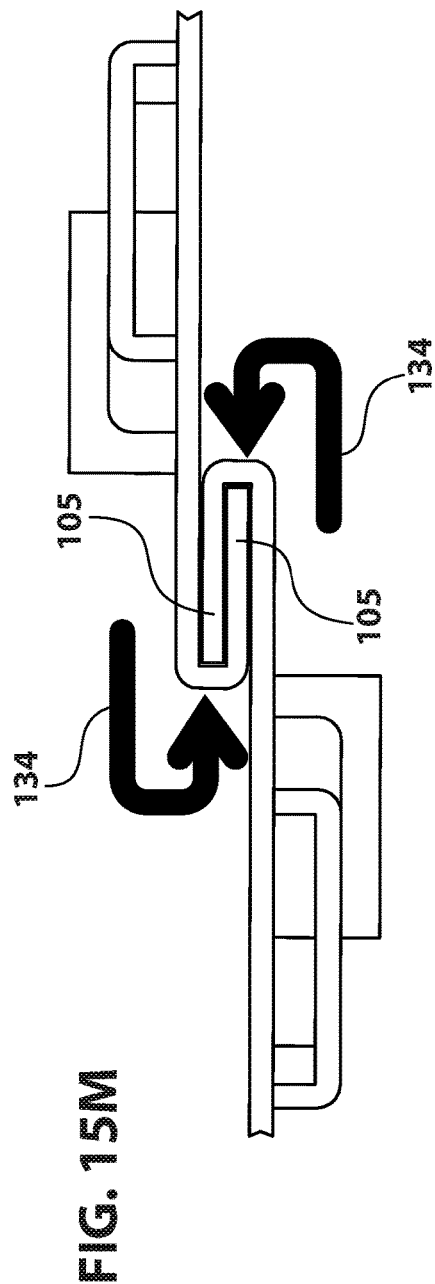
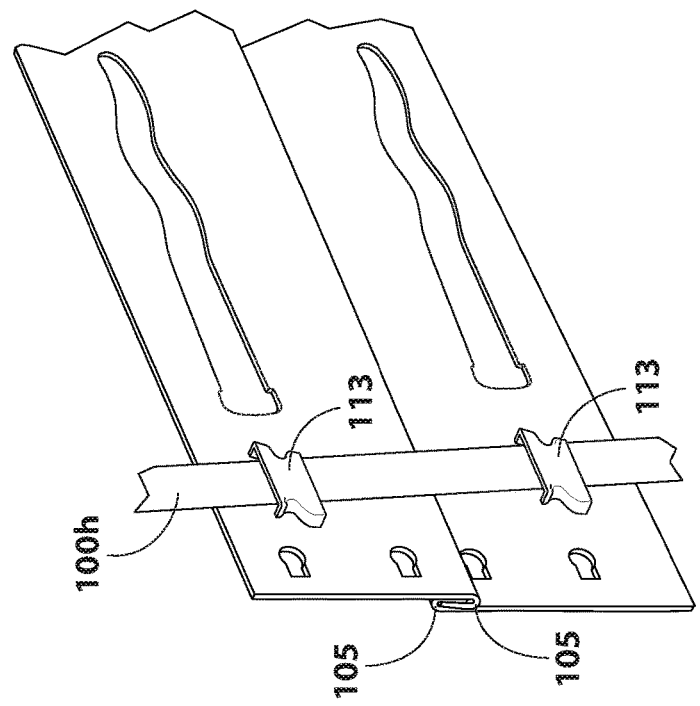
FIG. 15M
FIG. 15N

101

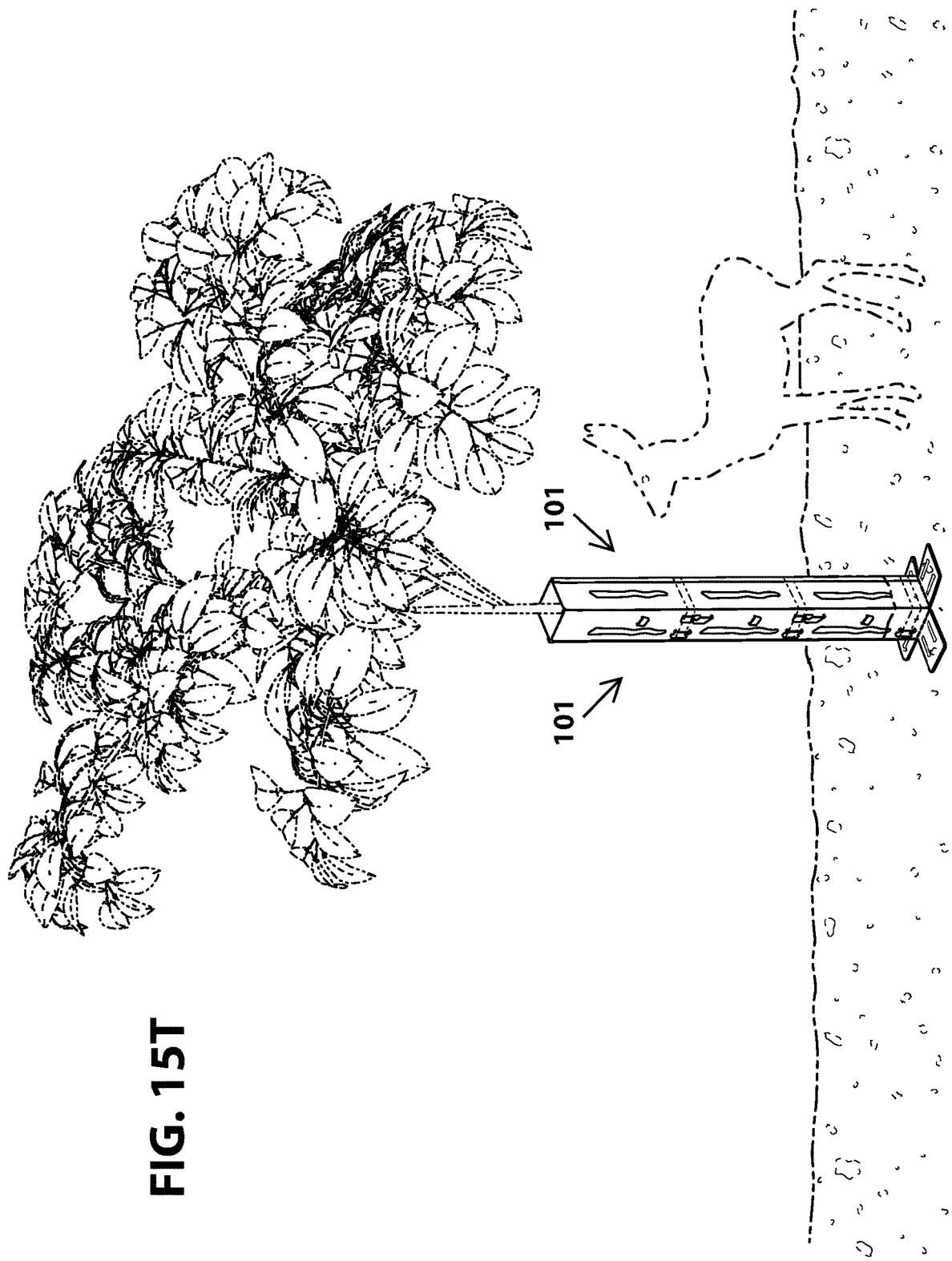

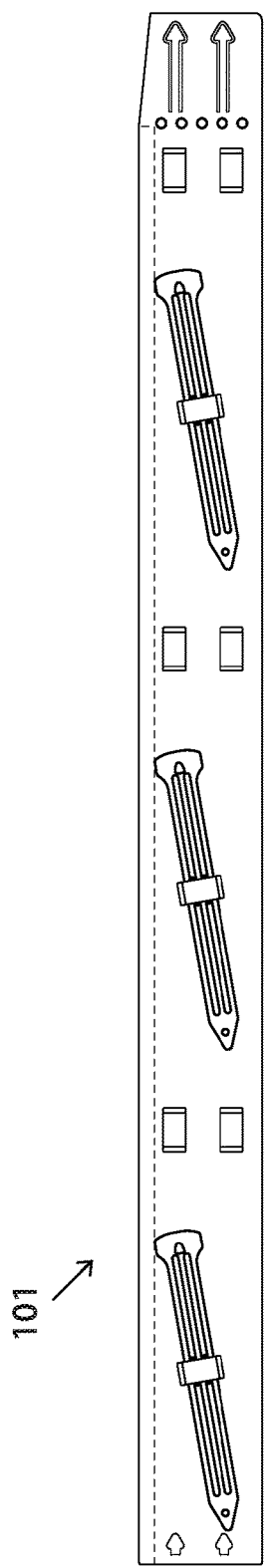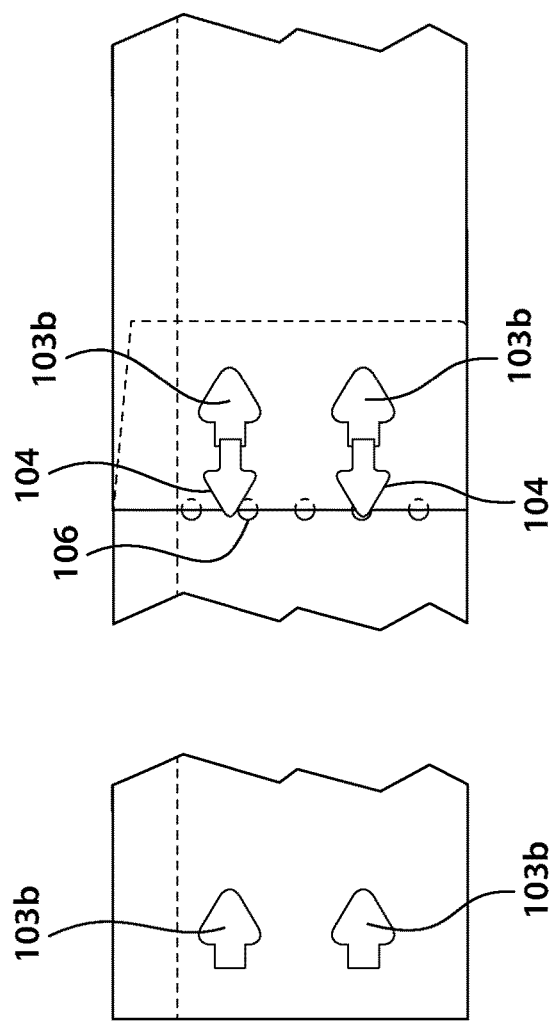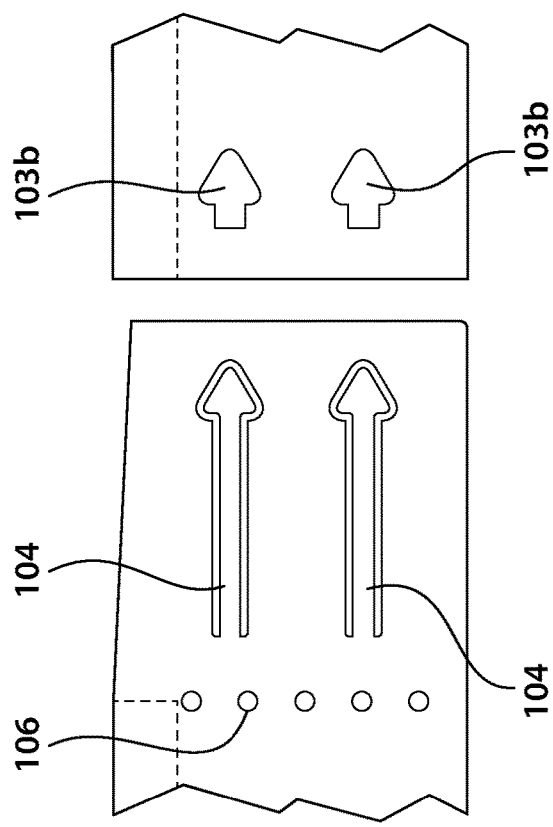

SIX-DEVICE-IN-ONE MATERIAL-SAVING CONSUMER-AND-MANUFACTURER-COST-SAVING SHIPPING-VOLUME-SAVING MULTI-BARRIER-LOCKING MULTI-ROOT-GRIPPING-AND-WATER-FLOWING ANTI-DIGGING GARDEN-AND-TREE-PROTECTING VERTICAL-TRUCK-BED-EXTENDER-AND-TONNEAU-COVER STACKABLE LANDSCAPE BARRIER

REFERENCE TO PREVIOUSLY FILED PROVISIONAL PATENT APPLICATION

Provisional Patent Application No. 62/905,389 was filed on Sep. 25, 2019.

1. FIELD OF THE INVENTION

The present invention relates to a landscape edging, which is cheap to produce, is easy to ship as one unit, requires no assembly, and can be quickly and easily be unfolded. Particularly, the present invention relates to a six-device-in-one landscape barrier, which comprises:
1) Barrier system,
2) Stake-locking sheath system,
3) Barrier-locking stake system,
4) Serpentine ridge system, and
5) Anti-digging plate system.

2. DESCRIPTION OF THE PRIOR ART

A number of landscape edgings have been introduced.

U.S. Pat. No. 2,094,519 issued 1937 Feb. 4 to Clarence W. Ballard, demonstrates a metal edging to be used to dene walk-ways, flower beds, driveways, and the like. It has been common to employ for this purpose strips of metal three or four 5 inches in width. The metal would be held in an upright position by driving stakes down alongside of the metal whereby the stakes would project from the side of the metal. Where the beds or walks followed an irregular ground contour, the edging in being carried over va high spot would have to be buried at the highest elevation and extend upwardly from the ground unduly at the lowest elevation so that an even projection of the edging above the ground could not be had. Moreover in employing the metal which would be approximately one-eighth inch in thickness, smooth corners could not be formed without taking the metal to some bending machine.

U.S. Pat. No. 2,769,277 issued 1953 Jan. 15 to William B Keelor, demonstrates a barrier element or band consisting of a number of sections or strips 10 of sheet metal. These sections; or strips 10 are arranged in endwise succession with overlaps 10a at their adjacent ends lapping one upon the other. Said sections 10 are uprightly edgewise disposed Y and a sectional band A formed thereby rests at its lower edge on the ground, the concave side of the band being the landside thereof. These sections or strips have corrugations therein extending transversely thereof, the purpose of which is to strengthen the strips laterally in a vertical direction; and to facilitate the bowing thereof in following the particular accurate pattern chosen therefore.

U.S. Pat. No. 3,484,989 issued 1967 Dec. 13 to Irvin I Lazinsky, demonstrates a lawn edging strip of plastic material, which is preferably colored green, and which is adapted to be fixed on the ground at the boundary lines of grass lawns, to give the latter an esthetic appearance at the junction areas thereof with flower or ornamental beds, or with a pavement, concrete walk, steps or the like. The strip also serves to facilitate the mowing of the lawn and to reduce the extent of the edging operations which are required to be executed by hand or power-operated tools. The edging strip is preferably formed from a continuous strip of extruded plastic provided with integrally molded protuberances which interengage spaced bracket supports which are driven into the ground, and which serve to dispose the top plane of the strip at the grass level adjacent to the edges of the flower beds or the paths or walks of hard material.

U.S. Pat. No. 3,495,352 issued 1967 Dec. 22 to Armand J Sbare, demonstrates an improved lawn edging structure having a main body plate to be embedded in the ground between the lawn edge and an area from which grass is to be excluded, including an auxiliary plate arranged for attachment to the main plate at grade level and extending horizontally into the lawn area to block grass growth adjacent to the main body plate, while permitting lawn mower operation over the auxiliary plate. This invention relates to an improved lawn edging structure, and particularly to such a structure including means for excluding grass from a strip adjacent to the lawn edging structure.

U.S. Pat. No. 4,372,079 issued 1981 Jan. 22, to Ann S. Trageser, demonstrates a garden edging structure that surrounds a garden plot and separates the same from grass, vegetation, or soil that might lie outwardly of the garden plot. Specifically, the garden edging structure includes an inner continuous boundary or border that surrounds the garden plot and includes a lower ground engaging portion that anchors the same about the plot, and an aboveground portion that tends to confine soil of the garden plot inwardly of the inner boundary. In addition, an outer boundary or border structure is provided and communicatively associated with said inner boundary structure. More particularly, said outer boundary structure is of a generally horizontal planar type material, such as vinyl, and extends about ground level continuously around said inner boundary. In the case where the garden plot is surrounded by grass, it is seen that said outer boundary would serve to support a portion of a lawn mower such that grass disposed about the outer edge thereof can be easily and cleanly cut.

U.S. Pat. No. 5,301,461, issued 1994 Apr. 12, to Daniel G. Zwier, relates to a landscape edging assembly which includes first and second elongated strips of material having longitudinal top and bottom edges and being adapted for use as landscape edging. The strips are adapted for end-to-end alignment along longitudinal axes thereof with mutually adjacent ends of each of the strips having an end segment that is laterally offset with respect to a remainder segment by an amount that is equal to or just slightly greater than a thickness dimension of the strips. The end segment and the remainder segment on each strip are integrally connected by a transversely extending segment and having an edge opening slot on the top edge of one of the strips and on the bottom edge of the next mutually adjacent strip.

U.S. Pat. No. 5,375,369, issued 1994 Dec. 27, to Daniel L. VerHoeve, relates primarily to a specialized doubly tongued stake which is designed and engineered to align, connect and ground-anchor post or block-like elements in the creation of one-element-high, one-element-thick, stakeable landscape edgings. Each landscape element is channeled with a tongue-locking keyway on each of two parallel, opposed side edges. The elements may be chained into continuous aligned arrangement by the intermediate insertion of the stakes so as to form long flexible landscape edging segments which may be then be staked to the ground in the creation of permanently aligned edging structures. Each landscape edging element is thus doubly staked to the ground with the number of stakes and staked elements being substantially equal.

U.S. Pat. No. 5,456,045, issued 1995 Oct. 10, to Douglas R. Bradley, refers to a lawn edging device which is provided in the form of a strip having a top edge configured for withstanding hammering, a bottom edge configured for penetration into the ground, and ends constructed for interlocking with adjacent strips. A plurality of ribs spaced parallel to each other extend from both sides of the strip and are oriented perpendicular to the length of the strip to provide vertical rigidity to the strip. The ribs taper towards the bottom edge of the strip and facilitate the penetration of the strip into the ground.

U.S. Pat. No. 5,941,018, issued 1999 Aug. 24, to Robert T. Herrema, demonstrates a landscape edging system which includes a horizontally elongate edging strip having opposing sides, a tab projecting from a side of the edging strip, and a vertically elongate stake. The tab includes a first portion which extends away from the side of the edging strip and a second portion which extends substantially in a longitudinal direction of the elongate edging strip in spaced relationship from a vertical plane generally defined by the side of the edging strip from which the tab projects. The elongate stake includes at least one edge portion having a thickness approximately equal to a distance between the vertical plane generally defined by the side of the edging strip from which the tab projects and the portion of the tab which extends in the direction of the elongate edging strip.

U.S. Pat. No. 6,012,254, issued 2000 Jan. 11, to Johannes N. Gaston, relates to a trenchless landscape edging system which includes a plurality of anchoring members, an edging member having no or substantially no barrier extending downwardly therefrom and corresponding interconnecting or adjoining blocks having recesses disposed therein. The blocks, in combination with the anchoring members and the edging member, may be employed to separate adjoining lawn, garden, walkway, driveway or other areas from one another.

U.S. Pat. No. 6,026,610, issued 2000 Feb. 22, to Melaney Northrop, demonstrates an edging strip with integrally molded stakes. The strip of the invention is a single, integrally molded piece, greatly simplifying construction, packaging, shipping, and assembly by the end user. Each strip will present an independent and usable item containing within the one piece the components necessary to position and attach the strip within the ground and to link it with other strips as desired. The integral stakes each also have broad top surfaces which provide a hammering surface for inserting the strip within the ground. The strip uses interlocking semi-stakes at its end points to connect with other strips, providing a full hammering surface when interlocked and providing anchoring points at the points of connection.

U.S. Pat. No. 6,345,465, issued 2002 Feb. 12, to Glen Allen, demonstrates a landscape-edging which may be used to segregate dissimilar landscaping schemes by positioning the device into the soil. The landscape edging is made of flexible strips, designed for continuous end-to-end attachment. The edging is attached to the soil by stakes. The edging system is designed so that stakes are removably attached to the edging portion of the device. By this attachment, the stakes can be conveniently and cost effectively manufactured and shipped together with the edging portion. Stiffening ribs on the stakes increase the strength of the stakes so that they may be made from the same material and thickness as the edging portion.

U.S. Pat. No. 6,629,383, issued 2003 Oct. 7, to Glen Allen, depicts a landscape-edging device which may be used to segregate dissimilar landscaping schemes by positioning the device into the soil. The landscape edging is made of flexible strips, designed for continuous end-to-end attachment. The edging is attached to the soil by stakes. The edging system is designed so that stakes are removably attached to the edging portion of the device. By this attachment, the stakes can be conveniently and cost effectively manufactured and shipped together with the edging portion. Stiffening ribs on the stakes increase the strength of the stakes so that they may be made from the same material and thickness as the edging portion.

U.S. Pat. No. 6,779,297, issued 2004 Aug. 24, to Clemente Conde, refers to a lawn edging device that comprises a flexible body with a tongue connector located at one end and a pocket connector located at the other end. The pocket connector comprises a slot feature sized to receive a tongue connector of another lawn edging strip and comprises a lock feature that prevents disengagement after connection with the other lawn edging strip. The pocket connector can further comprise a guide feature to guide the tongue connector of the other lawn edging strip towards the lock feature and into engagement with the slot feature.

U.S. Pat. No. 7,836,907, issued 2010 Aug. 17, to Frederick P. Strobl, Jr., refers to an elongated edging assembly for holding landscaping and/or paving materials and the like in place in a predetermined location. The assembly may be made up of first and second elongated edger members which each include an elongated upright material retaining plate and a connector located adjacent an end of the corresponding member. The connectors desirably include respective mating interengageable components located on the plates near the ends thereof.

U.S. Pat. No. 8,499,491, issued 2013 Aug. 6, to Joel W. Bolin, relates to a landscape edging system which has edging strip material with ends having a laterally extending projection and adapted for overlapping relation when assembled and having end edges disposed in edge to edge relation. A stake clip member is mounted to each of the laterally extending projections and defines a stake receptacle.

U.S. Pat. No. 9,173,350, issued 2015 Nov. 3, to Jeffery M. Beutler, refers to lawn and garden edging segments for end-to-end adjacent installation on an outdoor ground surface, with each edging segment comprising an elongate member having a pair of laterally extending arms defining separate sides of the edging segments and extending along the elongate length of the edging segments. The arms each include a lower wall, an upper wall on a top side of the edging segment and an edge wall.

U.S. Patent No. D390,671 issued 1998 Feb. 10, to Thomas N. Prassas and Shannon Bard, depicts the ornamental design for a lawn edging, as shown described.

U.S. Patent No. D444,579, issued 2001 Jul. 3, to Bradley Emalfarb, depicts an ornamental design for lawn edging panel.

U.S. Patent No. D548,368 issued 2005 Aug. 25, to Glen H. Hale and David Keeley, depicts the ornamental design for a lawn edging, as shown described.

U.S. Patent No. D752,248, issued 2016 Mar. 22, to Robert G. Kopp, depicts an ornamental design for a landscape edging.

U.S. Publication No. 20050055876, published 2005 Mar. 17, to Herman Solis, relates to a border system which includes a simulated plastic board for making a garden border, the board having a generally rectangular cross section and a length, and comprising a series of holes formed through the simulated board in a vertical direction relative to installation orientation for the board, and a plurality of metal bars for driving through the holes and anchoring the board to ground.

U.S. Publication No 20080163566, issued 2007 Jan. 8, to Joe Bella, describes the several aspects and features of the present invention; the provision of a paver edging device for use as an interface or boundary of a paved region. In one aspect the edging device includes an elongate strip extending in a longitudinal direction having a flange portion integrally formed to an edge of the elongate strip and extending in a transverse direction outwardly from one side of the strip. The flange is provided with a series of contoured-V cut-out portions having contoured edges. The contoured-V cut-out portions are connected along the rear edge thereof with a plurality of rear rail segments. Bending or contouring of the strip therefore requires removal of a portion of the rear rail segments.

DISADVANTAGES OF THE PRIOR ART

The prior art have failed to solve many problems associated with landscape edging, as follows:
1) No prior art mention or disclose any landscape edging, having
   barrier-locking tongues 104.
   Therefore, the prior art of landscape edging:
   a) Cannot save money for the consumer, requiring less barrier sections because of less overlap at barrier ends in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG.
   b) Cannot save materials during manufacturing being one-quarter of the length of wasted steel materials as comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   c) Cannot securely support
      solar-stake-mounted lights 100e
      (see FIGS. 3B, 3C, and 3D),
      a trellis for vines or climbing plants
      (see FIG. 3H, and FIG. 15I),
      an umbrella pole
      (see FIG. 3F, and FIG. 15G), and
      a sprinkler head or drip line
      (see FIG. 3G, and FIG. 15H);
   d) Cannot securely connect multiple six-device-in-one landscape barriers to each other by inserting through tongue-locking openings 103b and wrapping over the top or under the bottom of root-gripping barrier 102, respectively
      (see FIG. 1D, FIG. 6E, FIG. 6F, and FIG. 6G);
   e) Cannot securely lock multiple six-device-in-one landscape barriers to each other by inserting through tongue-locking openings 103b, wrapping in the opposite direction through corner-angling holes 106, and again through tongue-locking openings 103b
      in the directions of arrows 127c, 127d, and 127e
      (see FIG. 8A, FIG. 8B, FIG. 8C, and FIG. 8D);
   f) Cannot anchor six-device-in-one landscape barrier to the soil
      (see FIG. 15U, FIG. 15W, and FIG. 16D); and
   g) Cannot protect garden plants from animals
      (see FIG. 16B);
2) No prior art mention or disclose any landscape edging, having
   safety ridge 105.
   Therefore, the prior art of landscape edging:
   a) Cannot connect a safety ridge 105 of one six-device-in-one landscape barrier to a safety ridge 105 of a second six-device-in-one landscape barrier in the directions of arrows 134
      (see FIG. 15L)
         to create a shield to protect garden plants from animals
         (see FIG. 15T and FIG. 15U),
         to create a shield to protect saplings from animals
         (see FIG. 15R),
         to create a shield to protect trees from animals
         (see FIG. 15S),
         to create a barrier to protect garden vegetation from animals
         (see FIG. 15V), and
         to create a tonneau cover of a truck bed
         (see FIG. 15Q);
   b) Cannot provide a mechanical stopper or buttress against an adjacent horizontal safety ridge 105, while coupling such, in the directions of arrows 127a and 127b
      (see FIG. 8A and FIG. 8B);
   c) Cannot position the horizontal center of joining location of adjacent safety ridge 105 to be above a vertical row of adjustable-corner-angling holes 106 thereby structurally assisting the malleability of a bending point of material-saving multi-root-gripping-and-water-flowing barrier 102
      (see FIG. 8A and FIG. 8B); and
   d) Cannot provide means for installing barrier system 101 to quickly and easily couple barrier-locking tongues 104 to a respective tongue-locking openings 103b in the directions of arrows 127a and 127b
      (see FIG. 8A and FIG. 8B).
3) No prior art mention or disclose any landscape edging, having
   angling end-wing 103a.
   Therefore, the prior art of landscape edging:
   a) Cannot save manufacturing materials being one-quarter of the length of wasted steel materials as comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   b) Cannot save money for consumer, requiring less barrier sections because of less overlap at barrier ends in the directions of arrows 98a, 98b, 98c, 98d, 98e, 98f, 98g, 98h, 99a, 99b, 99c, 100a, 100b, 100c, and 100d
(see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
c) Cannot slide into the fold-over multi-barrier-coupling safety ridge 105 of an additional adjacent six-device-in-one landscape barrier;
d) Cannot anchor the six-device-in-one landscape barrier into the ground, when positioned vertically
(see FIG. 15R, FIG. 15S, and FIG. 15V); and
e) Cannot prevent animals from digging beneath the six-device-in-one landscape barrier, when inserted into the soil vertically
(see FIG. 15R, FIG. 15S, and FIG. 15V).
4) No prior art mention or disclose any landscape edging, having corner-angling holes 106.
Therefore, the prior art of landscape edging:
a) Cannot lock a six-device-in-one landscape barrier to an additional adjacent six-device-in-one landscape barrier by interlocking barrier-locking tongues 104 there through
(see FIG. 8B, FIG. 8C, and FIG. 8D);
b) Cannot lockingly support a garden-plant cage
(see FIG. 2E, FIG. 2F, FIG. 15J, and FIG. 15K); and
c) Cannot promote bending angling end-wing 103a to form a corner, enabling barrier system 101 to create a variety of corner-angles.
(see FIG. 2L, FIG. 2M, FIG. 2N, FIG. 2Q, and FIG. 2R).
5) No prior art mention or disclose any landscape edging, having serpentine stake 116a.
Therefore, the prior art of landscape edging:
a) Cannot frictionally anchor into the soil;
(see FIG. 10)
b) Can secure barrier system 101 into the soil, on an inclined surface
(see FIG. 2A (Prior Art), and FIG. 6G);
c) Cannot secure barrier system 101 into the soil on a level surface
(see FIG. 6E, and FIG. 10);
d) Cannot secure barrier system 101 piercing into soil angledly in the directions of arrows 126
(see FIG. 6F, and FIG. 6G); and
e) Cannot secure barrier system 101 piercing into the soil vertically in the directions of arrows 125
(see FIG. 6E, and FIG. 10).
6) No prior art mention or disclose any landscape edging, having serpentine ridges 118a.
Therefore, the prior art of landscape edging:
a) Cannot wedge into three single-angled sheaths 109 to securely lock serpentine stake 116a, for storage and shipping
(see FIG. 4B, FIG. 7B, and FIG. 7E);
b) Cannot wedge into two double-angled sheaths 110 to securely lock serpentine stake 116a
(see FIG. 6C, FIG. 6D, FIG. 7B, and FIG. 7C);
c) Cannot wedge into three triple-angled serpentine stake 116a
(see FIG. 6C, FIG. 6D, FIG. 7B, FIG. 7D, and FIG. 7E);
d) Cannot frictionally secure serpentine stake 116a into the soil to prevent lifting when ground expands and contracts due changes in temperature in the directions of arrows 98i, 98j, 98k, 98l, 98m, and 98n
(see FIG. 1K (Prior Art), FIG. 2A (Prior Art), FIG. 2B (Prior Art), and FIG. 7A); and
e) Cannot lockingly secure serpentine stake 116a to root-gripping barrier 102 by snap-locking double-snap-locking recesses to three triple-angled sheaths 113
(see FIG. 22A and FIG. 22B).
7) No prior art mention or disclose any landscape edging, having root-gripping locking tunnels 119.
Therefore, the prior art of landscape edging:
a) Cannot secure serpentine stake 116a in the soil by providing an opening through which grass and plant roots 128a may grow in the directions of arrows 128b
(see FIG. 2 (Prior Art), and FIG. 10);
b) Cannot create friction against the soil to secure serpentine stake 116a
(see FIG. 10);
c) Cannot secure root-gripping barrier 102 in the soil by providing an opening through which grass and plant roots 128a may grow in the directions of arrows 128b
(see FIG. 2 (Prior Art), and FIG. 10); and
d) Cannot create friction against the soil to secure root-gripping barrier 102
(see FIG. 10).
8) No prior art mention or disclose any landscape edging, having stake-locking root-gripping holes 116c.
Therefore, the prior art of landscape edging:
a) Cannot lock barrier-locking stake system 115 to barrier system 101 by securing to stake-locking nipples 107b
(see FIG. 4D);
b) Cannot secure serpentine stake 116a in the soil by providing an opening through which grass and plant roots 128a may grow in the directions of arrows 128b
(see FIG. 2 (Prior Art), and 10); and
c) Cannot create friction against the soil to secure multi-barrier-locking-angle multi-root-gripping-angle multi-water-flowing-angle storage-lockable-for-shipping serpentine stake 116a
(see FIG. 10).
9) No prior art mention or disclose any landscape edging, having three root-gripping angle tunnels 107a.
Therefore, the prior art of landscape edging:
a) Cannot save materials during manufacturing by stamping out serpentine stake 116a from material-saving multi-root-gripping-and-water-flowing barrier 102, utilizing the subsequent empty space therefrom
(see FIG. 1A (Prior Art), and FIG. 6A);
b) Cannot save time and energy costs when barrier-locking stake systems 115 is stored within root-gripping angle tunnels 107a during packaging, storage, and shipping the six-device-in-one landscape barrier
to reduce the space the space needed in each shipping container (see FIG. 2C and FIG. 2D), to reduce the space needed for barrier system 101 thickness when packaged, and to reduce significantly the unit cost of the six-device-in-one landscape barrier, (FIG. 2C (PRIOR ART) illustrates a shipping container 99a has one hundred landscape barrier packaged units 99b filling up all its internal volume 99c), (FIG. 2D illustrates a shipping container 100a has one hundred landscape barrier packaged units 100b filling up only 70% of its internal volume 100c and saving 30% of its internal volume 100d);

c) Cannot secure root-gripping barrier 102 into the soil by providing an opening through which grass and plant roots 128a may grow in the directions of arrows 128b

(see FIG. 6A, FIG. 6B, FIG. 9, and FIG. 10);

d) Cannot secure root-gripping barrier 102 into the soil by providing an opening through which soil may fill in the directions of arrows 132a and 132b

(see FIG. 15A);

c) Cannot lock into the soil by providing a lower edge below root-gripping angle tunnels 107a in the directions of arrows 133

(see FIG. 15B);

f) Cannot lock to top plate-securing hooks 123, in the directions of arrows 129a, 129b, 129c, and 129d

(see FIG. 9, FIG. 11A, FIG. 11B, FIG. 11C, FIG. 11D, FIG. 13, and FIG. 15A); and g) Cannot lock to bottom plate-securing snap-hooks 124, in the directions of arrows 129a, 129b, 129c, and 129d

(see FIG. 9, FIG. 11A, FIG. 11B, FIG. 11C, FIG. 11D, FIG. 13, and FIG. 15A).

10) No prior art mention or disclose any landscape edging, having stake-locking nipples 107b.

Therefore, the prior art of landscape edging:

a) Cannot lock the stake tip to barrier system 101 by being inserted into stake-locking root-gripping holes 116c

(see FIG. 4D)

to store the multi-barrier-locking-angle multi-root-gripping-angle multi-water-flowing-angle storage-lockable-for-shipping serpentine stake system 115;

b) Cannot lock the stake tip to barrier system 101 by being inserted into stake-locking root-gripping holes 116c

(see FIG. 4D)

to provide a secure place to store barrier-locking stake system 115 when not in use; and c) Cannot lock the stake tip to barrier system 101 by being inserted into stake-locking root-gripping holes 116c

(see FIG. 4D)

to prevent loss of serpentine stake 116a.

11) No prior art mention or disclose any landscape edging, having three single-angled sheaths 109.

Therefore, the prior art of landscape edging:

a) Cannot wedge the serpentine ridges 118a to securely lock serpentine stake 116a to barrier system 101

(see FIG. 6A, FIG. 7B, FIG. 7C, FIG. 7D, and FIG. 7E); and b) Cannot secure serpentine stake 116a to material-saving multi-root-gripping-and-water-flowing barrier 102 for storage and shipping (see FIG. 4B).

12) No prior art mention or disclose any landscape edging, having two double-angled sheaths 110.

Therefore, the prior art of landscape edging:

a) Cannot secure multiple six-device-in-one landscape barrier adjacently by providing loops for a strap 100h to be threaded through in the direction of arrows 134

(see FIG. 15N, and FIG. 15O)

to create a shield to protect garden plants from animals (see FIG. 16A and FIG. 16B), to create a shield to protect saplings from animals (see FIG. 15S and FIG. 15T), to create a shield to protect trees from animals (see FIG. 15S, FIG. 15T, FIG. 15U, and FIG. 15V), to create a barrier to protect garden vegetation from animals (see FIG. 16C and FIG. 16D), and to create a tonneau cover of a truck bed (see FIG. 15R);

b) Cannot secure six-device-in-one landscape barriers to utility holes of a pickup truck by providing openings for serpentine stake 116a to create a vertical truck-bed extender (see FIG. 15P, and FIG. 15Q);

c) Cannot secure multiple six-device-in-one landscape barriers to each other vertically by providing openings for serpentine stake 116a to create a tree ring or planter ring of varying heights (see FIG. 15J, FIG. 15K, FIG. 15L, and FIG. 15M);

d) Cannot guide serpentine stake 116a while being inserted vertically in the directions of arrows 125

(see FIG. 6D and FIG. 6E); and e) Cannot guide serpentine stake 116a while being inserted angledly in the directions of arrows 126

(see FIG. 6C, FIG. 6F, and FIG. 6G).

13) No prior art mention or disclose any landscape edging, having two vertical guiding walls 111.

Therefore, the prior art of landscape edging:

a) Cannot guide serpentine stake 116a while being inserted vertically through two double-angled sheaths 110

(see FIG. 6D, FIG. 6E, and FIG. 10); and b) Cannot stabilize serpentine stake 116a in the soil (see FIG. 6D, FIG. 6E, and FIG. 10).

14) No prior art mention or disclose any landscape edging, having two angled guiding walls 112.

Therefore, the prior art of landscape edging:

a) Cannot guide serpentine stake 116a while being inserted angledly through two double-angled sheaths 110

(see FIG. 6C, FIG. 6F, and FIG. 6G); and b) Cannot stabilize serpentine stake 116a in the soil (see FIG. 6C, and FIG. 6G).

15) No prior art mention or disclose any landscape edging, having
three triple-angled sheaths 113.
Therefore, the prior art of landscape edging:
   a) Cannot stackedly connect six-device-in-one landscape barriers adjacently by providing loops for a strap 100*h* can be threaded through in the direction of arrows 135
      (see FIG. 15N, and FIG. 15O)
         to create a shield to protect garden plants from animals
         (see FIG. 16A and FIG. 16B),
         to create a shield to protect saplings from animals
         (see FIG. 15S and FIG. 15T),
         to create a shield to protect trees from animals
         (see FIG. 15U and FIG. 15V),
         to create a barrier to protect garden vegetation from animals
         (see FIG. 16C and FIG. 16D), and
         to create a tonneau cover of a truck bed
         (see FIG. 15R);
   b) Cannot secure six-device-in-one landscape barriers to utility holes of a pickup truck by providing openings for serpentine stake 116*a*
      to create a vertical truck-bed extender
      (see FIG. 15P, and FIG. 15Q);
   c) Cannot secure multiple six-device-in-one landscape barriers to each other vertically by providing openings for serpentine stake 116*a*
      to create a tree ring or planter ring of varying heights
      (see FIG. 15J, FIG. 15K, FIG. 15L, and FIG. 15M);
   d) Cannot stabilize the tip of serpentine stake 116*a* to root-gripping barrier 102 while securely wedged into three single-angled sheaths 109, for storage and shipping
      (see FIG. 4B);
   e) Cannot guide serpentine stake 116*a* while being inserted through two double-angled sheaths 110 angledly in the direction of arrows 126
      (see FIG. 6C, FIG. 6F, and FIG. 6G); and
   f) Cannot guide serpentine stake 116*a* while being inserted vertically through two double-angled sheaths 110 in the direction of arrows 125
      (see FIG. 6D, and FIG. 6E).
16) No prior art mention or disclose any landscape edging, having
two curved guiding walls 114.
Therefore, the prior art of landscape edging:
   a) Cannot guide serpentine stake 116*a* while being inserted vertically through the three triple-angled sheaths 113
      (see FIG. 6C, FIG. 6D, FIG. 6E, and FIG. 7D);
   b) Cannot guide serpentine stake 116*a* while being inserted angledly through the three triple-angled sheaths 113
      (see FIG. 6C, FIG. 6F, FIG. 6G, and FIG. 7D); and
   c) Cannot stabilize serpentine stake 116*a* in the soil
      (see FIG. 6C, and FIG. 6G).
17) No prior art mention or disclose any landscape edging, having
anti-digging plates 121.
Therefore, the prior art of landscape edging:
   a) Cannot retain water 130 to help nourish grass and plants
      (see FIG. 13A);
   b) Cannot prevent animals from digging underneath the six-device-in-one landscape barrier
      (see FIG. 13B and FIG. 16B);
   c) Cannot stabilize six-device-in-one barrier system 101 by soil, gravel, rocks, bark chips, or other landscaping materials, being amassed upon plates 121, creating a downward force in the directions of arrows 131
      (see FIG. 13A and FIG. 14);
   d) Cannot provide adjustability, to be configured to many respective custom curvatures
      (see FIG. 3B, FIG. 12A, FIG. 12B, FIG. 12C, FIG. 12D, and FIG. 12E);
   e) Cannot provide adjustability, to be configured in a straight line
      (see FIG. 5A, and FIG. 12B); and
   f) Cannot provide adjustability, to be configured with 90, 45, 30, and 15 degree corners
      (see FIG. 3B, FIG. 12B, and FIG. 12E).
18) No prior art mention or disclose any landscape edging, having
top plate-securing hooks 123.
Therefore, the prior art of landscape edging:
   a) Cannot snappingly attach to barrier system 101 in the direction of arrows 129*a*, 129*b*, 129*c*, and 129*d*
      (see FIG. 5A, FIG. 5B, FIG. 5C, FIG. 11A, FIG. 11B, FIG. 11C, and FIG. 11D);
   b) Cannot quickly and easily remove from anti-digging plate systems 120 to barrier system 101
      (see FIG. 11A, FIG. 11B, FIG. 11C, and FIG. 11D);
   c) Cannot quickly and easily attach to anti-digging plate systems 120 from barrier system 101
      (see FIG. 5A, FIG. 5B, and FIG. 5C); and
   d) Cannot securely attach barrier-conforming connector 122, to root-gripping barrier 102
      (see FIG. 11D).
19) No prior art mention or disclose any landscape edging, having
bottom plate-securing snap-hooks 124.
Therefore, the prior art of landscape edging:
   a) Cannot snappingly attach barrier-conforming connector 122, to root-gripping barrier 102 in the direction of arrows 129*a*, 129*b*, 129*c*, and 129*d*
      (see FIG. 11A, FIG. 11B, FIG. 11C, and FIG. 11D);
   b) Cannot quickly and easily remove from barrier system 101
      (see FIG. 5A, FIG. 5B, FIG. 5C, and FIG. 11D);
   c) Cannot quickly and easily attach to barrier system 101
      (see FIG. 11C and FIG. 11D); and
   d) Cannot securely attach barrier-conforming connector 122, to material-saving multi-root-gripping-and-water-flowing barrier 102
      (see FIG. 11D).

OBJECTS AND ADVANTAGES OF THE INVENTION

The present invention substantially departs from the conventional concepts and designs of the prior art. In doing so, the present invention provides a six-device-in-one landscape barrier, having many unique and significant features, functions, and advantages, which overcome all the disadvantages of the prior art, as follows:

1) It is an object of the new invention to provide a six-device-in-one landscape barrier, having barrier-locking tongues 104.

Therefore, the six-device-in-one landscape barrier:
   a) Can save money for the consumer, requiring less barrier sections because of less overlap at barrier ends in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   b) Can save materials during manufacturing being one-quarter of the length of wasted steel materials as comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   c) Can securely support
      solar-stake-mounted lights 100e
      (see FIGS. 3B, 3C, and 3D),
      a trellis for vines or climbing plants
      (see FIG. 3H, and FIG. 15I),
      an umbrella pole
      (see FIG. 3F, and FIG. 15G), and
      a sprinkler head or drip line
      (see FIG. 3G, and FIG. 15H);
   d) Can securely connect multiple six-device-in-one landscape barriers to each other by inserting through tongue-locking openings 103b and wrapping over the top or under the bottom of root-gripping barrier 102, respectively
      (see FIG. 1D, FIG. 6E, FIG. 6F, and FIG. 6G);
   e) Can securely lock multiple six-device-in-one landscape barriers to each other by inserting through tongue-locking openings 103b, wrapping in the opposite direction through corner-angling holes 106, and again through tongue-locking openings 103b
      in the directions of arrows 127c, 127d, and 127e
      (see FIG. 8A, FIG. 8B, FIG. 8C, and FIG. 8D);
   f) Can anchor six-device-in-one landscape barrier to the soil
      (see FIG. 15U, FIG. 15W, and FIG. 16D); and
   g) Can protect garden plants from animals
      (see FIG. 16B).

2) It is an object of the new invention to provide a six-device-in-one landscape barrier, having safety ridge 105.

Therefore, the six-device-in-one landscape barrier:
   a) Can connect a safety ridge 105 of one six-device-in-one landscape barrier to a safety ridge 105 of a second six-device-in-one landscape barrier in the directions of arrows 134
      (see FIG. 15L)
      to create a shield to protect garden plants from animals
      (see FIG. 15T and FIG. 15U),
      to create a shield to protect saplings from animals
      (see FIG. 15R),
      to create a shield to protect trees from animals
      (see FIG. 15S),
      to create a barrier to protect garden vegetation from animals
      (see FIG. 15V), and
      to create a tonneau cover of a truck bed
      (see FIG. 15Q);
   b) Can provide a mechanical stopper or buttress against an adjacent horizontal safety ridge 105, while coupling such, in the directions of arrows 127a and 127b
      (see FIG. 8A and FIG. 8B);
   c) Can position the horizontal center of joining location of adjacent safety ridge 105 to be above a vertical row of adjustable-corner-angling holes 106 thereby structurally assisting the malleability of a bending point of root-gripping barrier 102
      (see FIG. 8A and FIG. 8B); and
   d) Can provide means for installing barrier system 101 to quickly and easily couple barrier-locking tongues 104 to a respective tongue-locking openings 103b in the directions of arrows 127a and 127b
      (see FIG. 8A and FIG. 8B).

3) It is an object of the new invention to provide a six-device-in-one landscape barrier, having angling end-wing 103a.

Therefore, the six-device-in-one landscape barrier:
   a) Can save manufacturing materials being one-quarter of the length of wasted steel materials as comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   b) Can save money for consumer, requiring less barrier sections because of less overlap at barrier ends in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   c) Can slide into safety ridge 105 of an additional adjacent six-device-in-one landscape barrier;
   d) Can anchor the six-device-in-one landscape barrier into the ground, when positioned vertically
      (see FIG. 15R, FIG. 15S, and FIG. 15V); and
   e) Can prevent animals from digging beneath the six-device-in-one landscape barrier, when inserted into the soil vertically
      (see FIG. 15R, FIG. 15S, and FIG. 15V).

4) It is an object of the new invention to provide a six-device-in-one landscape barrier, having corner-angling holes 106.

Therefore, the six-device-in-one landscape barrier:
   a) Can lock a six-device-in-one landscape barrier to an additional adjacent six-device-in-one landscape barrier by interlocking barrier-locking tongues 104 there through
      (see FIG. 8B, FIG. 8C, and FIG. 8D);
   b) Can lockingly support a garden-plant cage
      (see FIG. 2E, FIG. 2F, FIG. 15J, and FIG. 15K); and c) Can promote bending of angling end-wing 103a to form a corner, enabling barrier system 101 to create a variety of corner-angles.
(see FIG. 2L, FIG. 2M, FIG. 2N, FIG. 2Q, and FIG. 2R).

5) It is an object of the new invention to provide a six-device-in-one landscape barrier, having serpentine stake 116a.
Therefore, the six-device-in-one landscape barrier:
a) Can frictionally anchor into the soil;
(see FIG. 10)
b) Can secure barrier system 101 into the soil, on an inclined surface
(see FIG. 2A (Prior Art), and FIG. 6G);
c) Can secure barrier system 101 into the soil on a level surface
(see FIG. 6E, and FIG. 10);
d) Can secure barrier system 101 piercing into soil angledly in the directions of arrows 126
(see FIG. 6F, and FIG. 6G); and
e) Can secure barrier system 101 piercing into the soil vertically in the directions of arrows 125
(see FIG. 6E, and FIG. 10).

6) It is another object of the new invention to provide a six-device-in-one landscape barrier, having serpentine ridges 118a.
Therefore, the landscape barrier:
a) Can wedge into three single-angled sheaths 109 to securely lock serpentine stake 116a, for storage and shipping
(see FIG. 4B, FIG. 7B, and FIG. 7E);
b) Can wedge into two double-angled sheaths 110 to securely lock serpentine stake 116a
(see FIG. 6C, FIG. 6D, FIG. 7B, and FIG. 7C);
c) Can wedge into three triple-angled sheaths 113 to securely lock serpentine stake 116a
(see FIG. 6C, FIG. 6D, FIG. 7B, FIG. 7D, and FIG. 7E);
d) Can frictionally secure serpentine stake 116a into the soil to prevent lifting when ground expands and contracts due changes in temperature in the directions of arrows 98i, 98j, 98k, 98l, 98m, and 98n
(see FIG. 1K (Prior Art), FIG. 2A (Prior Art), FIG. 2B (Prior Art), and FIG. 7A); and
e) Can lockingly secure serpentine stake 116a to root-gripping barrier 102 by snap-locking double-snap-locking recesses to three triple-angled sheaths 113
(see FIG. 22A and FIG. 22B).

7) It is another object of the new invention to provide a landscape barrier, having
root-gripping locking tunnels 119.
Therefore, the landscape barrier:
a) Can secure serpentine stake 116a in the soil by providing an opening through which grass and plant roots 128a may grow in the directions of arrows 128b
(see FIG. 2 (Prior Art), and FIG. 10);
b) Can create friction against the soil to secure serpentine stake 116a
(see FIG. 10);
c) Can secure root-gripping barrier 102 in the soil by providing an opening through which grass and plant roots 128a may grow in the directions of arrows 128b
(see FIG. 2 (Prior Art), and FIG. 10); and
d) Can create friction against the soil to secure root-gripping barrier 102
(see FIG. 10).

8) It is a further object of the new invention to provide a landscape barrier, having stake-locking root-gripping holes 116c.
Therefore, the landscape barrier:
a) Can lock barrier-locking stake system 115 to barrier system 101 by securing to stake-locking nipples 107b
(see FIG. 4D);
b) Can secure serpentine stake 116a in the soil by providing an opening through which grass and plant roots 128a may grow in the directions of arrows 128b
(see FIG. 2 (Prior Art), and 10); and
c) Can create friction against the soil to secure serpentine stake 116a
(see FIG. 10).

9) It is an even further object of the new invention to provide a six-device-in-one landscape barrier, having three root-gripping angle tunnels 107a.
Therefore, the six-device-in-one landscape barrier:
a) Can save materials during manufacturing by stamping out serpentine stake 116a from root-gripping barrier 102, utilizing the subsequent empty space therefrom
(see FIG. 1A (Prior Art), and FIG. 6A);
b) Can save time and energy costs when barrier-locking stake systems 115 is stored within three root-gripping angle tunnels 107a during packaging, storage, and shipping the six-device-in-one landscape barrier
to reduce the space the space needed in each shipping container
(see FIG. 2C and FIG. 2D),
to reduce the space needed for barrier system 101 thickness when packaged, and
to reduce significantly the unit cost of the six-device-in-one landscape barrier,
(FIG. 2C (PRIOR ART) illustrates a shipping container 99a has one hundred landscape barrier packaged units 99b filling up all its internal volume 99c),
(FIG. 2D illustrates a shipping container 100a has one hundred landscape barrier packaged units 100b filling up only 70% of its internal volume 100c and saving 30% of its internal volume 100d);
c) Can secure root-gripping barrier 102 into the soil by providing an opening through which grass and plant roots 128a may grow in the directions of arrows 128b
(see FIG. 6A, FIG. 6B, FIG. 9, and FIG. 10);
d) Can secure root-gripping barrier 102 into the soil by providing an opening through which soil may fill in the directions of arrows 132a and 132b
(see FIG. 15A);
e) Can lock into the soil by providing a lower edge below root-gripping angle tunnels 107a in the directions of arrows 133
(see FIG. 15B);
f) Can lock to top plate-securing hooks 123, in the directions of arrows 129a, 129b, 129c, and 129d
(see FIG. 9, FIG. 11A, FIG. 11B, FIG. 11C, FIG. 11D, FIG. 13, and FIG. 15A); and g) Can lock to bottom plate-securing snap-hooks 124, in the directions of arrows 129a, 129b, 129c, and 129d
(see FIG. 9, FIG. 11A, FIG. 11B, FIG. 11C, FIG. 11D, FIG. 13, and FIG. 15A).

10) It is another object of the new invention to provide a six-device-in-one landscape barrier, having stake-locking nipples 107b.
Therefore, the six-device-in-one landscape barrier:
   a) Can lock the stake tip to barrier system 101 by being inserted into stake-locking root-gripping holes 116c
      (see FIG. 4D)
         to store barrier-locking stake system 115;
   b) Can lock the stake tip to barrier system 101 by being inserted into stake-locking root-gripping holes 116c
      (see FIG. 4D)
         to provide a secure place to store barrier-locking stake system 115 when not in use; and
   c) Can lock the stake tip to barrier system 101 by being inserted into stake-locking root-gripping holes 116c
      (see FIG. 4D)
         to prevent loss of serpentine stake 116a.

11) It is yet another object of the new invention to provide a six-device-in-one landscape barrier, having three single-angled sheaths 109.
Therefore, the six-device-in-one landscape barrier:
   a) Can wedge serpentine ridges 118a to securely lock serpentine stake 116a to barrier system 101
      (see FIG. 6A, FIG. 7B, FIG. 7C, FIG. 7D, and FIG. 7E); and
   b) Can secure serpentine stake 116a to root-gripping barrier 102 for storage and shipping
      (see FIG. 4B).

12) It is still yet another object of the new invention to provide a six-device-in-one landscape barrier, having two double-angled sheaths 110.
Therefore, the six-device-in-one landscape barrier:
   a) Can secure multiple six-device-in-one landscape barrier adjacently by providing loops for a strap 100h to be threaded through in the direction of arrows 134
      (see FIG. 15N, and FIG. 15O)
         to create a shield to protect garden plants from animals
         (see FIG. 16A and FIG. 16B),
         to create a shield to protect saplings from animals
         (see FIG. 15S and FIG. 15T),
         to create a shield to protect trees from animals
         (see FIG. 15S, FIG. 15T, FIG. 15U, and FIG. 15V),
         to create a barrier to protect garden vegetation from animals
         (see FIG. 16C and FIG. 16D), and
         to create a tonneau cover of a truck bed
         (see FIG. 15R);
   b) Can secure six-device-in-one landscape barriers to utility holes of a pickup truck by providing openings for serpentine stake 116a
      to create a vertical truck-bed extender
      (see FIG. 15P, and FIG. 15Q);
   c) Can secure multiple six-device-in-one landscape barriers to each other vertically by providing openings for serpentine stake 116a
      to create a tree ring or planter ring of varying heights
      (see FIG. 15J, FIG. 15K, FIG. 15L, and FIG. 15M);
   d) Can guide serpentine stake 116a while being inserted vertically in the directions of arrows 125
      (see FIG. 6D and FIG. 6E); and
   e) Can guide serpentine stake 116a while being inserted angledly in the directions of arrows 126
      (see FIG. 6C, FIG. 6F, and FIG. 6G).

13) It is still yet an even further object of the new invention to provide a six-device-in-one landscape barrier, having two vertical guiding walls 111.
Therefore, the six-device-in-one landscape barrier:
   a) Can guide serpentine stake 116a while being inserted vertically through two double-angled-stake-securing strap-loop sheaths 110
      (see FIG. 6D, FIG. 6E, and FIG. 10); and
   b) Can stabilize serpentine stake 116a in the soil
      (see FIG. 6D, FIG. 6E, and FIG. 10).

14) It is still yet an even further object of the new invention to provide a six-device-in-one landscape barrier, having two angled guiding walls 112.
Therefore, the six-device-in-one landscape barrier:
   a) Can guide serpentine stake 116a while being inserted angledly through two double-angled-stake-securing strap-loop sheaths 110
      (see FIG. 6C, FIG. 6F, and FIG. 6G); and
   b) Can stabilize serpentine stake 116a in the soil
      (see FIG. 6C, and FIG. 6G).

15) It is still yet an even further object of the new invention to provide a six-device-in-one landscape barrier, having three triple-angled sheaths 113.
Therefore, the six-device-in-one landscape barrier:
   a) Can stackedly connect multiple six-device-in-one landscape barriers adjacently by providing loops for a strap 100h can be threaded through in the direction of arrows 135
      (see FIG. 15N, and FIG. 15O)
         to create a shield to protect garden plants from animals
         (see FIG. 16A and FIG. 16B),
         to create a shield to protect saplings from animals
         (see FIG. 15S and FIG. 15T),
         to create a shield to protect trees from animals
         (see FIG. 15U and FIG. 15V),
         to create a barrier to protect garden vegetation from animals
         (see FIG. 16C and FIG. 16D), and
         to create a tonneau cover of a truck bed
         (see FIG. 15R);
   b) Can secure six-device-in-one landscape barriers to utility holes of a pickup truck by providing openings for serpentine stake 116a
      to create a vertical truck-bed extender
      (see FIG. 15P, and FIG. 15Q);
   c) Can secure six-device-in-one landscape barriers to each other vertically by providing openings for serpentine stake 116a
      to create a tree ring or planter ring of varying heights
      (see FIG. 15J, FIG. 15K, FIG. 15L, and FIG. 15M);

d) Can stabilize the tip of serpentine stake 116*a* to material-saving multi-root-gripping-and-water-flowing barrier 102 while securely wedged into three single-angled-stake-securing strap-loop sheaths 109, for storage and shipping
(see FIG. 4B);
e) Can guide serpentine stake 116*a* while being inserted through two double-angled-stake-securing strap-loop sheaths 110 angledly in the direction of arrows 126
(see FIG. 6C, FIG. 6F, and FIG. 6G); and
f) Can serpentine stake 116*a* while being inserted vertically through two double-angled sheaths 110 in the direction of arrows 125
(see FIG. 6D, and FIG. 6E).

16) It is still yet an even further object of the new invention to provide a six-device-in-one landscape barrier, having
two curved guiding walls 114.
Therefore, the six-device-in-one landscape barrier:
a) Can guide serpentine stake 116*a* while being inserted vertically through three triple-angled sheaths 113
(see FIG. 6C, FIG. 6D, FIG. 6E, and FIG. 7D);
b) Can guide serpentine stake 116*a* while being inserted angledly through three triple-angled sheaths 113
(see FIG. 6C, FIG. 6F, FIG. 6G, and FIG. 7D); and
c) Can stabilize serpentine stake 116*a* in the soil
(see FIG. 6C, and FIG. 6G).

17) It is still yet an even further object of the new invention to provide a six-device-in-one landscape barrier, having
anti-digging plates 121.
Therefore, the six-device-in-one landscape barrier:
a) Can retain water 130 to help nourish grass and plants
(see FIG. 13A);
b) Can prevent animals from digging underneath the six-device-in-one landscape barrier
(see FIG. 13B and FIG. 16B);
c) Can stabilize barrier system 101 by soil, gravel, rocks, bark chips, or other landscaping materials, being amassed upon plates 121, creating a downward force in the directions of arrows 131
(see FIG. 13A and FIG. 14);
d) Can provide adjustability, to be configured to many respective custom curvatures
(see FIG. 3B, FIG. 12A, FIG. 12B, FIG. 12C, FIG. 12D, and FIG. 12E);
e) Can provide adjustability, to be configured in a straight line
(see FIG. 5A, and FIG. 12B); and
f) Can provide adjustability, to be configured with 90, 45, 30, and 15 degree corners
(see FIG. 3B, FIG. 12B, and FIG. 12E).

18) It is still yet an even further object of the new invention to provide a six-device-in-one landscape barrier, having
top plate-securing hooks 123.
Therefore, the six-device-in-one landscape barrier:
a) Can snappingly attach to barrier system 101 in the direction of arrows 129*a*, 129*b*, 129*c*, and 129*d*
(see FIG. 5A, FIG. 5B, FIG. 5C, FIG. 11A, FIG. 11B, FIG. 11C, and FIG. 11D);
b) Can quickly and easily remove from the anti-digging plate systems 120 to barrier system 101
(see FIG. 11A, FIG. 11B, FIG. 11C, and FIG. 11D);
c) Can quickly and easily attach to the anti-digging plate systems 120 from barrier system 101
(see FIG. 5A, FIG. 5B, and FIG. 5C); and
d) Can securely attach barrier-conforming connector 122, to material-saving multi-root-gripping-and-water-flowing barrier 102
(see FIG. 11D).

19) It is still yet an even further object of the new invention to provide a six-device-in-one landscape barrier, having
bottom plate-securing snap-hooks 124.
Therefore, the six-device-in-one landscape barrier:
a) Can snappingly attach barrier-conforming connector 122, to root-gripping barrier 102 in the direction of arrows 129*a*, 129*b*, 129*c*, and 129*d*
(see FIG. 11A, FIG. 11B, FIG. 11C, and FIG. 11D);
b) Can quickly and easily remove from barrier system 101
(see FIG. 5A, FIG. 5B, FIG. 5C, and FIG. 11D);
c) Can quickly and easily attach to barrier system 101
(see FIG. 11C and FIG. 11D); and
d) Can securely attach barrier-conforming connector 122, to root-gripping barrier 102
(see FIG. 11D).

Other objects and advantages of the present invention will become apparent from a consideration of the accompanying drawings and ensuing description.

SUMMARY OF THE INVENTION

A six-device-in-one landscape barrier, comprises: a barrier, a end-wing molded to the barrier for saving materials during manufacturing, being half of the length of comparable prior art and saving money for consumers by requiring less overlap at the ends of the landscape barriers and preventing animals from digging beneath the landscape barrier, when inserted into the soil vertically and bending to create a variety of corner angles, corner-angling holes cut out from the barrier for lockingly supporting a garden-plant cage and promoting bending of the end-wing to form a variety of corner angles, tongue-locking openings cut out from the end-wing, barrier-locking tongues molded to the end-wing for saving materials during manufacturing, being half of the length of comparable prior art and saving money for consumers by requiring less overlap at the two barrier ends of the landscape barriers and securely supporting solar-stake-mounted lights or a trellis for vines or climbing plants or an umbrella pole or a sprinkler head or drip line and securely connecting multiple landscape barriers together by inserting through the tongue-locking opening and wrapping over the top or under the bottom of the barrier and securely locking multiple landscape barriers together by inserting through the tongue-locking openings, wrapping in the opposite direction through the corner-angling holes, and again through the tongue-locking opening and anchoring the landscape barrier into soil and protecting garden plants from animals and saving materials during manufacturing, being half of the length of comparable prior art and saving money for consumers by requiring less overlap at the ends of the landscape barriers, a fold-over ridge folded from the top of the material-saving barrier for connecting the ridge of one landscape barrier to the ridge of an another landscape barrier to create a shield to protect garden plants from animals and to create a shield to protect saplings from animals and to create a shield to protect trees from animals and to create a barrier to protect garden vegetation from animals and to create a tonneau cover of a truck bed and providing a guide for the end-wing to slide into, at least one serpentine stake punched out of the barrier for frictionally anchoring the stake into soil by providing a serpentine stake shape and securing the landscape barrier into soil on an inclined or level surface and piercing into soil angledly or vertically, root-gripping tunnels punched out of the barrier for saving materials during manufacturing by stamping out the stake from the barrier and saving time and energy costs when the stake is stored within the root-gripping tunnel during packaging and storage and shipping the landscape barrier to reduce the space needed in each shipping container and to reduce the space needed for the landscape barrier and to reduce unit cost of the landscape barrier and securing the landscape barrier into soil by providing tunnel openings through which grass and plant roots may grow and soil may fill and locking into soil by providing tunnel lower edges below the root-gripping tunnels, stake-locking nipples formed into the barrier for locking the stake to the barrier to provide a secure place to store the stake when not in use and to prevent loss of the stake, a stopper formed into the stake, a stake-locking hole punched out of the stake for locking the stake tip to the barrier for storage and shipping and securing the stake in the soil by providing an opening through which grass and plant roots may grow and creating friction against the soil to secure the stake, at least one single-angled sheath and double-angled sheath and triple-angled sheath, molded to the barrier for connecting multiple landscape barriers by providing an opening for a strap to be threaded therethrough to create a shield to protect gardens or saplings or trees from animals and a barrier to protect garden plants from animals and a tonneau cover of a truck bed and securing the landscape barrier to the utility holes of a pickup truck by providing an opening for the stake to be threaded therethrough to create a vertical truck-bed extender and securing multiple landscape barriers to each other vertically by providing an opening for a stake to be threaded therethrough to create a tree ring or planter ring of varying heights and guiding a stake while being inserted vertically or angledly, ridges respectively pressed into the stake for wedging into the single- and double- and triple-angled sheaths to securely lock the stake for storage and shipping and wedging into the double-angled sheath to securely lock the stake and wedging into the triple-angled sheath to securely lock the stake and frictionally securing the stake into soil, having friction provided by serpentine ridge-shapes, to prevent lifting when ground expands and contracts due to changes in temperature and securely locking the stake to the barrier by snap-locking to the triple-angled sheath.

BRIEF DESCRIPTION OF THE DRAWINGS

FIG. 4A illustrates a front view of the six-device-in-one landscape barrier following the punch-stamping process during manufacturing.

FIG. 4B illustrates a front view of the six-device-in-one landscape barrier configured for shipping, with the serpentine stakes locked to multi-stake-locking-angle sheath systems.

FIG. 6C, FIG. 6D, FIG. 6E, and FIG. 6F illustrate front views of straight and angle oriented serpentine stakes, respectively.

FIG. 7A, FIG. 7B, FIG. 7C, FIG. 7D, and FIG. 7E illustrate front perspective, side, top, and top cross-sectional views of the barrier-locking stake system, respectively.

FIG. 8A, FIG. 8B, FIG. 8C, and FIG. 8D illustrate front views of the barrier-locking tongues, the safety ridge, and the corner-angling holes, in locked and unlocked configurations, respectively.

FIG. 11A, FIG. 11B, FIG. 11C, and FIG. 11D illustrate cross-sectional views of the top plate-securing hooks and the bottom plate-securing snap-hooks connecting to the root-gripping barrier.

FIG. 12A, FIG. 12B, FIG. 12C, FIG. 12D, and FIG. 12E illustrate top views of various configurations of plate systems connected to the six-device-in-one landscape barrier.

FIG. 13A and FIG. 14 illustrate cross-sectional views of the root-gripping barrier and the plates, retaining water, and being secured by the mass of soil, respectively.

FIG. 13B illustrates a cross-sectional view of the root-gripping barrier and the plates, demonstrating anti-digging function for repelling unwanted pests.

FIG. 15D illustrates a perspective view of the six-device-in-one landscape barrier demonstrating how the barrier-locking tongues securely integrate multiple solar lights and how two double-angled sheaths with three triple-angled sheaths securely integrate a solar light.

FIG. 15M and FIG. 15N illustrate top ad perspective views of the six-device-in-one landscape barrier demonstrating how the safety ridge and a strap can securely connect multiple barriers together.

FIG. 15O and FIG. 15P illustrate perspective and back views of the six-device-in-one landscape barrier demonstrating how the barrier-locking stake systems can securely connect barriers to the utility holes of a pickup truck.

FIG. 15T, FIG. 15U, FIG. 15V, and FIG. 15W illustrate perspective and close-up views of the six-device-in-one landscape barrier demonstrating how the barriers can be connected and used as a shield to protect trees from animals.

FIG. 16E illustrates a front view of a variation of the barrier system.

FIG. 17A and FIG. 17B illustrate front views of variations of the fold-over safety ridge and the adjustable-corner-angling holes sets.

DETAILED DESCRIPTION OF THE INVENTION

The six-device-in-one landscape barrier comprises:
1) Barrier system,
2) Stake-locking sheath system,
3) Barrier-locking stake system,
4) Serpentine ridge system, and
5) Anti-digging plate system.

Component

Figure 1A:
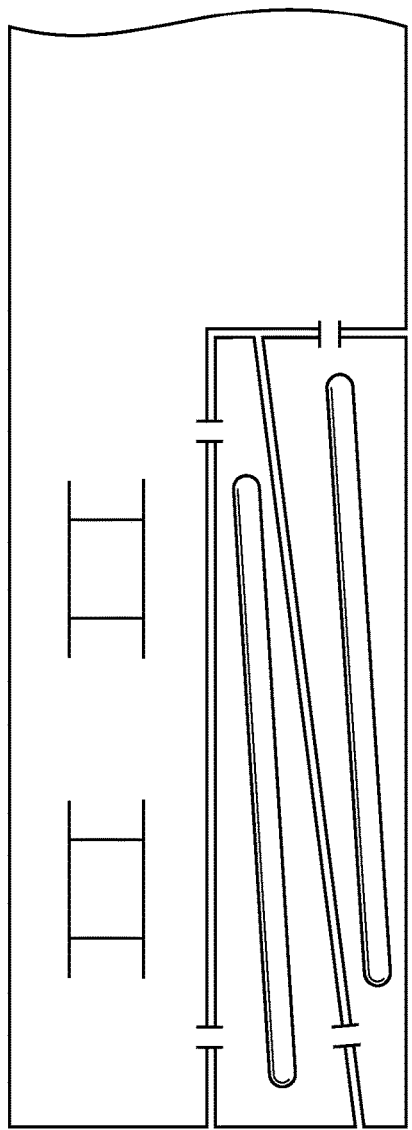
FIG. 1A (Prior Art) and FIG. 1B (Prior Art) illustrate front views of prior art landscape barrier, which will rust, resulting from the detachment of integrated stakes from an edging strip, exposing unprotected steel to weather elements.
Figure 1B:
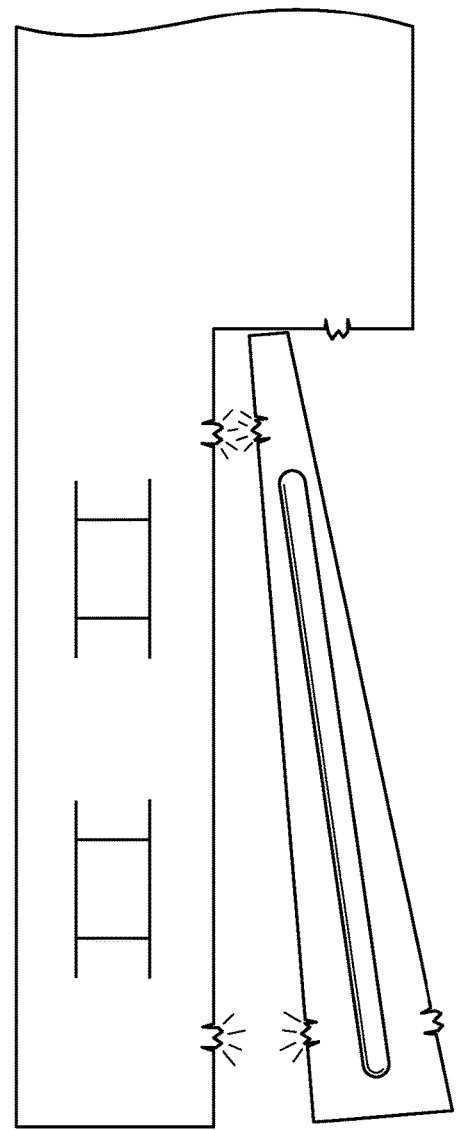
FIG. 1C (Prior Art), FIG. 1D, FIG. 1E (Prior Art), FIG. 1F, FIG. 1G (Prior Art), FIG. 1H, and illustrate front views of prior art landscape barrier demonstrating the excessive length of overlap required when coupled with adjacent prior art landscape barriers, thereby wasting steel materials during manufacturing, and increasing the cost to the consumer, and demonstrates the material and cost savings of six-device-in-one landscape barrier.
FIG. 1I (Prior Art) illustrates the disadvantages of attaching stakes at the ends of each barrier section, which wastes a foot of overall material, in turn increasing production costs, and results in more overlap per barrier piece, requiring more barrier sections overall.
FIG. 1J illustrates a front view of the advantages of punching the stakes from the six-device-in-one landscape barrier face, which can save 8 inches of overall material, lowering production costs, and results in less overlap per barrier piece, requiring less barrier sections overall.
FIG. 1K (Prior Art), FIG. 2A (Prior Art), and FIG. 2B (Prior Art) illustrate prior art landscape barrier which provides no means to secure stakes in soft or wet soil, and/or on an incline, and how prior art landscape barrier provides no means to not become bent and disconnected when the ground shifts and swells.
Figure 1E:
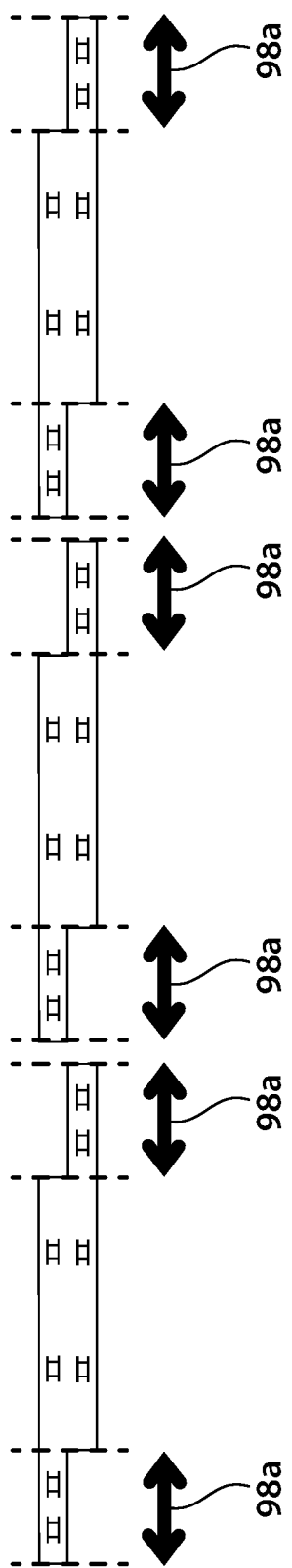
Figure 1F:
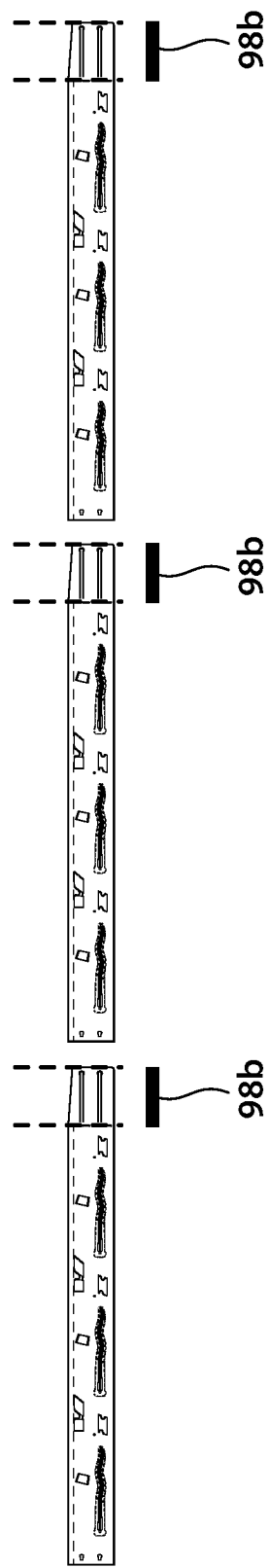
Figure 1G:
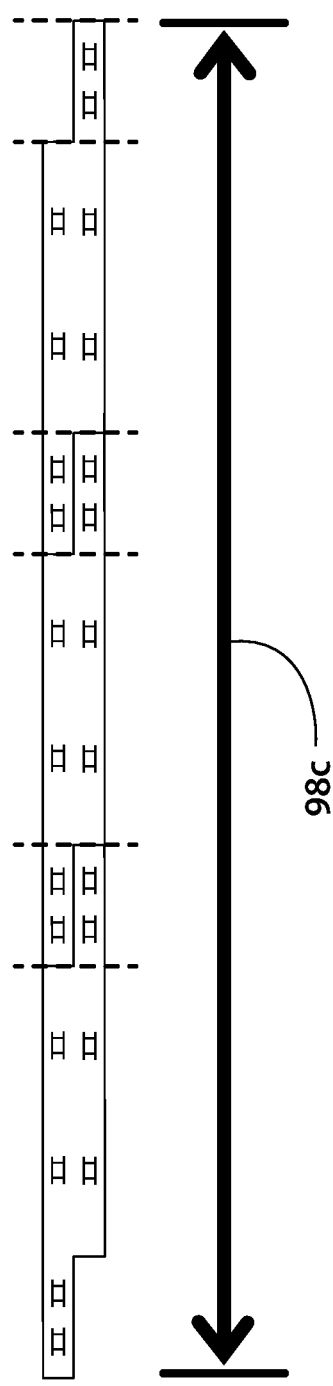
Figure 1H:
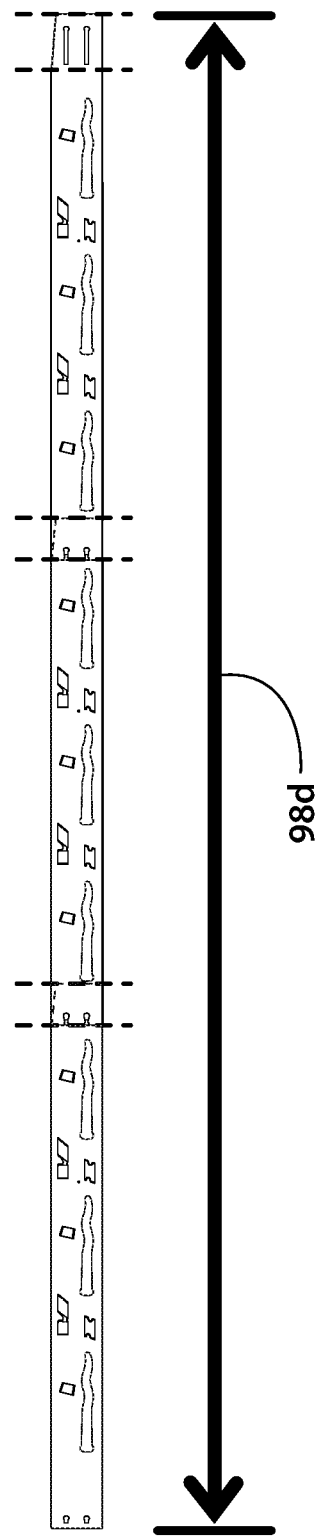
Figure 1I:
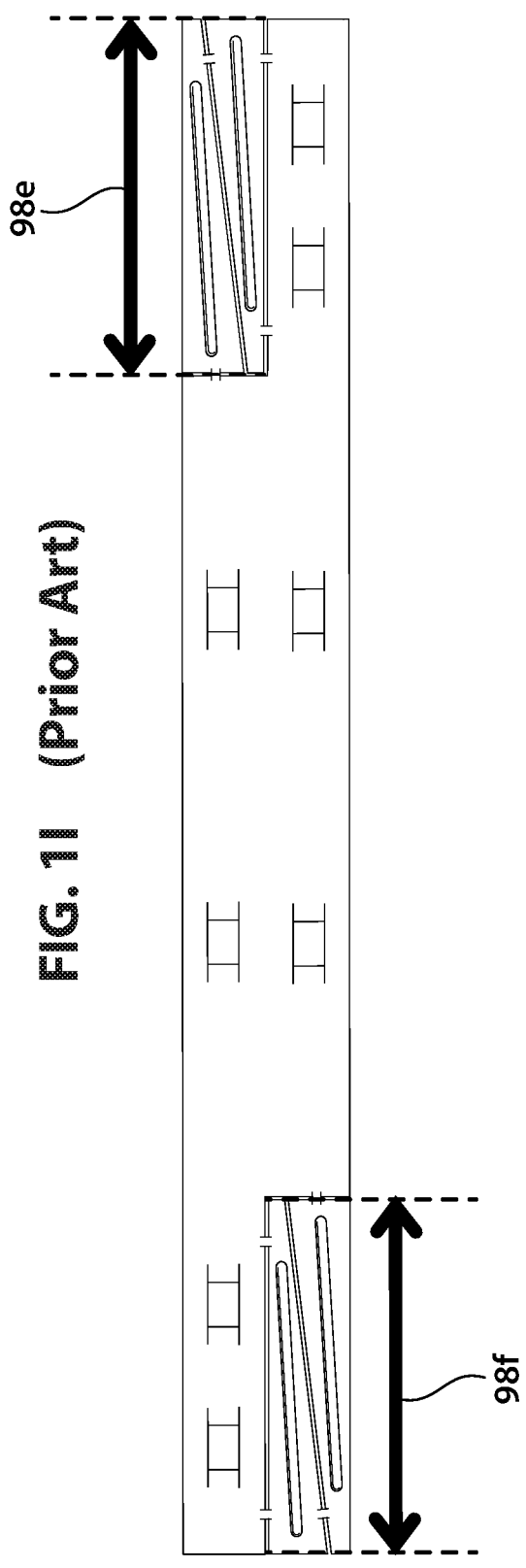
Figure 1J:
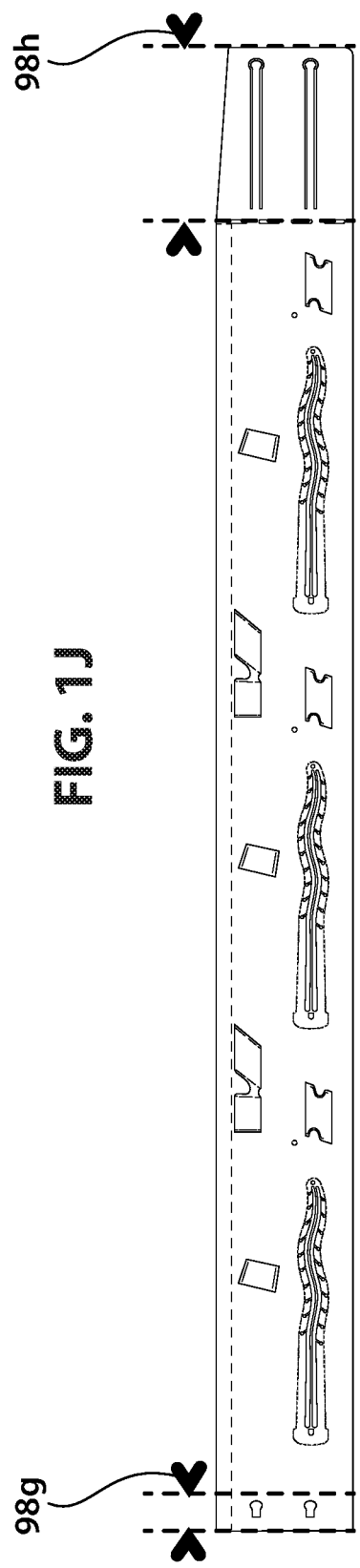
Figure 2A:
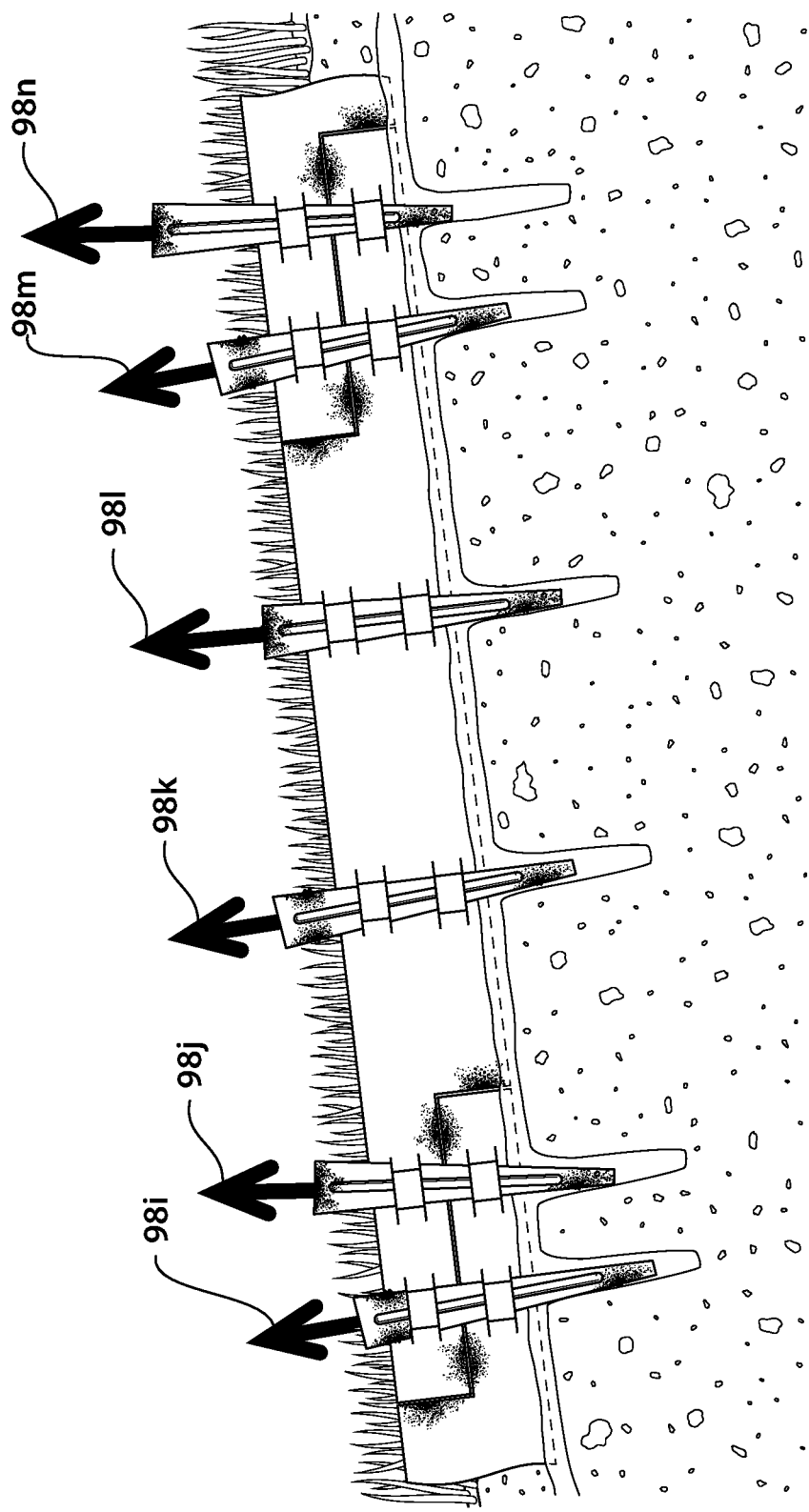
FIG. 2C (Prior Art) and FIG. 2D illustrate perspective views of the advantage of reducing thirty percent of the thickness of the six-device-in-one landscape barrier having the barrier-locking stake systems stored in the three material-saving consumer-and-manufacturer-cost-saving shipping-volume-saving multi-root-gripping-and-water-flowing-angle tunnels when packaged for storage and transportation compared to other prior-art landscape barriers.
FIG. 2E and FIG. 2F illustrate perspective views of six-device-in-one landscape barrier demonstrating how the adjustable-corner-angling holes can support a garden-plant cage.
FIG. 2G and FIG. 2H illustrate perspective views of the six-device-in-one landscape barrier demonstrating how the barrier-locking stake systems can securely stack multiple barriers vertically and installed on a flat or sloped surface.
FIG. 2I illustrates a perspective view demonstrating how the six-device-in-one landscape barrier and barrier-locking stake systems can securely connect the barrier to the utility holes of a pickup truck.
FIG. 2J illustrates a perspective view demonstrating how multiple six-device-in-one landscape barriers can be connected by inserting a strap through the two double-angled sheaths and the three triple-angled sheaths.
FIG. 2K illustrates a perspective view of the six-device-in-one landscape barrier demonstrating how the barriers can be connected and used as tonneau cover of a pickup truck.
FIG. 2L, FIG. 2M, and FIG. 2N illustrate perspective and close-up views of six-device-in-one landscape barrier demonstrating how the barriers can be connected and used as a shield to protect trees from animals.
FIG. 2O, FIG. 2P, FIG. 2Q, and FIG. 2R illustrate perspective and close-up views of the six-device-in-one landscape barrier demonstrating how the barriers can be connected and used as a shield to protect garden plants from animals.
Figure 2B:
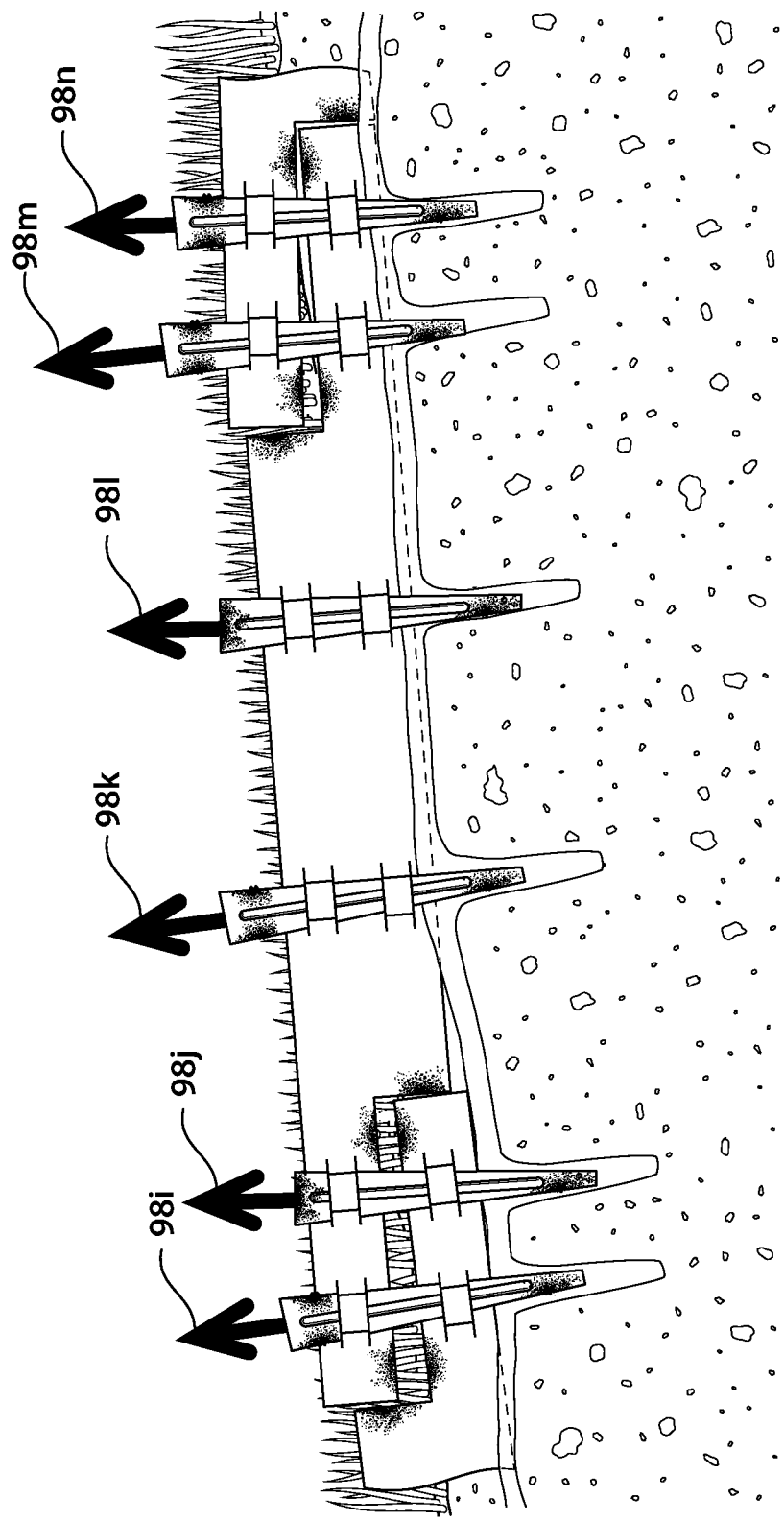
Figure 2C:
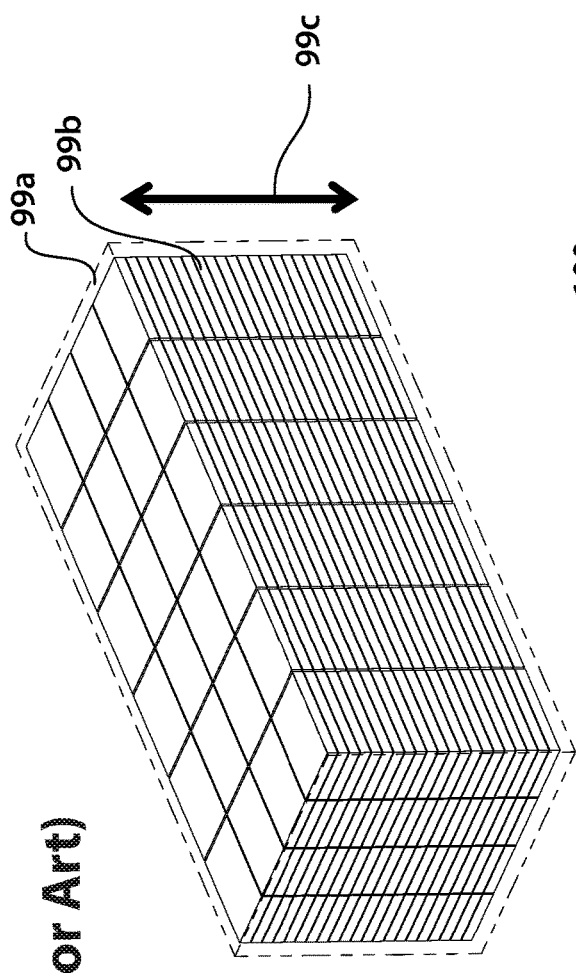

Referring to FIG. 1A (Prior Art), FIG. 1B (Prior Art), FIG. 1C (Prior Art), FIG. 1D, FIG. 1E (Prior Art), FIG. 1F, FIG. 1G (Prior Art), FIG. 1H, FIG. 1I (Prior Art), FIG. 1J, FIG. 1K (Prior Art), FIG. 2A (Prior Art), FIG. 2B (Prior Art), FIG. 2C (Prior Art), FIG. 2D, FIG. 2E, FIG. 2F, FIG. 2G, FIG. 2H, FIG. 2I, FIG. 2J, FIG. 2K, FIG. 2L, FIG. 2M, FIG. 2N, FIG. 2O, FIG. 2P, FIG. 2Q, FIG. 2R, FIG. 3A, FIG. 3B, FIG. 3C, FIG. 3D, FIG. 4A, FIG. 4B, FIG. 4C, FIG. 4D, FIG. 5A, FIG. 5B, FIG. 5C, and FIG. 5D, the six-device-in-one landscape barrier comprises:
1) Barrier system 101, respectively comprising:
2) Barrier 102,
3) Angling end-wing 103a,
   Material-saving tongue-locking openings 103b,
4) Barrier-locking tongues 104,
5) Safety ridge 105,
6) Corner-angling holes 106,
7) Three root-gripping angle tunnels 107a, and
   Stake-locking nipples 107b;
8) Sheath system 108, respectively comprising:
9) Three single-angled sheaths 109,
10) Two double-angled sheaths 110,
11) Two vertical guiding walls 111,
12) Two angled guiding walls 112,
13) Three triple-angled sheaths 113, and
14) Two curved guiding walls 114;
15) Barrier-locking stake system 115, respectively comprising:
16) Serpentine stake 116a,
    Barrier-securing stopper 116b, and
    Stake-locking root-gripping holes 116c;
17) Serpentine ridge system 117, respectively comprising:
18) Serpentine ridges 118a,
    Branching bridges 118b, and
19) Root-gripping locking tunnels 119;
20) Anti-digging plate system 120, respectively comprising:
21) Anti-digging plates 121,
22) Barrier-conforming connector 122,
23) Top plate-securing hooks 123, and
24) Bottom plate-securing snap-hooks 124.

Material

Referring to FIG. 1A (Prior Art), FIG. 1B (Prior Art), FIG. 1C (Prior Art), FIG. 1D, FIG. 1E (Prior Art), FIG. 1F, FIG. 1G (Prior Art), FIG. 1H, FIG. 1I (Prior Art), FIG. 1J, FIG. 1K (Prior Art), FIG. 2A (Prior Art), FIG. 2B (Prior Art), FIG. 2C (Prior Art), FIG. 2D, FIG. 2E, FIG. 2F, FIG. 2G, FIG. 2H, FIG. 2I, FIG. 2J, FIG. 2K, FIG. 2L, FIG. 2M, FIG. 2N, FIG. 2O, FIG. 2P, FIG. 2Q, FIG. 2R, FIG. 3A, FIG. 3B, FIG. 3C, FIG. 3D, FIG. 4A, FIG. 4B, FIG. 4C, FIG. 4D, FIG. 5A, FIG. 5B, FIG. 5C, and FIG. 5D:
1) Barrier system 101 is made of the combined materials of its components.
2) Barrier 102
   is made of metallic material.
3) Angling end-wing 103a
   is made of metallic material.
   Material-saving tongue-locking openings 103b
      each are made of empty space.
4) Barrier-locking tongues 104
   each are made of metallic material.
5) Safety ridge 105
   is made of metallic material.
6) Corner-angling holes 106
   each are made of empty space.
7) Three root-gripping angle tunnels 107a
   each are made of empty space.
   Stake-locking nipples 107b
      each are made of metallic material.
8) Stake-locking sheath system 108 is made of the combined materials of its components.
9) Three single-angled sheaths 109
   each are made of metallic material.
10) Two double-angled sheaths 110
    each are made of metallic material.
11) Two vertical guiding walls 111
    each are made of metallic material.
12) Two angled guiding walls 112
    each are made of metallic material.
13) Three triple-angled sheaths 113
    each are made of metallic material.
14) Two curved guiding walls 114
    each are made of metallic material.
15) Barrier-locking stake system 115 is made of the combined materials of its components.
16) Serpentine stake 116a
    is made of metallic material.
    Barrier-securing stopper 116b
       is made of metallic material.
    Stake-locking root-gripping holes 116c
       each are made of empty space.
17) Serpentine ridge system 117 is made of the combined materials of its components.
18) Serpentine ridges 118a
    is made of metallic material.
    Branching bridges 118b
       each are made of metallic material.
19) Root-gripping locking tunnels 119
    each are made of empty space.
20) Anti-digging plate system 120 is made of the combined materials of its components.
21) Anti-digging plates 121
    each are made of metallic material.
22) Barrier-conforming connector 122
    is made of metallic material.
23) Top plate-securing hooks 123
    each are made of metallic material.
24) Bottom plate-securing snap-hooks 124
    each are made of metallic material.

Shape
  Referring to FIG. 1A (Prior Art), FIG. 1B (Prior Art), FIG. 1C (Prior Art), FIG. 1D, FIG. 1E (Prior Art), FIG. 1F, FIG. 1G (Prior Art), FIG. 1H, FIG. 1I (Prior Art), FIG. 1J, FIG. 1K (Prior Art), FIG. 2A (Prior Art), FIG. 2B (Prior Art), FIG. 2C (Prior Art), FIG. 2D, FIG. 2E, FIG. 2F, FIG. 2G, FIG. 2H, FIG. 2I, FIG. 2J, FIG. 2K, FIG. 2L, FIG. 2M, FIG. 2N, FIG. 2O, FIG. 2P, FIG. 2Q, FIG. 2R, FIG. 3A, FIG. 3B, FIG. 3C, FIG. 3D, FIG. 4A, FIG. 4B, FIG. 4C, FIG. 4D, FIG. 5A, FIG. 5B, FIG. 5C, and FIG. 5D:
  1) Barrier system 101 has the combined shapes of its components.
  2) Barrier 102
    has a rectangular shape.
  3) Angling end-wing 103a
    has a wedge shape.
    Material-saving tongue-locking openings 103b
      each have a cul-de-sac shape.
  4) Barrier-locking tongues 104
    each have an elongated cul-de-sac shape.
  5) Safety ridge 105
    has a U shaped.
  6) Corner-angling holes 106
    each have a capsule shape.
  7) Three root-gripping angle tunnels 107a
    each have a wavy shape.
    Stake-locking nipples 107b
      each have a round-domed shape.
  8) Stake-locking sheath system 108 has the combined shapes of its components.
  9) Three single-angled sheaths 109
    each have a trapezoidal shape.
  10) Two double-angled sheaths 110
    each have a rectangular shape.
  11) Two vertical guiding walls 111
    each have an I shape.
  12) Two angled guiding walls 112
    each have an I shape.
  13) Three triple-angled sheaths 113
    each have a parallelogram shape.
  14) Two curved guiding walls 114
    each have a U shape.
  15) Barrier-locking stake system 115 has the combined shapes of its components.
  16) Serpentine stake 116a
    has a wavy shape.
    Barrier-securing stopper 116b
      has a half-dome shape.
    Stake-locking root-gripping holes 116c
      each have a circular shape.
  17) Serpentine ridge system 117 has the combined shapes of its components.
  18) Serpentine ridges 118a
    each have a wavy shape.
    Branching bridges 118b
      each have an I shape.
  19) Root-gripping locking tunnels 119
    each have a circular shape.
  20) Anti-digging plate system 120 has the combined shapes of its components.
  21) Anti-digging plates 121
    each have a rounded rectangular shape.
  22) Barrier-conforming connector 122
    has a rectangular shape.
  23) Top plate-securing hooks 123
    each have a U shape.
  24) Bottom plate-securing snap-hooks 124
    each have an upside-down U shape.

Connection
  Referring to FIG. 1A (Prior Art), FIG. 1B (Prior Art), FIG. 1C (Prior Art), FIG. 1D, FIG. 1E (Prior Art), FIG. 1F, FIG. 1G (Prior Art), FIG. 1H, FIG. 1I (Prior Art), FIG. 1J, FIG. 1K (Prior Art), FIG. 2A (Prior Art), FIG. 2B (Prior Art), FIG. 2C (Prior Art), FIG. 2D, FIG. 2E, FIG. 2F, FIG. 2G, FIG. 2H, FIG. 2I, FIG. 2J, FIG. 2K, FIG. 2L, FIG. 2M, FIG. 2N, FIG. 2O, FIG. 2P, FIG. 2Q, FIG. 2R, FIG. 3A, FIG. 3B, FIG. 3C, FIG. 3D, FIG. 4A, FIG. 4B, FIG. 4C, FIG. 4D, FIG. 5A, FIG. 5B, FIG. 5C, and FIG. 5D:
  1) Barrier system 101 has the combined connections of its components.
  2) Barrier 102
    is attached to tongue-locking openings 103b and barrier-locking tongues 104.
  3) Angling end-wing 103a
    is attached to the end of root-gripping barrier 102.
    Material-saving tongue-locking openings 103b
      respectively are cut out from angling end-wing 103a.
  4) Barrier-locking tongues 104
    respectively are cut out from angling end-wing 103a.
  5) Safety ridge 105
    is folded from the top of material-saving multi-root-gripping-and-water flowing barrier 102.
  6) Corner-angling holes 106
    respectively are cut out from root-gripping barrier 102.
  7) Three root-gripping angle tunnels 107a
    respectively are formed into root-gripping barrier 102.
    Stake-locking nipples 107b
      respectively are pressed into root-gripping barrier 102.
  8) Stake-locking sheath system 108 has the combined connections of its components.
  9) Three single-angled sheaths 109
    respectively are formed into from root-gripping barrier 102.
  10) Two double-angled sheaths 110
    respectively are formed into root-gripping barrier 102.
  11) Two vertical guiding walls 111
    respectively are formed into two double-angled-stake-securing strap-loop sheaths 110.
  12) Two angled guiding walls 112
    respectively are respectively are formed into two double-angled sheaths 110.
  13) Three triple-angled sheaths 113
    respectively are formed into root-gripping barrier 102.
  14) Two curved guiding walls 114
    respectively are formed into three triple-angled sheaths 113.
  15) Barrier-locking stake system 115 has the combined connections of its components.
  16) Serpentine stake 116a.
    is press-punched out of root-gripping barrier 102.
    Barrier-securing stopper 116b
      is formed into serpentine stake 116a.
    Stake-locking root-gripping holes 116c
      respectively are punched out of serpentine stake 116a.
  17) Serpentine ridge system has the combined connections of its components.
  18) Serpentine ridges 118a
    respectively are pressed into serpentine stake 116a
    Branching bridges 118b
      respectively are molded to serpentine ridges 117.

19) Root-gripping locking tunnels 119
respectively are formed into out of serpentine ridges 117.
20) Anti-digging plate system 120 has the combined connections of its components.
21) Anti-digging plates 121
respectively are molded to barrier-conforming connector 122.
22) Barrier-conforming connector 122
is molded to anti-digging plates 121.
23) Top plate-securing hooks 123
respectively are molded to barrier-conforming connector 122.
24) Bottom plate-securing snap-hooks 124
respectively are molded to barrier-conforming connector 122.

Function

Figure 2D:
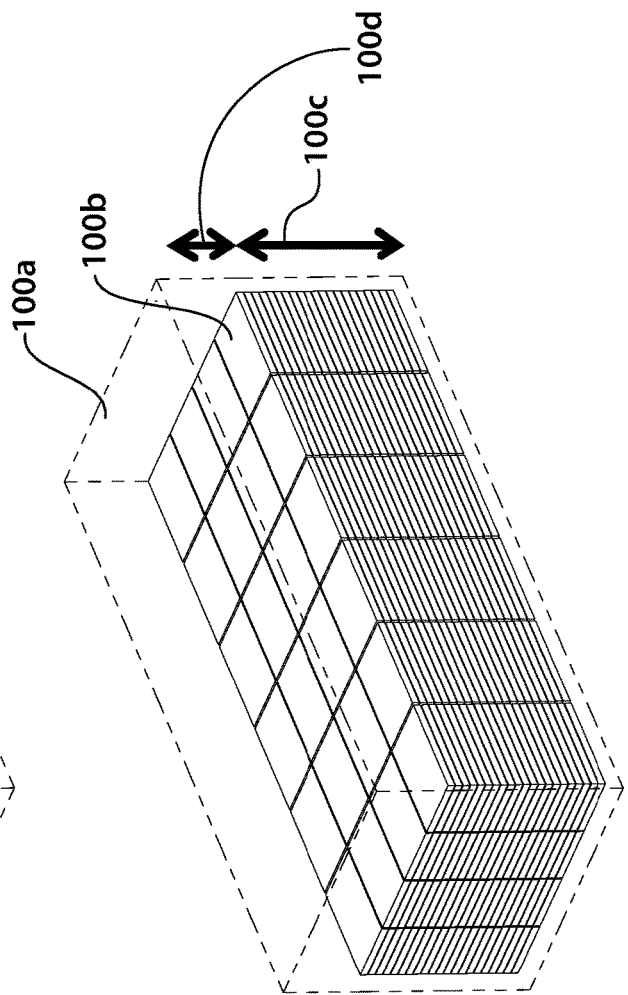
Figure 2G:
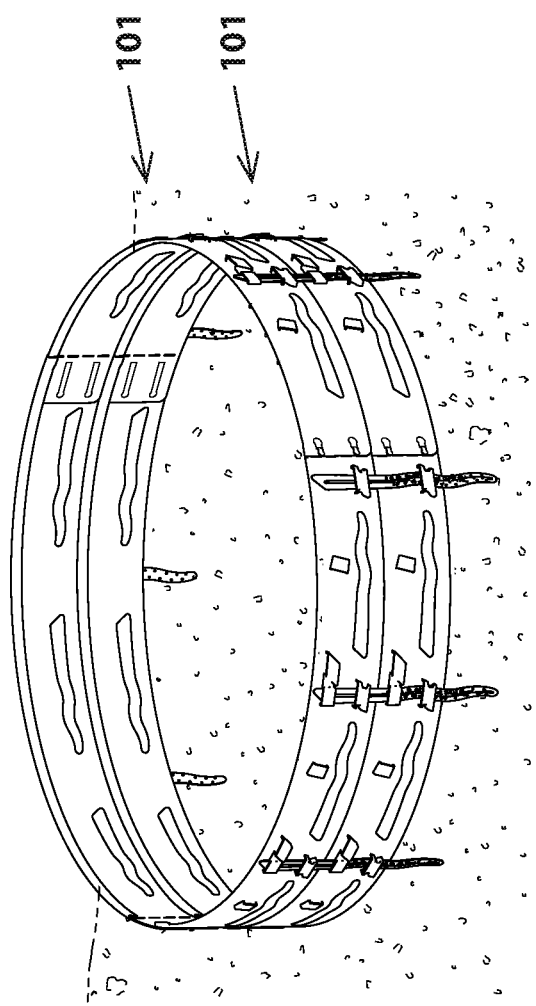
Figure 2H:
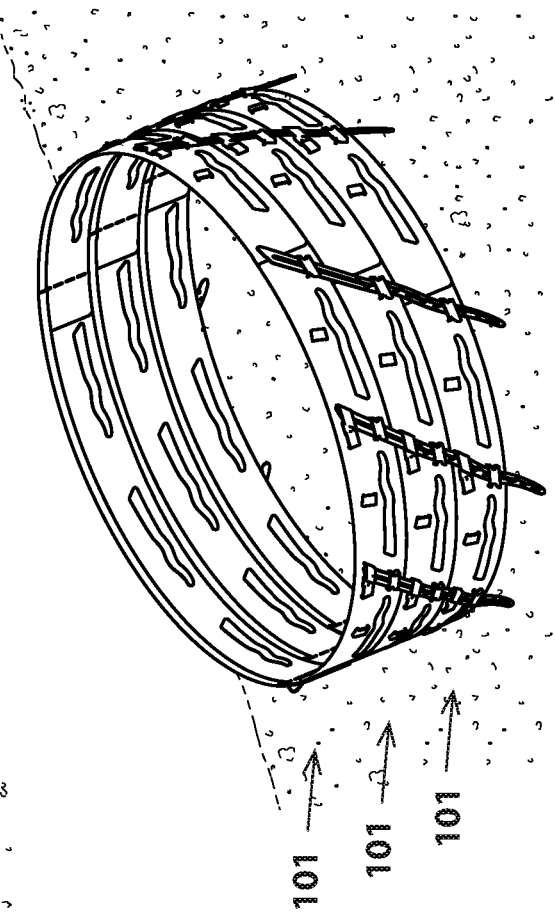
Figure 21:
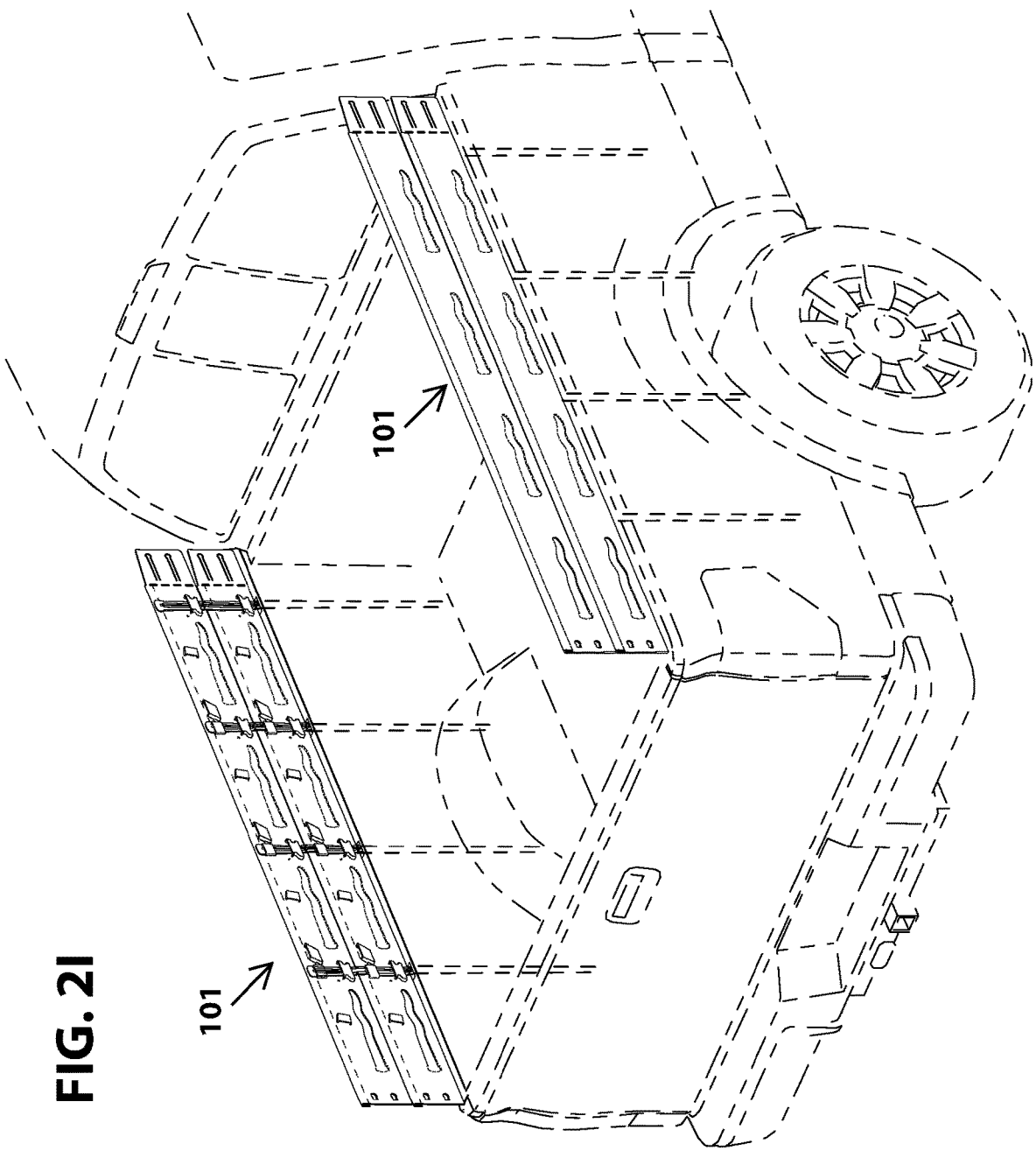
FIG. 21A, FIG. 21B, FIG. 21C, and FIG. 21D illustrate front and top views of variations of the barrier systems.
Figure 2J:
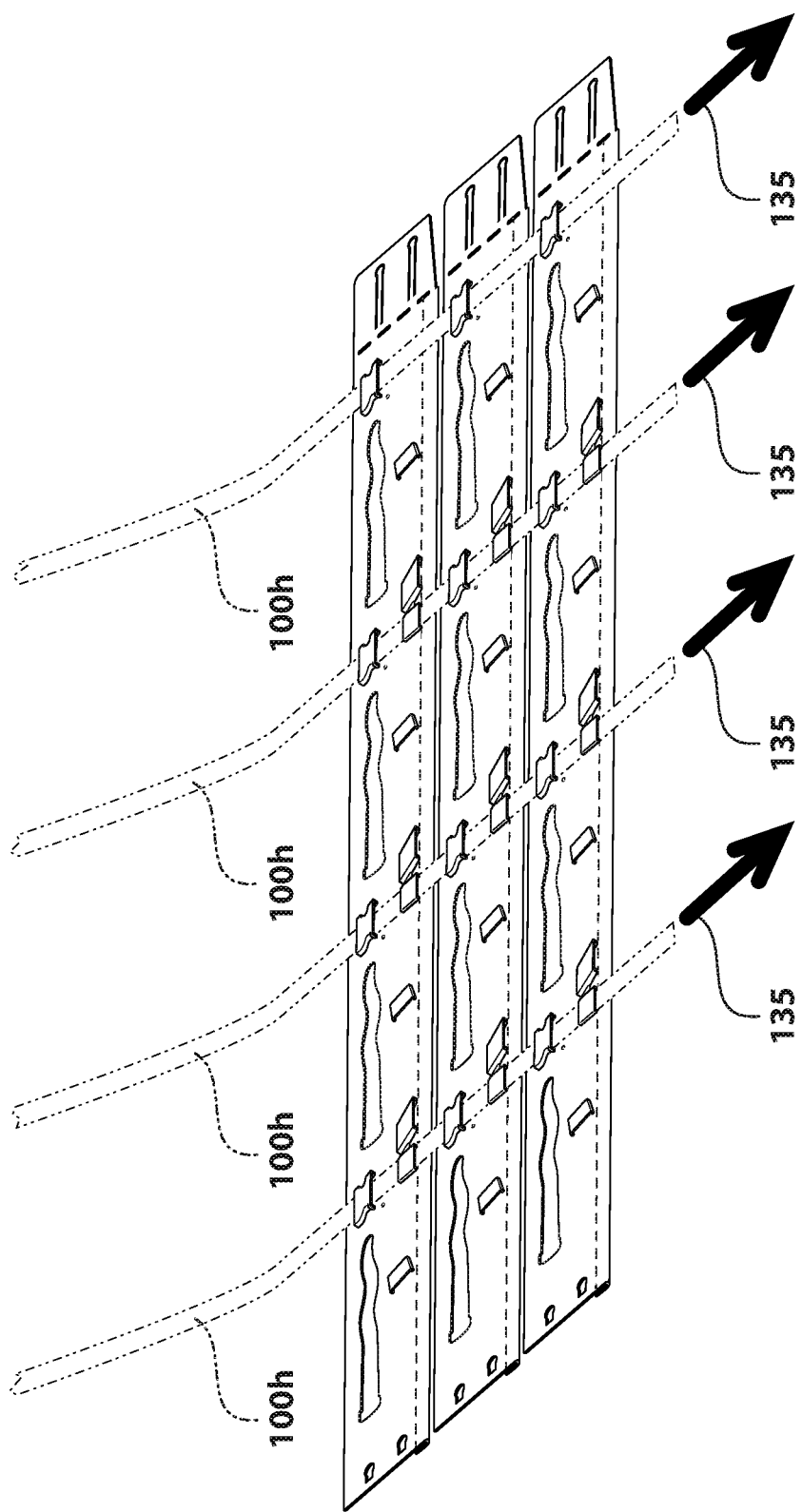
Figure 2K:
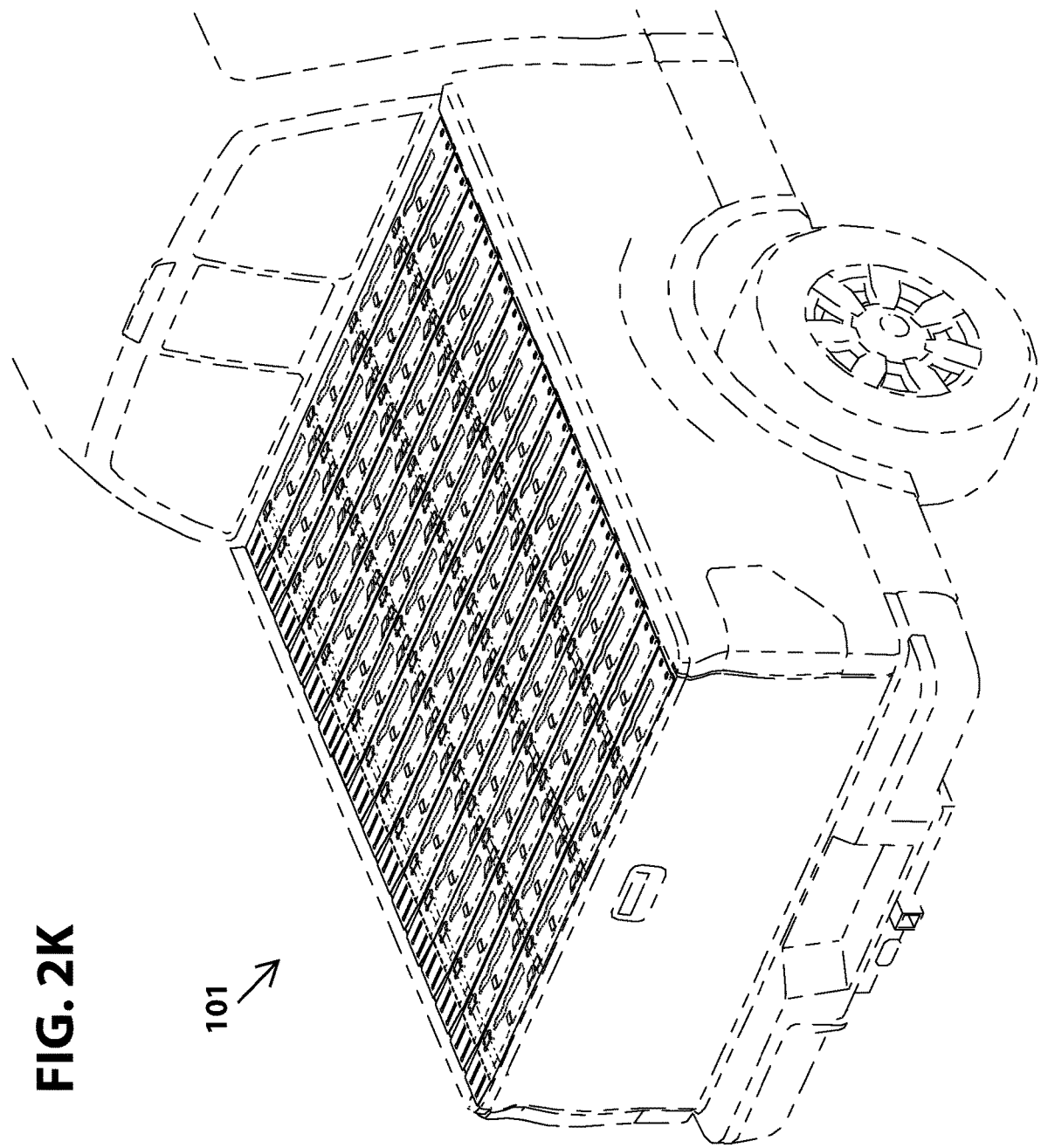
Figure 2M:
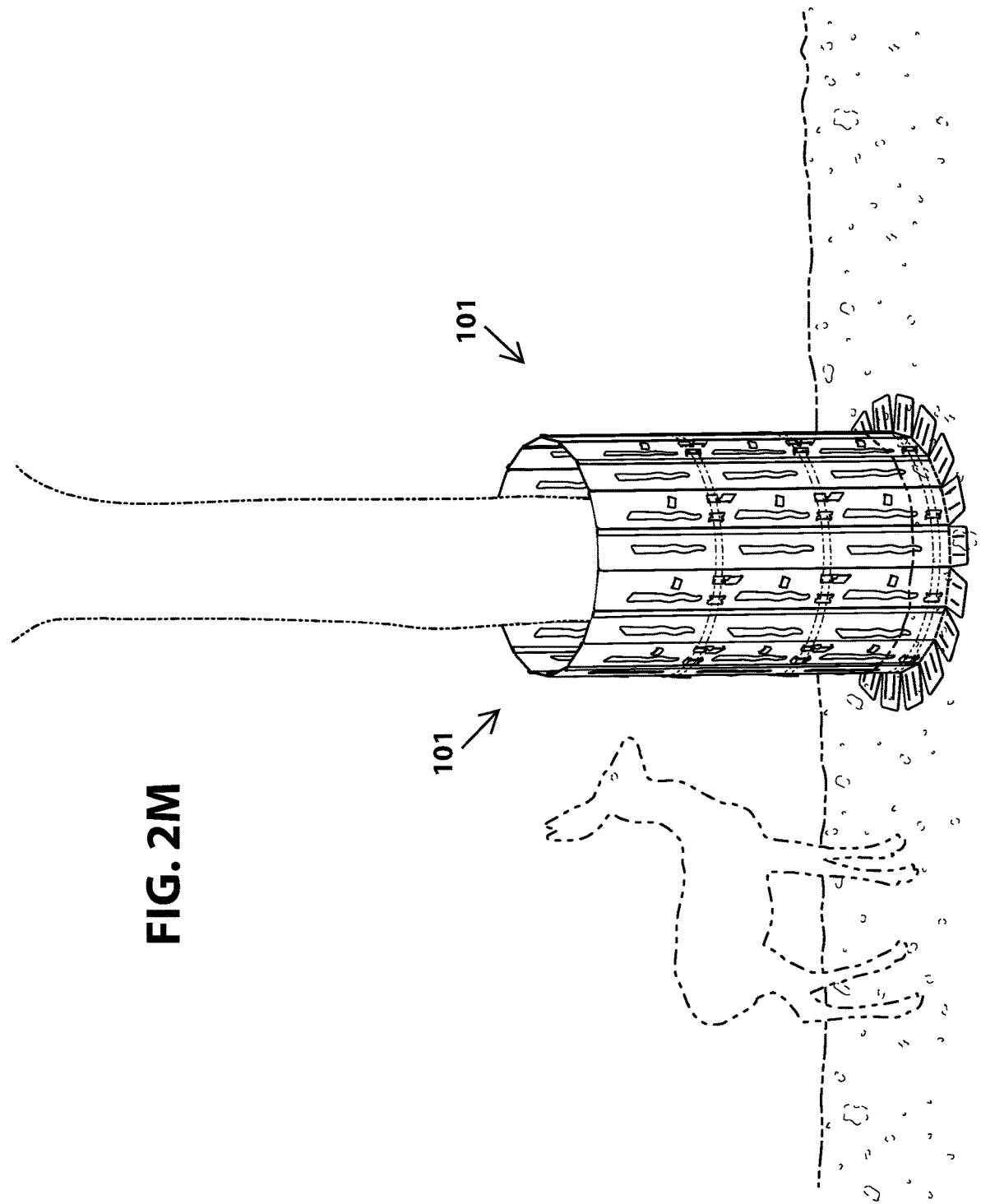
Figure 2N:
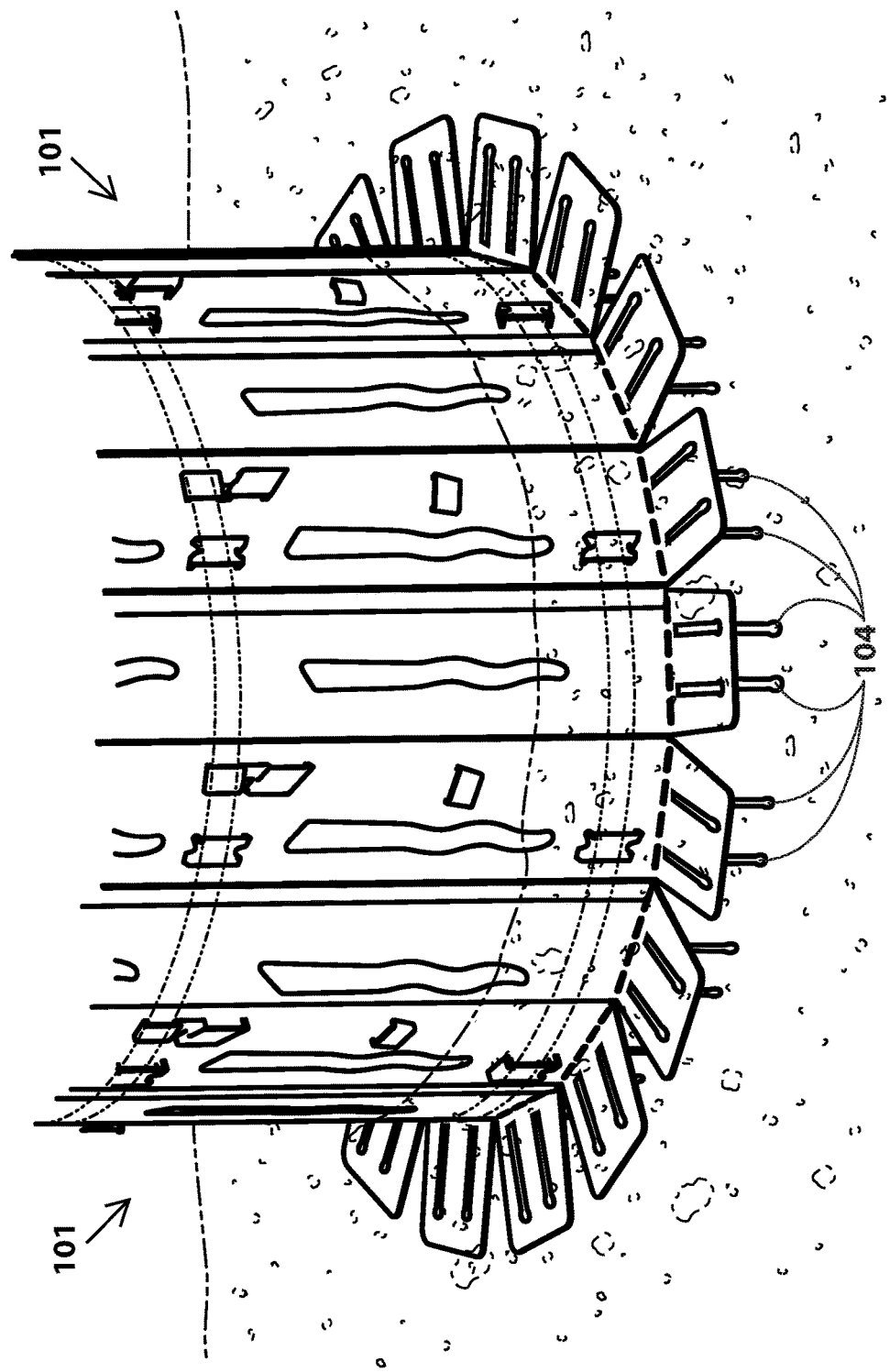
Figure 2O:
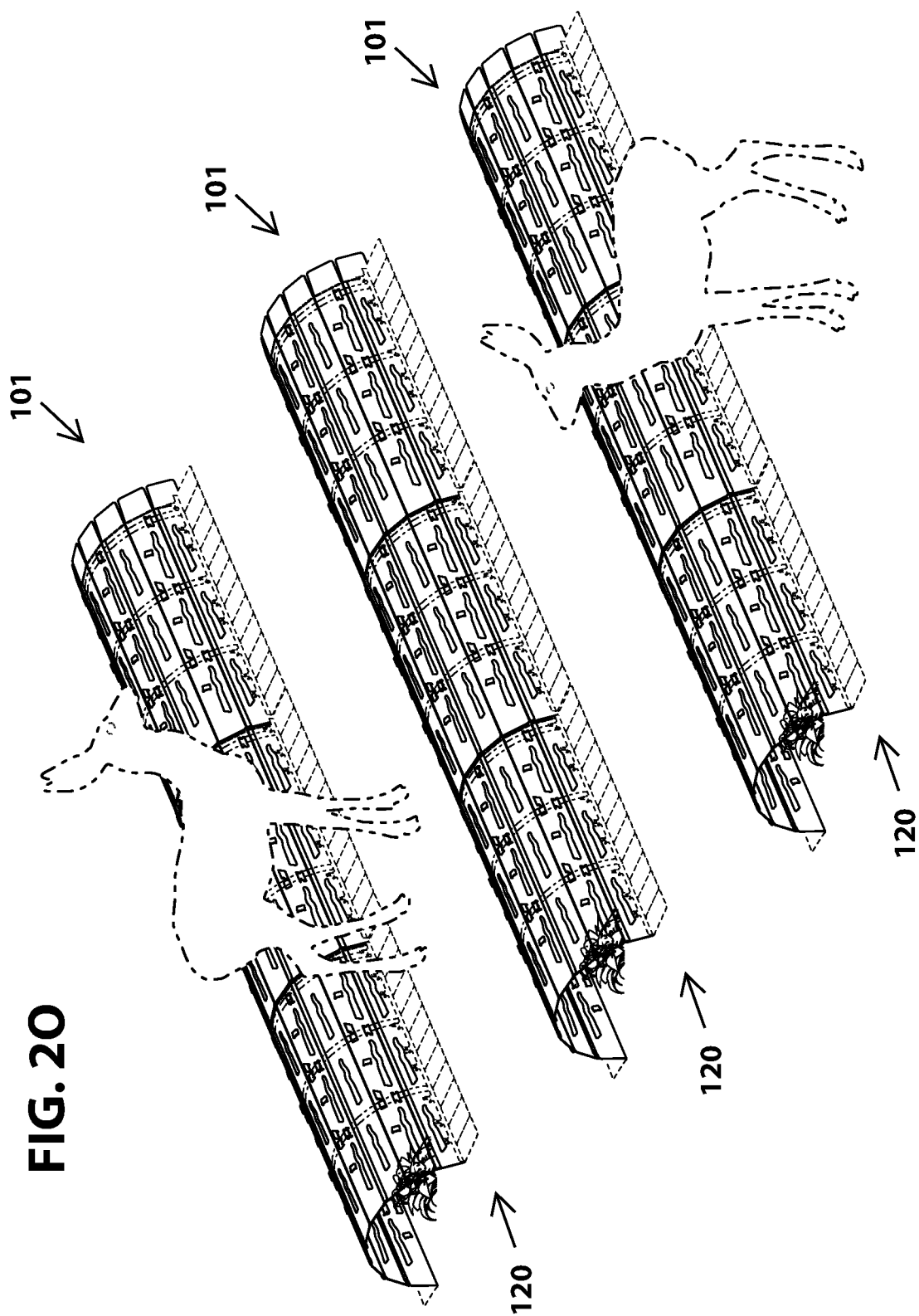
Figure 2P:
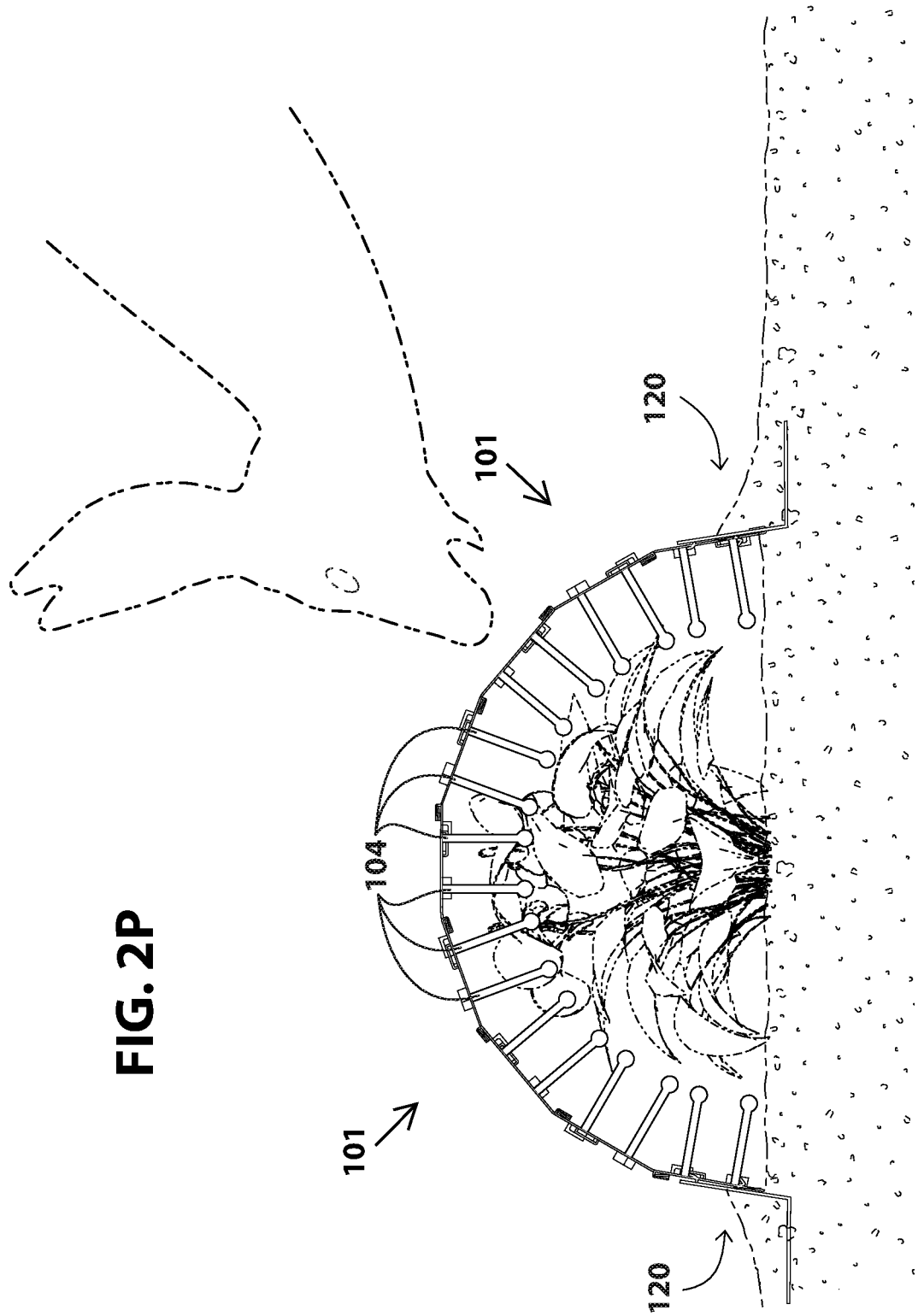
Figure 2Q:
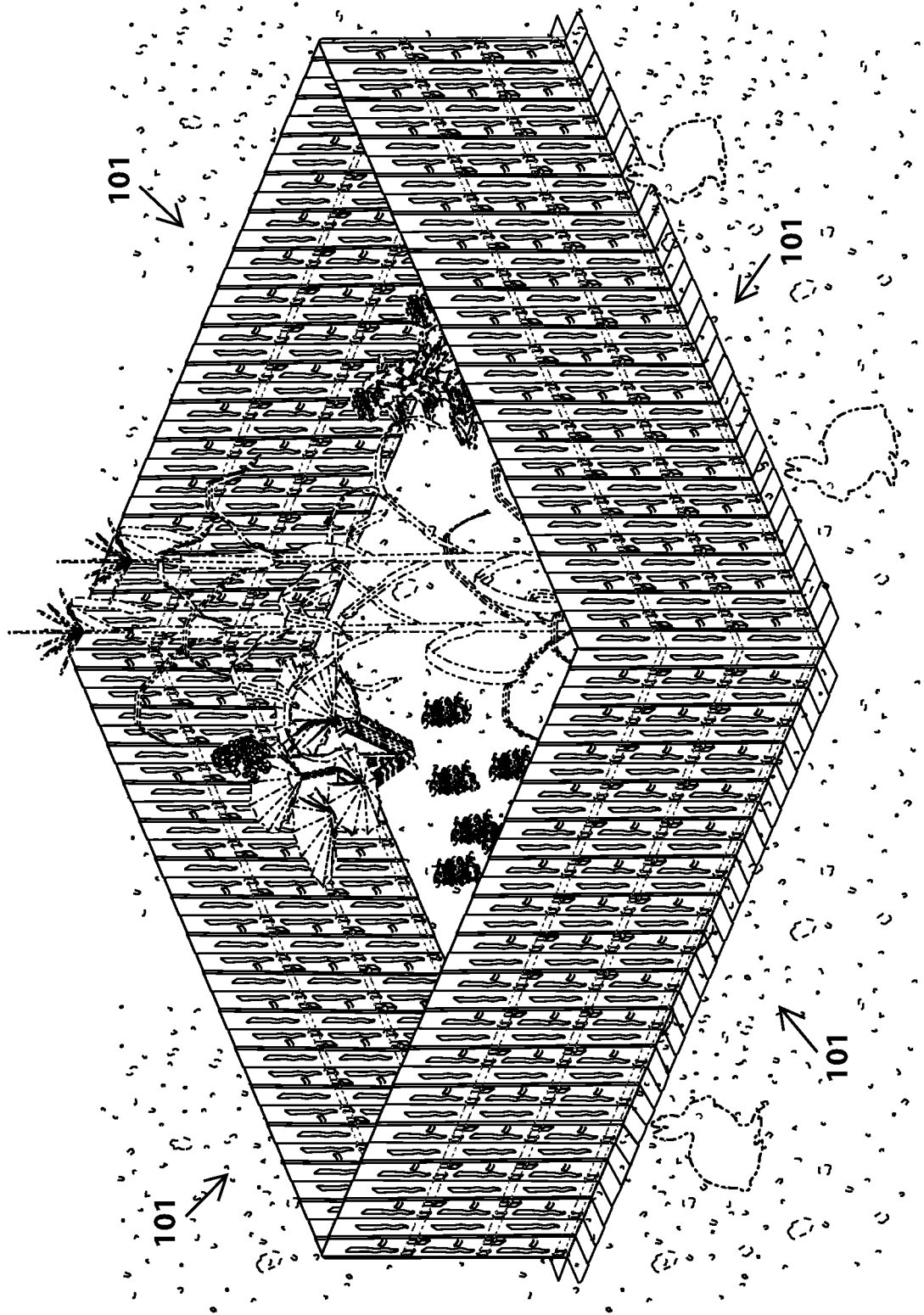
Figure 2R:
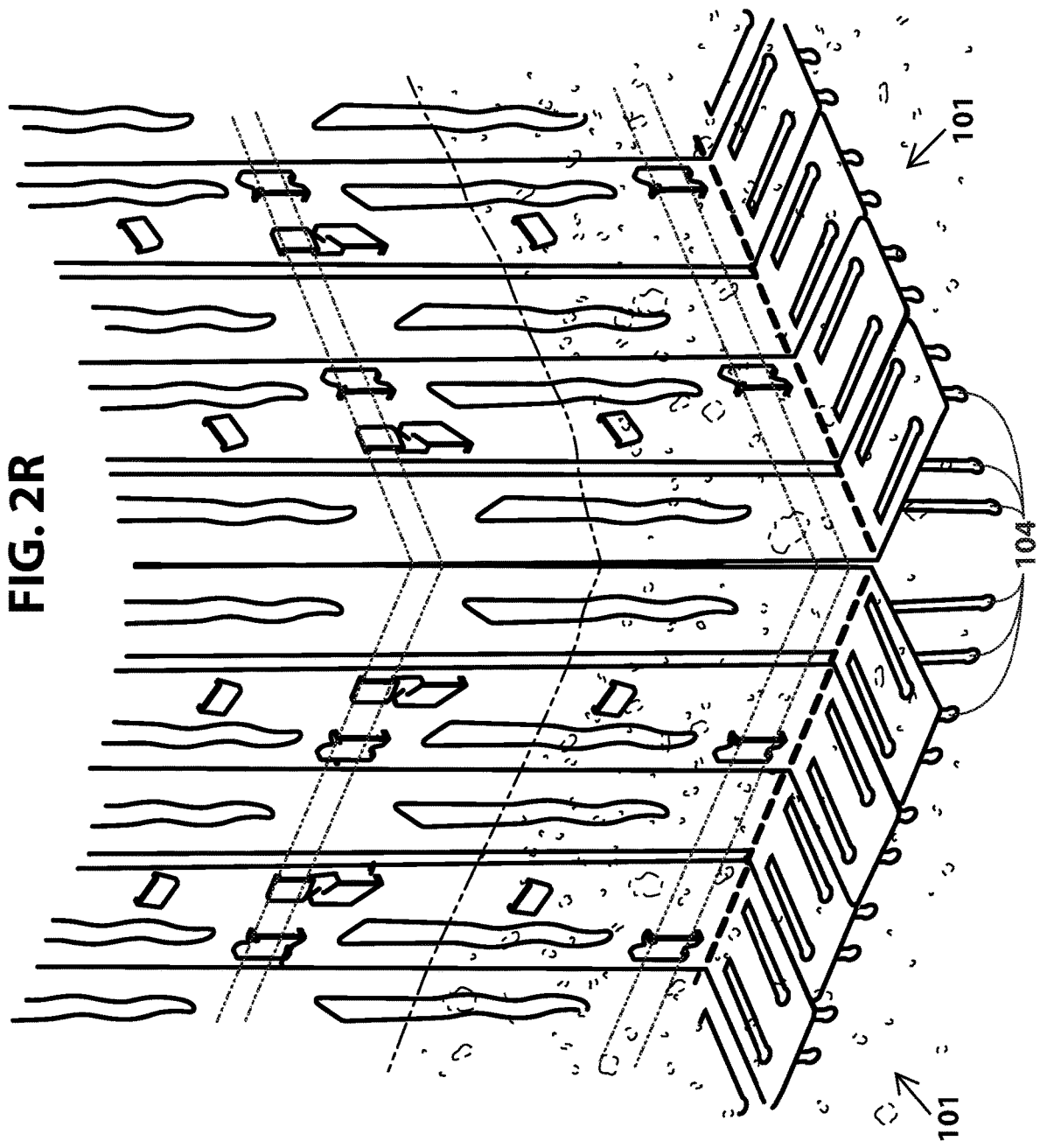
Figure 15A:
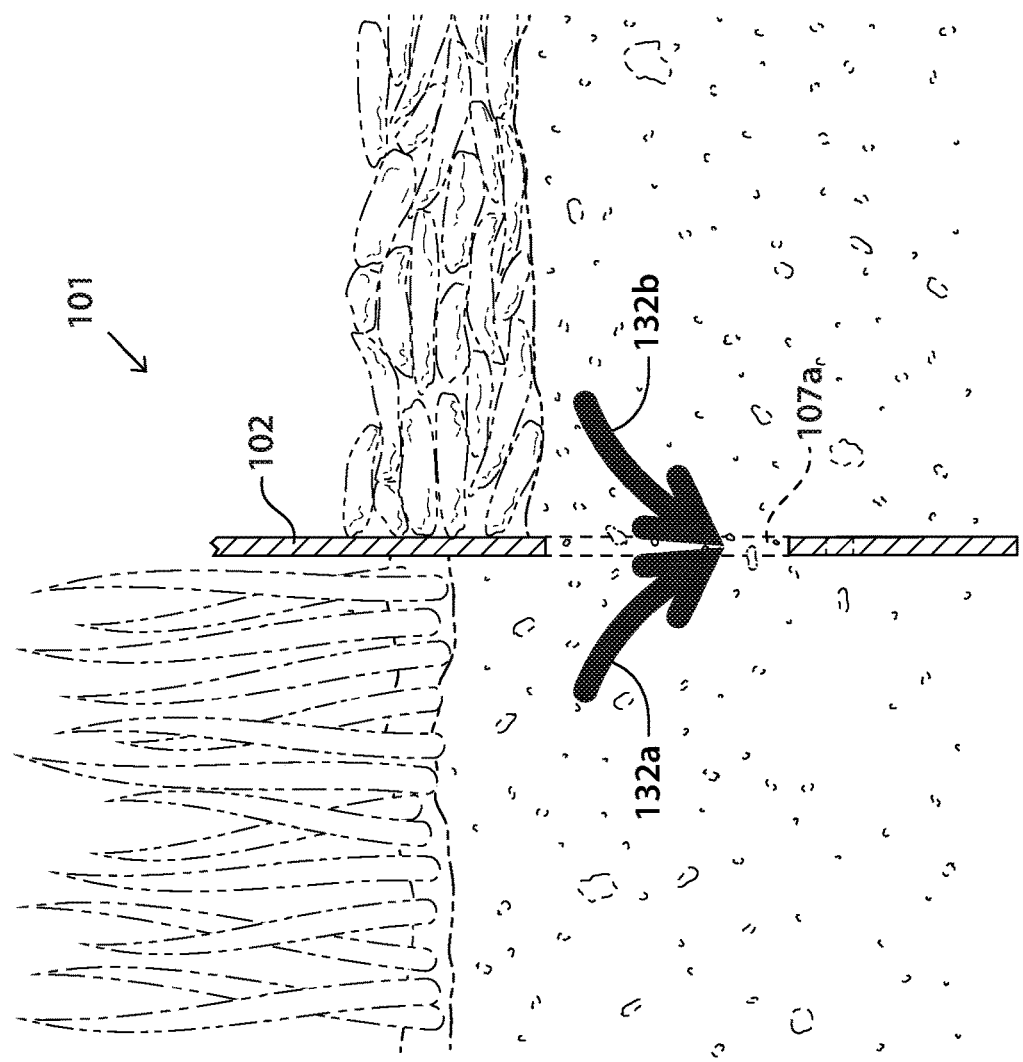
FIG. 15A and FIG. 15B illustrate cross-sectional views of the three root-gripping angle tunnels locking the root-gripping barrier into the soil.
Figure 15B:
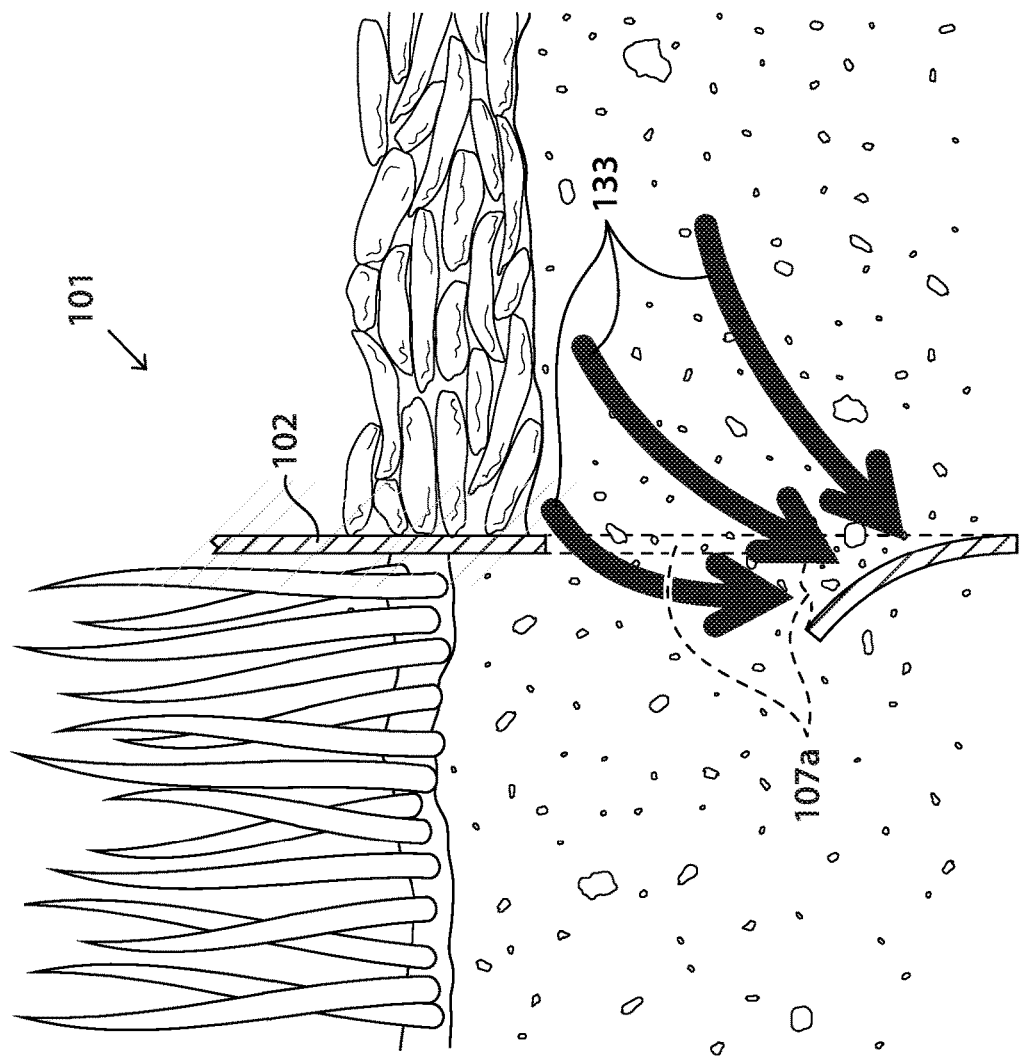
Figure 15C:
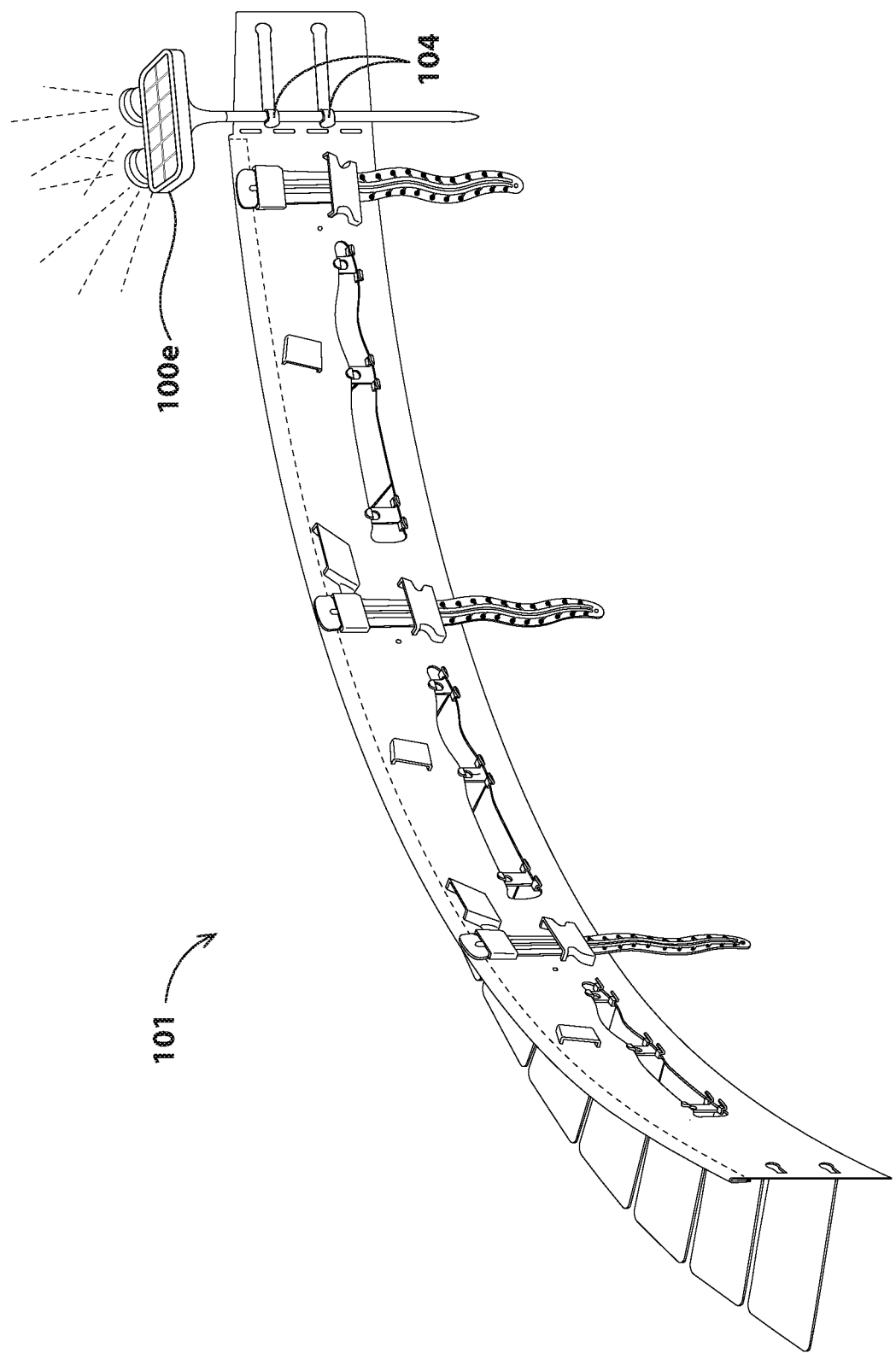
FIG. 15C illustrates a perspective view of the six-device-in-one landscape barrier demonstrating how the barrier-locking tongues securely integrate a solar light.
Figure 15E:
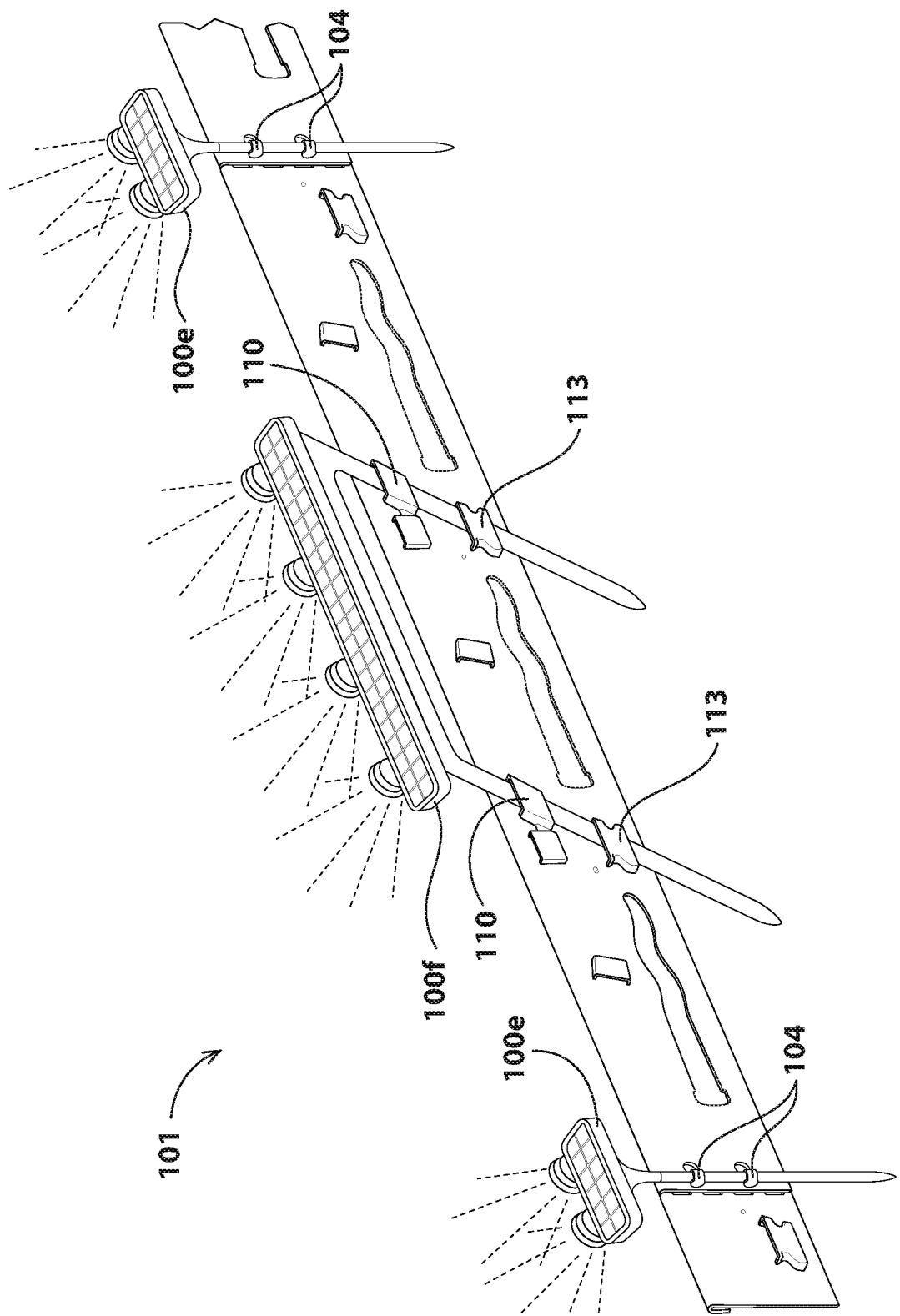
FIG. 15E illustrates a perspective view of the six-device-in-one landscape barrier demonstrating how the barrier-locking tongues securely integrate multiple solar lights and how two double-angled sheaths with three triple-angled sheaths securely integrate a solar light.
Figure 15F:
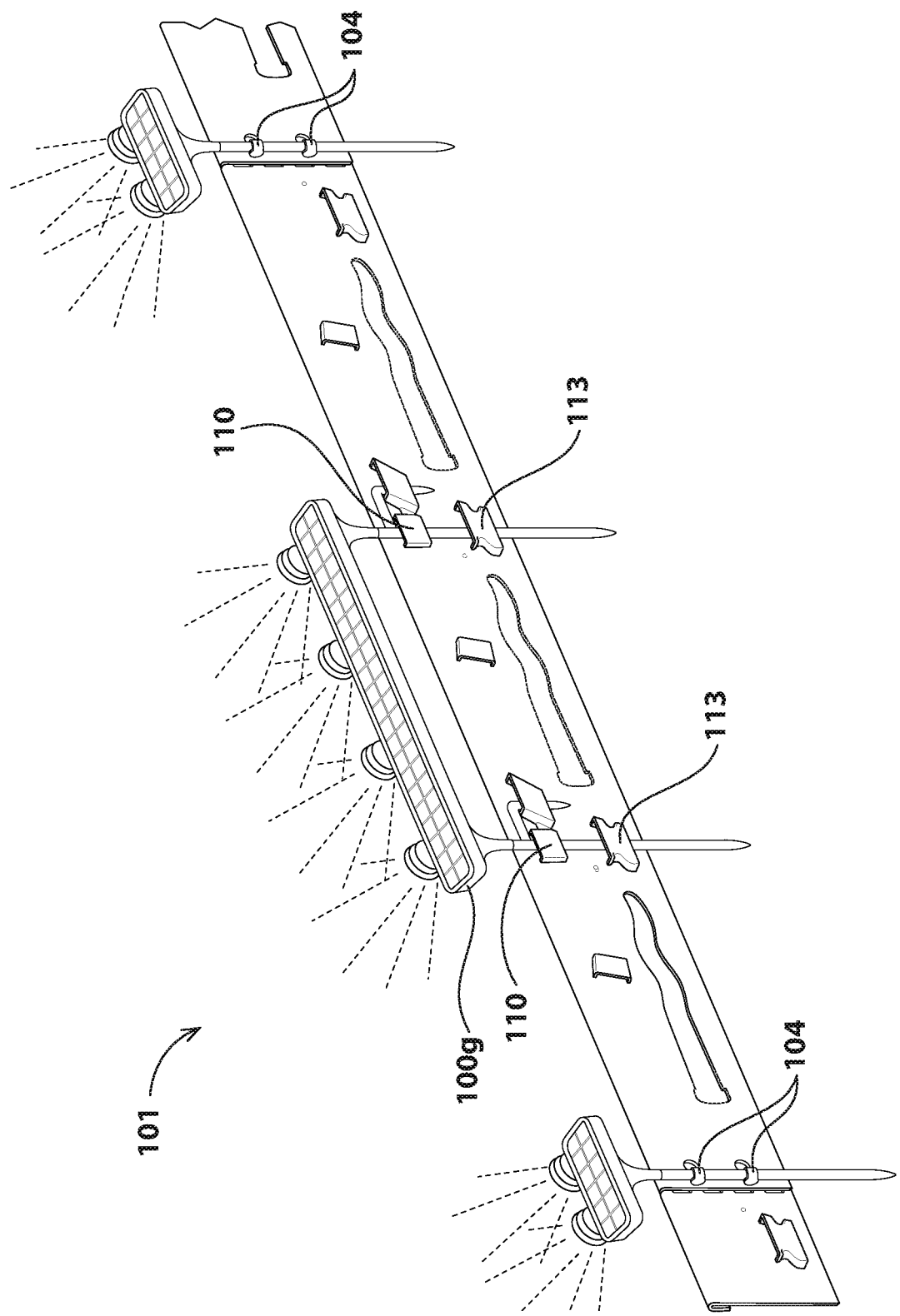
FIG. 15F illustrates a perspective view of the six-device-in-one landscape barrier demonstrating how the barrier-locking tongues securely integrate multiple solar lights and how two double-angled sheaths with three triple-angled sheaths securely integrate a solar light.
Figure 15G:
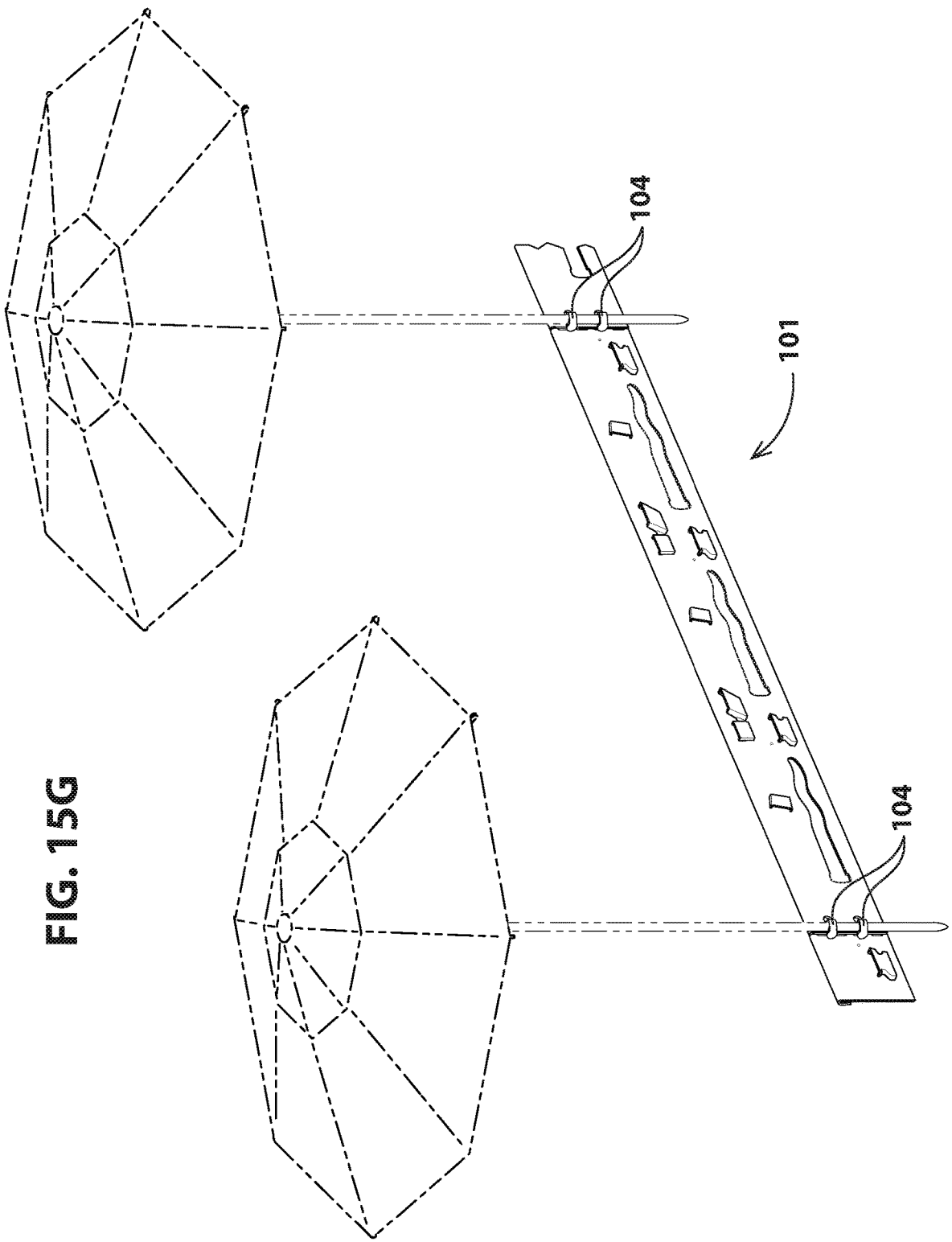
FIG. 15G illustrates a perspective view of the six-device-in-one landscape barrier demonstrating how the barrier-locking tongues securely integrate multiple umbrella poles.
Figure 15H:
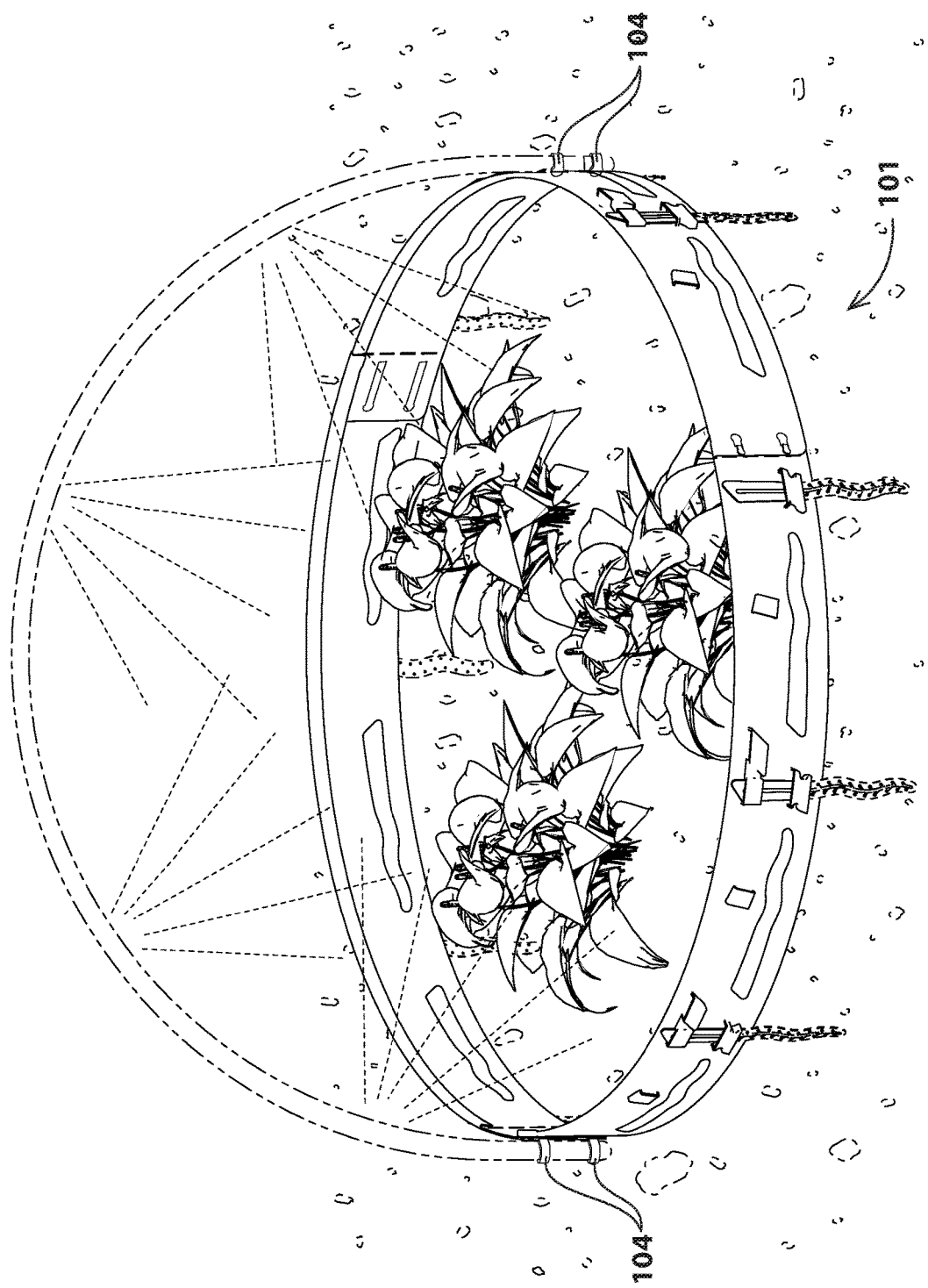
FIG. 15H illustrates a perspective view of the six-device-in-one landscape barrier demonstrating how the barrier-locking tongues securely integrate a sprinkler or drip system.
Figure 15I:
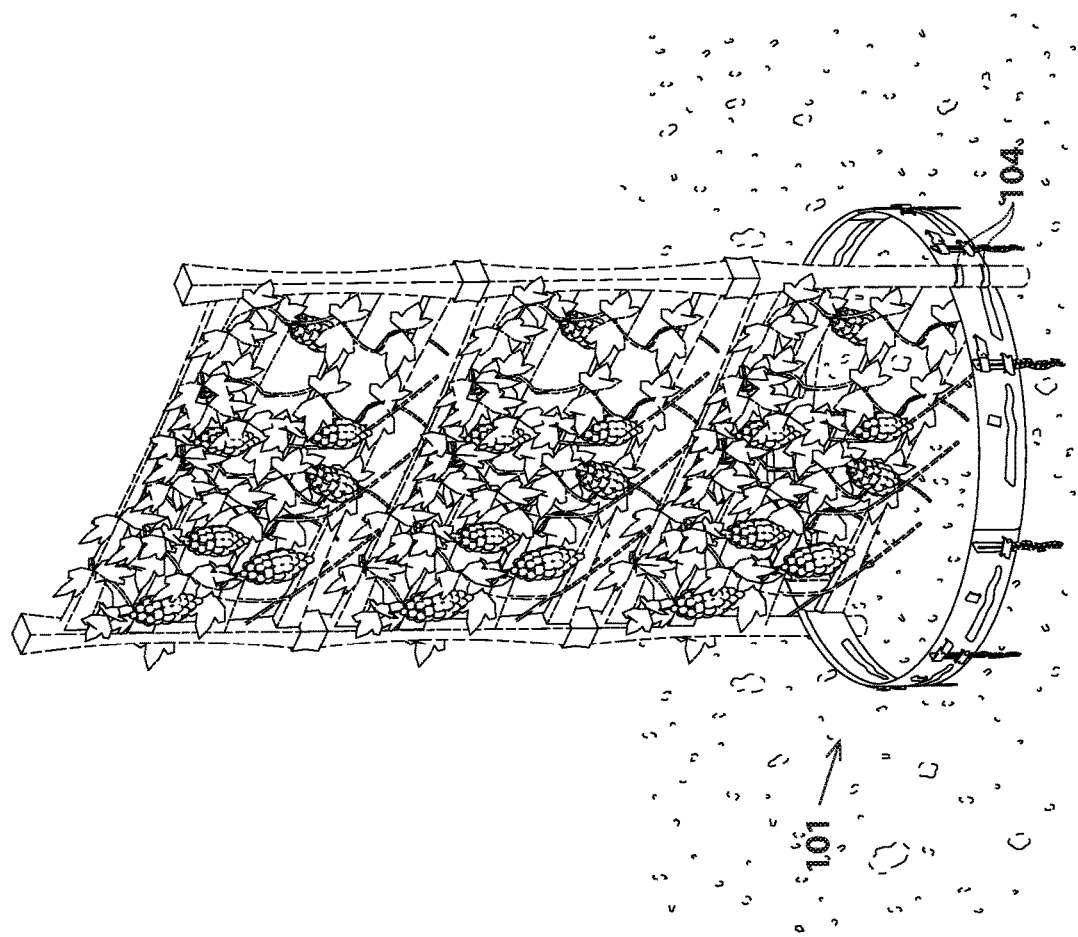
FIG. 15I illustrates a perspective view of the six-device-in-one landscape barrier demonstrating how the barrier-locking tongues securely integrate multiple a trellis.
Figure 15K:
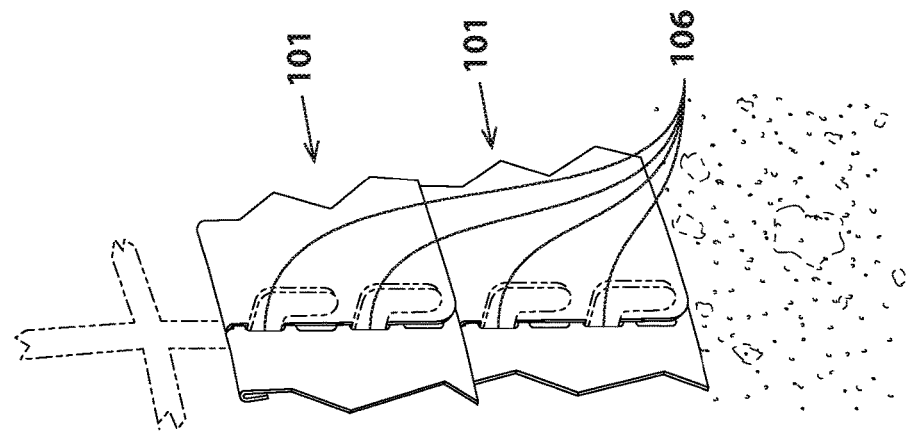
FIG. 15J and FIG. 15K illustrate perspective views of the six-device-in-one landscape barrier demonstrating how the corner-angling holes can support a garden-plant cage.
Figure 15J:
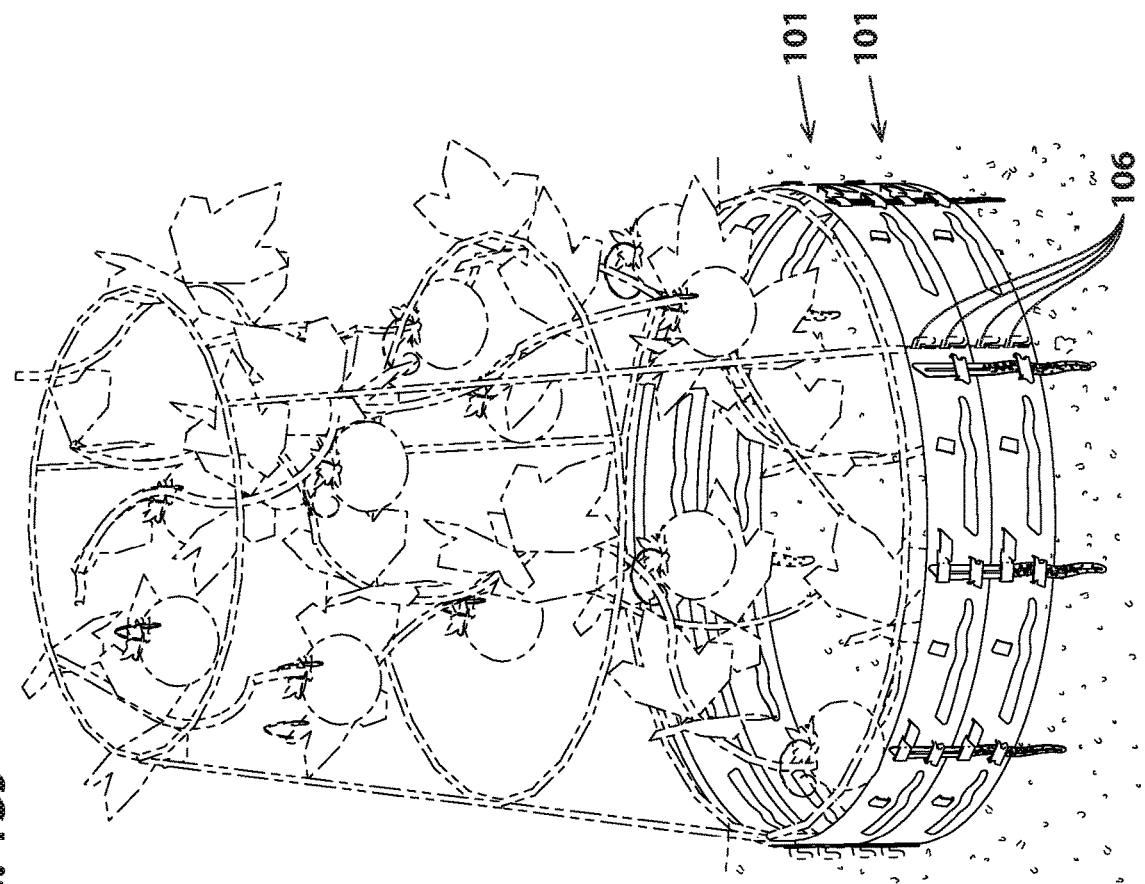
Figure 15L:
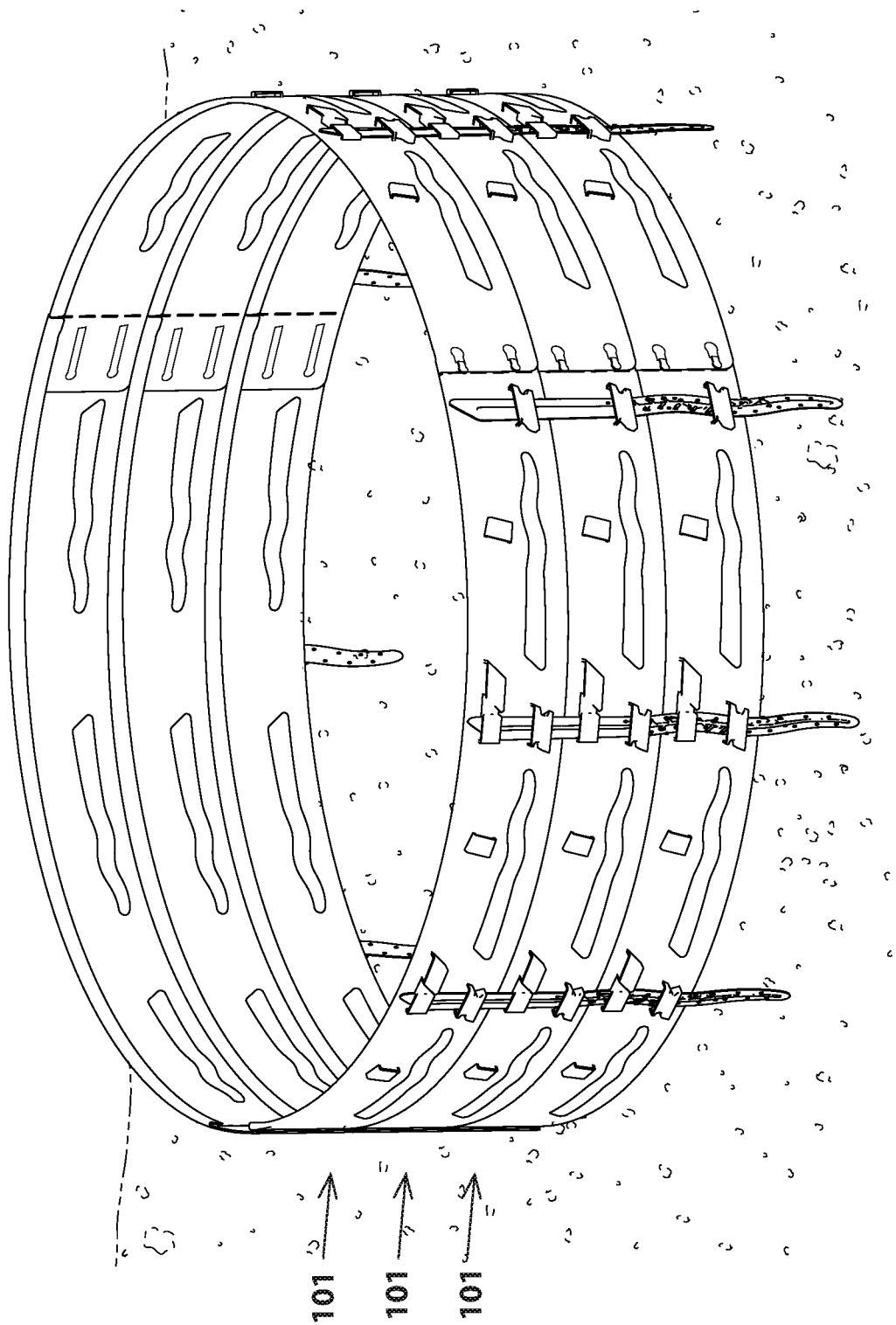
FIG. 15L illustrates a perspective view of the six-device-in-one landscape barrier demonstrating how the barrier-locking stake systems can securely stack multiple barriers vertically and installed on a flat or a sloped surface.
Figure 15P:
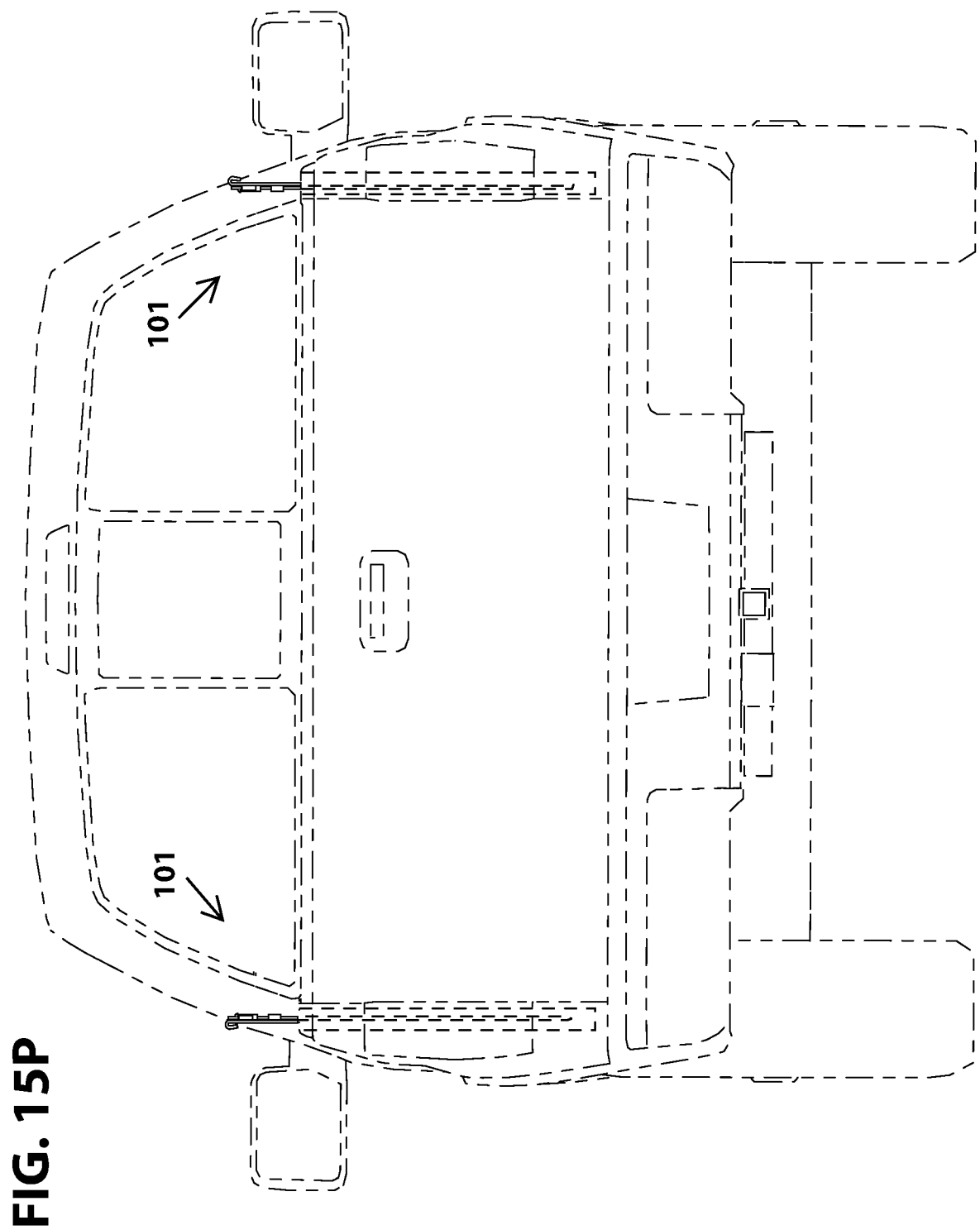
Figure 15Q:
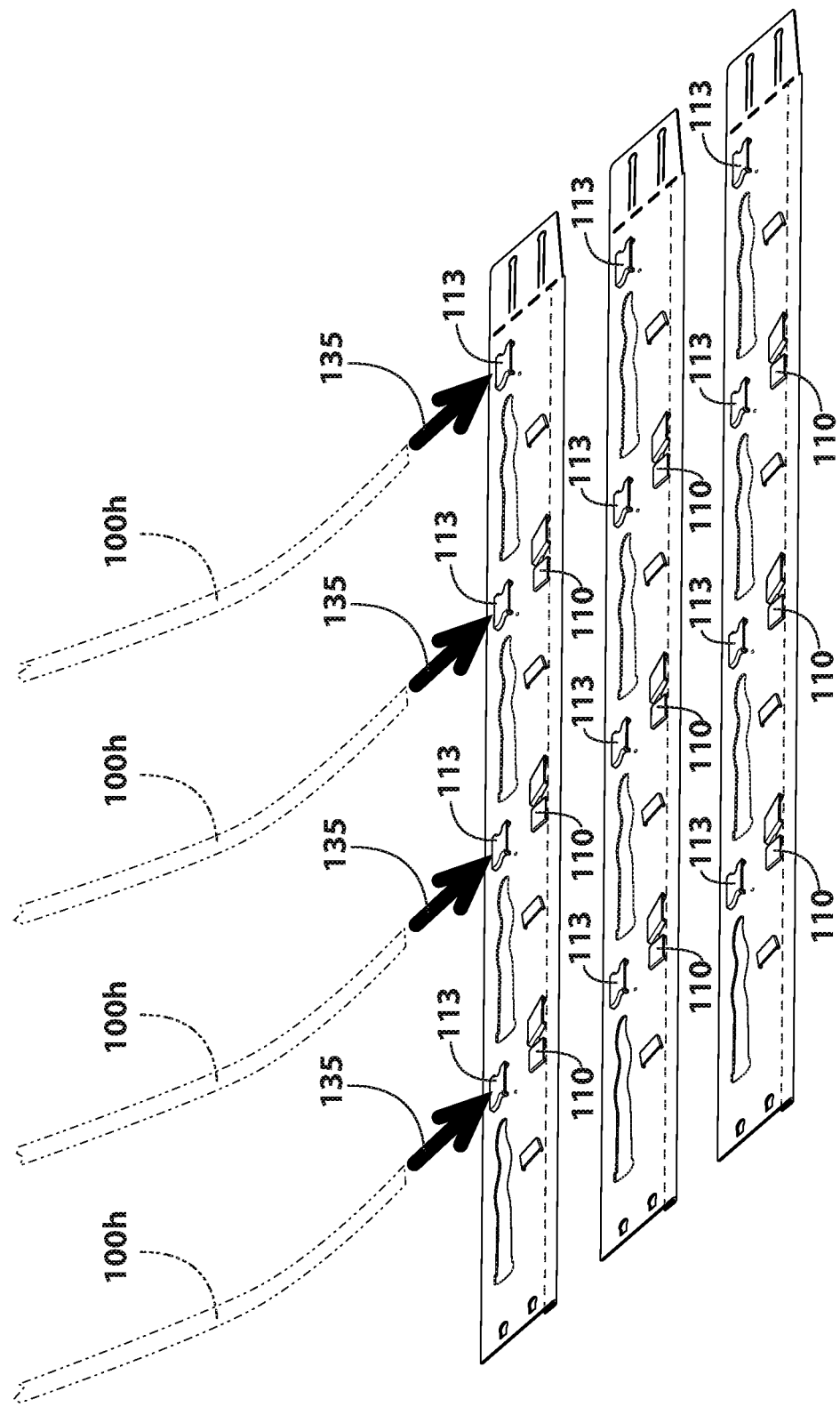
FIG. 15Q and FIG. 15R illustrate perspective views demonstrating how multiple six-device-in-one landscape barriers can be connected by inserting a strap through the two double-angled sheaths and the three triple-angled sheaths.
Figure 15R:
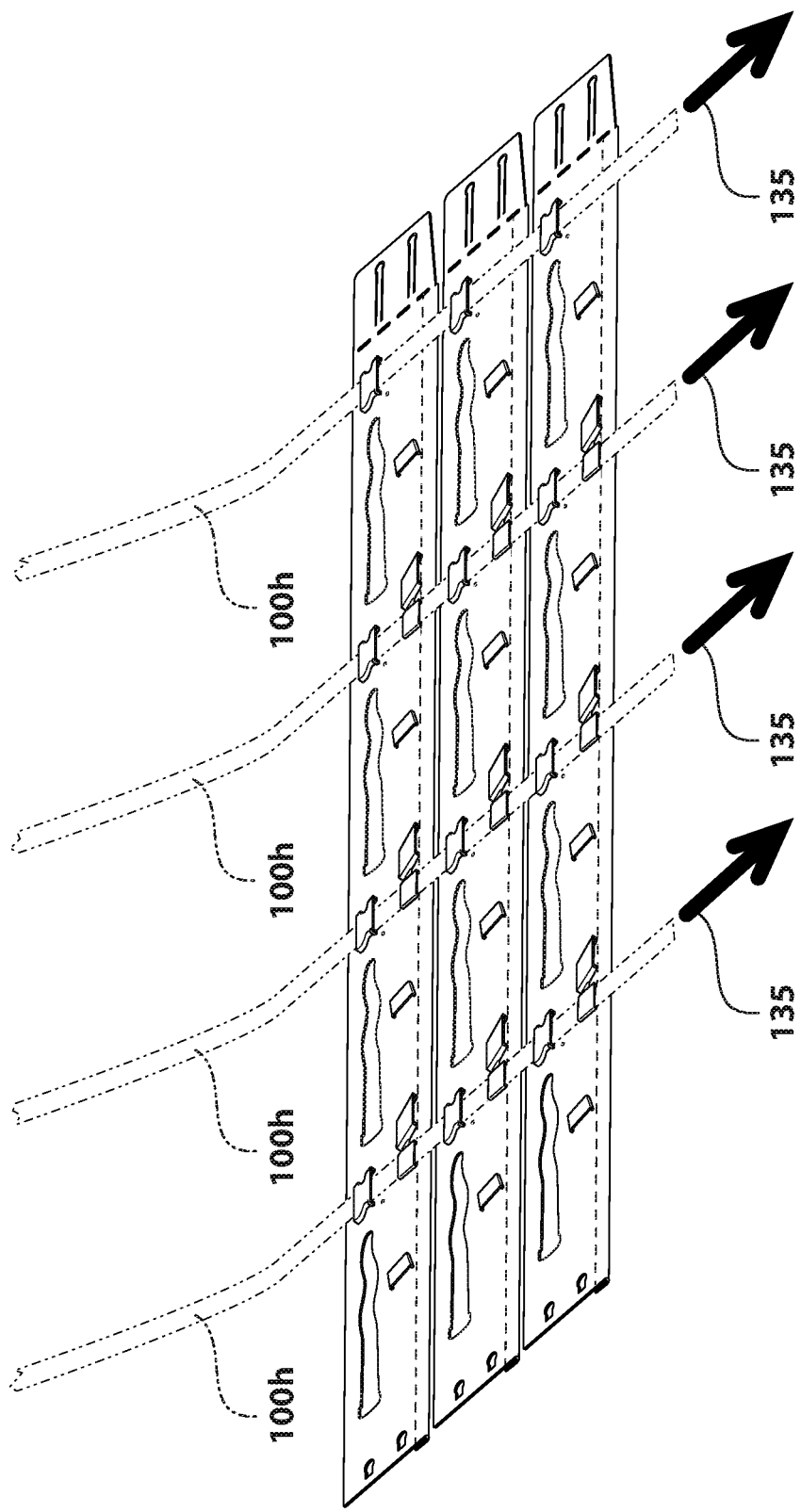
Figure 15S:
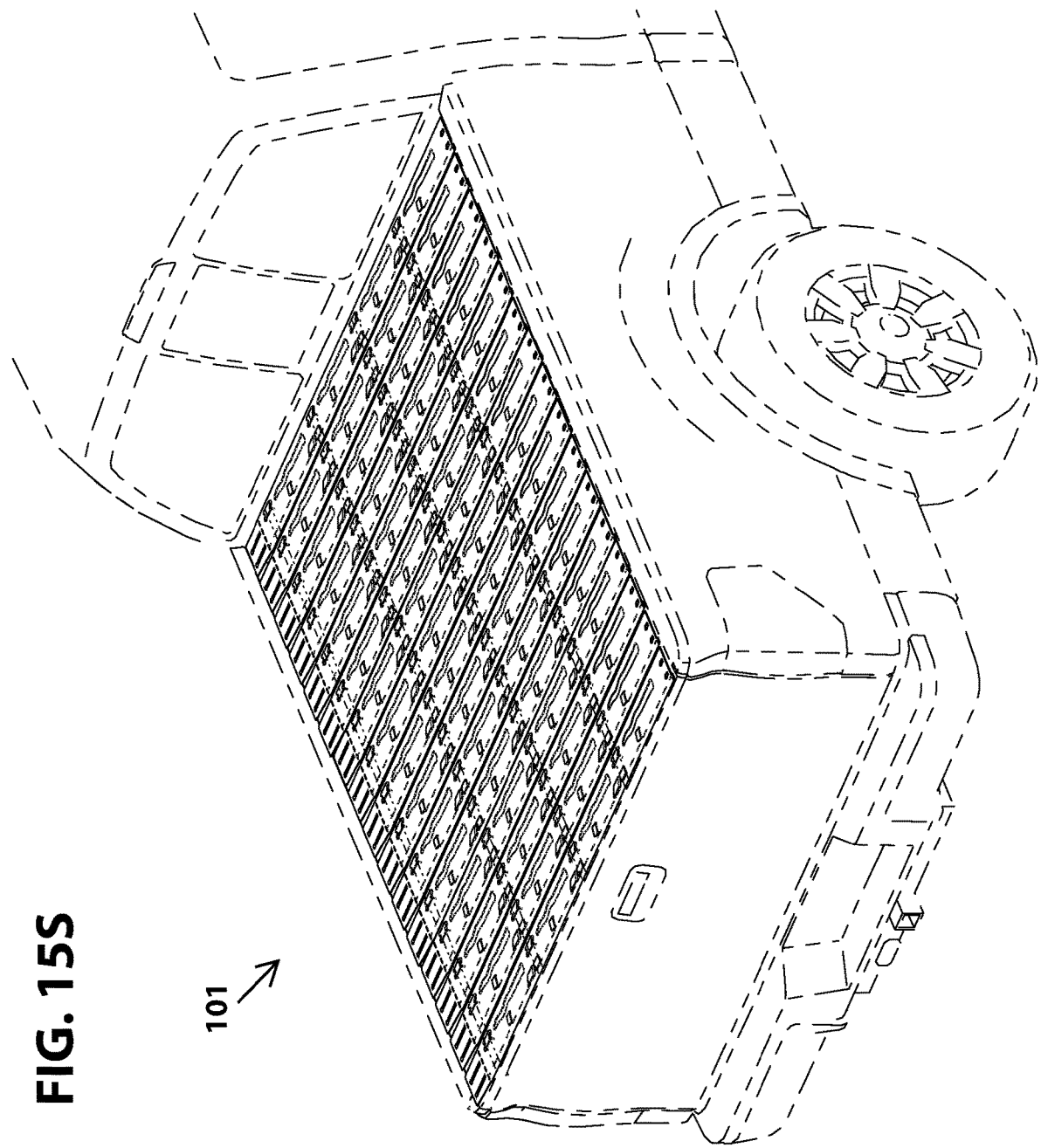
FIG. 15S illustrates a perspective view of the six-device-in-one landscape barrier demonstrating how the barriers can be connected and used as tonneau cover of a pickup truck.
Figure 15U:
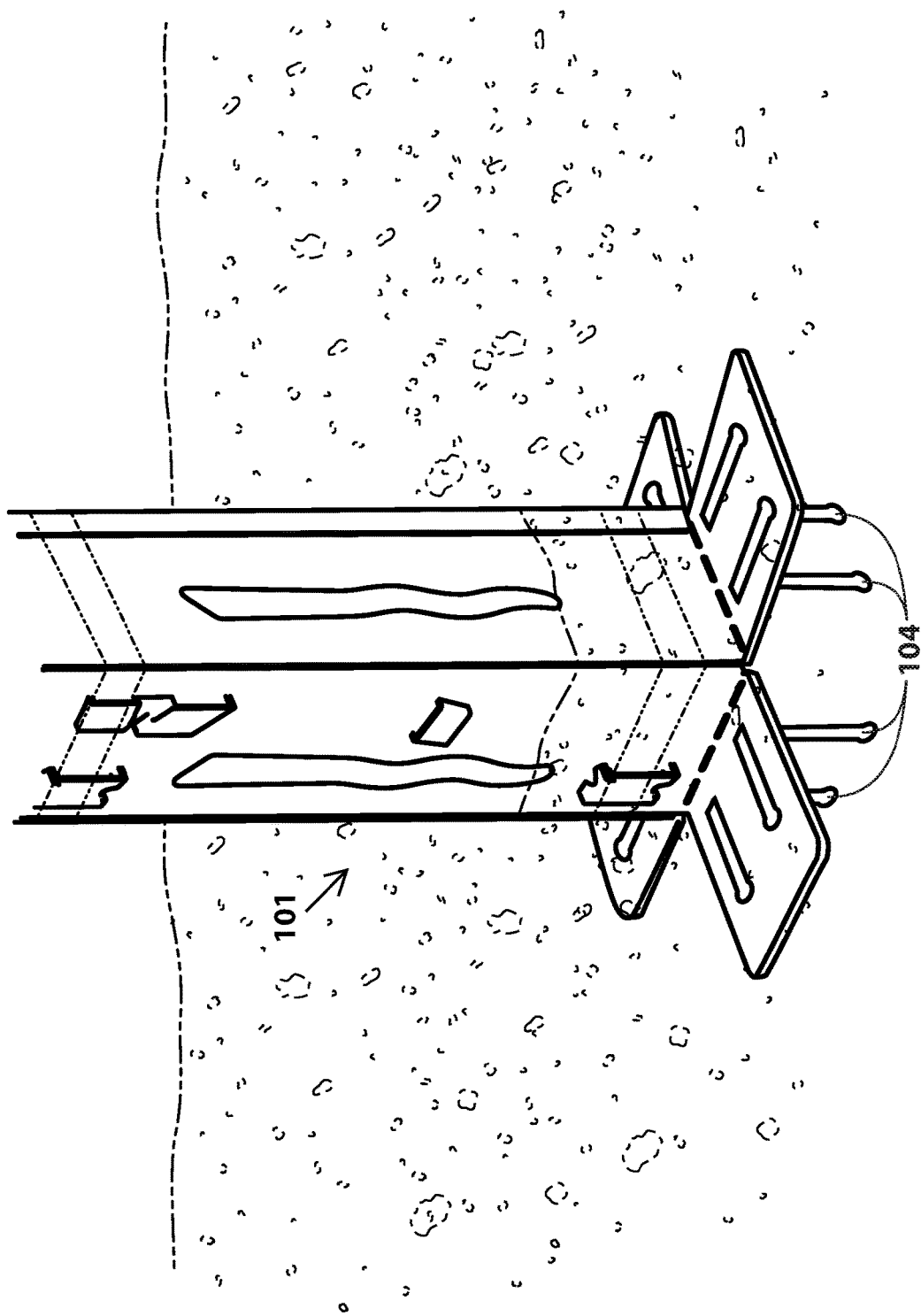
Figure 15V:
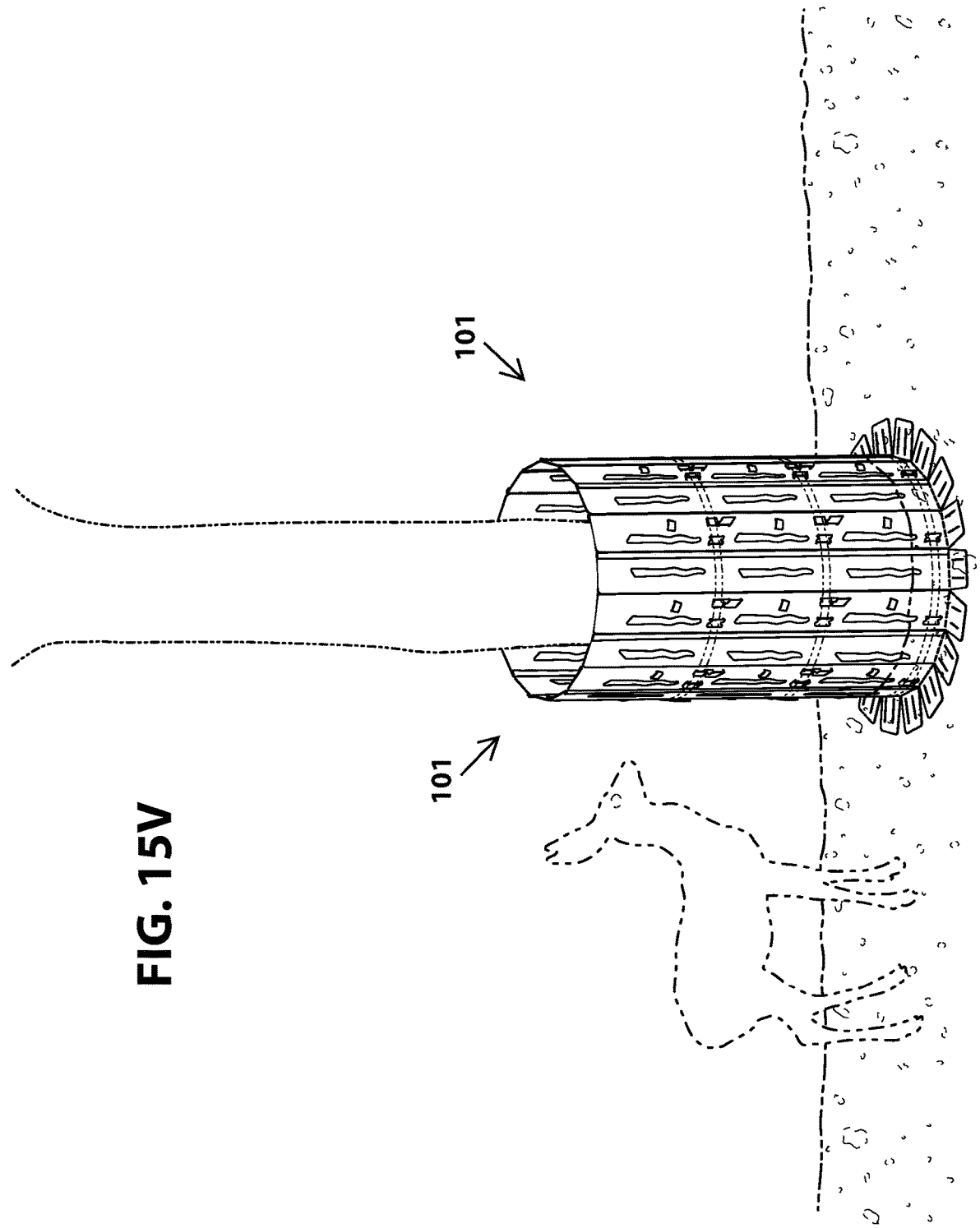
Figure 15W:
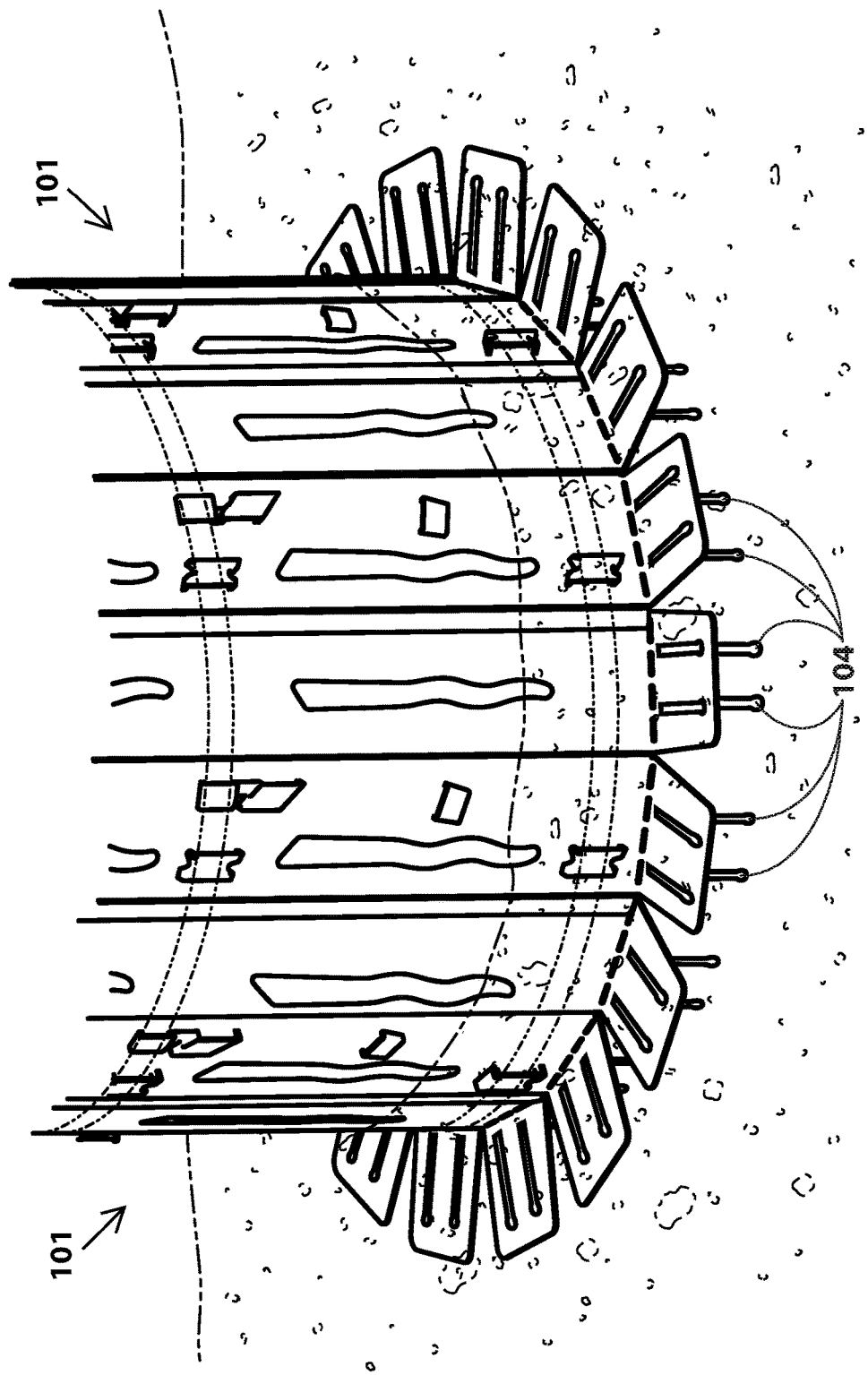
Figure 16A:
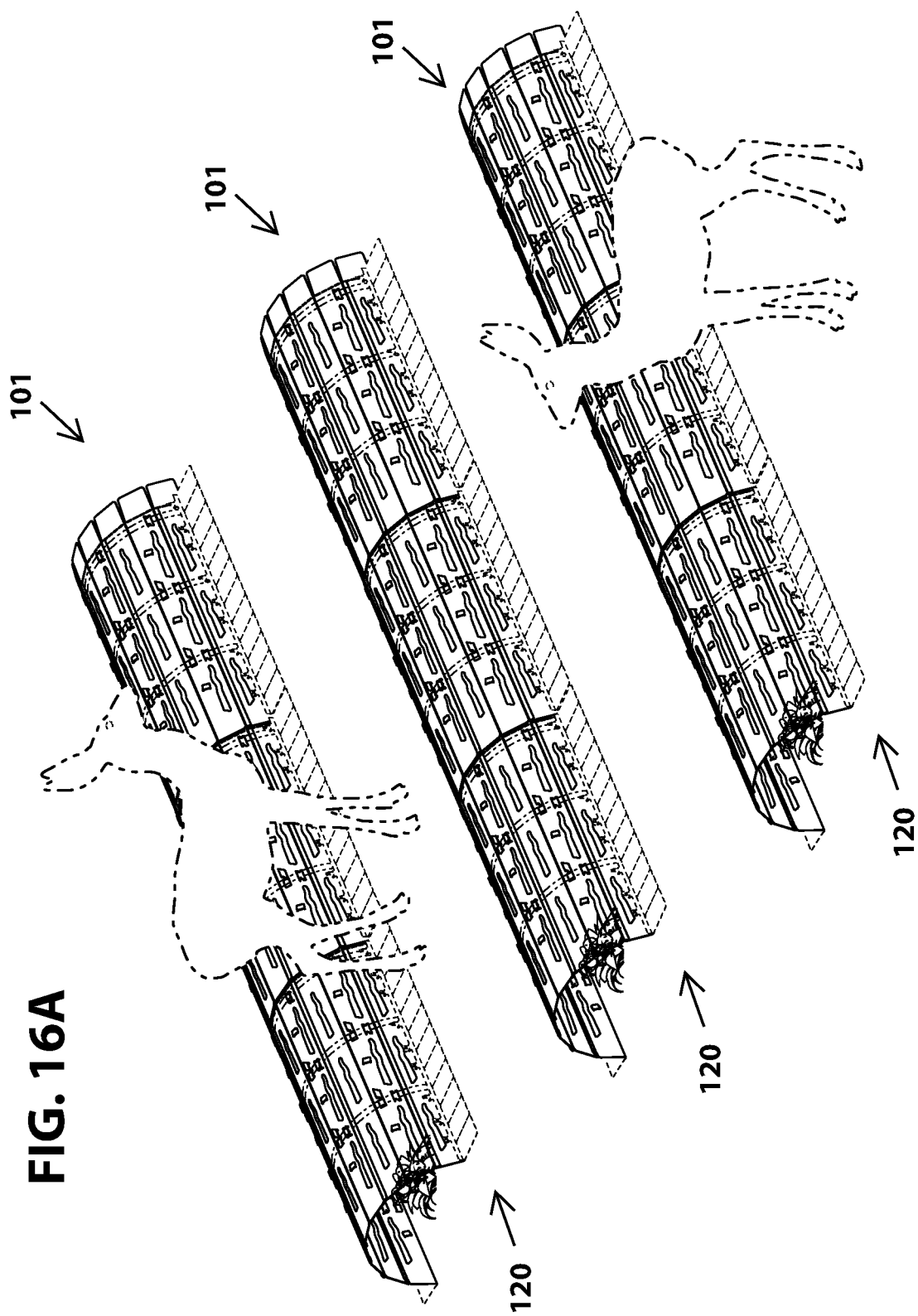
FIG. 16A, FIG. 16B, FIG. 16C, and FIG. 16D illustrate perspective and close-up views of the six-device-in-one landscape barrier demonstrating how the barriers can be connected and used as a shield to protect garden plants from animals.
Figure 16B:
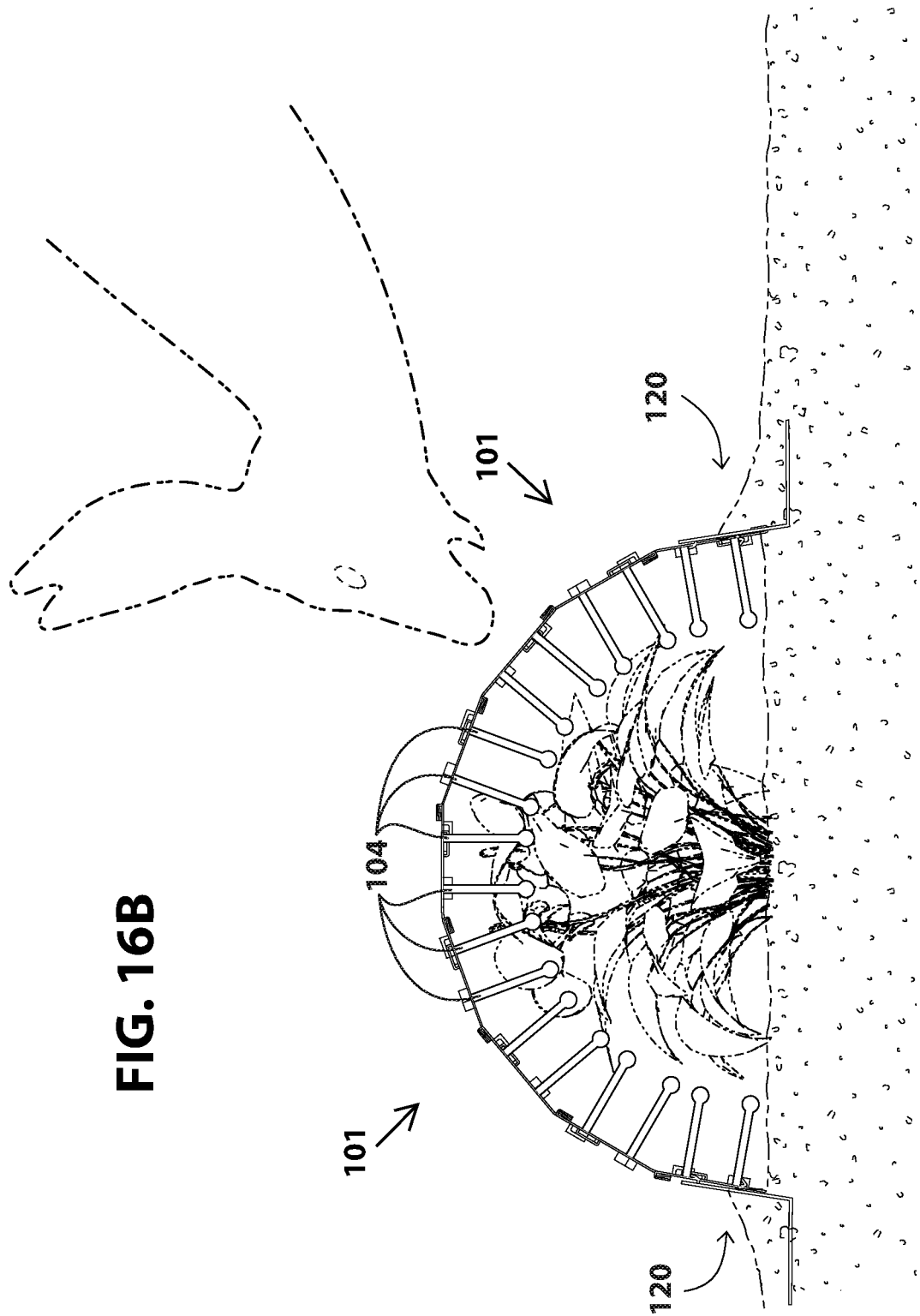
Figure 16C:
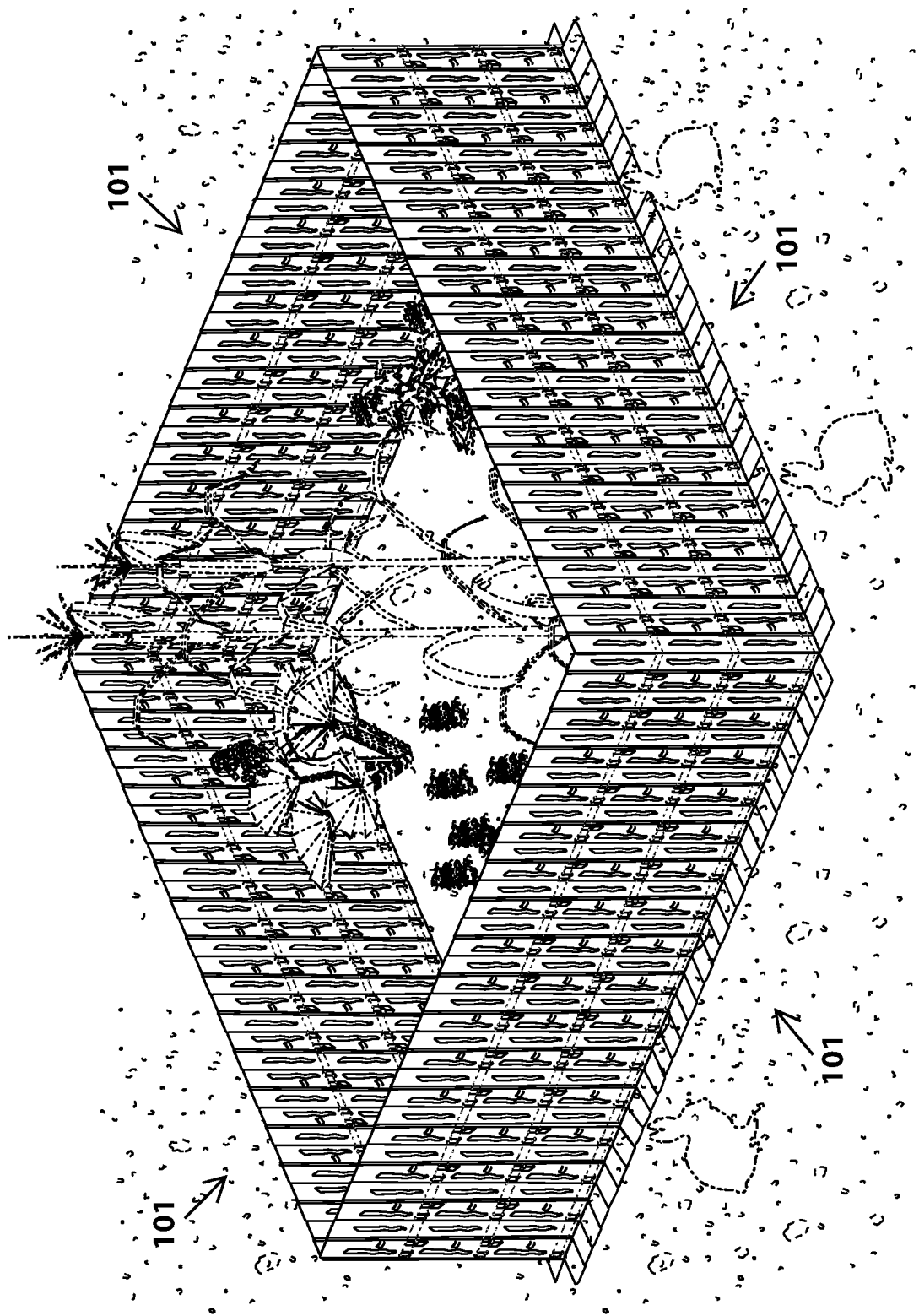
Figure 16D:
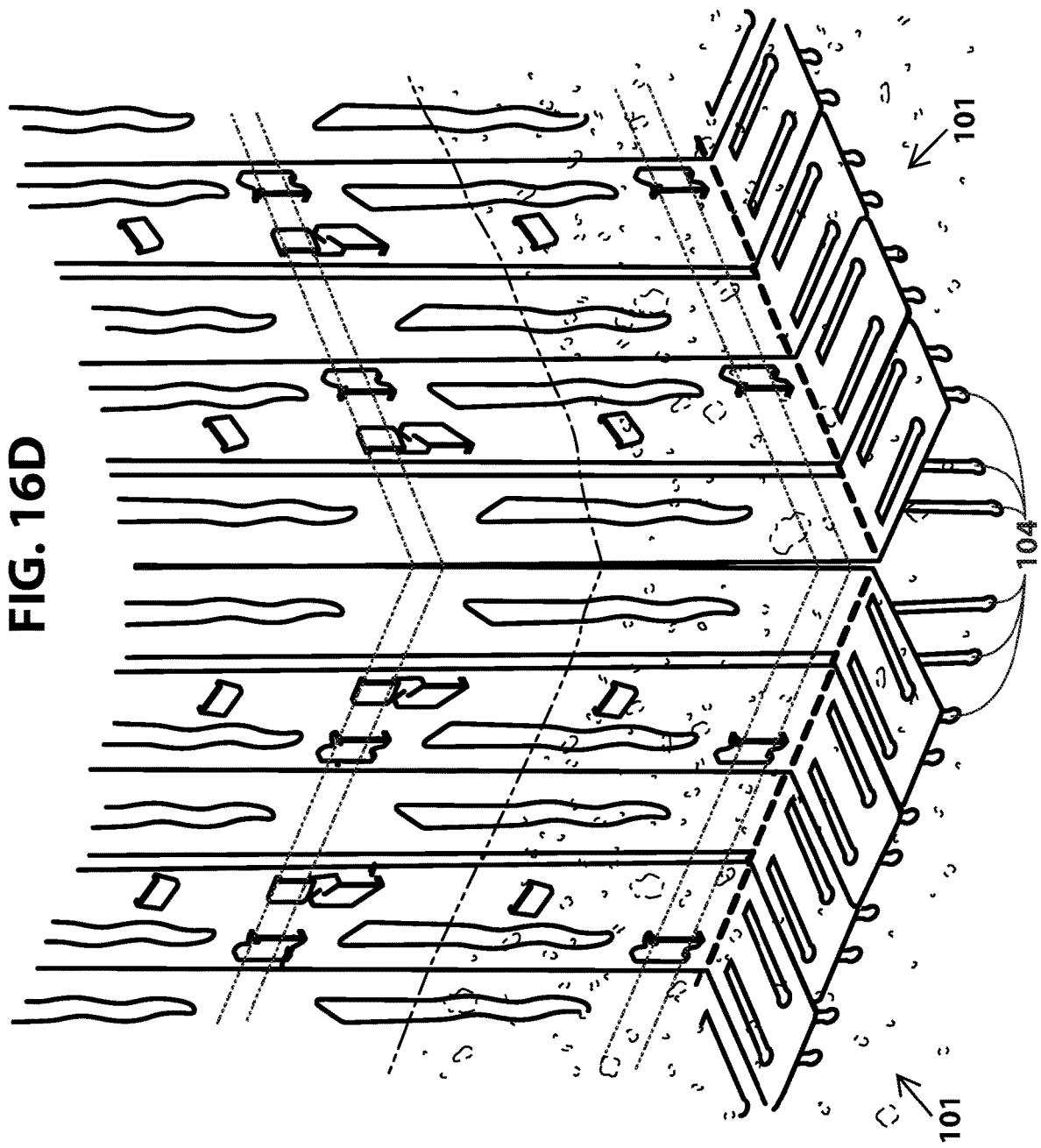

Referring to FIG. 1A (Prior Art), FIG. 1B (Prior Art), FIG. 1C (Prior Art), FIG. 1D, FIG. 1E (Prior Art), FIG. 1F, FIG. 1G (Prior Art), FIG. 1H, FIG. 1I (Prior Art), FIG. 1J, FIG. 1K (Prior Art), FIG. 2A (Prior Art), FIG. 2B (Prior Art), FIG. 2C (Prior Art), FIG. 2D, FIG. 2E, FIG. 2F, FIG. 2G, FIG. 2H, FIG. 2I, FIG. 2J, FIG. 2K, FIG. 2L, FIG. 2M, FIG. 2N, FIG. 2O, FIG. 2P, FIG. 2Q, FIG. 2R, FIG. 6A, FIG. 6B, FIG. 6C, FIG. 6D, FIG. 6E, FIG. 6F, FIG. 6G, FIG. 7A, FIG. 7B, FIG. 7C, FIG. 7D, FIG. 7E, FIG. 8A, FIG. 8B, FIG. 8C, FIG. 8D, FIG. 9, FIG. 10, FIG. 11A, FIG. 11B, FIG. 11C, FIG. 11D, FIG. 12A, FIG. 12B, FIG. 12C, FIG. 12D, FIG. 12E, FIG. 13A, FIG. 13B, FIG. 14, FIG. 15A, FIG. 15B, FIG. 15C, FIG. 15D, FIG. 15E, FIG. 15F, FIG. 15G, FIG. 15H, FIG. 15I, FIG. 15J, FIG. 15K, FIG. 15L, FIG. 15M, FIG. 15N, FIG. 15O, FIG. 15P, FIG. 15Q, FIG. 15R, FIG. 15S, FIG. 15T, FIG. 15U, FIG. 15V, FIG. 15W, FIG. 16A, FIG. 16B, FIG. 16C, and FIG. 16D:

1) Barrier system 101 is for performing the combined functions of its components.
2) Barrier 102 is for:
   a) Dividing landscaping materials or plant areas
      (see FIG. 6A, and FIG. 6B);
   b) Defining aesthetic patterns in a landscaping design
      (see FIG. 12A, FIG. 12B, FIG. 12C, FIG. 12D, and FIG. 12E);
   c) Providing a barrier for moisture retention, to nourish plants and grass
      (see FIG. 6A, FIG. 6B, and FIG. 13);
   d) Providing a barrier with three root-gripping angle tunnels 107a, for growing grass and plant roots 128a therethrough, thereby securing material-saving multi-root-gripping-and-water-flowing barrier 102 to the soil in the directions of arrows 128b
      (see FIG. 6A, FIG. 6B, and FIG. 9); and
   c) Providing a barrier with three root-gripping angle tunnels 107a, to fill soil there through, thereby securing material-saving multi-root-gripping-and-water-flowing barrier 102 to the soil
      (see FIG. 6B and FIG. 15A).
3) Angling end-wing 103a is for:
   a) Saving manufacturing materials being one-quarter of the length of wasted steel materials as comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D)
   b) Saving money for consumer, requiring less barrier sections because of less overlap at barrier ends in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   c) Sliding into safety ridge 105 of an additional six-device-in-one landscape barrier;
   d) Anchoring the six-device-in-one landscape barrier into the ground, when positioned vertically
      (see FIG. 15R, FIG. 15S, and FIG. 15V); and
   e) Preventing animals from digging beneath the six-device-in-one landscape barrier, when positioned vertically
      (see FIG. 15R, FIG. 15S, and FIG. 15V).

Material-saving tongue-locking openings 103b are for:
   Coupling root-gripping barriers 102 together
      (see FIG. 6C, FIG. 6D, FIG. 8A, and FIG. 8B);
4) Barrier-locking tongues 104 respectively are for:
   a) Saving money for consumers requiring less overlap at barrier ends in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   b) Saving materials during manufacturing, being half of the length of wasted comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D)
   c) Securely supporting
      solar-stake-mounted lights 100e
         (see FIG. 3B, FIG. 3C, and FIG. 3D),
      a trellis for vines or climbing plants
         (see FIG. 3H, and FIG. 15I),
      an umbrella pole
         (see FIG. 3F, and FIG. 15G), and
      a sprinkler head or drip line
         (see FIG. 3G, and FIG. 15H);
   d) Securely connecting multiple six-device-in-one landscape barriers to each other by inserting through tongue-locking openings 103b and wrapping over the top or under the bottom of root-gripping barrier 102, respectively
      (see FIG. 1D, FIG. 6E, FIG. 6F, and FIG. 6G);
   e) Securely locking multiple six-device-in-one landscape barriers to each other by inserting through tongue-locking openings 103b, wrapping in the opposite direction through corner-angling holes 106, and again through tongue-locking openings 103b in the directions of arrows 127c, 127d, and 127e
      (see FIG. 8A, FIG. 8B, FIG. 8C, and FIG. 8D);
   f) Anchoring six-device-in-one landscape barrier to the soil
      (see FIG. 15U, FIG. 15W, and FIG. 16D); and
   g) Protecting garden plants from animals
      (see FIG. 16B);

5) Safety ridge 105 is for:
   a) Connecting a safety ridge 105 of one six-device-in-one landscape barrier to a safety ridge 105 of a second six-device-in-one landscape barrier in the directions of arrows 134
      (see FIG. 15L)
         to create a shield to protect garden plants from animals
            (see FIG. 15T and FIG. 15U),
         to create a shield to protect saplings from animals
            (see FIG. 15R),
         to create a shield to protect trees from animals
            (see FIG. 15S),
         to create a barrier to protect garden vegetation from animals
            (see FIG. 15V), and
         to create a tonneau cover of a truck bed
            (see FIG. 15Q);
   b) Providing a stopper against an adjacent safety ridge 105, while coupling such, in the directions of arrows 127a and 127b
      (see FIG. 8A and FIG. 8B); and
   c) Providing a guide for an additional angling end-wing 103a to a to slide into in the directions of arrows 127a and 127b
      (see FIG. 8A and FIG. 8B).

6) Corner-angling holes 106 respectively are for:
   a) Locking a six-device-in-one landscape barrier to an additional adjacent six-device-in-one landscape barrier by interlocking barrier-locking tongues 104 there through
      (see FIG. 8B, FIG. 8C, and FIG. 8D);
   b) Lockingly supporting a garden-plant cage
      (see FIG. 2E, FIG. 2F, FIG. 15J, and FIG. 15K); and
   c) Promoting bending of angling end-wing 103a to form a corner, enabling barrier system 101 to create or be formed in a variety of corner-angles
      (see FIG. 2L, FIG. 2M, FIG. 2N, FIG. 2Q, and FIG. 2R).

Figure 6A:
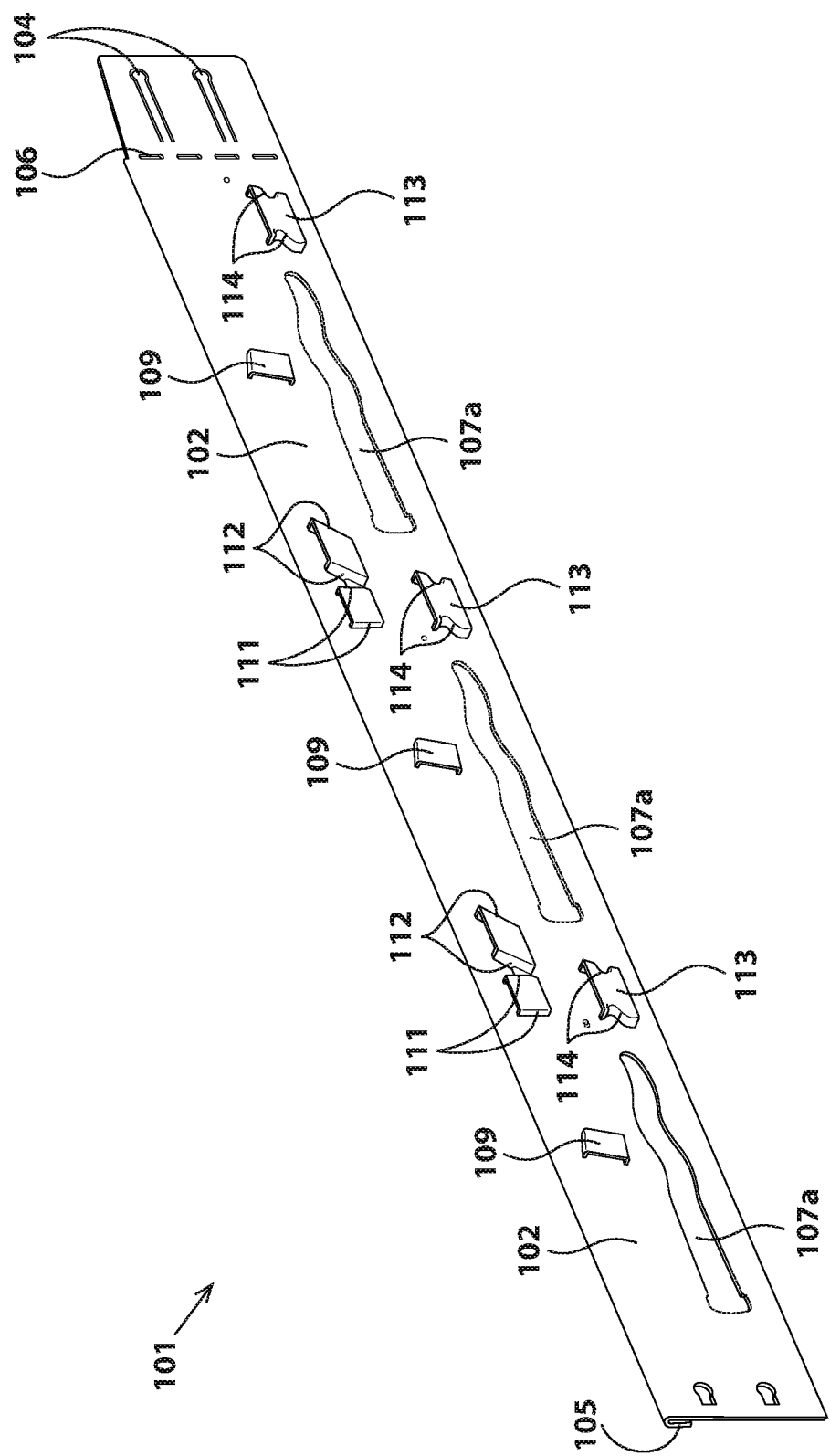
FIG. 6A and FIG. 6B illustrate a front perspective and a side cross-sectional view of the root-gripping barrier.
Figure 6B:
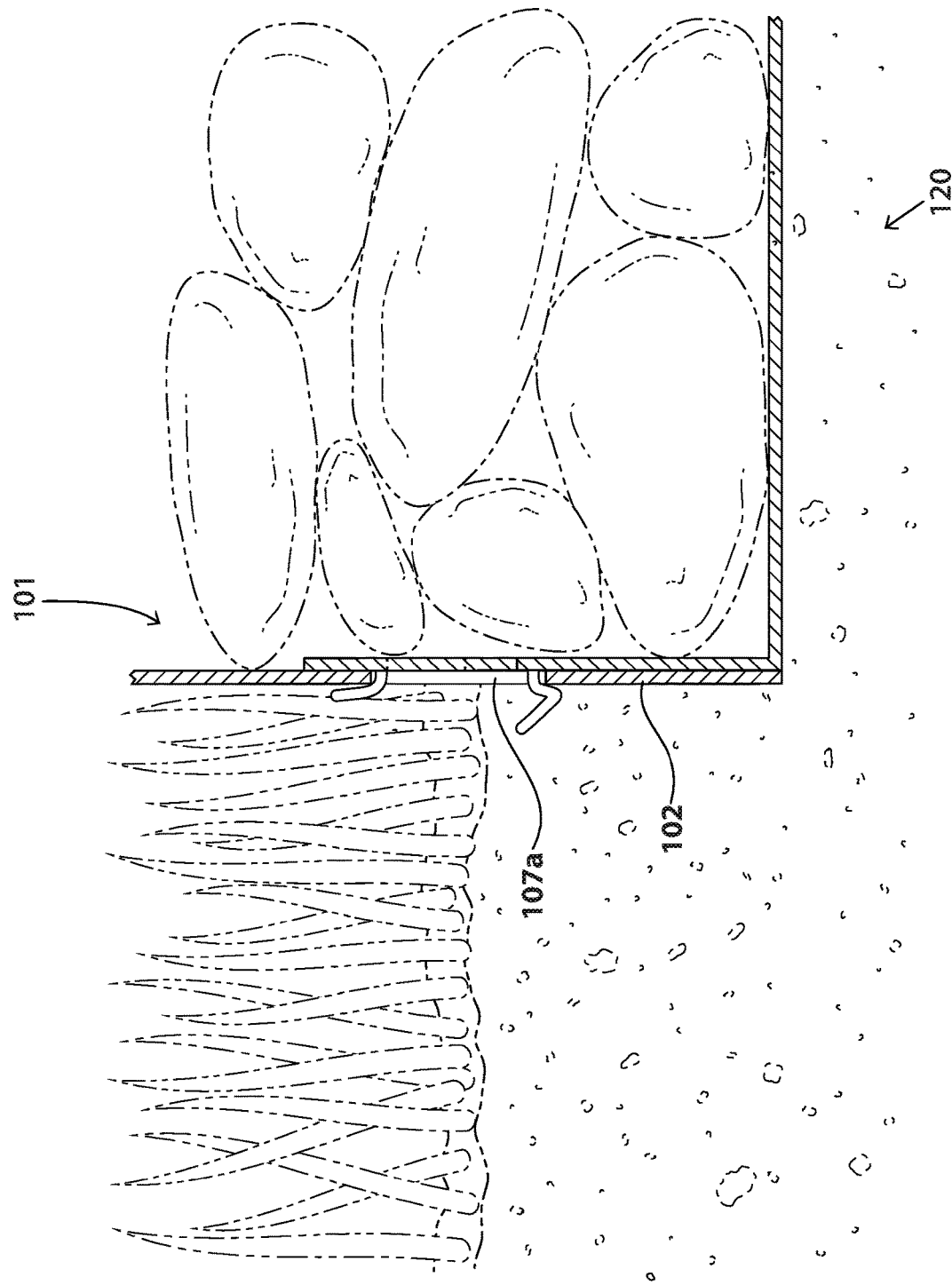
Figure 6F:
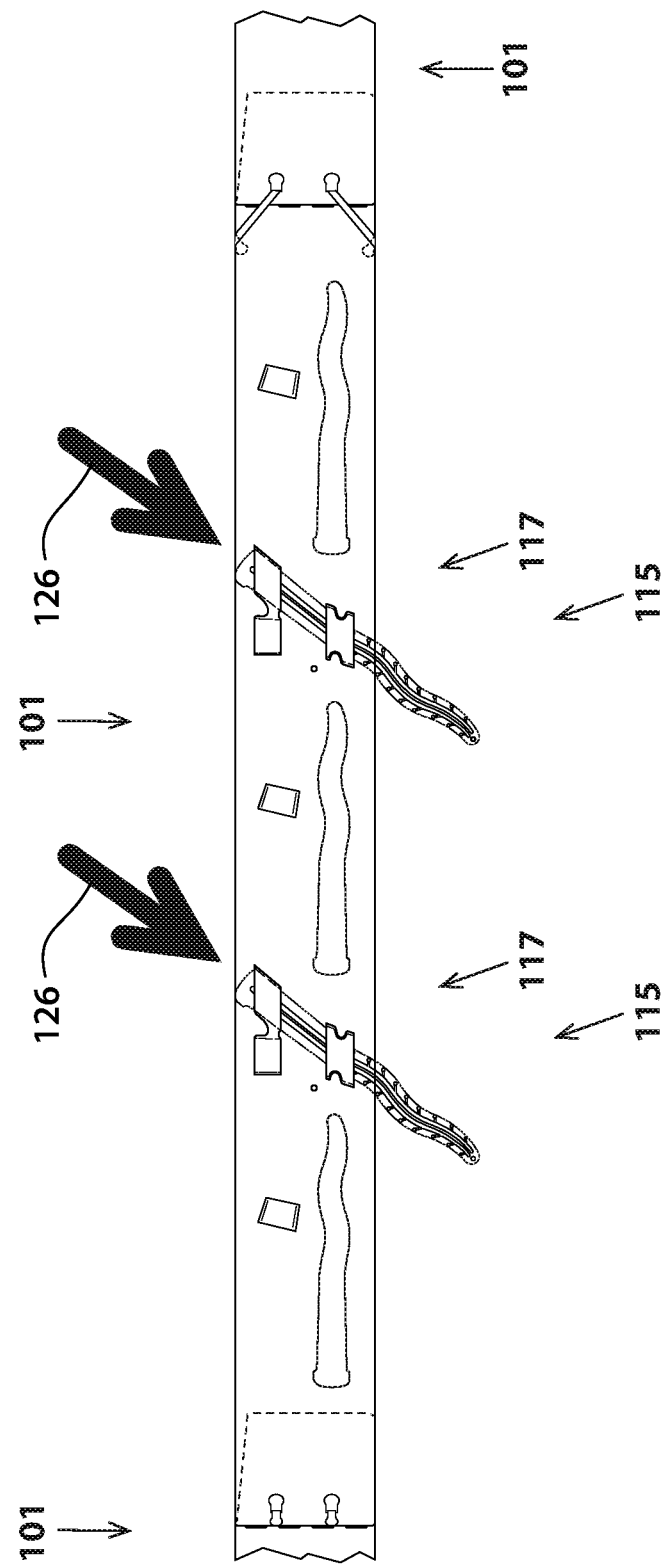

7) Three root-gripping angle tunnels 107a respectively are for:
   a) Saving materials during manufacturing by stamping out serpentine stake 116a from root-gripping barrier 102, utilizing the subsequent empty space therefrom
      (see FIG. 1A (Prior Art), and FIG. 6A);
   b) Saving time and energy costs when barrier-locking stake systems 115 is stored within three root-gripping angle tunnels 107a during packaging, storage, and shipping the six-device-in-one landscape barrier to reduce the space the space needed in each shipping container
      (see FIG. 2C and FIG. 2D),
         to reduce the space needed for barrier system 101 thickness when packaged, and
         to reduce significantly the unit cost of the six-device-in-one landscape barrier,
      (FIG. 2C (PRIOR ART) illustrates a shipping container 99a has one hundred landscape barrier packaged units 99b filling up all its internal volume 99c),
      (FIG. 2D illustrates a shipping container 100a has one hundred landscape barrier packaged units 100b filling up only 70% of its internal volume 100c and saving 30% of its internal volume 100d);
   c) Securing root-gripping barrier 102 into the soil by providing an opening through which grass and plant roots 128a may grow in the directions of arrows 128b
      (see FIG. 6A, FIG. 6B, FIG. 9, and FIG. 10);
   d) Securing root-gripping barrier 102 into the soil by providing an opening through which soil may fill in the directions of arrows 132a and 132b
      (see FIG. 15A);
   e) Locking into the soil by providing a lower edge below the three root-gripping angle tunnels 107a in the directions of arrows 133
      (see FIG. 15B);
   f) Locking to top plate-securing hooks 123, in the directions of arrows 129a, 129b, 129c, and 129d
      (see FIG. 9, FIG. 11A, FIG. 11B, FIG. 11C, FIG. 11D, FIG. 13, and FIG. 15A); and
   g) Locking to bottom plate-securing snap-hooks 124, in the directions of arrows 129a, 129b, 129c, and 129d
      (see FIG. 9, FIG. 11A, FIG. 11B, FIG. 11C, FIG. 11D, FIG. 13, and FIG. 15A).

Stake-locking nipples 107b respectively are for:
   a) Locking the stake tip to barrier system 101 by being inserted into stake-locking root-gripping holes 116c
      (see FIG. 4D)
         to store barrier-locking stake system 115;
   b) Locking the stake tip to barrier system 101 by being inserted into stake-locking root-gripping holes 116c
      (see FIG. 4D)
         to provide a secure place to store barrier-locking stake system 115 when not in use; and
   c) Locking the stake tip to barrier system 101 by being inserted into stake-locking root-gripping holes 116c
      (see FIG. 4D)
         to prevent loss of serpentine stake 116a.

8) Stake-locking sheath system 108 is for performing the combined functions of its components.

9) Three single-angled sheaths 109 respectively are for:
   a) Wedging serpentine ridges 118a to securely lock serpentine stake 116a to barrier system 101
      (see FIG. 6A, FIG. 7B, FIG. 7C, FIG. 7D, and FIG. 7E); and
   b) Securing serpentine stake 116a to material-saving multi-root-gripping-and-water-flowing barrier 102 for storage and shipping
      (see FIG. 4B).

Figure 6G:
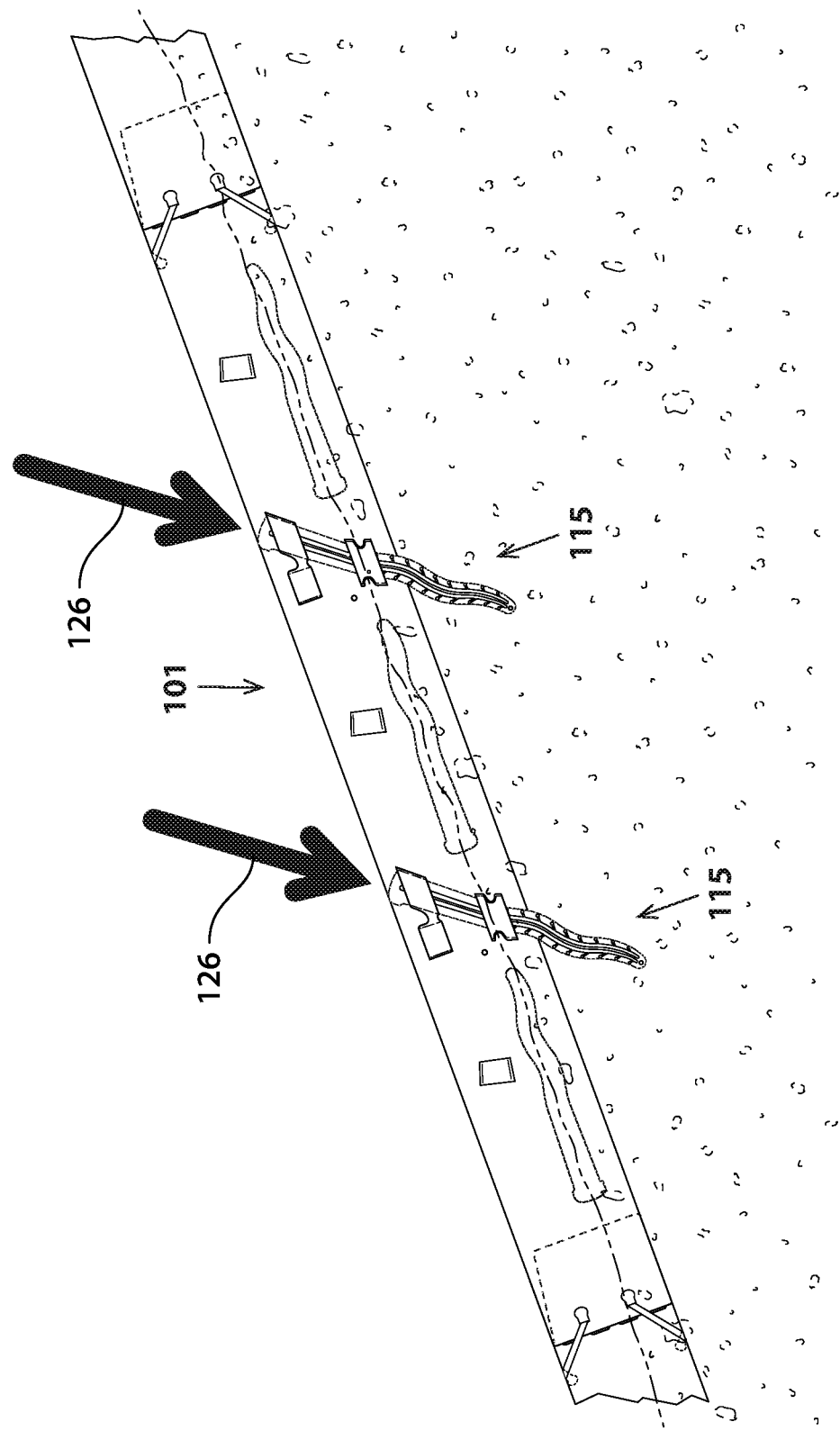
FIG. 6G illustrates a front view of the serpentine stakes, attached to the root-gripping barrier, driven into an angled soil surface.
Figure 9:
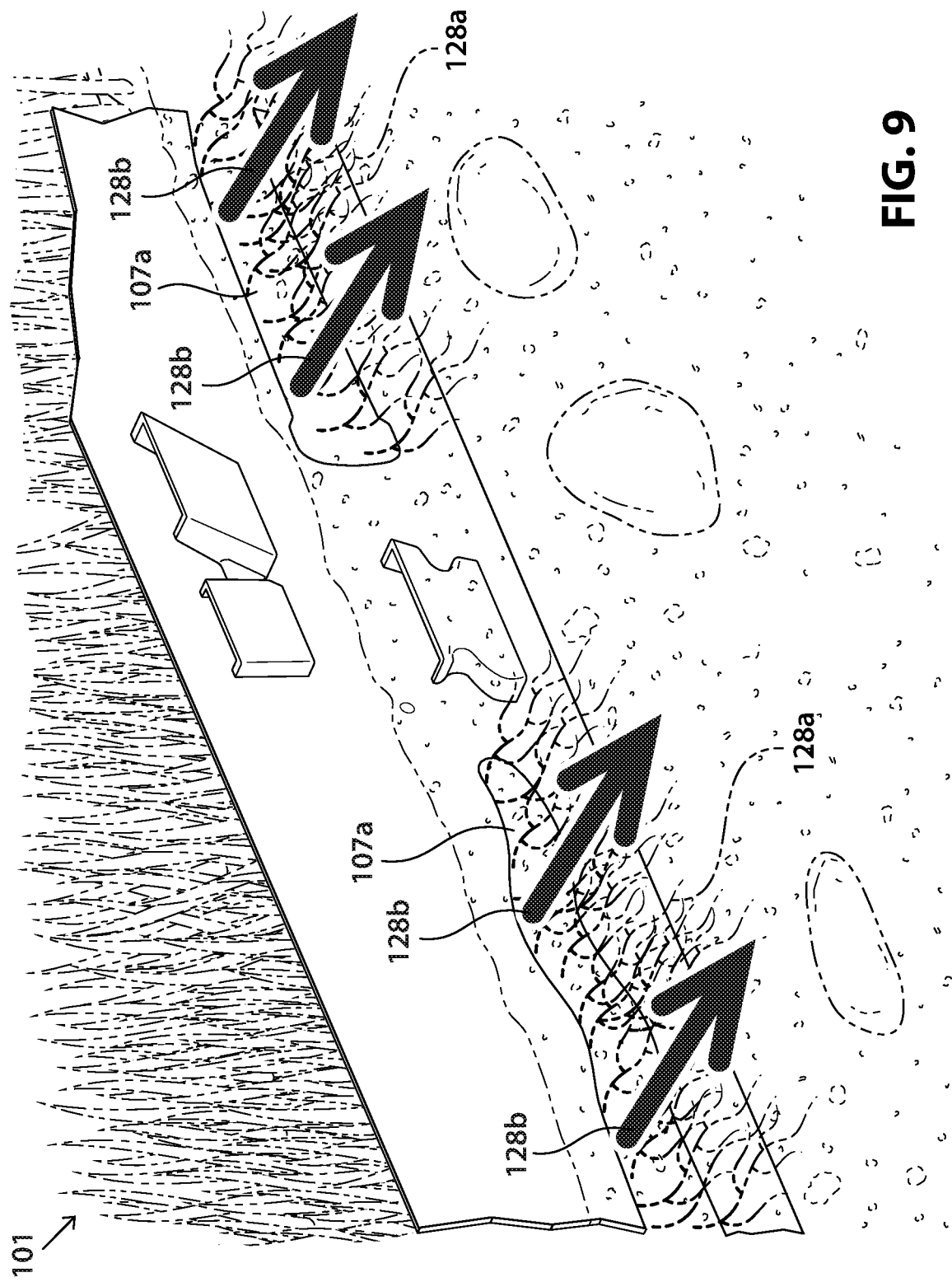
FIG. 9 and FIG. 10 illustrate perspective views of how soil fills, and roots grow through, the three root-gripping angle tunnels and the root-gripping locking tunnels, respectively.
Figure 10:
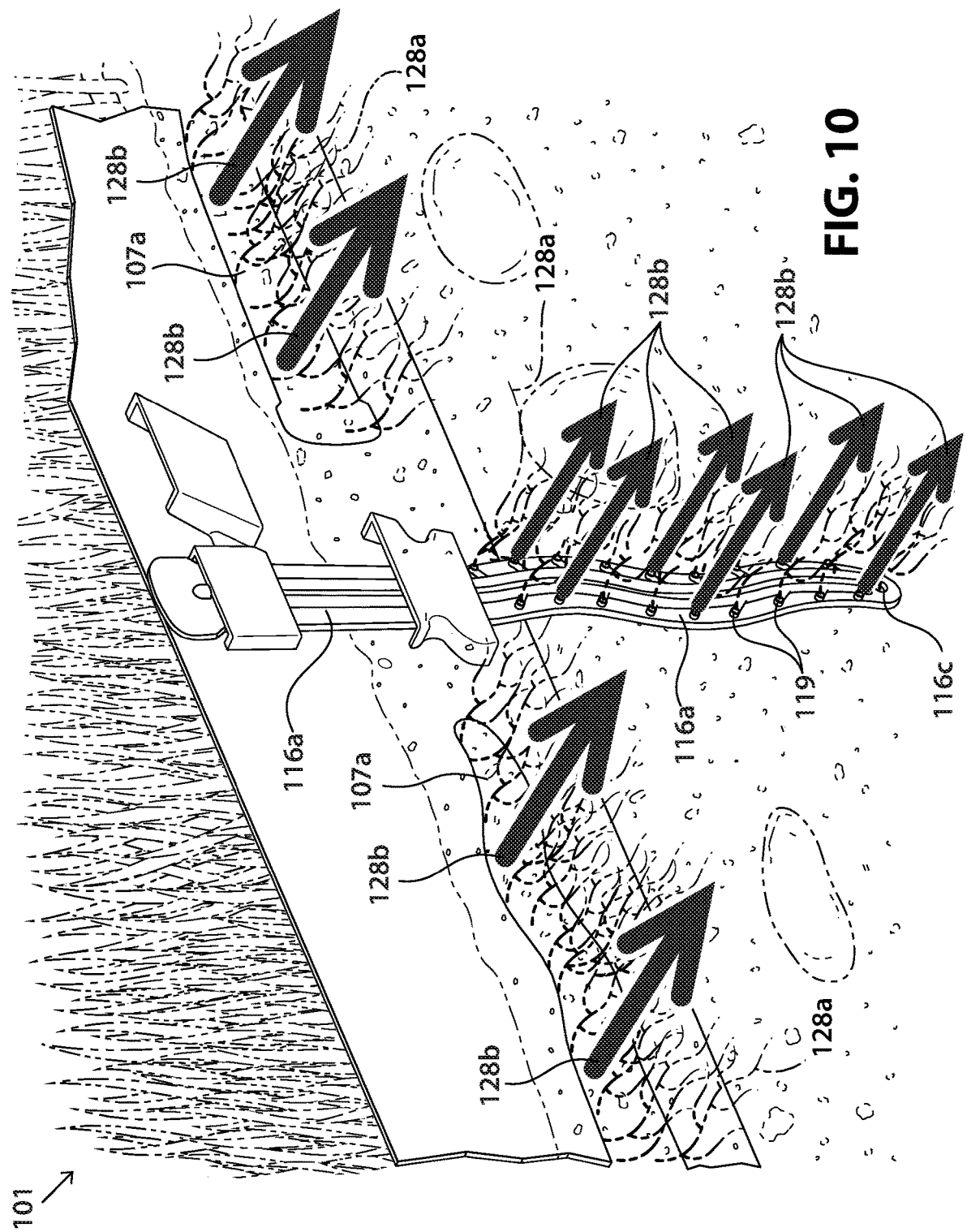
Figure 22B:
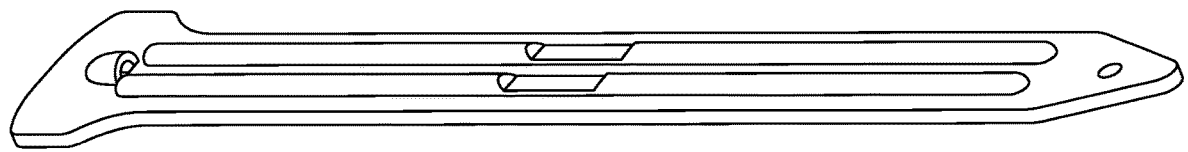
FIG. 22A, FIG. 22B, FIG. 22C, FIG. 22D, and FIG. 22E illustrate perspective, front, side and top cross-sectional views of a variation of the barrier-locking stake systems.
Figure 22A:
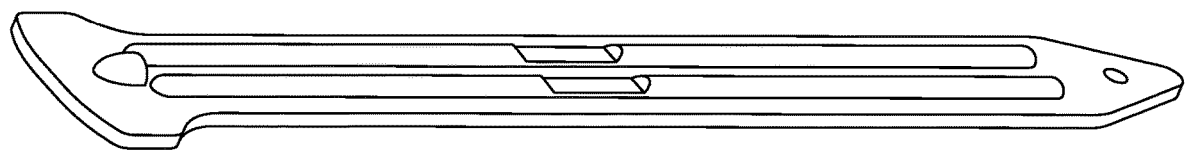
Figure 22C:
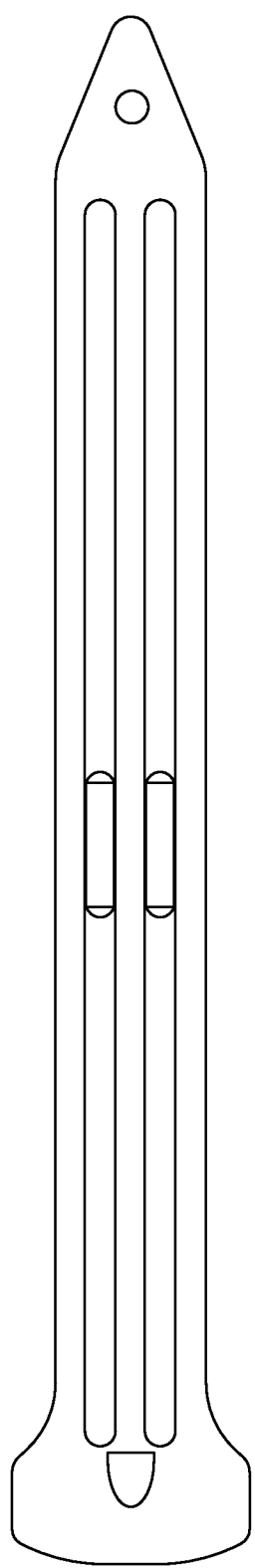
Figure 22D:
Figure 22E:
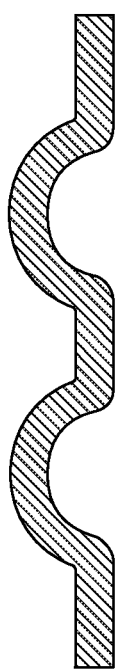

10) Two double-angled sheaths 110 respectively are for:
   a) Connecting multiple six-device-in-one landscape barrier adjacently by providing loops for a strap 100h to be threaded through in the direction of arrows 134
      (see FIG. 15N, and FIG. 15O)
         to create a shield to protect garden plants from animals
            (see FIG. 16A and FIG. 16B),
         to create a shield to protect saplings from animals
            (see FIG. 15S and FIG. 15T),
         to create a shield to protect trees from animals
            (see FIG. 15S, FIG. 15T, FIG. 15U, and FIG. 15V),
         to create a barrier to protect garden vegetation from animals
            (see FIG. 16C and FIG. 16D), and
         to create a tonneau cover of a truck bed
            (see FIG. 15R);

b) Securing six-device-in-one landscape barriers to utility holes of a pickup truck by providing openings for serpentine stake 116a
to create a vertical truck-bed extender
(see FIG. 15P, and FIG. 15Q);
c) Securing multiple six-device-in-one landscape barriers to each other vertically by providing openings for serpentine stake 116a
to create a tree ring or planter ring of varying heights
(see FIG. 15J, FIG. 15K, FIG. 15L, and FIG. 15M);
d) Guiding serpentine stake 116a while being inserted vertically in the directions of arrows 125
(see FIG. 6D and FIG. 6E); and
e) Guiding serpentine stake 116a while being inserted angledly in the directions of arrows 126
(see FIG. 6C, FIG. 6F, and FIG. 6G).
11) Two vertical guiding walls 111 respectively are for:
a) Guiding serpentine stake 116a while being inserted vertically through two double-angled-stake-securing strap-loop sheaths 110
(see FIG. 6D, FIG. 6E, and FIG. 10); and
b) Stabilizing serpentine stake 116a in the soil
(see FIG. 6D, FIG. 6E, and FIG. 10).
12) Two angled guiding walls 112 respectively are for:
a) Guiding serpentine stake 116a while being inserted angledly through two double-angled sheaths 110
(see FIG. 6C, FIG. 6F, and FIG. 6G); and
b) Stabilizing serpentine stake 116a in the soil
(see FIG. 6C, and FIG. 6G).
13) Three triple-angled sheaths 113 respectively are for:
a) Stackedly connecting multiple six-device-in-one landscape barriers adjacently by providing loops for a strap 100h can be threaded through in the direction of arrows 135
(see FIG. 15N, and FIG. 15O)
to create a shield to protect garden plants from animals
(see FIG. 16A and FIG. 16B),
to create a shield to protect saplings from animals
(see FIG. 15S and FIG. 15T),
to create a shield to protect trees from animals
(see FIG. 15U and FIG. 15V),
to create a barrier to protect garden vegetation from animals
(see FIG. 16C and FIG. 16D), and
to create a tonneau cover of a truck bed
(see FIG. 15R);
b) Securing six-device-in-one landscape barriers to utility holes of a pickup truck by providing openings for serpentine stake 116a
to create a vertical truck-bed extender
(see FIG. 15P, and FIG. 15Q);
c) Securing multiple six-device-in-one landscape barriers to each other vertically by providing openings for serpentine stake 116a
to create a tree ring or planter ring of varying heights
(see FIG. 15J, FIG. 15K, FIG. 15L, and FIG. 15M);
d) Stabilizing the tip of serpentine stake 116a to root-gripping barrier 102 while securely wedged into three single-angled sheaths 109, for
storage and shipping
(see FIG. 4B);
e) Guiding serpentine stake 116a while being inserted through two double-angled sheaths 110 angledly in the direction of arrows 126
(see FIG. 6C, FIG. 6F, and FIG. 6G); and
f) Guiding serpentine stake 116a while being inserted vertically through two double-angled sheaths 110 in the direction of arrows 125
(see FIG. 6D, and FIG. 6E).
14) Two curved guiding walls 114 respectively are for:
a) Guiding serpentine stake 116a while being inserted vertically through the three triple-angled-stake securing strap loop sheaths 113
(see FIG. 6C, FIG. 6D, FIG. 6E, and FIG. 7D);
b) Guiding serpentine stake 116a while being inserted angledly through the three triple-angled sheaths 113
(see FIG. 6C, FIG. 6F, FIG. 6G, and FIG. 7D); and
c) Stabilizing serpentine stake 116a in the soil
(see FIG. 6C, and FIG. 6G).
15) Barrier-locking stake system 115 is for performing the combined functions of its components.
16) Serpentine stake 116a is for:
a) Frictionally anchoring into the soil
(see FIG. 10);
b) Securing barrier system 101 into the soil, on an inclined surface
(see FIG. 2 (Prior Art), and FIG. 6G);
c) Securing barrier system 101 into the soil on a level surface
(see FIG. 6E, and FIG. 10);
d) Securing barrier system 101 piercing into soil angledly in the direction of arrows 126
(see FIG. 6F, and FIG. 6G); and
e) Securing barrier system 101 piercing into the soil vertically in the direction of arrows 125
(see FIG. 6E, and FIG. 10).
Barrier-securing stopper 116b is for:
a) Vertically locking six-device-in-one landscape barrier from raising up away from the ground
(see FIG. 4E); and
b) Preventing serpentine stake 116a from going through three single-angled sheaths 109, two double-angled sheaths 110, or three triple-angled sheaths 113, respectively
(see FIG. 4E).
Stake-locking root-gripping holes 116c respectively are for:
a) Locking barrier-locking stake system 115 to barrier system 101 by securing to stake-locking nipples 107b
(see FIG. 4D);
b) Securing serpentine stake 116a in the soil by providing an opening through which grass and plant roots 128a may grow in the directions of arrows 128b
(see FIG. 2 (Prior Art), and 10); and
c) Creating friction against the soil to secure serpentine stake 116a
(see FIG. 10).
17) Serpentine ridge system 117 is for performing the combined functions of its components.
18) Serpentine ridges 118a respectively are for:
a) Wedging into three single-angled sheaths 109 to securely lock serpentine stake 116a, for storage and shipping
(see FIG. 4B, FIG. 7B, and FIG. 7E);
b) Wedging into two double-angled sheaths 110 to securely lock serpentine stake 116a
(see FIG. 6C, FIG. 6D, FIG. 7B, and FIG. 7C);

c) Wedging into three triple-angled sheaths 113 to securely lock serpentine stake 116*a*
(see FIG. 6C, FIG. 6D, FIG. 7B, FIG. 7D, and FIG. 7E);
d) Frictionally securing serpentine stake 116*a* into the soil to prevent lifting when ground expands and contracts due changes in temperature in the directions of arrows 98*i*, 98*j*, 98*k*, 98*l*, 98*m*, and 98*n*
(see FIG. 1K (Prior Art), FIG. 2A (Prior Art), FIG. 2B (Prior Art), and FIG. 7A); and
e) Lockingly securing serpentine stake 116*a* to root-gripping barrier 102 by snap-locking double-snap-locking recesses to the three triple-angled sheaths 113
(see FIG. 22A and FIG. 22B).

Branching bridges 118*b* respectively are for:
  a) Creating friction against soil to secure serpentine stake 116*a*
  (see FIG. 2 (Prior Art), and FIG. 7A); and
  b) Wedging serpentine stake 116*a* to securely lock into the soil.

19) Root-gripping locking tunnels 119 respectively are for:
  a) Securing serpentine stake 116*a* in the soil by providing an opening through which grass and plant roots 128*a* may grow in the directions of arrows 128*b*
  (see FIG. 2 (Prior Art), and FIG. 10);
  b) Creating friction against the soil to secure serpentine stake 116*a*
  (see FIG. 10);
  c) Securing root-gripping barrier 102 in the soil by providing an opening through which grass and plant roots 128*a* may grow in the directions of arrows 128*b*
  (see FIG. 2 (Prior Art), and FIG. 10); and
  d) Creating friction against the soil to secure root-gripping barrier 102
  (see FIG. 10).

20) Anti-digging plate systems 120 respectively are for performing the combined functions of its components.

Figure 3A:
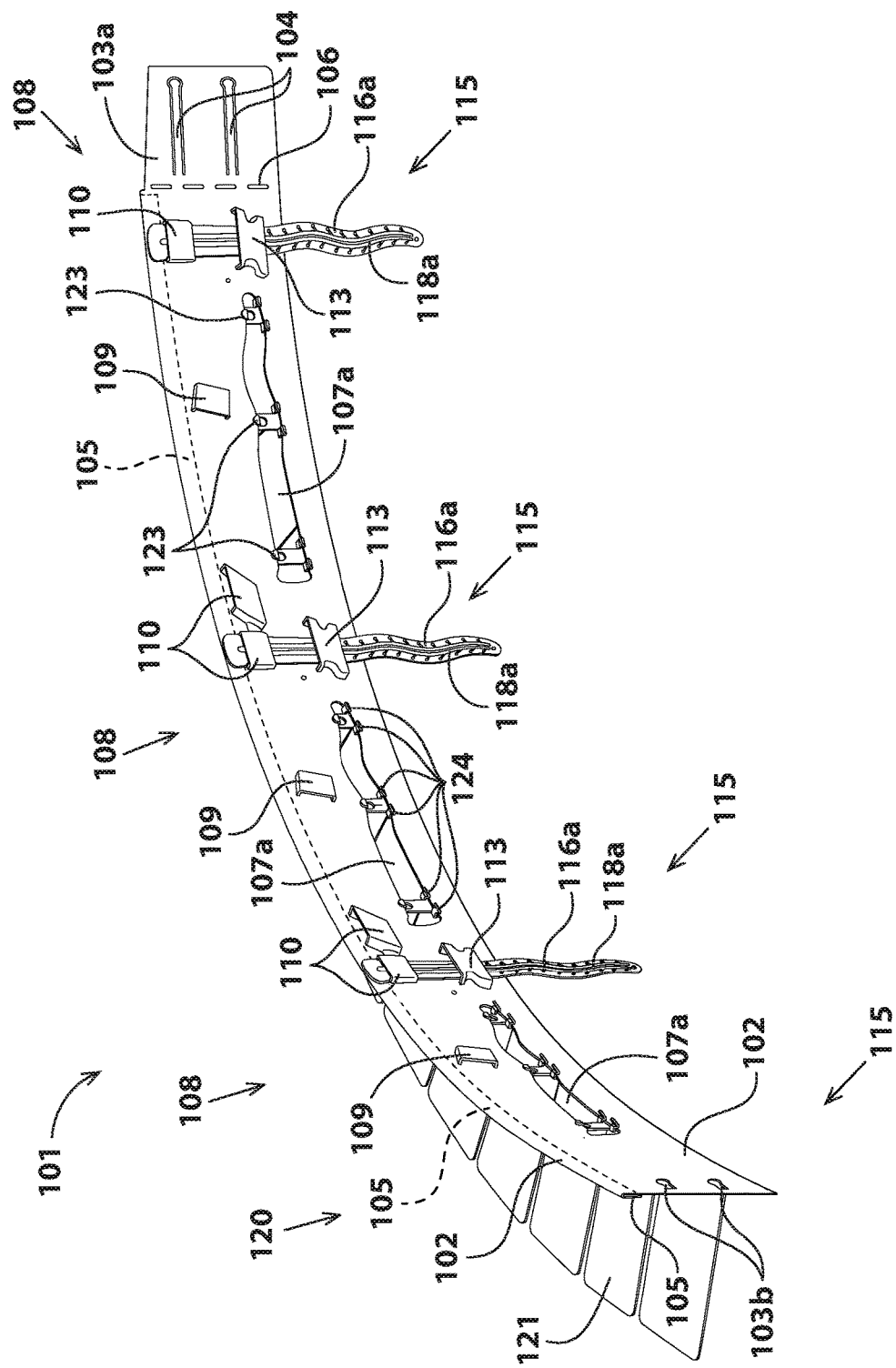
FIG. 3A illustrates a perspective view of the six-device-in-one landscape barrier.
Figure 3B:
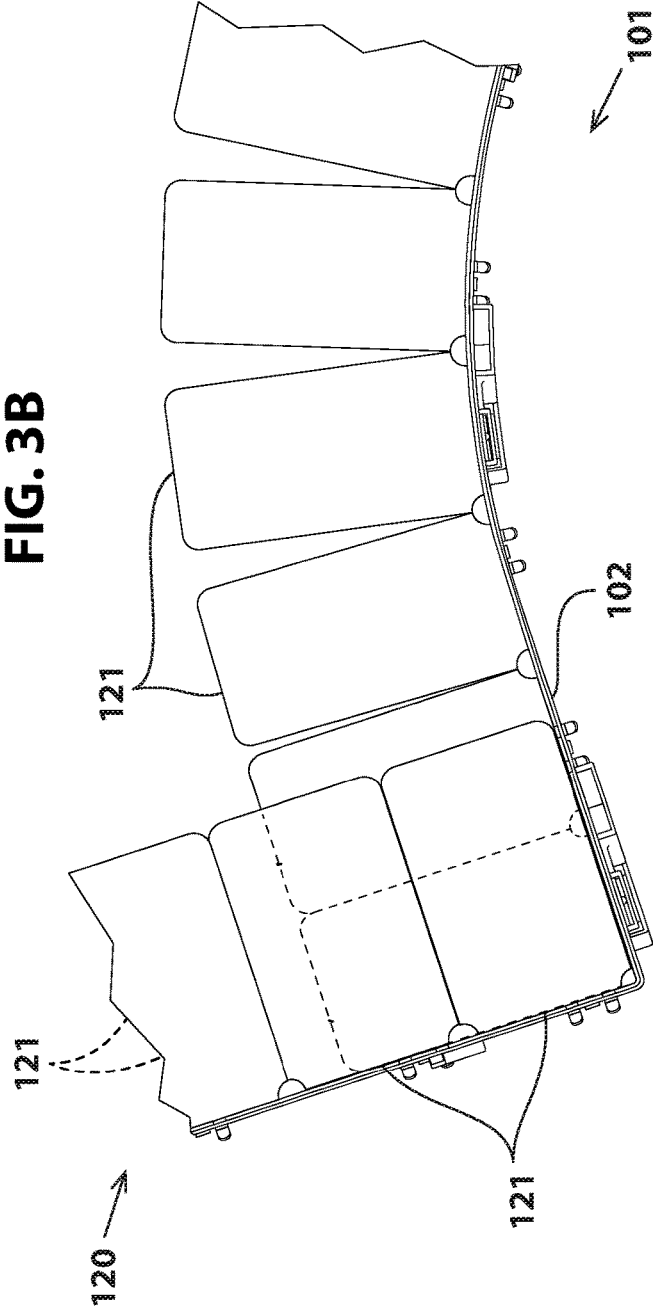
FIG. 3B illustrates a perspective view of the six-device-in-one landscape barrier demonstrating how the barrier-locking tongues securely integrate a solar-stake-mounted light.
Figure 3C:
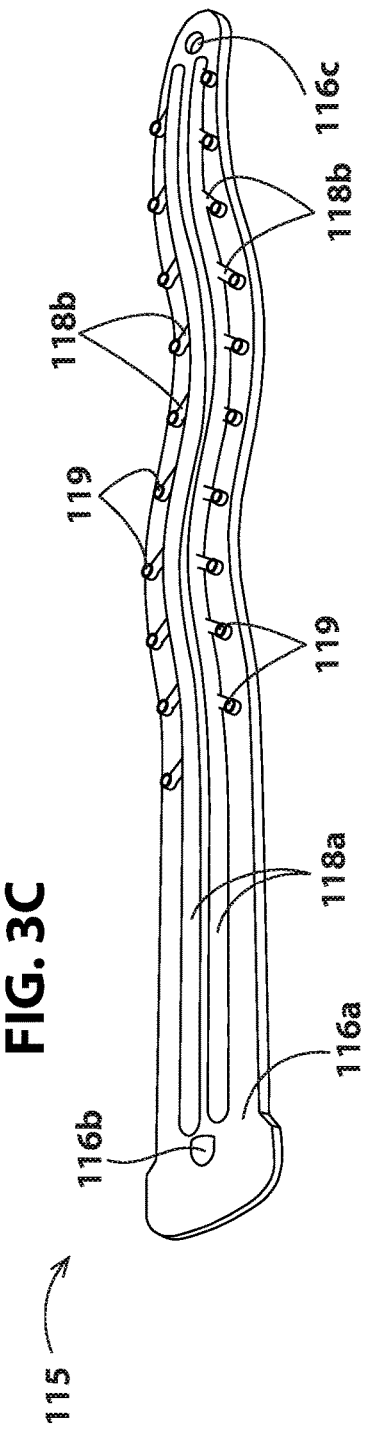
FIG. 3C illustrates a perspective view of the six-device-in-one landscape barrier demonstrating how the barrier-locking tongues securely integrate multiple solar-stake-mounted lights and how two double-angled sheaths with three triple-angled sheaths securely integrate a solar light.
Figure 3D:
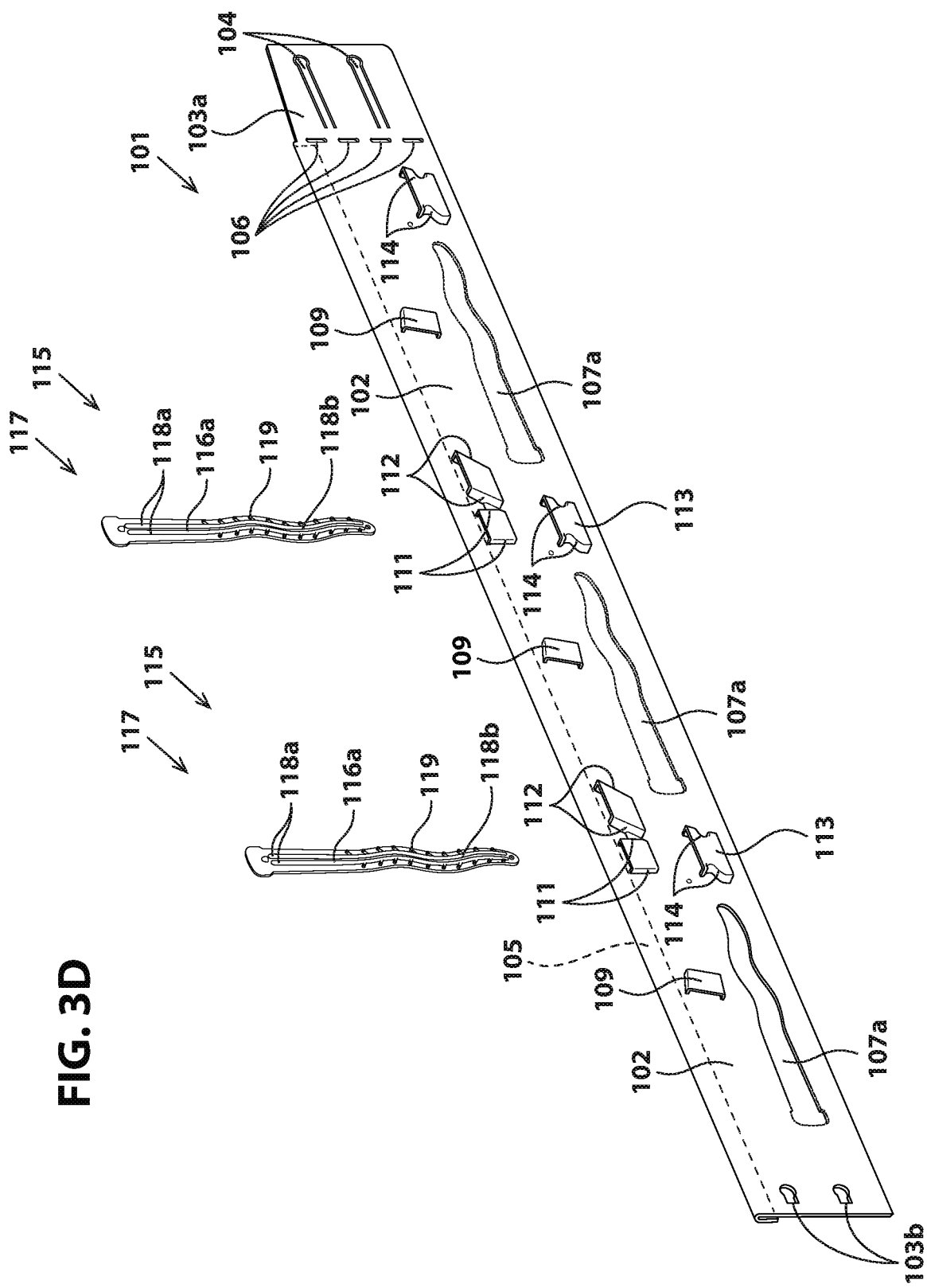
FIG. 3D illustrates a perspective view of the six-device-in-one landscape barrier demonstrating how the barrier-locking tongues securely integrate multiple solar lights and how two double-angled sheaths with three triple-angled sheaths securely integrate a solar light.
Figure 12A:
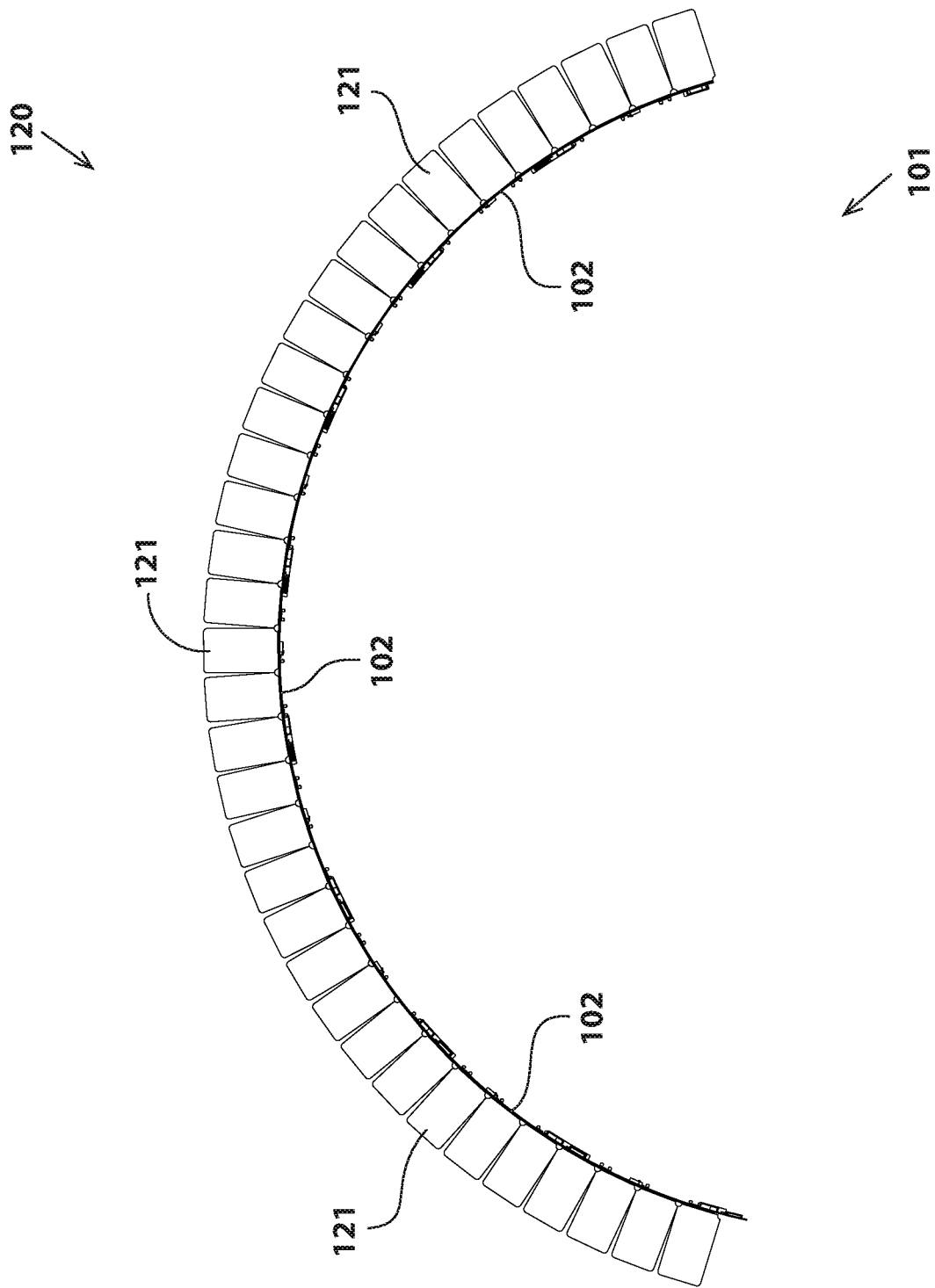
Figure 12B:
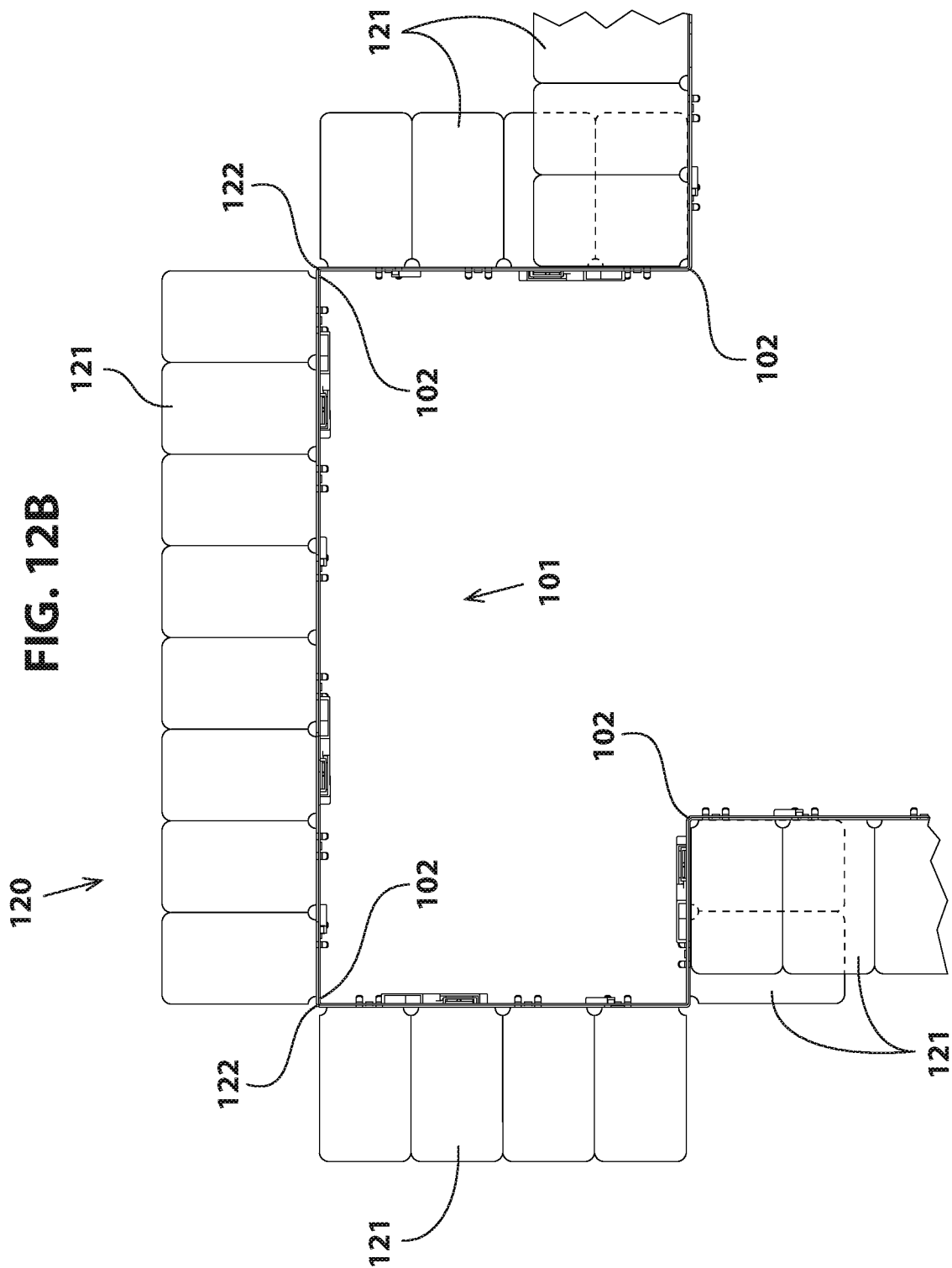
Figure 12C:
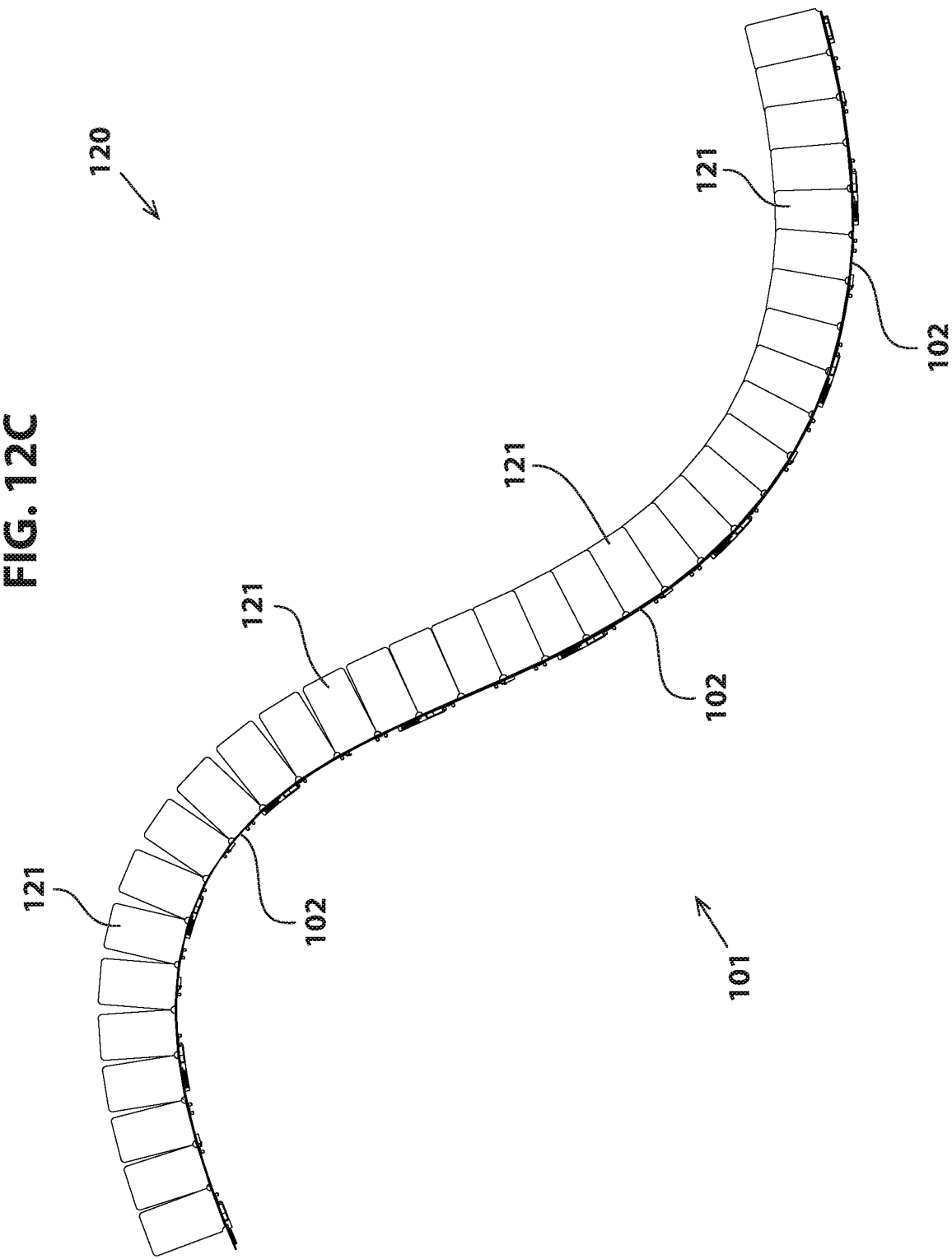
Figure 12D:
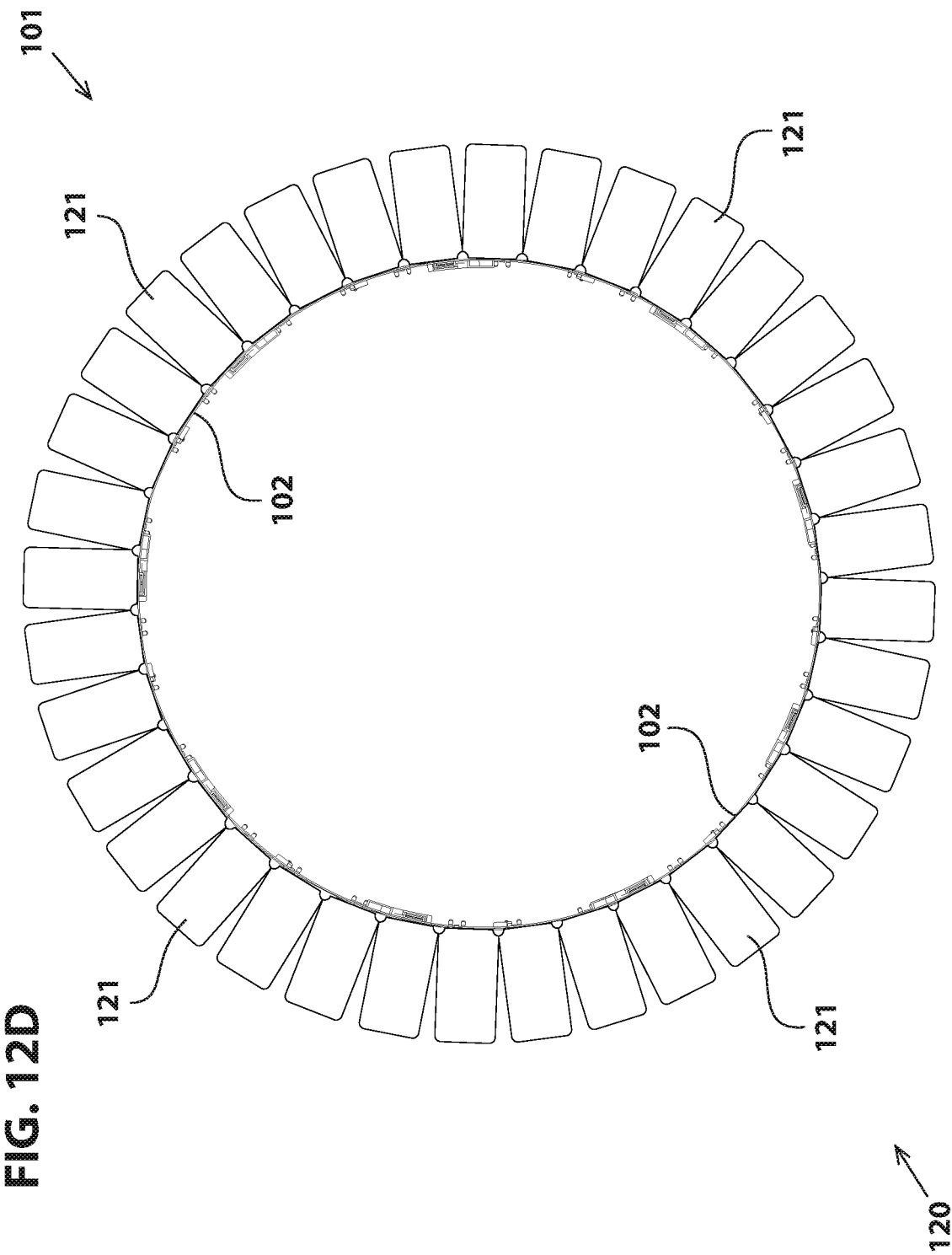
Figure 13A:
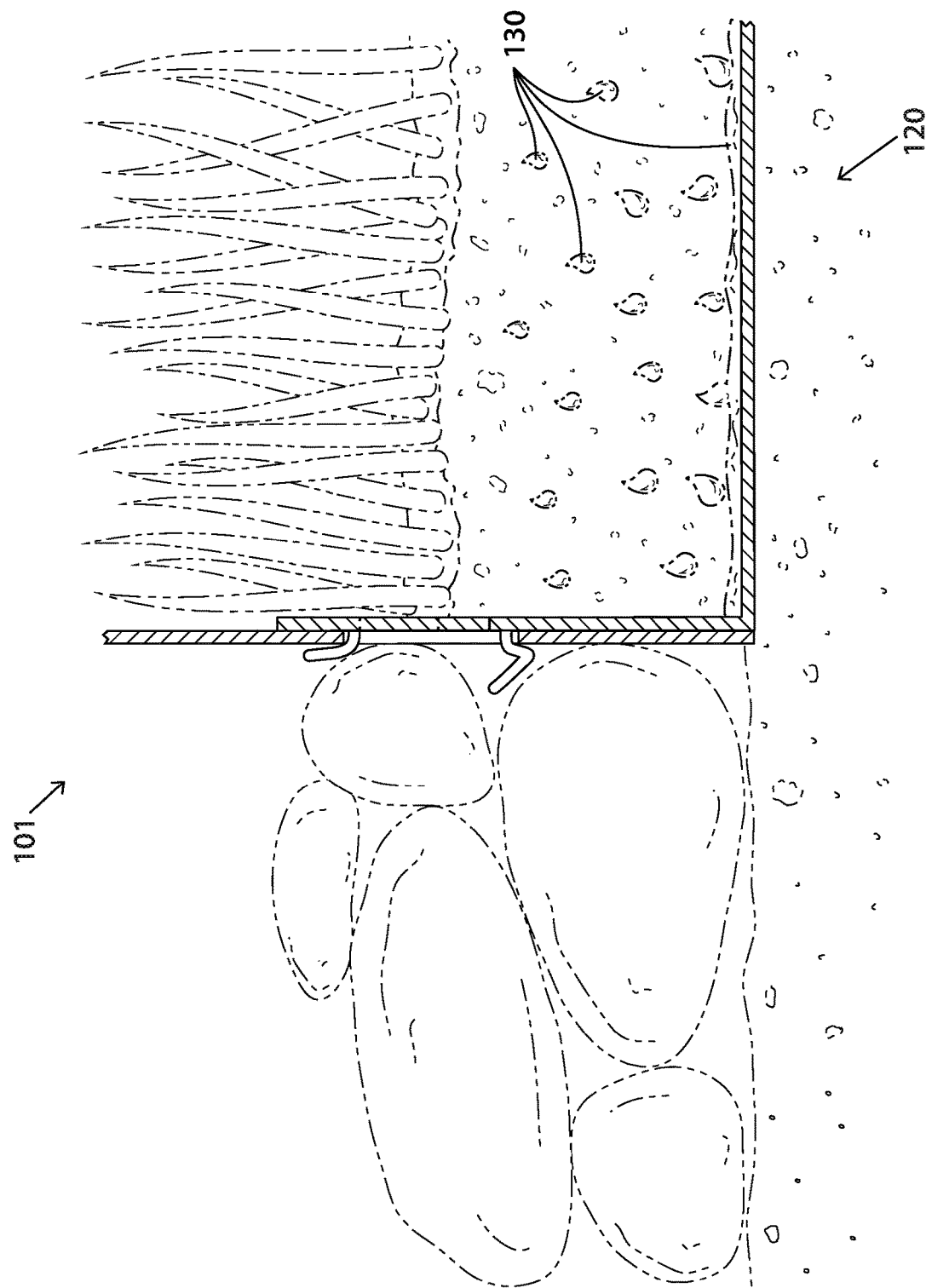
Figure 150:
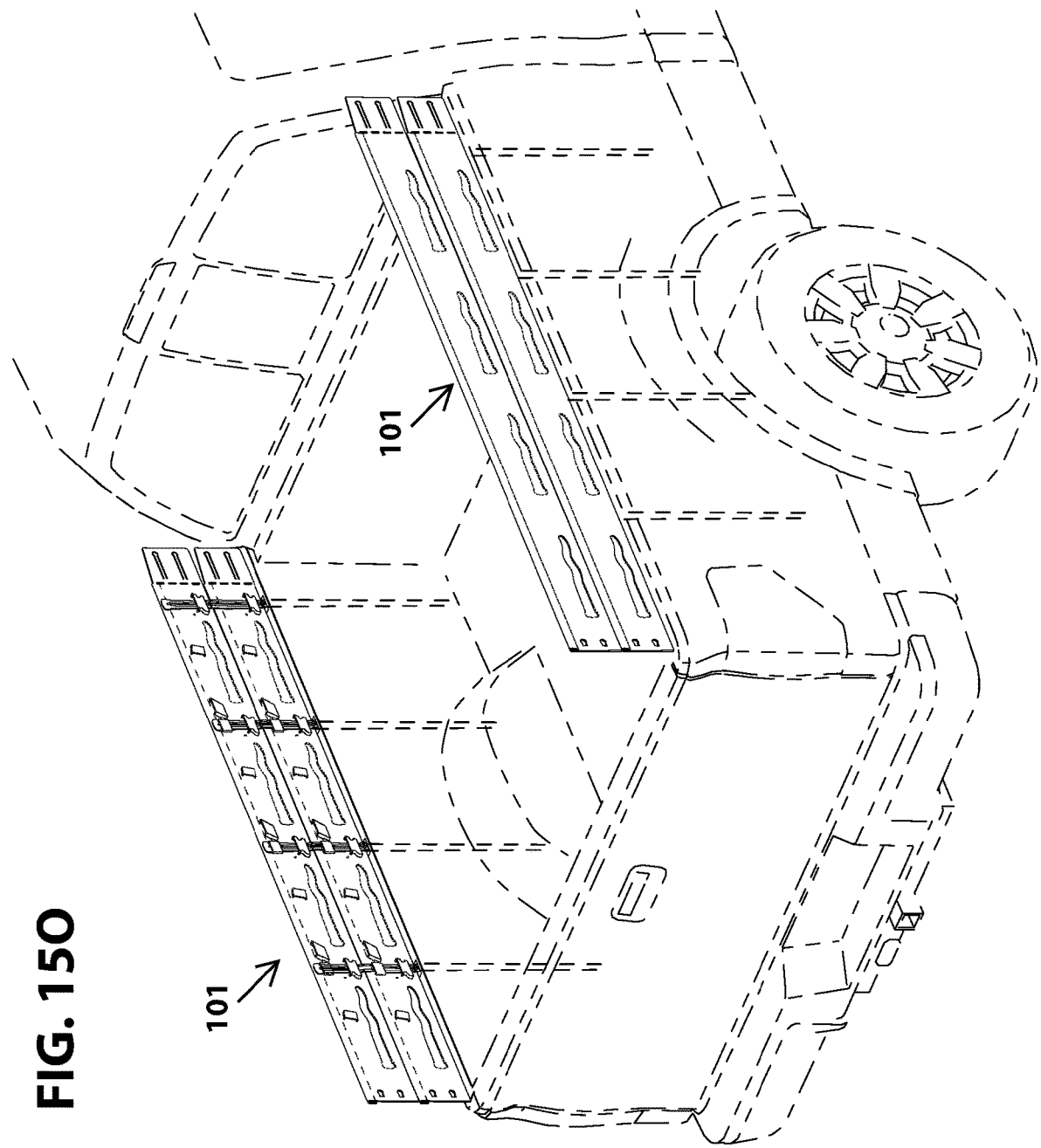

21) Anti-digging plates 121 respectively are for:
  a) Retaining water 130 to help nourish grass and plants
  (see FIG. 13A);
  b) Preventing animals from digging underneath the six-device-in-one landscape barrier
  (see FIG. 13B and FIG. 16B);
  c) Stabilizing barrier system 101 by soil, gravel, rocks, bark chips, or other landscaping materials, being amassed upon anti-digging plates 121, creating a downward force in the direction of arrows 131
  (see FIG. 13A and FIG. 14);
  d) Providing adjustability, to be configured to many respective custom curvatures
  (see FIG. 3B, FIG. 12A, FIG. 12B, FIG. 12C, FIG. 12D, and FIG. 12E);
  e) Providing adjustability, to be configured in a straight line
  (see FIG. 5A, and FIG. 12B); and
  f) Providing adjustability, to be configured with 90, 45, 30, and 15 degree corners
  (see FIG. 3B, FIG. 12B, and FIG. 12E).

22) Barrier-conforming connector 122 is for:
  Providing means for anti-digging plate systems 120 to conform to the shape of root-gripping barrier 102
  (see FIG. 5A, FIG. 5B, FIG. 5C, and FIG. 2B).

Figures 11A, 11B:
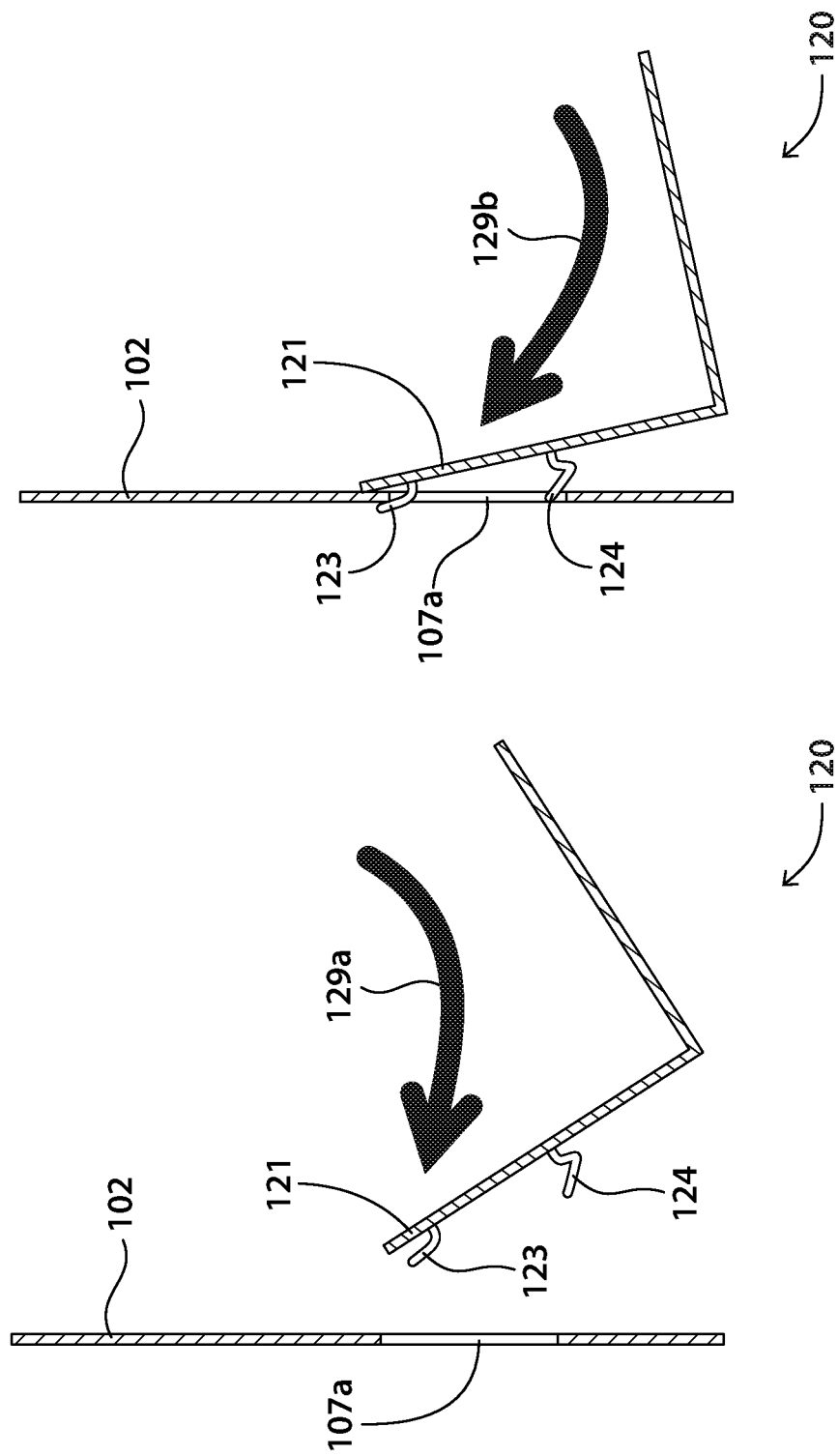

23) Top plate-securing hooks 123 respectively are for:
  a) Snappingly attaching to anti-digging plate systems 120 to barrier system 101 in the direction of arrows 129*a*, 129*b*, 129*c*, and 129*d*,
  (see FIG. 5A, FIG. 5B, FIG. 5C, FIG. 11A, FIG. 11B, FIG. 11C, and FIG. 11D);
  b) Quickly and easily removing from anti-digging plate systems 120 from barrier system 101
  (see FIG. 5A, FIG. 5B, and FIG. 5C);
  c) Quickly and easily attaching to barrier system 101
  (see FIG. 11A, FIG. 11B, FIG. 11C, and FIG. 11D); and
  d) Securely attaching barrier-conforming connector 122, to root-gripping barrier 102
  (see FIG. 11D).

24) Bottom plate-securing snap-hooks 124 respectively are for:
  a) Snappingly attaching barrier-conforming connector 122 to root-gripping barrier 102 in the direction of arrows 129*a*, 129*b*, 129*c*, and 129*d*,
  (see FIG. 11A, FIG. 11B, FIG. 11C, and FIG. 11D);
  b) Quickly and easily removing from barrier system 101
  (see FIG. 5A, FIG. 5B, FIG. 5C, and FIG. 11D);
  c) Quickly and easily attaching to barrier system 101
  (see FIG. 11C and FIG. 11D); and
  d) Securely attaching barrier-conforming connector 122, to root-gripping barrier 102
  (see FIG. 11D).

Variation

Referring to FIG. 16E, FIG. 17A, FIG. 17B, FIG. 18, FIG. 19, FIG. 20, FIG. 21A, FIG. 21B, FIG. 21C, FIG. 21D, FIG. 22A, FIG. 22B, FIG. 22C, FIG. 22D, FIG. 22E, FIG. 22F, FIG. 22G, FIG. 22H, FIG. 22I, FIG. 22J, FIG. 22K, FIG. 22L, FIG. 22M, FIG. 22N, FIG. 22O, FIG. 22P, FIG. 22Q, FIG. 22R, FIG. 22S, FIG. 22T, FIG. 23A, FIG. 23B, FIG. 23C, FIG. 23D, FIG. 23E, FIG. 23F, FIG. 23G, FIG. 23H, FIG. 23I, FIG. 23J, FIG. 23K, FIG. 23L, FIG. 23M, and FIG. 23N:

FIG. 16 illustrates a front view of a variation of barrier system 101 with a variation of the serpentine stakes 116*a*.

FIG. 17A and FIG. 17B illustrate front views of variations of tongue-locking openings 103*b*, barrier-locking tongues 104, and corner-angling holes 106.

Figure 18:
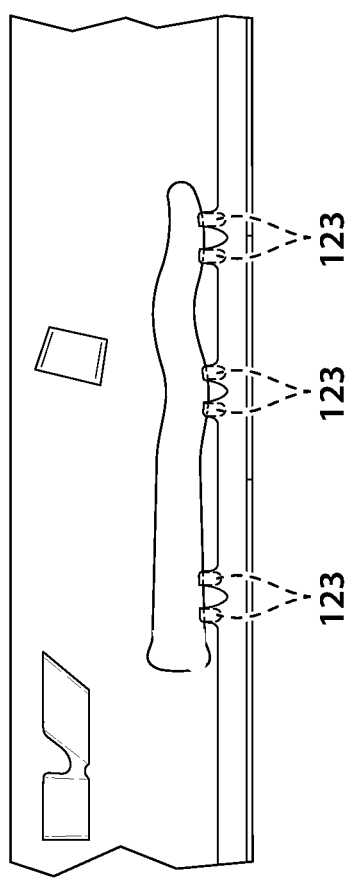
FIG. 18 illustrates a front view of a variation of the top plate-securing hooks.

FIG. 18 illustrates a front view of a variation of top plate-securing hooks 123, securing anti-digging plate systems 120 to root-gripping barrier 102.

Figure 19:
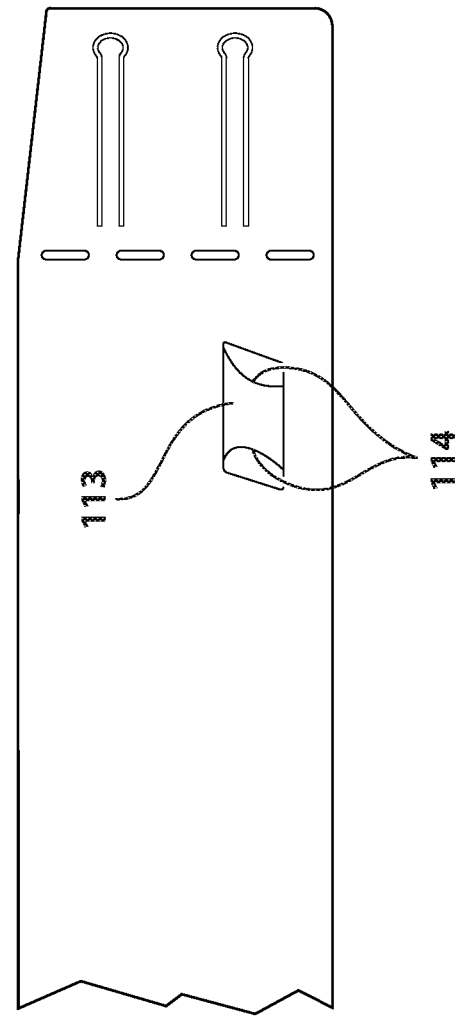
FIG. 19 illustrates a front view of a variation of the two curved guiding walls.

FIG. 19 illustrates a front view of a variation of two angled guiding walls 112.

Figure 20:
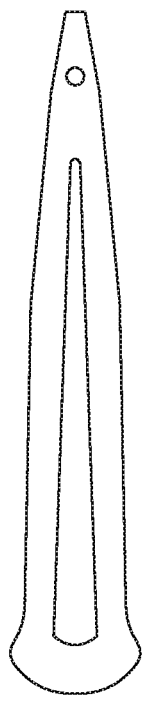
FIG. 20 illustrates a front view of a variation of the barrier-locking stake systems.
Figure 21A:
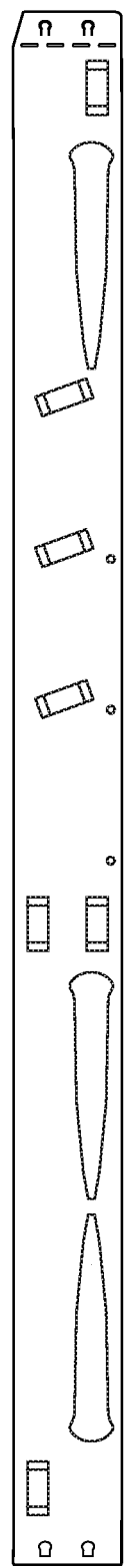
Figure 21B:
Figure 21C:
Figure 21D:

FIG. 20 illustrates a front view of a variation of barrier-locking stake system 115.

FIG. 21A, FIG. 21B, FIG. 21C, and FIG. 21D illustrate front and top views of variations of barrier system 101.

FIG. 22A, FIG. 22B, FIG. 22C, FIG. 22D and FIG. 22E illustrate perspective, front, side and cross-sectional views of a variation of barrier-locking stake system 115.

Figure 22F:
FIG. 22F, FIG. 22G, FIG. 22H, FIG. 22I, FIG. 22J, FIG. 22K, FIG. 22L, FIG. 22M, and FIG. 22N illustrate top, front, top cross-sectional and perspective views of variations of the barrier systems.
Figure 22G:
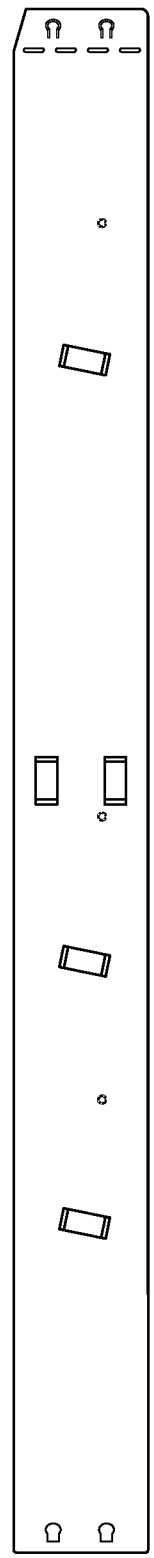

FIG. 22F and FIG. 22G illustrate top and front views of a variation of barrier system 101.

Figure 22H:
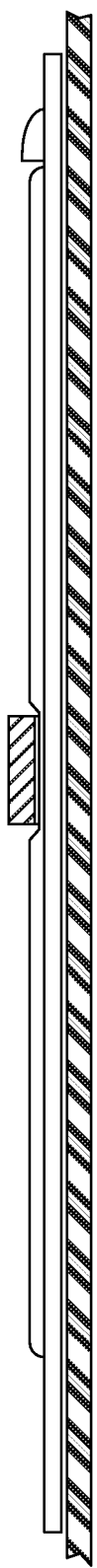

FIG. 22H illustrates a side cross-sectional view demonstrating how a variation of barrier-locking stake system 115 having a recess in a variation of serpentine ridges 117 which allows three single-angled sheaths 109 to lock the stake in place during shipping and in retail environments.

Figure 22I:
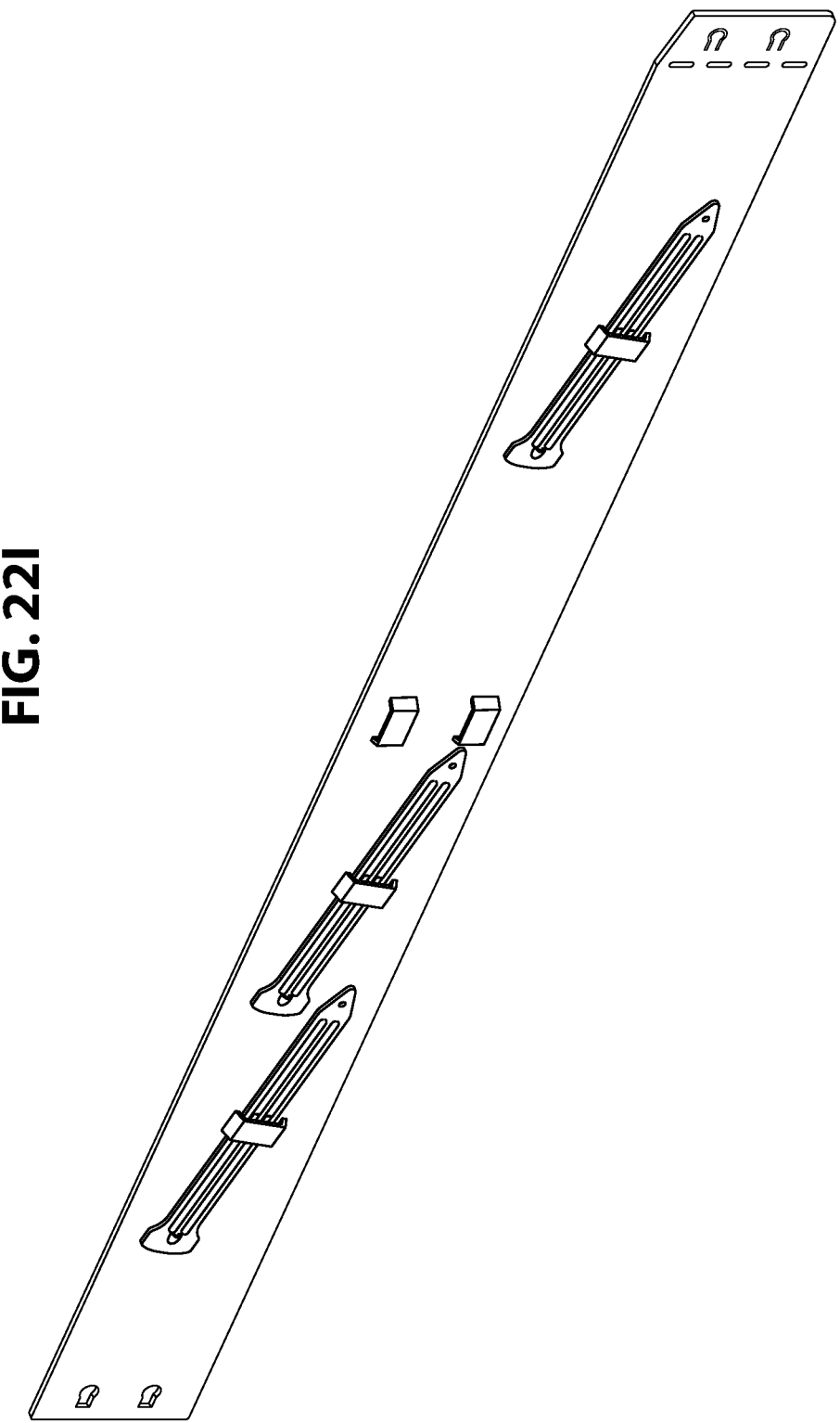
Figure 22J:
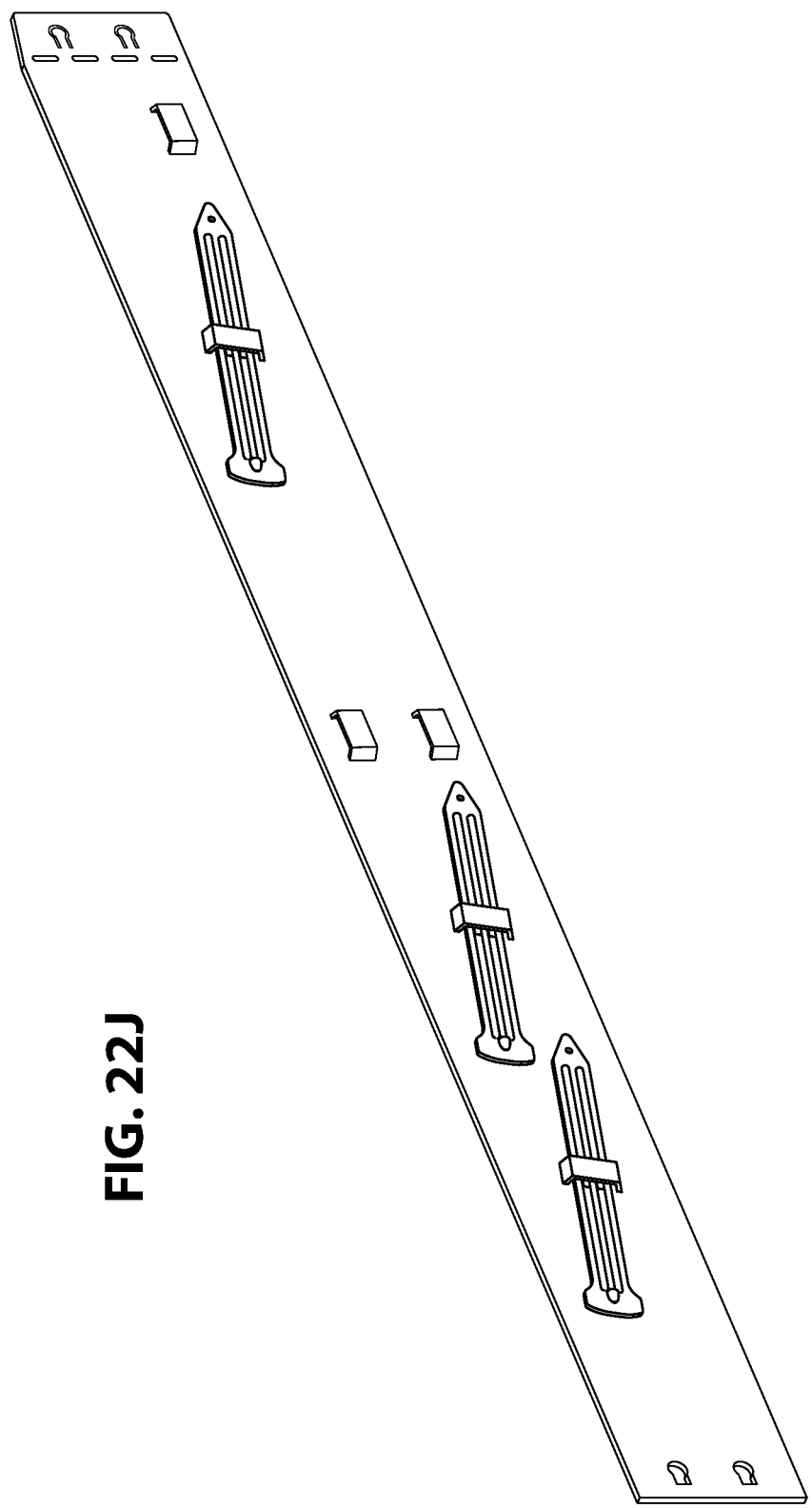

FIG. 22I and FIG. 22J illustrate perspective views demonstrating how a variation of barrier-locking stake system 115 are attached to a variation of barrier system 101.

Figure 22K:
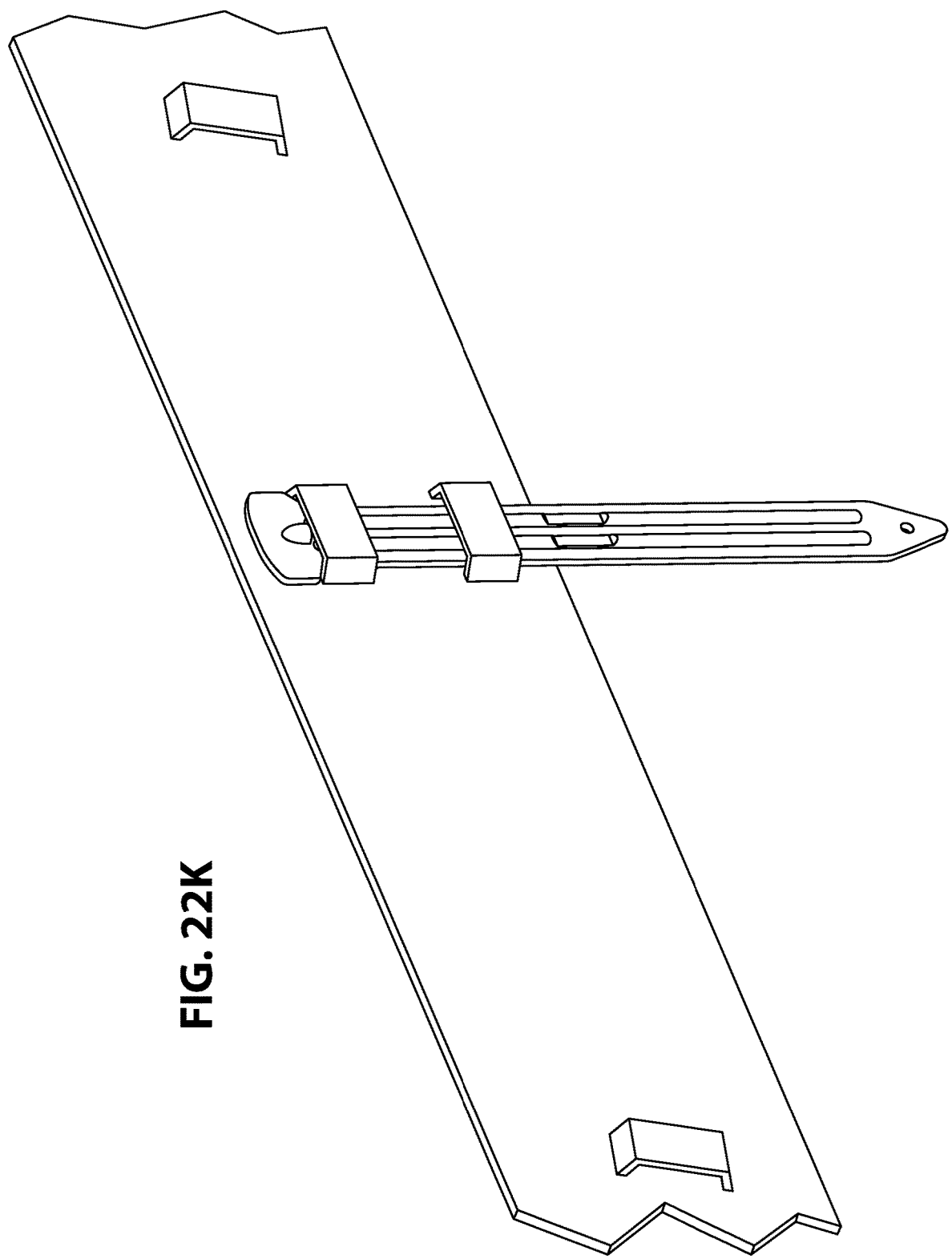

FIG. 22K illustrates a variation of how a variation of a stake is used to stabilize a barrier.

Figure 22L:
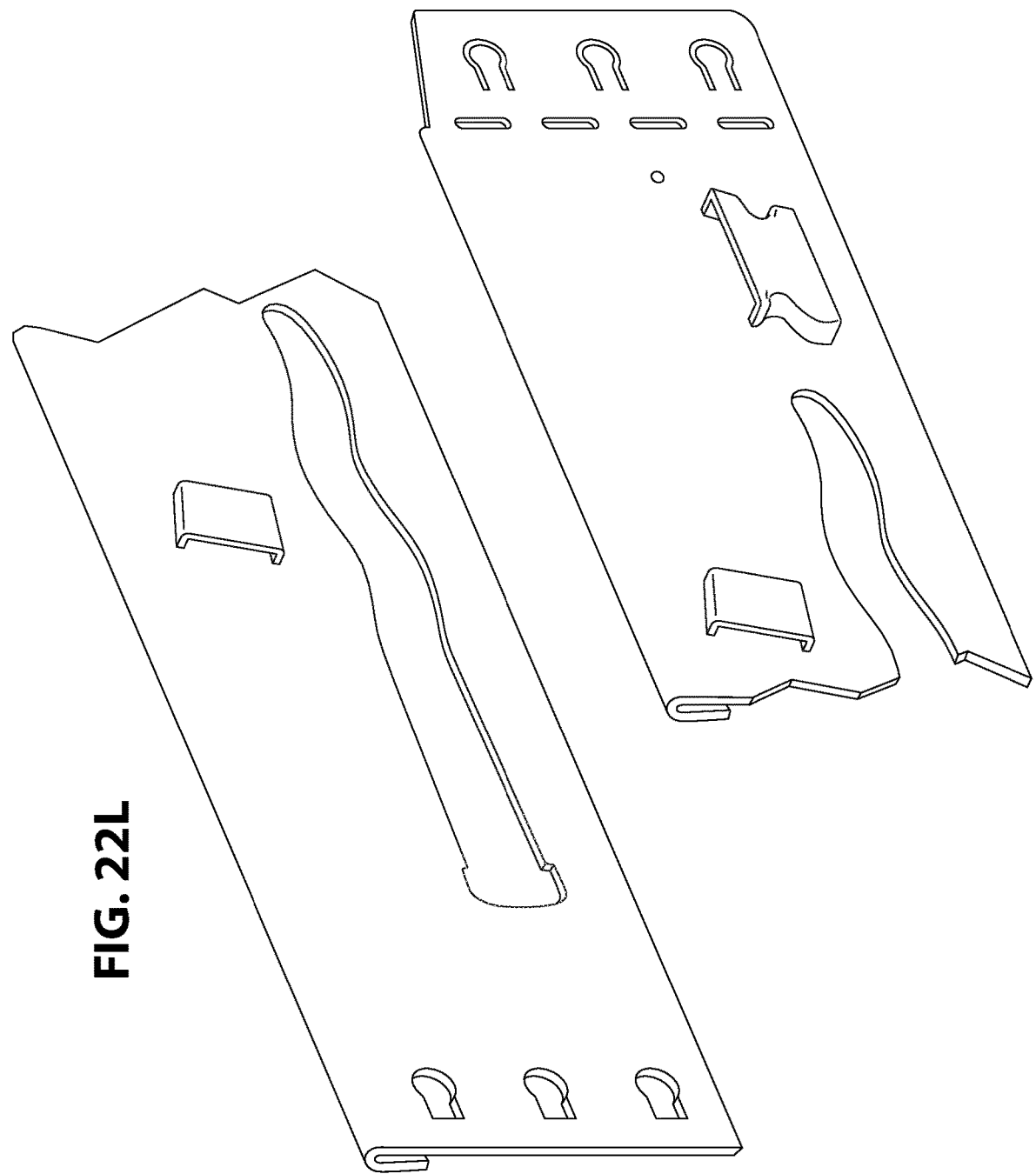

FIG. 22L illustrates variations of tongue-locking openings 103b, and barrier-locking tongues 104.

Figure 22M:
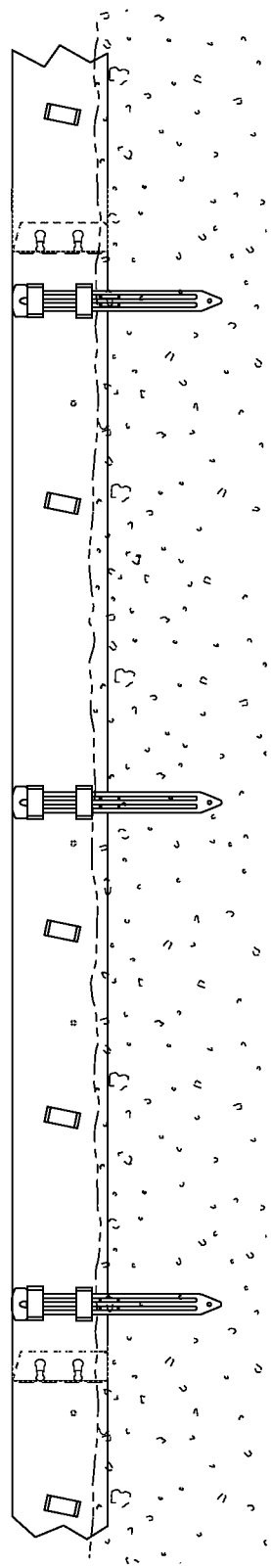

FIG. 22M illustrates a variation of the six-device-in-one landscape barrier and how the stakes are installed to connect multiple sections together and to secure the landscape barrier to the ground.

Figure 22N:
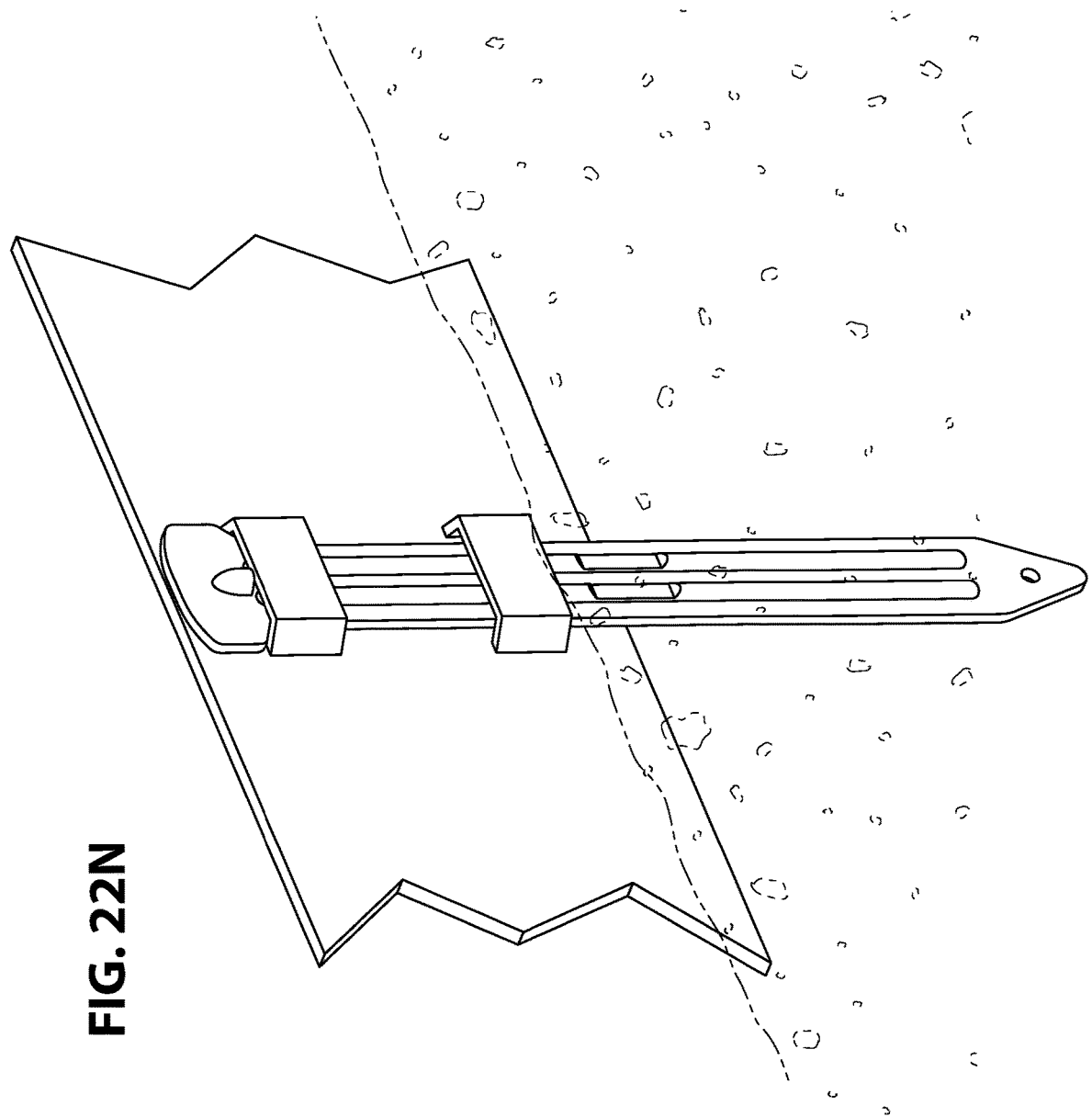
Figure 22P:
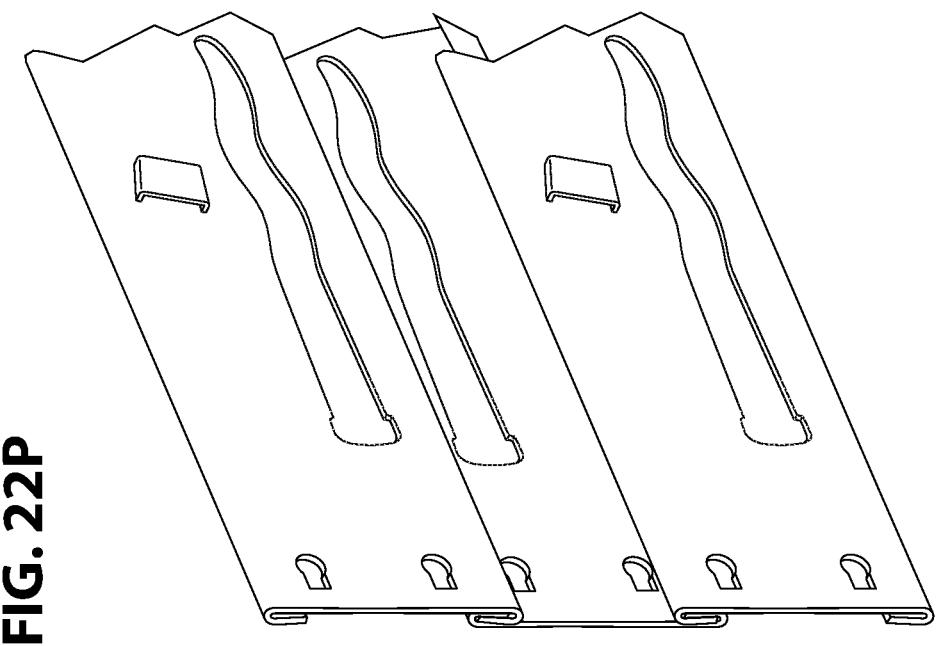
FIG. 22O, FIG. 22P, FIG. 22Q, FIG. 22R, FIG. 22S, and FIG. 22T illustrate perspective and front views of a variation of the six-device-in-one landscape barrier having two safety ridges on the top and bottom, respectively.
Figure 22O:
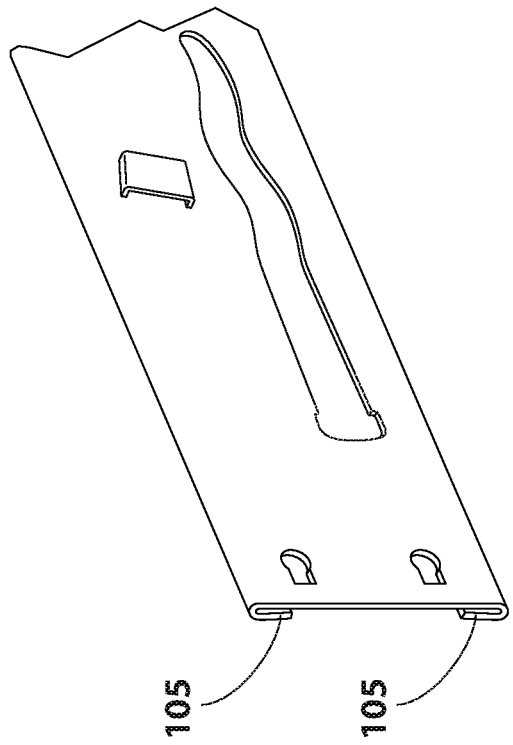
Figure 22R:
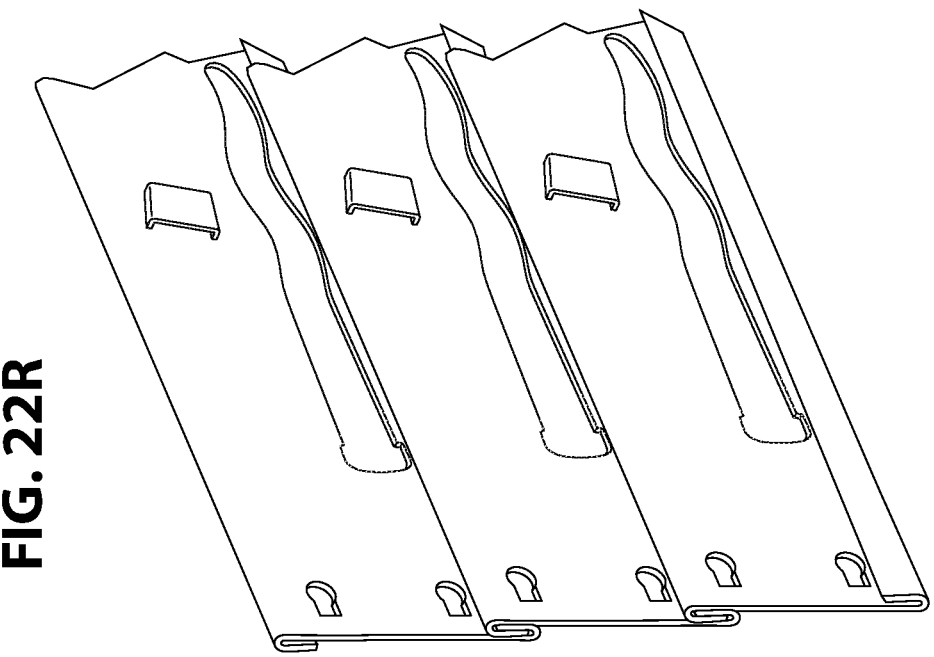
Figure 22Q:
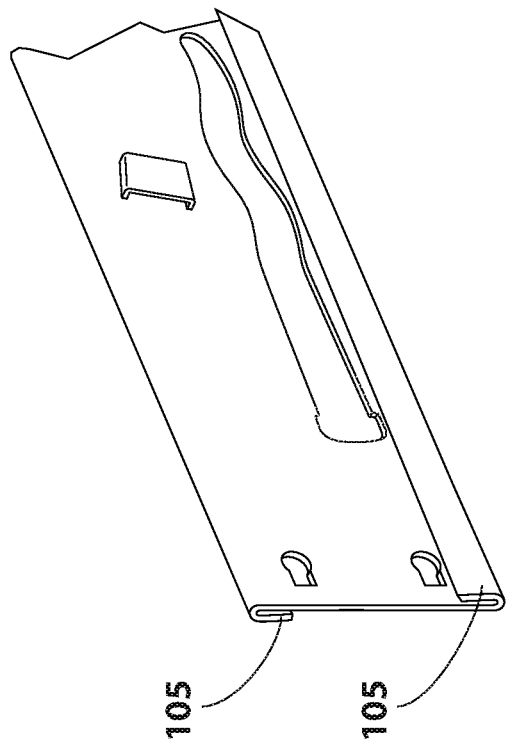
Figure 22S:
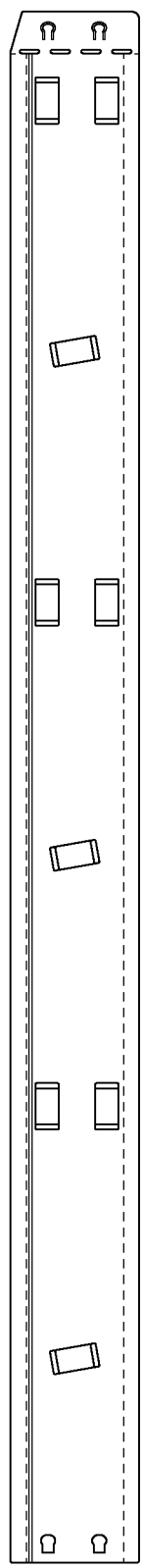
Figure 22T:
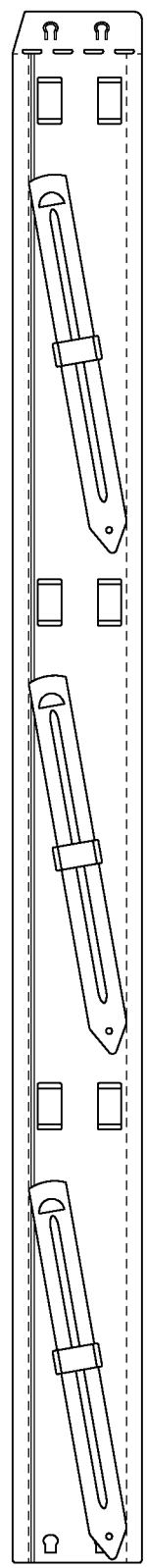
Figure 23A:
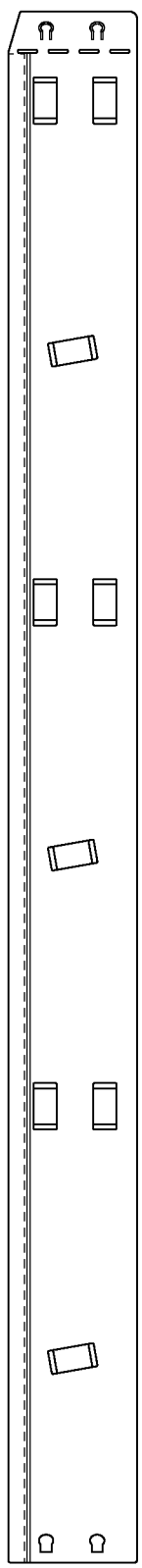
FIG. 23A, FIG. 23B, FIG. 23C, FIG. 23D, FIG. 23E, FIG. 23F, FIG. 23G, FIG. 23H, FIG. 23I, FIG. 23J, FIG. 23K, FIG. 23L, FIG. 23M, and FIG. 23N illustrate equivalent variations of the six-device-in-one landscape barrier.
Figure 23B:
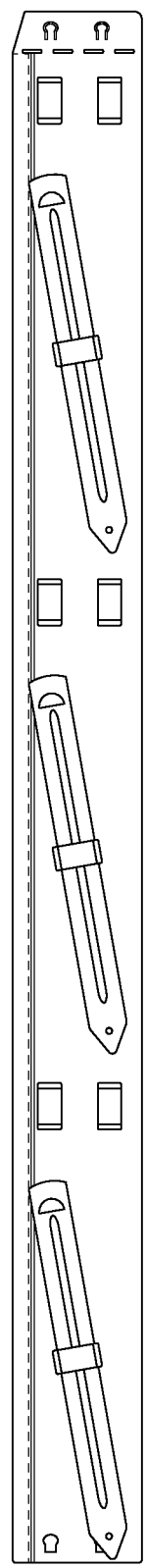
Figure 23C:
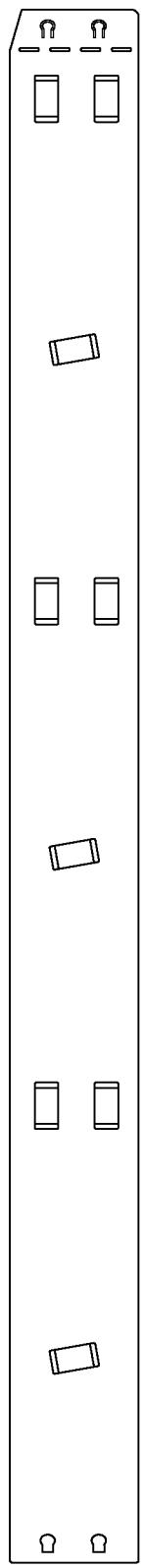
Figure 23D:
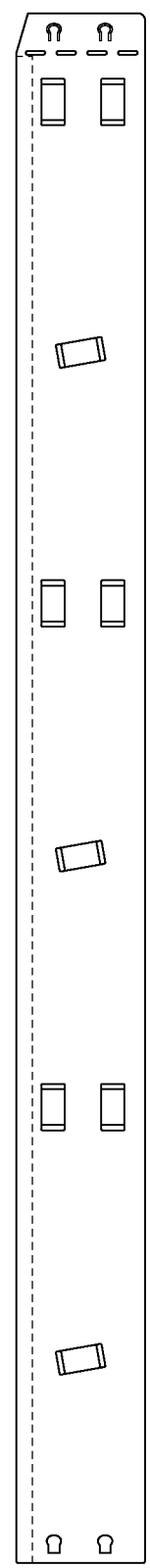
Figure 23E:
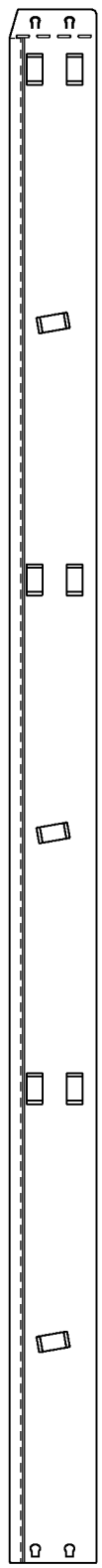
Figure 23F:
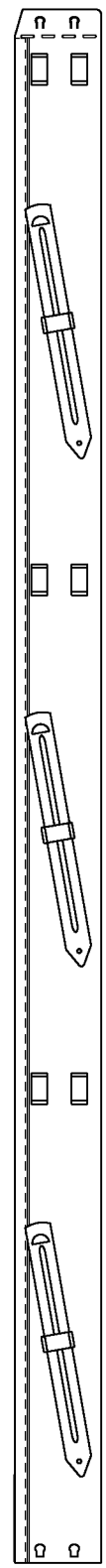
Figure 23G:
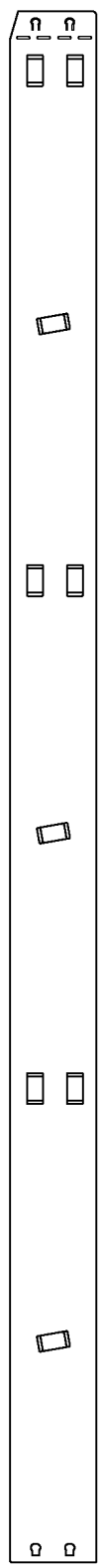
Figure 23H:
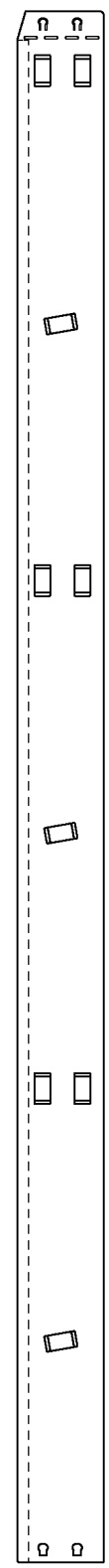
Figure 23I:
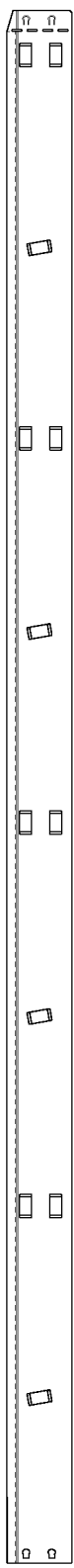
Figure 23J:
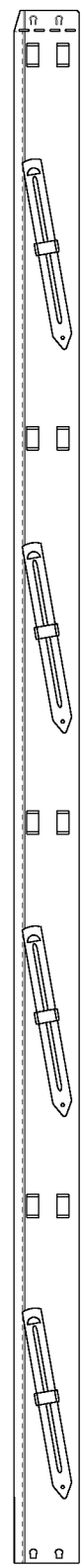
Figure 23K:
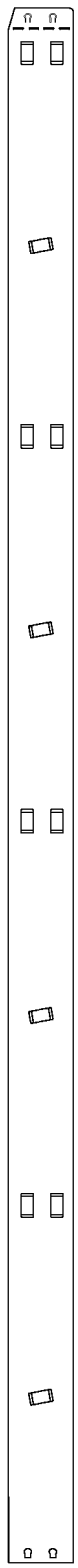
Figure 23L:
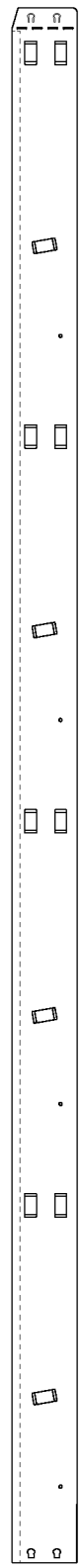
Figure 23M:
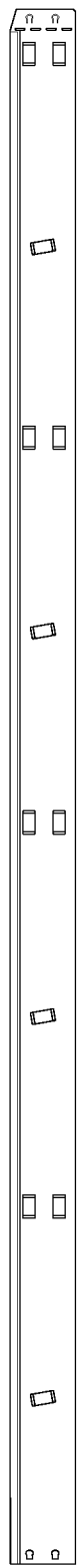
Figure 23N:
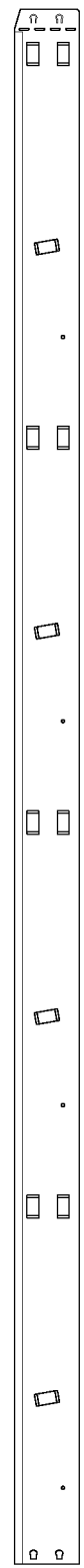

FIG. 22N illustrates how a variation of barrier-locking stake system 115, having a stopper, is which prevents the stake from proceeding further past the top front edge of the top sheath.

FIG. 22O, FIG. 22P, FIG. 22Q, and FIG. 22R illustrate variations of the six-device-in-one landscape barrier having two safety ridges on the top and bottom, respectively.

FIG. 23A, FIG. 23B, FIG. 23C, FIG. 23D, FIG. 23E, FIG. 23F, FIG. 23G, FIG. 23H, FIG. 23I, FIG. 23J, FIG. 23K, FIG. 23L, FIG. 23M, and FIG. 23N illustrate equivalent variations of the six-device-in-one landscape barrier.

MAJOR ADVANTAGES OF THE INVENTION

The present invention substantially departs from the conventional concepts and designs of the prior art. In doing so, the present invention provides a six-device-in-one landscape barrier, having many unique and significant features, functions, and advantages, which overcome all the disadvantages of the prior art, as follows:

1) It is an object of the new invention to provide a six-device-in-one landscape barrier, having barrier-locking tongues 104.
   Therefore, the six-device-in-one landscape barrier:
   a) Can save money for the consumer, requiring less barrier sections because of less overlap at barrier ends in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG.
   b) Can save materials during manufacturing being one-quarter of the length of wasted steel materials as comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);
   c) Can securely support
      solar-stake-mounted lights 100e
      (see FIGS. 3B, 3C, and 3D),
      a trellis for vines or climbing plants
      (see FIG. 3H, and FIG. 15I),
      an umbrella pole
      (see FIG. 3F, and FIG. 15G), and
      a sprinkler head or drip line
      (see FIG. 3G, and FIG. 15H);
   d) Can securely connect multiple six-device-in-one landscape barriers to each other by inserting through tongue-locking openings 103b and wrapping over the top or under the bottom of root-gripping barrier 102, respectively
      (see FIG. 1D, FIG. 6E, FIG. 6F, and FIG. 6G);
   e) Can securely lock multiple six-device-in-one landscape barriers to each other by inserting through tongue-locking openings 103b, wrapping in the opposite direction through corner-angling holes 106, and again through tongue-locking openings 103b in the directions of arrows 127c, 127d, and 127e
      (see FIG. 8A, FIG. 8B, FIG. 8C, and FIG. 8D);
   f) Can anchor six-device-in-one landscape barrier to the soil
      (see FIG. 15U, FIG. 15W, and FIG. 16D); and
   g) Can protect garden plants from animals
      (see FIG. 16B).

2) It is an object of the new invention to provide a six-device-in-one landscape barrier, having safety ridge 105.
   Therefore, the six-device-in-one landscape barrier:
   a) Can connect a safety ridge 105 of one six-device-in-one landscape barrier to a safety ridge 105 of a second six-device-in-one landscape barrier in the directions of arrows 134
      (see FIG. 15L)
         to create a shield to protect garden plants from animals
         (see FIG. 15T and FIG. 15U),
         to create a shield to protect saplings from animals
         (see FIG. 15R),
         to create a shield to protect trees from animals
         (see FIG. 15S),
         to create a barrier to protect garden vegetation from animals
         (see FIG. 15V), and
         to create a tonneau cover of a truck bed
         (see FIG. 15Q);
   b) Can provide a mechanical stopper or buttress against an adjacent horizontal safety ridge 105, while coupling such, in the directions of arrows 127a and 127b
      (see FIG. 8A and FIG. 8B);
   c) Can position the horizontal center of joining location of adjacent safety ridge 105 to be above a vertical row of corner-angling holes 106 thereby structurally assisting the malleability of a bending point of root-gripping barrier 102
      (see FIG. 8A and FIG. 8B); and
   d) Can provide means for installing barrier system 101 to quickly and easily couple barrier-locking tongues 104 to a respective tongue-locking openings 103b in the directions of arrows 127a and 127b
      (see FIG. 8A and FIG. 8B).

3) It is an object of the new invention to provide a six-device-in-one landscape barrier, having angling end-wing 103a.
   Therefore, the six-device-in-one landscape barrier:
   a) Can save manufacturing materials being one-quarter of the length of wasted steel materials as comparable prior art in the directions of arrows 98a, 98b, 98c, 98d, 98e, 98f, 98g, 98h, 99a, 99b, 99c, 100a, 100b, 100c, and 100d
      (see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);

b) Can save money for consumer, requiring less barrier sections because of less overlap at barrier ends in the directions of arrows 98a, 98b, 98c, 98d, 98e, 98f, 98g, 98h, 99a, 99b, 99c, 100a, 100b, 100c, and 100d
(see FIG. 1A (Prior Art), FIG. 1B (Prior Art), FIG. 1C (Prior Art), FIG. 1D, FIG. 1E (Prior Art), FIG. 1G (Prior Art), FIG. 1H, FIG. 2C (Prior Art), and FIG. 2D);

c) Can slide into safety ridge 105 of an additional adjacent six-device-in-one landscape barrier;

d) Can anchor the six-device-in-one landscape barrier into the ground, when positioned vertically
(see FIG. 15R, FIG. 15S, and FIG. 15V); and e) Can prevent animals from digging beneath the six-device-in-one landscape barrier, when inserted into the soil vertically
(see FIG. 15R, FIG. 15S, and FIG. 15V).

4) It is an object of the new invention to provide a six-device-in-one landscape barrier, having corner-angling holes 106.

Therefore, the six-device-in-one landscape barrier:

a) Can lock a six-device-in-one landscape barrier to an additional adjacent six-device-in-one landscape barrier by interlocking barrier-locking tongues 104 there through
(see FIG. 8B, FIG. 8C, and FIG. 8D);

b) Can lockingly support a garden-plant cage
(see FIG. 2E, FIG. 2F, FIG. 15J, and FIG. 15K); and c) Can promote bending of angling end-wing 103a to form a corner, enabling barrier system 101 to create a variety of corner-angles.
(see FIG. 2L, FIG. 2M, FIG. 2N, FIG. 2Q, and FIG. 2R).

5) It is an object of the new invention to provide a six-device-in-one landscape barrier, having serpentine stake 116a.

Therefore, the six-device-in-one landscape barrier:

a) Can frictionally anchor into the soil;
(see FIG. 10)

b) Can secure barrier system 101 into the soil, on an inclined surface
(see FIG. 2A (Prior Art), and FIG. 6G);

c) Can secure barrier system 101 into the soil on a level surface
(see FIG. 6E, and FIG. 10);

d) Can secure barrier system 101 piercing into soil angledly in the directions of arrows 126
(see FIG. 6F, and FIG. 6G); and e) Can secure barrier system 101 piercing into the soil vertically in the directions of arrows 125
(see FIG. 6E, and FIG. 10).

6) It is another object of the new invention to provide a six-device-in-one landscape barrier, having serpentine ridges 118a.

Therefore, the landscape barrier:

a) Can wedge into three single-angled sheaths 109 to securely lock serpentine stake 116a, for storage and shipping
(see FIG. 4B, FIG. 7B, and FIG. 7E);

b) Can wedge into two double-angled sheaths 110 to securely lock serpentine stake 116a
(see FIG. 6C, FIG. 6D, FIG. 7B, and FIG. 7C);

c) Can wedge into three triple-angled sheaths 113 to securely lock serpentine stake 116a
(see FIG. 6C, FIG. 6D, FIG. 7B, FIG. 7D, and FIG. 7E);

d) Can frictionally secure serpentine stake 116a into the soil to prevent lifting when ground expands and contracts due changes in temperature in the directions of arrows 98i, 98j, 98k, 98l, 98m, and 98n
(see FIG. 1K (Prior Art), FIG. 2A (Prior Art), FIG. 2B (Prior Art), and FIG. 7A); and e) Can lockingly secure serpentine stake 116a to root-gripping barrier 102 by snap-locking double-snap-locking recesses to three triple-angled sheaths 113
(see FIG. 22A and FIG. 22B).

7) It is another object of the new invention to provide a landscape barrier, having root-gripping locking tunnels 119.

Therefore, the landscape barrier:

a) Can secure serpentine stake 116a in the soil by providing an opening through which grass and plant roots 128a may grow in the directions of arrows 128b
(see FIG. 2 (Prior Art), and FIG. 10);

b) Can create friction against the soil to secure serpentine stake 116a
(see FIG. 10);

c) Can secure root-gripping barrier 102 in the soil by providing an opening through which grass and plant roots 128a may grow in the directions of arrows 128b
(see FIG. 2 (Prior Art), and FIG. 10); and d) Can create friction against the soil to secure root-gripping barrier 102
(see FIG. 10).

8) It is a further object of the new invention to provide a landscape barrier, having stake-locking root-gripping holes 116c.

Figure 4C:
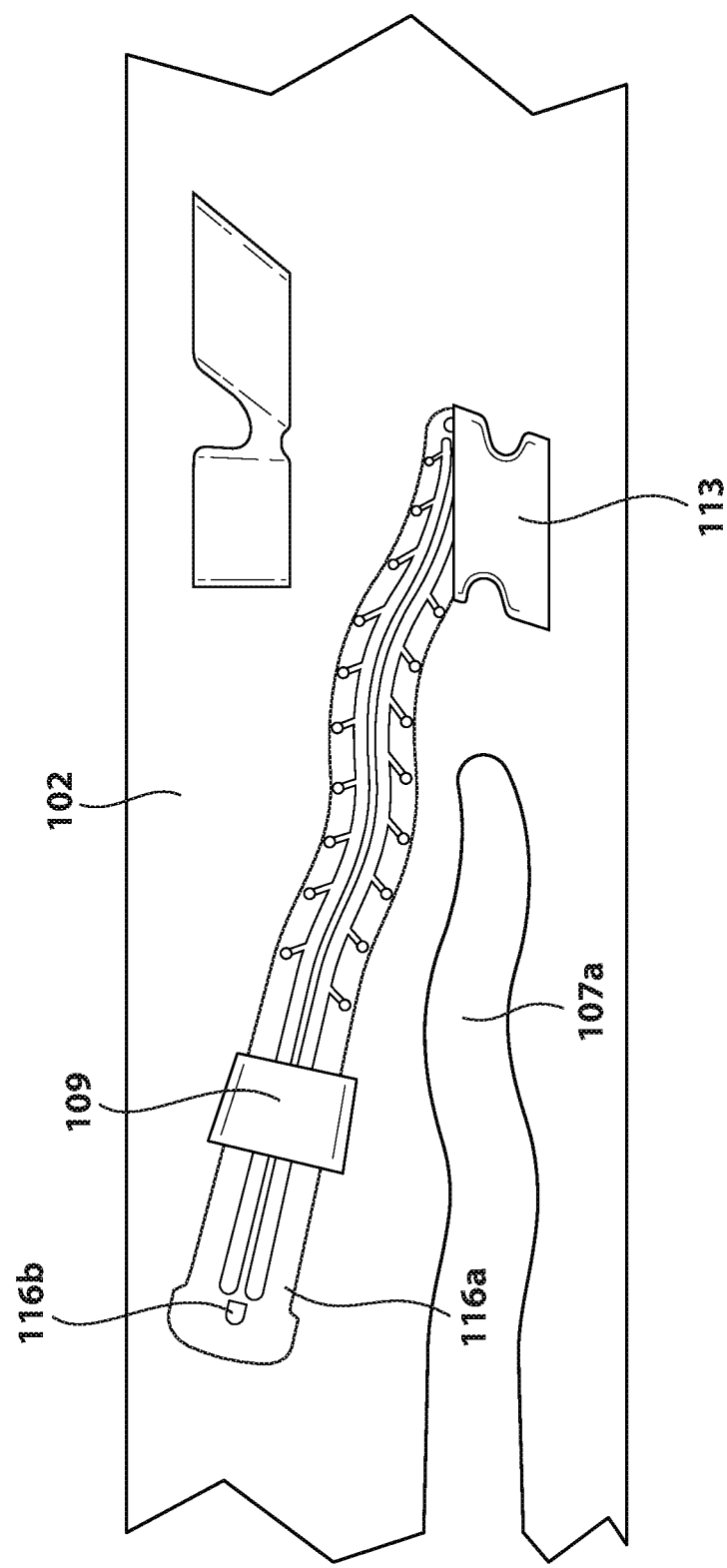
FIG. 4C illustrates a close-up front view of the six-device-in-one landscape barrier configured for shipping, with the serpentine stakes locked to stake-locking sheath systems.
Figure 4D:
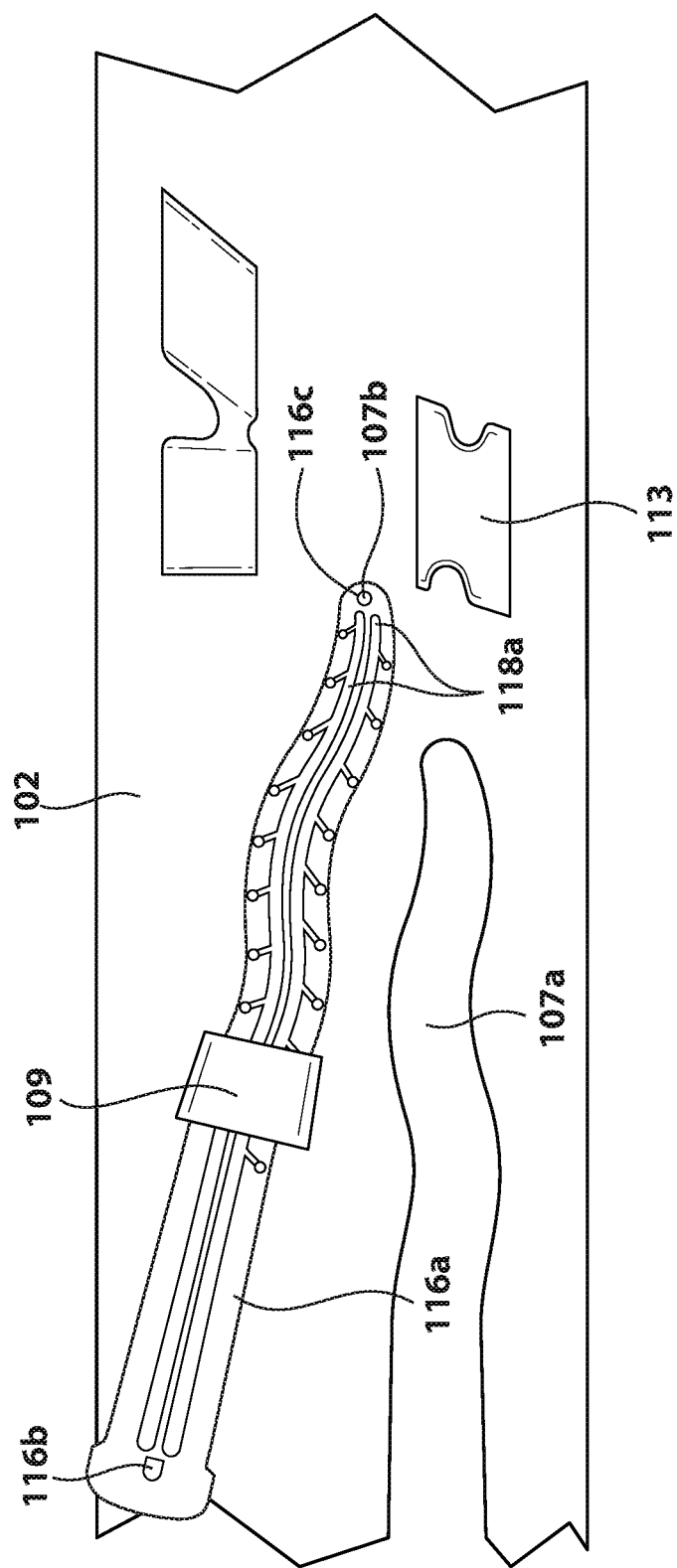
FIG. 4D illustrates a close-up front view of the six-device-in-one landscape barrier configured for shipping, with the serpentine stakes locked to the stake-locking nipples by the stake-locking root-gripping holes.
Figure 5A:
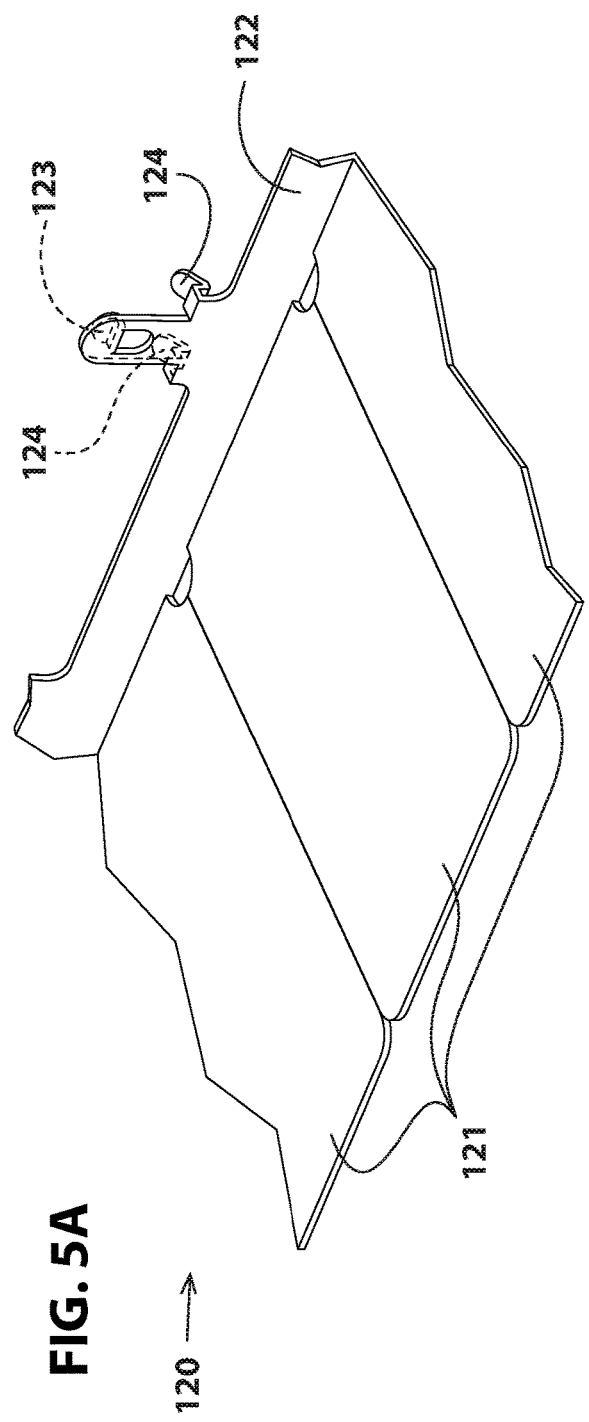
FIG. 5A, FIG. 5B, FIG. 5C, and FIG. 5D illustrate perspective views of the plate system.
Figure 5B:
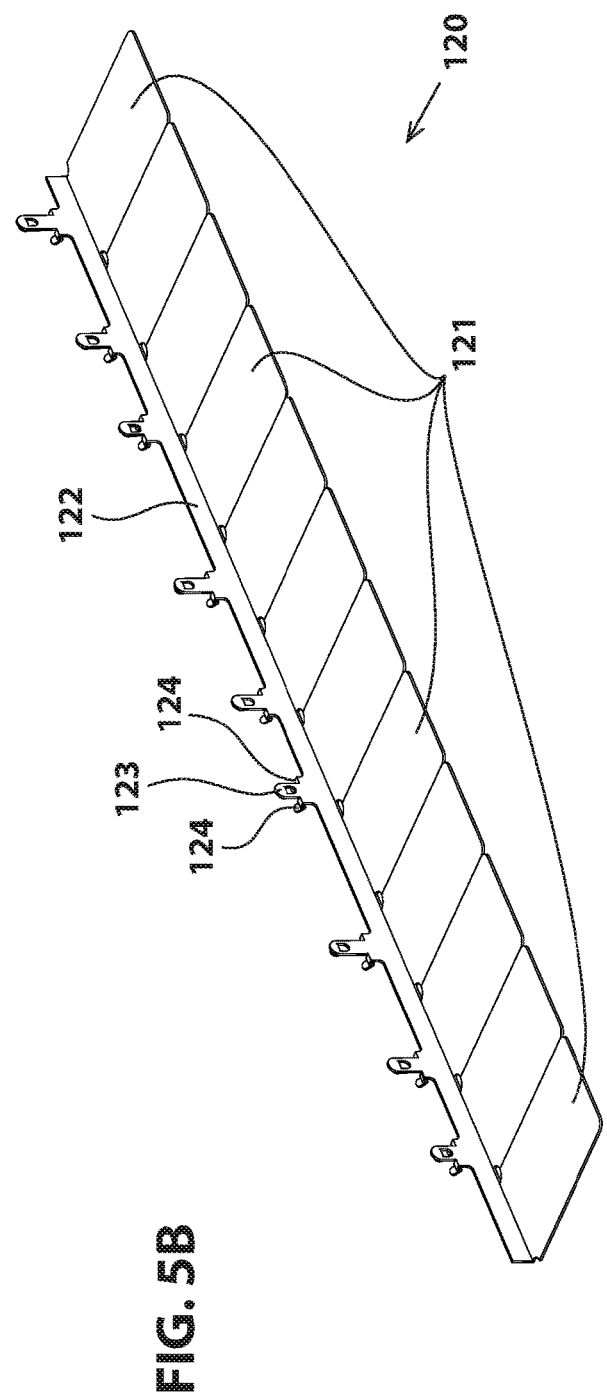
Figure 5C:
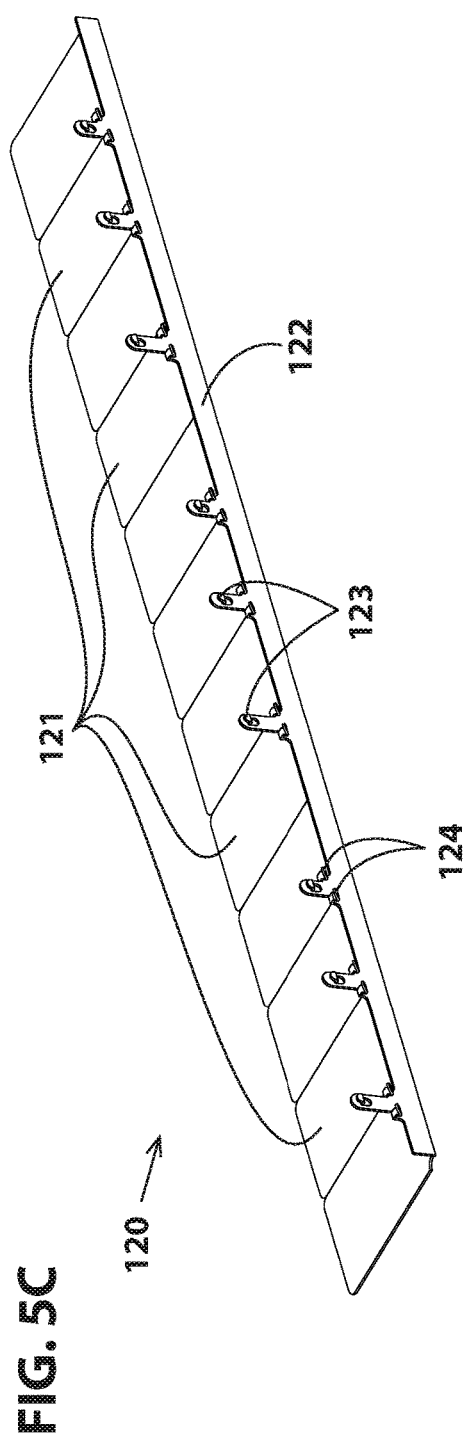
Figure 5D:
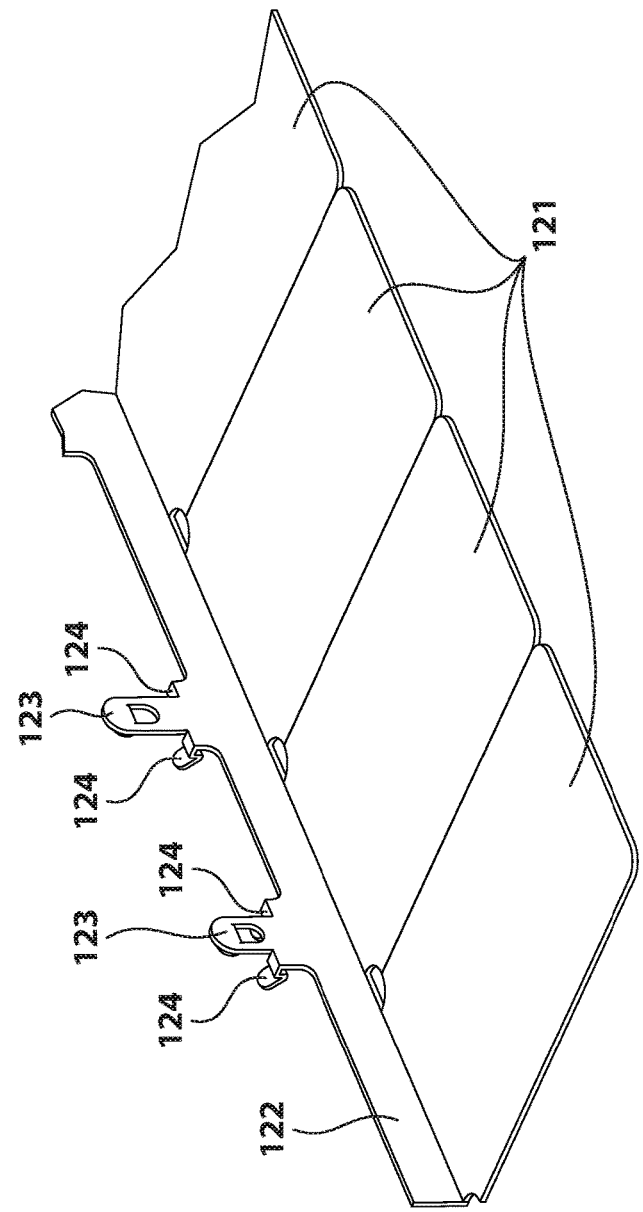

Therefore, the landscape barrier:

a) Can lock barrier-locking stake system 115 to barrier system 101 by securing to stake-locking nipples 107b
(see FIG. 4D);

b) Can secure serpentine stake 116a in the soil by providing an opening through which grass and plant roots 128a may grow in the directions of arrows 128b
(see FIG. 2 (Prior Art), and 10); and c) Can create friction against the soil to secure serpentine stake 116a
(see FIG. 10).

9) It is an even further object of the new invention to provide a six-device-in-one landscape barrier, having three root-gripping angle tunnels 107a.

Therefore, the six-device-in-one landscape barrier:

a) Can save materials during manufacturing by stamping out serpentine stake 116a from root-gripping barrier 102, utilizing the subsequent empty space therefrom
(see FIG. 1A (Prior Art), and FIG. 6A);

b) Can save time and energy costs when barrier-locking stake systems 115 is stored within three root-gripping angle tunnels 107a during packaging, storage, and shipping the six-device-in-one landscape barrier
to reduce the space the space needed in each shipping container
(see FIG. 2C and FIG. 2D),
to reduce the space needed for barrier system 101 thickness when packaged, and
to reduce significantly the unit cost of the six-device-in-one landscape barrier,
(FIG. 2C (PRIOR ART) illustrates a shipping container 99a has one hundred landscape barrier packaged units 99b filling up all its internal volume 99c),
(FIG. 2D illustrates a shipping container 100a has one hundred landscape barrier packaged units 100b filling up only 70% of its internal volume 100c and saving 30% of its internal volume 100d);
c) Can secure root-gripping barrier 102 into the soil by providing an opening through which grass and plant roots 128a may grow in the directions of arrows 128b
(see FIG. 6A, FIG. 6B, FIG. 9, and FIG. 10);
d) Can secure root-gripping barrier 102 into the soil by providing an opening through which soil may fill in the directions of arrows 132a and 132b
(see FIG. 15A);
c) Can lock into the soil by providing a lower edge below root-gripping angle tunnels 107a in the directions of arrows 133
(see FIG. 15B);
f) Can lock to top plate-securing hooks 123, in the directions of arrows 129a, 129b, 129c, and 129d
(see FIG. 9, FIG. 11A, FIG. 11B, FIG. 11C, FIG. 11D, FIG. 13, and FIG. 15A); and
g) Can lock to bottom plate-securing snap-hooks 124, in the directions of arrows 129a, 129b, 129c, and 129d
(see FIG. 9, FIG. 11A, FIG. 11B, FIG. 11C, FIG. 11D, FIG. 13, and FIG. 15A).
10) It is another object of the new invention to provide a six-device-in-one landscape barrier, having
stake-locking nipples 107b.
Therefore, the six-device-in-one landscape barrier:
a) Can lock the stake tip to barrier system 101 by being inserted into stake-locking root-gripping holes 116c
(see FIG. 4D)
to store barrier-locking stake system 115;
b) Can lock the stake tip to barrier system 101 by being inserted into stake-locking root-gripping holes 116c
(see FIG. 4D)
to provide a secure place to store barrier-locking stake system 115 when not in use; and
c) Can lock the stake tip to barrier system 101 by being inserted into stake-locking root-gripping holes 116c
(see FIG. 4D)
to prevent loss of serpentine stake 116a.
11) It is yet another object of the new invention to provide a six-device-in-one landscape barrier, having
three single-angled sheaths 109.

Therefore, the six-device-in-one landscape barrier:
a) Can wedge serpentine ridges 118a to securely lock serpentine stake 116a to barrier system 101
(see FIG. 6A, FIG. 7B, FIG. 7C, FIG. 7D, and FIG. 7E); and
b) Can secure serpentine stake 116a to root-gripping barrier 102 for storage and shipping
(see FIG. 4B).
12) It is still yet another object of the new invention to provide a six-device-in-one landscape barrier, having
two double-angled sheaths 110.
Therefore, the six-device-in-one landscape barrier:
a) Can secure multiple six-device-in-one landscape barrier adjacently by providing loops for a strap 100h to be threaded through in the direction of arrows 134
(see FIG. 15N, and FIG. 15O)
to create a shield to protect garden plants from animals
(see FIG. 16A and FIG. 16B),
to create a shield to protect saplings from animals
(see FIG. 15S and FIG. 15T),
to create a shield to protect trees from animals
(see FIG. 15S, FIG. 15T, FIG. 15U, and FIG. 15V),
to create a barrier to protect garden vegetation from animals
(see FIG. 16C and FIG. 16D), and
to create a tonneau cover of a truck bed
(see FIG. 15R);
b) Can secure six-device-in-one landscape barriers to utility holes of a pickup truck by providing openings for serpentine stake 116a
to create a vertical truck-bed extender
(see FIG. 15P, and FIG. 15Q);
c) Can secure multiple six-device-in-one landscape barriers to each other vertically by providing openings for serpentine stake 116a
to create a tree ring or planter ring of varying heights
(see FIG. 15J, FIG. 15K, FIG. 15L, and FIG. 15M);
d) Can guide serpentine stake 116a while being inserted vertically in the directions of arrows 125
(see FIG. 6D and FIG. 6E); and
e) Can guide serpentine stake 116a while being inserted angledly in the directions of arrows 126
(see FIG. 6C, FIG. 6F, and FIG. 6G).
13) It is still yet an even further object of the new invention to provide a six-device-in-one landscape barrier, having
two vertical guiding walls 111.
Therefore, the six-device-in-one landscape barrier:
a) Can guide serpentine stake 116a while being inserted vertically through two double-angled-stake-securing strap-loop sheaths 110
(see FIG. 6D, FIG. 6E, and FIG. 10); and
b) Can stabilize serpentine stake 116a in the soil
(see FIG. 6D, FIG. 6E, and FIG. 10).

14) It is still yet an even further object of the new invention to provide a six-device-in-one landscape barrier, having
two angled guiding walls 112.
Therefore, the six-device-in-one landscape barrier:
   a) Can guide serpentine stake 116a while being inserted angledly through two double-angled-stake-securing strap-loop sheaths 110
      (see FIG. 6C, FIG. 6F, and FIG. 6G); and
   b) Can stabilize serpentine stake 116a in the soil
      (see FIG. 6C, and FIG. 6G).
15) It is still yet an even further object of the new invention to provide a six-device-in-one landscape barrier, having
three triple-angled sheaths 113.
Therefore, the six-device-in-one landscape barrier:
   a) Can stackedly connect multiple six-device-in-one landscape barriers adjacently by providing loops for a strap 100h can be threaded through in the direction of arrows 135
      (see FIG. 15N, and FIG. 15O)
         to create a shield to protect garden plants from animals
            (see FIG. 16A and FIG. 16B),
         to create a shield to protect saplings from animals
            (see FIG. 15S and FIG. 15T),
         to create a shield to protect trees from animals
            (see FIG. 15U and FIG. 15V),
         to create a barrier to protect garden vegetation from animals
            (see FIG. 16C and FIG. 16D), and
         to create a tonneau cover of a truck bed
            (see FIG. 15R);
   b) Can secure six-device-in-one landscape barriers to utility holes of a pickup truck by providing openings for serpentine stake 116a
         to create a vertical truck-bed extender
            (see FIG. 15P, and FIG. 15Q);
   c) Can secure six-device-in-one landscape barriers to each other vertically by providing openings for serpentine stake 116a
         to create a tree ring or planter ring of varying heights
            (see FIG. 15J, FIG. 15K, FIG. 15L, and FIG. 15M);
   d) Can stabilize the tip of serpentine stake 116a to material-saving multi-root-gripping-and-water-flowing barrier 102 while securely wedged into three single-angled-stake-securing strap-loop sheaths 109, for storage and shipping
      (see FIG. 4B);
   e) Can guide serpentine stake 116a while being inserted through two double-angled-stake-securing strap-loop sheaths 110 angledly in the direction of arrows 126
      (see FIG. 6C, FIG. 6F, and FIG. 6G); and
   f) Can serpentine stake 116a while being inserted vertically through two double-angled sheaths 110 in the direction of arrows 125
      (see FIG. 6D, and FIG. 6E).
16) It is still yet an even further object of the new invention to provide a six-device-in-one landscape barrier, having
two curved guiding walls 114.
Therefore, the six-device-in-one landscape barrier:
   a) Can guide serpentine stake 116a while being inserted vertically through three triple-angled sheaths 113
      (see FIG. 6C, FIG. 6D, FIG. 6E, and FIG. 7D);
   b) Can guide serpentine stake 116a while being inserted angledly through three triple-angled sheaths 113
      (see FIG. 6C, FIG. 6F, FIG. 6G, and FIG. 7D); and
   c) Can stabilize serpentine stake 116a in the soil
      (see FIG. 6C, and FIG. 6G).
17) It is still yet an even further object of the new invention to provide a six-device-in-one landscape barrier, having
anti-digging plates 121.
Therefore, the six-device-in-one landscape barrier:
   a) Can retain water 130 to help nourish grass and plants
      (see FIG. 13A);
   b) Can prevent animals from digging underneath the six-device-in-one landscape barrier
      (see FIG. 13B and FIG. 16B);
   c) Can stabilize barrier system 101 by soil, gravel, rocks, bark chips, or other landscaping materials, being amassed upon plates 121, creating a downward force in the directions of arrows 131
      (see FIG. 13A and FIG. 14);
   d) Can provide adjustability, to be configured to many respective custom curvatures
      (see FIG. 3B, FIG. 12A, FIG. 12B, FIG. 12C, FIG. 12D, and FIG. 12E);
   e) Can provide adjustability, to be configured in a straight line
      (see FIG. 5A, and FIG. 12B); and
   f) Can provide adjustability, to be configured with 90, 45, 30, and 15 degree corners
      (see FIG. 3B, FIG. 12B, and FIG. 12E).
18) It is still yet an even further object of the new invention to provide a six-device-in-one landscape barrier, having
top plate-securing hooks 123.
Therefore, the six-device-in-one landscape barrier:
   a) Can snappingly attach to barrier system 101 in the direction of arrows 129a, 129b, 129c, and 129d
      (see FIG. 5A, FIG. 5B, FIG. 5C, FIG. 11A, FIG. 11B, FIG. 11C, and FIG. 11D);
   b) Can quickly and easily remove from the anti-digging plate systems 120 to barrier system 101
      (see FIG. 11A, FIG. 11B, FIG. 11C, and FIG. 11D);
   c) Can quickly and easily attach to the anti-digging plate systems 120 from barrier system 101
      (see FIG. 5A, FIG. 5B, and FIG. 5C); and
   d) Can securely attach barrier-conforming connector 122, to material-saving multi-root-gripping-and-water-flowing barrier 102
      (see FIG. 11D).
19) It is still yet an even further object of the new invention to provide a six-device-in-one landscape barrier, having
bottom plate-securing snap-hooks 124.
Therefore, the six-device-in-one landscape barrier:
   a) Can snappingly attach barrier-conforming connector 122, to root-gripping barrier 102 in the direction of arrows 129a, 129b, 129c, and 129d
      (see FIG. 11A, FIG. 11B, FIG. 11C, and FIG. 11D);

b) Can quickly and easily remove from barrier system 101
(see FIG. 5A, FIG. 5B, FIG. 5C, and FIG. 11D);
c) Can quickly and easily attach to barrier system 101
(see FIG. 11C and FIG. 11D); and
d) Can securely attach barrier-conforming connector 122, to root-gripping barrier 102
(see FIG. 11D).

What is claimed is:

1. A six-device-in-one landscape barrier comprising:
a root-gripping barrier
having two barrier ends and a barrier top;
an angling end-wing
molded to one of said two barrier ends of said root-gripping barrier,
said angling end-wing
for anchoring said six-device-in-one landscape barrier into the ground vertically when said angling end-wing is inserted into the ground
to prevent animals from digging beneath said six-device-in-one landscape barrier;
at least one tongue-locking opening
cut out from said angling end-wing;
at least one corner-angling hole
cut out from another one of said two barrier ends of said root-gripping barrier;
at least one barrier-locking tongue
molded to said angling end-wing,
said at least one barrier-locking tongue
for securely connecting said barrier to an other landscape barrier by inserting through at least one tongue-locking opening of said other landscape barrier;
a safety ridge
folded from said barrier top of said root-gripping barrier,
said safety ridge
for providing a guide for an angling end-wing of another landscape barrier to slide under;
at least one serpentine stake
having a stake tip,
said at least one serpentine stake
press-punched out of said root-gripping barrier
instead of being molded to said two barrier ends to reduce the required length of said root-gripping barrier to save material and to reduce the weight of said root-gripping barrier during manufacturing;
at least one root-gripping angle tunnel
press-punched through said root-gripping barrier
to press-punch said at least one serpentine stake out of there to save material and to reduce the weight of said root-gripping barrier during manufacturing,
said at least one root-gripping angle tunnel
for securing said root-gripping barrier into soil when inserted therein by providing said at least one root-gripping angle tunnel through which grass and plant roots grow and thus grip on said root-gripping barrier, and through which rain water is discharged to prevent plant roots from rotting away;
at least one stake-locking nipple
formed into said root-gripping barrier;
at least one barrier-securing stopper
formed into said at least one serpentine stake;
at least one stake-locking root-gripping hole
press-punched through said stake tip of said at least one serpentine stake,
said at least one stake-locking root-gripping hole
for said at least one stake-locking nipple to respectively snap therein to lock said stake tip to said root-gripping barrier for storage and shipping, and
for securing said at least one serpentine stake in the soil when inserted therein by providing said stake-locking root-gripping hole through which grass and plant roots grow and thus grip on said serpentine stake;
at least one single-angled sheath
molded to said root-gripping barrier,
said at least one single-angled sheath
for said at least one serpentine stake to respectively insert therethrough to secure said at least one serpentine stake to said root-gripping barrier for storage and shipping;
at least one double-angled sheath
molded to said root-gripping barrier,
said at least one double-angled sheath
for securing said six-device-in-one landscape barrier to another landscape barrier or to the ground vertically or in an angle when said at least one serpentine stake is threaded therethrough;
two vertical guiding walls and
two angled guiding walls
each molded to said double-angled sheath,
said two vertical guiding walls and said two angled guiding walls
for guiding said at least one serpentine stake while being inserted through said at least one double-angled sheath;
at least one triple-angled sheath
molded to said root-gripping barrier,
said at least one triple-angled sheath
for securing said six-device-in-one landscape barrier to another landscape barrier or to the ground vertically or in an angle when said at least one serpentine stake is threaded therethrough;
two curved guiding walls
each molded to said at least one triple-angled sheath,
said two curved guiding walls
for guiding said at least one serpentine stake while being inserted through said at least one triple-angled sheath;
a plurality of serpentine ridges
respectively pressed into said at least one serpentine stake,
said serpentine ridges
for wedging into said at least one single-angled sheath or said at least one double-angled sheath or said at least one triple-angled sheath to securely lock said at least one serpentine stake therein, for storage and shipping, and
for frictionally securing said at least one serpentine stake into soil when inserted therein;
a plurality of anti-digging plates
for preventing animals from digging underneath said six-device-in-one landscape barrier, and
for stabilizing said six-device-in-one landscape barrier by soil, gravel, rocks, bark chips, or other landscaping materials, being amassed upon said anti-digging plates;
a barrier-conforming connector
molded to said anti-digging plates;
a plurality of top plate-securing hooks respectively molded to said barrier-conforming connector, said top plate-securing hooks
for hooking through said at least one root-gripping angle tunnel,
to attach said anti-digging plates to said root-gripping barrier;

a plurality of bottom plate-securing snap-hooks
respectively molded to said barrier-conforming connector,
said bottom plate-securing snap-hooks
for hooking through said at least one root-gripping angle tunnel,
to attach said anti-digging plates to said root-gripping barrier;

a plurality of root-gripping locking tunnels
respectively formed into said serpentine stake,
said root-gripping locking tunnels
for securing said at least one serpentine stake in soil when inserted therein by providing said root-gripping locking tunnels through which grass and plant roots grow and thus grip on said serpentine stake; and a plurality of branching bridges
respectively molded to said serpentine ridges,
said branching bridges
for creating friction against soil to secure said at least one serpentine stake in the soil when inserted therein.

2. The six-device-in-one landscape barrier of claim 1, wherein:
said at least one tongue-locking opening
has a cul-de-sac shape.

3. The six-device-in-one landscape barrier of claim 1, wherein:
said at least one barrier-locking tongue
has an elongated cul-de-sac shape.

4. The six-device-in-one landscape barrier of claim 1, wherein:
said at least one root-gripping angle tunnel
has a wavy shape.

5. The six-device-in-one landscape barrier of claim 1, wherein:
said at least one serpentine stake
is made of metallic material.

6. The six-device-in-one landscape barrier of claim 1, wherein:
said at least one serpentine stake
has a wavy shape.

7. The six-device-in-one landscape barrier of claim 1, wherein:
said at least one stake-locking nipple
has a round-domed shape.

8. A root-gripping landscape barrier comprising:
a root-gripping barrier
having two barrier ends and a barrier top;
an end-wing
molded to one of said two barrier ends of said root-gripping barrier
for anchoring said root-gripping landscape barrier into the ground vertically when said end-wing is inserted into the ground,
to prevent animals from digging beneath said root-gripping landscape barrier;
at least one tongue-locking opening
cut out from said end-wing;
at least one corner-angling hole
cut out from another one of said two barrier ends of said root-gripping barrier;
at least one barrier-locking tongue
molded to said end-wing
for securely connecting said root-gripping landscape barrier to an other landscape barrier by inserting through at least one tongue-locking opening of said other landscape barrier;
a safety ridge
folded from said barrier top of said root-gripping barrier
for providing a guide for an end-wing of another landscape barrier to slide into;
at least one serpentine stake
having a stake tip,
said at least one serpentine stake
press-punched out of said root-gripping barrier
instead of being molded to said two barrier ends to reduce the required length of said root-gripping barrier to save material and to reduce the weight of said root-gripping barrier during manufacturing;
at least one root-gripping angle tunnel
press-punched through said root-gripping barrier
to press-punch said at least one serpentine stake out of there to save material and to reduce the weight of said root-gripping barrier during manufacturing
for securing said root-gripping landscape barrier into soil when inserted therein by providing said at least one root-gripping angle tunnel through which grass and plant roots may grow and thus grip on said root-gripping barrier;
at least one stake-locking nipple
formed into said material-saving multi-root-gripping barrier;
at least one barrier-securing stopper
formed into said at least one serpentine stake;
at least one stake-locking hole
press-punched through said stake tip of said at least one serpentine stake
for said at least one stake-locking nipple to respectively snap therein to lock said stake tip to said root-gripping barrier for storage and shipping, and
for securing said at least one serpentine stake in the soil when inserted therein by providing said stake-locking hole through which grass and plant roots may grow and thus grip on said serpentine stake;
at least one single-angled sheath
molded to said root-gripping barrier
for said at least one serpentine stake to respectively insert therethrough to secure said at least one serpentine stake to said root-gripping barrier for storage and shipping;
at least one double-angled sheath
molded to said root-gripping barrier
for securing said root-gripping-landscape barrier to another landscape barrier or to the ground vertically or in an angle when said at least one serpentine stake is threaded therethrough;
two vertical guiding walls and
two angled guiding walls
each molded to said double-angled sheath
for guiding said at least one serpentine stake while being inserted through said at least one double-angled sheath;

at least one triple-angled sheath
  molded to said root-gripping barrier
    for securing said root-gripping landscape barrier to another landscape barrier or to the ground vertically or in an angle when said at least one serpentine stake is threaded therethrough;
two curved guiding walls,
  each molded to said at least one triple-angled sheath
    for guiding said at least one serpentine stake while being inserted through said at least one triple-angled sheath;
a plurality of serpentine ridges
  respectively pressed into said at least one serpentine stake
    for wedging into said at least one single- and double- and triple-angled sheath to securely lock said at least one serpentine stake therein, for storage and shipping, and
    for frictionally securing said at least one serpentine stake into soil when inserted therein;
a plurality of anti-digging plates
  for preventing animals from digging underneath said root-gripping landscape barrier, and
  for stabilizing said root-gripping landscape barrier by soil, gravel, rocks, bark chips, or other landscaping materials, being amassed upon said anti-digging plates;
a barrier-conforming connector
  molded to said anti-digging plates;
a plurality of top plate-securing hooks
  respectively molded to said barrier-conforming connector
    for hooking through said at least one root-gripping angle tunnel,
    to attach said anti-digging plates to said root-gripping barrier;
a plurality of bottom plate-securing snap-hooks
  respectively molded to said barrier-conforming connector
    for hooking through said at least one root-gripping angle tunnel,
    to attach said anti-digging plates to said root-gripping barrier;
a plurality of root-gripping locking tunnels
  respectively formed into said serpentine stake
    for securing said at least one serpentine stake in soil when inserted therein by providing said root-gripping locking tunnels through which grass and plant roots may grow and thus grip on said serpentine stake; and
a plurality of branching bridges
  respectively molded to said serpentine ridges
    for creating friction against soil to secure said at least one serpentine stake in the soil when inserted therein.

9. The root-gripping landscape barrier of claim 8, wherein:
said at least one tongue-locking opening
  has a cul-de-sac shape.

10. The root-gripping landscape barrier of claim 8, wherein:
said at least one barrier-locking tongue
  has an elongated cul-de-sac shape.

11. The root-gripping landscape barrier of claim 8, wherein:
said at least one root-gripping angle tunnel
  has a wavy shape.

12. The root-gripping landscape barrier of claim 8, wherein:
said at least one serpentine stake
  is made of metallic material.

13. The root-gripping landscape barrier of claim 8, wherein:
said at least one serpentine stake
  has a wavy shape.

14. The root-gripping landscape barrier of claim 8, wherein:
said at least one stake-locking nipple
  has a round-domed shape.

* * * * *